(12) United States Patent
Andino, Jr. et al.

(10) Patent No.: US 7,792,685 B2
(45) Date of Patent: Sep. 7, 2010

(54) SELECTION OF INDIVIDUALS FROM A POOL OF CANDIDATES IN A COMPETITION SYSTEM

(75) Inventors: Adalberto Andino, Jr., Sterling, VA (US); Matthew Errol Quamina, Fairfax, VA (US)

(73) Assignee: United Negro College Fund, Inc., Fairfax, VA (US)

( * ) Notice: Subject to any disclaimer, the term of this patent is extended or adjusted under 35 U.S.C. 154(b) by 0 days.

(21) Appl. No.: 11/882,007

(22) Filed: Jul. 30, 2007

(65) Prior Publication Data

US 2008/0052103 A1 Feb. 28, 2008

Related U.S. Application Data

(62) Division of application No. 09/996,907, filed on Nov. 30, 2001, now Pat. No. 7,321,858.

(51) Int. Cl.
*G06Q 99/00* (2006.01)
(52) U.S. Cl. .................. 705/1.1; 705/320; 705/321
(58) Field of Classification Search ............... 705/1, 705/1.1, 320, 321
See application file for complete search history.

(56) References Cited

U.S. PATENT DOCUMENTS

| | | | |
|---|---|---|---|
| 4,787,036 A | 11/1988 | Fleming | |
| 5,117,353 A | 5/1992 | Stipanovich et al. | |
| 5,164,897 A | 11/1992 | Clark et al. | |
| 5,170,362 A | 12/1992 | Greenberg et al. | |
| 5,197,004 A | 3/1993 | Sobotka et al. | |
| 5,416,694 A | 5/1995 | Parrish et al. | |

(Continued)

FOREIGN PATENT DOCUMENTS

JP 11-120224 4/1999

(Continued)

OTHER PUBLICATIONS

Daniel P. Lopresti, "A Comparison of Text-Based Methods for Detecting Duplication in Document Image Databases," Proceedings of Document Recognition and Retrieval VII (IS&T/SPIE Electronic Imaging), vol. 3967, pp. 210-221, San Jose, CA, Jan. 2000.

(Continued)

*Primary Examiner* — Jonathan Ouellette
(74) *Attorney, Agent, or Firm* — Fitch Even Tabin & Flannery; Kendrew H. Colton

(57) ABSTRACT

An integrated highly automated competition system allows for selection of one or more competition winners. Documents can be submitted electronically or by hardcopy. Document submissions are checked against databases to determine duplicate existence by a variety of information extracted from the documents. Candidates are filtered by one or more filters requiring candidates meet completeness qualification, eligibility, and partner/discretionary standards. Candidates are evaluated by one or more readers and scored on a plurality of cognitive and non-cognitive variables. Readers are monitored and corrective action is taken when reader evaluations are determined to require corrective action. Candidates are selected by a two stage process first using raw read scores and then using a successive weighted read score iteration or tie-breaking stage. Winning candidates are subject to progress tracking and re-qualification prior to receiving award payments.

7 Claims, 79 Drawing Sheets

U.S. PATENT DOCUMENTS

| | | | |
|---|---|---|---|
| 5,437,554 | A | 8/1995 | Clark et al. |
| 5,458,493 | A | 10/1995 | Clark et al. |
| 5,466,159 | A | 11/1995 | Clark et al. |
| 5,551,880 | A | 9/1996 | Bonnstetter et al. |
| 5,558,521 | A | 9/1996 | Clark et al. |
| 5,657,256 | A | 8/1997 | Swanson et al. |
| 5,663,547 | A | 9/1997 | Ziarno |
| 5,672,060 | A | 9/1997 | Poor |
| 5,690,497 | A | 11/1997 | Clark et al. |
| 5,709,551 | A | 1/1998 | Clark et al. |
| 5,716,213 | A | 2/1998 | Clark et al. |
| 5,717,865 | A | 2/1998 | Stratmann |
| 5,758,324 | A | 5/1998 | Hartman et al. |
| 5,799,302 | A | 8/1998 | Johnson et al. |
| 5,809,484 | A | 9/1998 | Mottola et al. |
| 5,832,497 | A | 11/1998 | Taylor |
| 5,879,165 | A | 3/1999 | Brunkow et al. |
| 5,884,270 | A | 3/1999 | Walker et al. |
| 5,978,768 | A | 11/1999 | McGovern et al. |
| 5,987,302 | A | 11/1999 | Driscoll et al. |
| 5,991,595 | A * | 11/1999 | Romano et al. ............... 434/353 |
| 6,088,686 | A | 7/2000 | Walker et al. |
| 6,112,050 | A | 8/2000 | George-Morgan |
| 6,115,683 | A | 9/2000 | Burstein et al. |
| 6,120,299 | A | 9/2000 | Trenholm et al. |
| 6,144,838 | A | 11/2000 | Sheehan |
| 6,155,839 | A | 12/2000 | Clark et al. |
| 6,168,440 | B1 | 1/2001 | Clark et al. |
| 6,181,909 | B1 | 1/2001 | Burstein et al. |
| 6,183,261 | B1 | 2/2001 | Clark et al. |
| 6,193,521 | B1 | 2/2001 | Clark et al. |
| 6,234,806 | B1 | 5/2001 | Trenholm et al. |
| 6,240,409 | B1 | 5/2001 | Aiken |
| 6,250,548 | B1 | 6/2001 | McClure et al. |
| 6,256,399 | B1 | 7/2001 | Poor |
| 6,267,601 | B1 | 7/2001 | Jongsma et al. |
| 6,272,467 | B1 | 8/2001 | Durand et al. |
| 6,275,812 | B1 | 8/2001 | Haq et al. |
| 6,280,198 | B1 | 8/2001 | Calhoun et al. |
| 6,289,340 | B1 | 9/2001 | Puram et al. |
| 6,295,439 | B1 | 9/2001 | Bejar et al. |
| 6,928,435 | B2 | 8/2005 | Lee et al. |
| 2002/0040317 | A1* | 4/2002 | Neumeyer et al. ............... 705/11 |
| 2002/0046074 | A1 | 4/2002 | Barton |
| 2002/0120538 | A1 | 8/2002 | Corrie et al. |
| 2002/0128892 | A1 | 9/2002 | Farenden |
| 2002/0198765 | A1 | 12/2002 | Magrino et al. |
| 2002/0198766 | A1 | 12/2002 | Magrino et al. |
| 2003/0083891 | A1 | 5/2003 | Lang et al. |
| 2003/0195786 | A1 | 10/2003 | Dewar |

FOREIGN PATENT DOCUMENTS

| | | |
|---|---|---|
| WO | WO 98/39716 | 9/1998 |
| WO | WO 99/17242 | 4/1999 |
| WO | WO 99/54835 | 10/1999 |
| WO | WO 01/03034 A1 | 1/2001 |
| WO | WO 01/13276 A1 | 2/2001 |
| WO | WO 01/25971 A1 | 4/2001 |
| WO | WO 01/43035 A1 | 6/2001 |
| WO | WO 01/59598 A2 | 8/2001 |
| WO | WO 01/61527 A2 | 8/2001 |
| WO | WO 01/61670 A1 | 8/2001 |

OTHER PUBLICATIONS

Daniel P. Lopresti, "Models and Algorithms for Duplicate Document Detection," Proceedings of the Fifth International Conference on Document Analysis and Recognition, Institute of Electrical and Electronics Engineers, Inc., 1998.

Paul S. Prueitt; Chapter 11 of *Foundations for Knowledge Management*; 1999; printed from http://www.bcngroup.org/area3/pprueitt/kmbook/Chapter_11.htm on Oct. 15, 2001.

Kennedy et al., Chapter 3 (relating to In-House Applicant Tracking Systems) from *Electronic Job Search Revolution*; Wiley & Sons, 1994.

Bandalos, D. L. and Sedlacek, W. E. (1987). *Changes in student values and attitudes over a decade*. (ERIC Document Reproduction Service, No. ED 290972).

Ancis, J. R. & Sedlacek, W. E. (1997). Predicting the academic achievement of female students using the SAT and noncognitive variables. *College and University* 72 (3), 1-8 printed from http://www.inform.umd.edu/EdRes/Topic/Diversity/General/Reading/Sedlacek/1975.htm on Jun. 10, 2003.

Sedlacek, W. E. & Adams-Gaston, J. (1992). Predicting the academic success of student-athletes using SAT and noncognitive variables. *Journal of Counseling and Development* 70, 724-727.

Boyer, S. P. & Sedlacek, W. E. (1998). Noncognitive predictors of academic success for international students: A longitudinal study. *Journal of College Student Development*, 29, 218-222.

Tracey, T. J. and Sedlacek, W. E. (1984). Noncognitive variables in predicting academic success by race. *Measurement and Evaluation in Guidance*, 16, 171-178.

Ripley et al., "Cream: Criteria-related Employability Assessment Method: A systematic approach for employee selection." Management Decision, v32n9, pp. 27-36, 1994.

Murphy et al., "Modeling the effects of banding in personnel selection," Personnel Psychology, v48n1, pp. 61-84, Spring 1995.

Bowman et al., "Admissions decision making in master of public administration program affirmative action?" American Review of Public Administration, v19, n2, p. 149, Jun. 1989.

"Wang and USC to market Student Admissions Processing Application," News Release, p. 1, Nov. 27, 1990.

* cited by examiner

| EVALUATION VARIABLE | PARTNER GROUP ENGINEERING PARTNER GROUP | BUSINESS MANAGEMENT PARTNER GROUP |
|---|---|---|
| CURRICULUM VIGOR | 2 | 9 |
| ACADEMIC ACHIVEMENT | 1 | 8 |
| POSITIVE SELF-ESTEEM | 9 | 3 |
| REALISTIC SELF-APPRAISAL | 10 | 10 |
| UNDERSTANDING AND NAVIGATION OF SOCIAL AND ORGANIZATIONAL SYSTEMS | 6 | 1 |
| PREFERENCE FOR LONG-TERM GOALS OVER IMMEDIATE GRATIFICATION | 4 | 6 |
| LEADERSHIP EXPERIENCE | 7 | 2 |
| COMMUNITY SERVICE | 11 | 11 |
| SELF-MOTIVATED ACQUISITION OF KNOWLEDGE OR SKILLS | 5 | 7 |
| PERSUASIVENESS | 8 | 5 |
| LANGUAGE STRUCTURE AND EXPRESSION ABILITY | 3 | 4 |

PRIORITY ORDERING OF EVALUATION
VARIABLES BY SELECTED PARTNER GROUPS

Figure 12c

| | CANDIDATE # 1, READ 1 | CANDIDATE # 1, READ 2 | CANDIDATE # 2, READ 1 | CANDIDATE # 2, READ 2 |
|---|---|---|---|---|
| CURRICULUM VIGOR | 4 | 3 | 4 | 2 |
| ACADEMIC ACHIVEMENT | 4 | 4 | 4 | 4 |
| POSITIVE SELF-ESTEEM | 2 | 2 | 3 | 4 |
| REALISTIC SELF-APPRAISAL | 3 | 2 | 3 | 4 |
| UNDERSTANDING AND NAVIGATION OF SOCIAL AND ORGANIZATIONAL SYSTEMS | 3 | 4 | 3 | 3 |
| PREFERENCE FOR LONG-TERM GOALS OVER IMMEDIATE GRATIFICATION | 2 | 2 | 2 | 2 |
| LEADERSHIP EXPERIENCE | 4 | 3 | 4 | 4 |
| COMMUNITY SERVICE | 2 | 4 | 4 | 2 |
| SELF-MOTIVATED ACQUISITION OF KNOWLEDGE OR SKILLS | 3 | 4 | 3 | 2 |
| PERSUASIVENESS | 4 | 3 | 2 | 3 |
| LANGUAGE STRUCTURE AND EXPRESSION ABILITY | 3 | 2 | 2 | 2 |

Figure 12d

| | | READ VARIABLES | | | | | | | | | | TOTAL SCORE |
|---|---|---|---|---|---|---|---|---|---|---|---|---|
| ORIGINAL READING | CANDIDATE #1, READ 1 | 4 | 4 | 2 | 3 | 3 | 2 | 4 | 2 | 3 | 4 | 3 | 68 |
| | CANDIDATE #1, READ 2 | 3 | 4 | 2 | 2 | 4 | 2 | 3 | 4 | 4 | 3 | 2 | |
| | CANDIDATE #2, READ 1 | 4 | 4 | 3 | 3 | 3 | 2 | 4 | 4 | 3 | 2 | 2 | 66 |
| | CANDIDATE #2, READ 2 | 2 | 4 | 4 | 4 | 3 | 2 | 4 | 2 | 2 | 3 | 2 | |
| FIRST WEIGHTING | CANDIDATE #1, READ 1 | 4 | 8 | 2 | 3 | 3 | 2 | 4 | 2 | 3 | 4 | 3 | 74 |
| | CANDIDATE #1, READ 2 | 3 | 8 | 2 | 2 | 4 | 2 | 3 | 4 | 4 | 3 | 2 | |
| | CANDIDATE #2, READ 1 | 4 | 8 | 3 | 3 | 3 | 2 | 4 | 4 | 3 | 2 | 2 | 74 |
| | CANDIDATE #2, READ 2 | 2 | 8 | 4 | 4 | 3 | 2 | 4 | 2 | 2 | 3 | 2 | |
| SECOND WEIGHTING | CANDIDATE #1, READ 1 | 8 | 8 | 2 | 3 | 3 | 2 | 4 | 2 | 3 | 4 | 3 | 82 |
| | CANDIDATE #1, READ 2 | 8 | 8 | 2 | 2 | 4 | 2 | 3 | 4 | 4 | 3 | 2 | |
| | CANDIDATE #2, READ 1 | 8 | 8 | 3 | 3 | 3 | 2 | 4 | 4 | 3 | 2 | 2 | 82 |
| | CANDIDATE #2, READ 2 | 8 | 8 | 4 | 4 | 3 | 2 | 4 | 2 | 2 | 3 | 2 | |
| THIRD WEIGHTING | CANDIDATE #1, READ 1 | 8 | 8 | 2 | 3 | 3 | 2 | 4 | 2 | 3 | 4 | 6 | 87 |
| | CANDIDATE #1, READ 2 | 8 | 8 | 2 | 2 | 4 | 2 | 3 | 4 | 4 | 3 | 4 | |
| | CANDIDATE #2, READ 1 | 8 | 8 | 3 | 3 | 3 | 2 | 4 | 4 | 3 | 2 | 4 | 86 |
| | CANDIDATE #2, READ 2 | 8 | 8 | 4 | 4 | 3 | 2 | 4 | 2 | 2 | 3 | 4 | |

Figure 12e

READER QUALIFICATION
Reader Name:          AP5 Trainer AP5 Trainer        Nominee Name:           Jeffrey Kap
Reader Race/Ethnicity:   Asian Pacific American      Nominee Race/Ethnicity:  Asian Pacific American

NOMINEE BIOGRAPHY
Demographics
GENDER:            Male
BORN:              12/13/82  Dependent
RACE/ETHNICITY:    Asian Pacific American
FIRST LANGUAGE SPOKEN: English and another language mandarin
Educational Status and History
COLLEGE BOARD    SCHOOL ATTENDED              BEGIN     END      GRAD     RANK/SZ    G
371905           Jenks High School  Jenks Oklahoma  8/1/97   5/1/01   5/1/01   0/0        3

GED COMPLETED: Not Provided
ABSENT FROM HIGH SCHOOL FOR ONE OR MORE TERMS BEFORE GRADUATING:
No Future Plans
INTENDED MAJOR IN COLLEGE:      electrical engineering
PROFESSIONAL GOALS:             Work as an engineering consultant for a large firm

READER ELIGIBILITY
IF YOU INDICATE 'YES' ON ANY OF THE FOLLOWING, THIS NOMINEE WILL BE REDIRECTED FOR REVIEW BY ANOTHER READER.
IF ALL ANSWERS ARE 'NO', YOU WILL CONTINUE WITH THIS NOMINEE.

Educational Status and History
COLLEGE BOARD  SCHOOL ATTENDED                BEGIN    END    GRAD    RANK/SZ  G
371905          Jenks High School  Jenks Oklahoma  8/1/97  5/1/01  5/1/01  0/0      3

GED COMPLETED: Not Provided
ABSENT FROM HIGH SCHOOL FOR ONE OR MORE TERMS BEFORE GRADUATING:
No

Future Plans
INTENDED MAJOR IN COLLEGE:   electrical engineering
PROFESSIONAL GOALS:          Work as an engineering consultant for a large firm

READER ELIGIBILITY
IF YOU INDICATE "YES" ON ANY OF THE FOLLOWING, THIS NOMINEE WILL BE REDIRECTED FOR REVIEW BY ANOTHER READER.
IF ALL ANSWERS ARE "NO", YOU WILL CONTINUE WITH THIS NOMINEE.

1. Did you nominate this Nominee?
   o Yes  ⊙ No
2. Did you recommend this Nominee?
   o Yes  ⊙ No
3. Do you, for any reason—for example, because you are familiar with the Nominee or because you are affiliated with his/her high school because the Nominee is non-traditional and you lack experience in assessing such students—prefer not to review this application?
   o Yes  ⊙ No

[SUBMIT]  [RESET]

FIG. 18

Reader Name: APS Trainer APS Trainer
Reader Race/Ethnicity: Asian Pacific American Nominee Name: Jeffrey Kap
Nominee Race/Ethnicity: Asian Pacific American
Nominee SSN: 543868912

View Nominee Data
View Nomination Data
View Recommendation Data

Please verify this Nominee is eligible on the basis of high school graduation by August 2001 OR completed GED by February 2001 OR, if neither, admission to a collegiate institution. Unless the Nominee completed the GED, please verify that at least GPA listed is a minimum of 3.3.

COLLEGE BOARD   SCHOOL ATTENDED                    BEGIN    END     GRAD    RANK/SZ   G
371905          Jenks High School   Jenks Oklahoma  8/1/97   5/1/01  5/1/01  0/0       3

ACCORDING TO THE NOMINATOR, DOES THE NOMINEE HAVE A CUMULATIVE GPA OF 3.3 OR MORE ON A 4.0 SCALE? Yes
GED COMPLETED: Not Provided
NEITHER GRADUATED HIGH SCHOOL NOR COMPLETED THE GED BY JUNE 2001 BUT HAS BEEN ADMITTED TO A COLLEGIATE INSTITUTION: Not Provided
PLEASE ENSURE ACCURACY OF RESPONSES BELOW. A "NO" response can eliminate a nominee from the scholarship competition.

1. Is the Nominee ELIGIBLE based on graduation by August 2001, GED, or admission to a collegiate institution?
   ⊙ Yes   ○ No 2. Is the Nominee ELIGIBLE based on GPA? (if the Nominee has completed a GED, please mark "Yes" in all cases.)
   ⊙ Yes   ○ No 3. Is the Nominee ELIGIBLE based on the most recent school being a high school (not a college)?

FIG. 19

View Recommendation Data

Please verify this Nominee is eligible on the basis of high school graduation by August 2001 OR completed GED by February 2001 OR, if neither, admission to a collegiate institution. Unless the Nominee completed the GED, please verify that at least GPA listed is a minimum of 3.3.

| COLLEGE BOARD | SCHOOL ATTENDED | | | BEGIN | END | GRAD | RANK/SZ | GPA |
|---|---|---|---|---|---|---|---|---|
| 371905 | Jenks High School | Jenks | Oklahoma | 8/1/97 | 5/1/01 | 5/1/01 | 0/0 | 3 |

ACCORDING TO THE NOMINATOR, DOES THE NOMINEE HAVE A CUMULATIVE GPA OF 3.3 OR MORE ON A 4.0 SCALE? Yes
GED COMPLETED: Not Provided
NEITHER GRADUATED HIGH SCHOOL NOR COMPLETED THE GED BY JUNE 2001 BUT HAS BEEN ADMITTED TO A COLLEGIATE INSTITUTION: Not Provided
PLEASE ENSURE ACCURACY OF RESPONSES BELOW. A "NO" response can eliminate a nominee from the scholarship competition.

1. Is the Nominee ELIGIBLE based on graduation by August 2001, GED, or admission to a collegiate institution?
   ⦿ Yes  ○ No
2. Is the Nominee ELIGIBLE based on GPA? (If the Nominee has completed a GED, please mark "Yes" in all cases.)
   ⦿ Yes  ○ No
3. Is the Nominee ELIGIBLE based on the most recent school being a high school (not a college)?
   ⦿ Yes  ○ No
4. Is there enough information available on which to base a sound score for this Nominee?
   ⦿ Yes  ○ No

[SUBMIT] [RESET]

NOMINEE SCORE SHEET

Reader Name: AP5 Trainer AP5 Trainer
Reader Race/Ethnicity: Asian Pacific American View Nominee Data
View Nomination Data
View Recommendation Data

Variables
1. Curriculum rigor
2. Overall academic achievement
3. Positive self-concept/self-esteem
4. Realistic self-appraisal
5. Understanding and navigation of social and organizational systems
6. Preference for long-term over immediate needs
7. Successful leadership experience
8. Community service
9. Non-traditional, Self-directed acquisition of knowledge or skill

---

1. Curriculum rigor

*NOMINATOR RESPONSE*

RIGOR OF STUDENT'S COURSEWORK: EXTREMELY O

One glance at Jeff's transcript, Jenk's most rigorous courses, he has dis to enter any of the most rigorous univer

NOMINATOR'S RECOMMENDATION:

The Gates Millenium Scholarship accomplished in high school, but because make a difference in our lives. He has a for service. Jeff has set high goals and take to succeed. At the very least, it i assistance it takes to get this astoundi

Nominee Packet Progress Detail (grouped by complete/incomplete, ordered by SSN)     Date: 11/27/01

| SSN | LAST_NAME | FIRST_NAME | MID_NAME | ETH_GRP | NOMINEE | NOMINATION | RECOMMEND |
|---|---|---|---|---|---|---|---|
| Complete | | | | | | | |
| 102666661 | BALTAZAS | CHRISTOPHER | JOHN | AP | 02/07/2001 | 01/31/2001 | 02/08/2001 |
| 103820267 | MARCI | KELSBY | RYESUN | AP | 02/22/2001 | 02/09/2001 | 02/15/2001 |
| 104942831 | Sayee | Nomena | | AP | 01/30/2001 | 01/30/2001 | 01/27/2001 |
| 106929883 | Pierof | OdYe | RatiGo | AP | 02/28/2001 | 02/07/2001 | 03/12/2001 |
| 106943505 | WANH | JING JING | | AA | 03/01/2001 | 01/25/2001 | 02/02/2001 |
| 108765555 | BERRINGT | AMBER | LYN | AP | 02/26/2001 | 02/22/2001 | 02/26/2001 |
| 109704131 | Snoparskz | April | Elisabeth | AP | 02/01/2001 | 01/27/2001 | 01/31/2001 |
| 110666246 | Hb | Sarah | Mia | AP | 02/02/2001 | 02/12/2001 | 02/08/2001 |
| 110724923 | NGUYEO | KIMBERLY | HANG | AP | 02/09/2001 | 02/09/2001 | 03/02/2001 |
| 110804098 | Maitlane | Dominick | Ariel | AA | 01/31/2001 | 01/31/2001 | 01/27/2001 |
| 110841763 | AKUKWF | VICTOR | UGONNA | AA | 02/23/2001 | 02/12/2001 | 02/27/2001 |
| 111645020 | VITELLP | KATHERINE | LEIGH | AP | 02/22/2001 | 02/08/2001 | 02/07/2001 |
| 111662102 | Givent | Puresha | Renee | AA | 02/01/2001 | 02/01/2001 | 02/01/2007 |
| 111683631 | Tsanh | On | Kia | AP | 01/30/2001 | 01/31/2001 | 01/31/2007 |
| 112644854 | MYRIF | STEPHANIE | ANETTE | AA | 03/02/2001 | 01/30/2001 | 02/08/2001 |
| 112660885 | TALBOU | CHRISTINE | ELIZABETH | AA | 02/26/2001 | 02/09/2001 | 02/07/2001 |
| 112666184 | Tonh | Andrew | Hoi-Ming | AP | 02/01/2001 | 01/22/2001 | 02/09/2001 |

FIG.22A

Nominee Packet Progress Detail (grouped by complete/incomplete, ordered by SSN)    Date: 11/27/01

| SSN | LAST_NAME | FIRST_NAME | MID_NAME | ETH_GRP | NOMINEE | SUBMIT DATES NOMINATION | RECOMMEND |
|---|---|---|---|---|---|---|---|
| Complete | | | | | | | |
| 113644174 | RYAO | JAMILAH | ROCHELLE | AA | 02/22/2001 | 02/01/2001 | 02/07/2001 |
| 113709561 | Soi | Karen | Kyeling | AP | 02/01/2001 | 02/19/2001 | 01/28/2001 |
| 114645967 | MB | Pei Pei | | AP | 01/30/2001 | 01/31/2001 | 01/30/2001 |
| 114802528 | Landep | Sandra | Patricia | HA | 02/01/2001 | 02/01/2001 | 02/04/2001 |
| 115649010 | Powelm | Samantha | Danielle | AA | 02/03/2001 | 01/31/2001 | 02/07/2001 |
| 115700542 | Pierof | LAUREN | HULISTON | AA | 02/12/2001 | 02/01/2001 | 02/12/2001 |
| 115741077 | XIAP | SHONG | | AP | 02/23/2001 | 02/07/2001 | 02/07/2001 |
| 115745377 | Abinades | Olga | Esther | HA | 01/22/2001 | 01/29/2001 | 02/01/2001 |
| 115800770 | AVENDANP | JUAN | ESTEBAN | HA | 02/23/2001 | 02/08/2001 | 03/01/2001 |
| 116302031 | Noai | Luyombya | – | AA | 02/03/2001 | 01/29/2001 | 01/29/2001 |
| 116303041 | Henz | Ddungu | – | AA | 01/31/2001 | 01/31/2001 | 01/31/2001 |
| 116646008 | Huntes | Brandi | Tchelle | AA | 01/31/2001 | 01/26/2001 | 01/26/2001 |
| 116805102 | Kin | Namcheol | Joshua | AP | 01/30/2001 | 01/30/2001 | 01/30/2001 |
| 117642727 | Correlb | Polynne | Persephone | AA | 01/29/2001 | 01/30/2001 | 01/30/2001 |
| 117642922 | Phan | Phoong | Nguyen | AP | 01/31/2001 | 01/31/2001 | 02/01/2001 |
| 117647502 | BB | VIRGNIA | LAY | AP | 02/23/2001 | 02/09/2001 | 03/01/2001 |

FIG. 22B

Nominee Package Progress Detail (grouped by complete/incomplete, ordered by Nominee Name)

Date: 09/05/01

| SSN | LAST_NAME | FIRST_NAME | MID_NAME | ETH_GRP | NOMINEE | SUBMIT DATES NOMINAT | RECOMME |
|---|---|---|---|---|---|---|---|
| Complete | | | | | | | |
| 445824111 | Abaz | Bezuwork | G. | AA | | | |
| 976531697 | Abdum | Alganesh | D. | AA | | | |
| 301650319 | Ackenstosd | Aloha | B. | AP | | | |
| 938384949 | Awb | Annikka | | AA | | | |
| 310024156 | Bobarrb | Mally | Fanta | AA | | | |
| . . . | | | | | | | |
| Incomplete | | | | | | | |
| 112346789 | A'b | B'Liah | Methusalah | AA | | | |
| 114493466 | Akwokwp | Victor | Cindy | AA | | | |
| 234567890 | Ao | Xiao-Xiao | | AP | | | |
| 202544467 | Anh | Nom-Nom | | AP | | | |
| 393950606 | Av | Amelia | G. | AP | | | |
| . . . | | | | | | | |

FIG.23

Nominee Packet Progress Detail (grouped by complete/incomplete, Ethnic Group, ordered by SSN)

Date: 11/27/01

| SSN | LAST_NAME | FIRST_NAME | MID_NAME | ETH_GRP | NOMINEE | SUBMIT DATES NOMINATION | RECOMMEND |
|---|---|---|---|---|---|---|---|
| Complete | | | | | | | |
| 207743970 | EBRAHIN | REHANNA | B | | 03/12/2001 | 02/12/2001 | 02/26/2001 |
| 208686762 | PENB | Maria | Elena | | 03/12/2001 | 01/30/2001 | 03/12/2001 |
| 208746368 | MANIGAU | JEANNE | CHRISTINE | | 03/12/2001 | 01/30/2001 | 03/01/2001 |
| 210600762 | SILLB | JENNIBA | | | 03/12/2001 | 03/13/2001 | 01/31/2001 |
| 210685497 | SAMSOO | TIFFANy | TALINA | | 03/12/2001 | 02/07/2001 | 02/19/2001 |
| 211680884 | NUNEA | OLIVIA | | | 03/12/2001 | 02/22/2001 | 03/01/2001 |
| 211680884 | TOUSSAINU | TYRONE | ANCY | | 03/12/2001 | 02/01/2001 | 03/01/2001 |
| 217847972 | AIBAMB | OMOWUNMI | ALEEMAT | | 03/12/2001 | 02/22/2001 | 02/19/2001 |
| 220509654 | MARTINEA | ANTONIO | BRAVO | | 03/12/2001 | 02/22/2001 | 02/01/2001 |
| 223722433 | Jamel | Anita | Madja | | 03/12/2001 | 02/12/2001 | 02/27/2001 |
| 225722272 | THOMAT | CHARLES | ANTHONY | | 03/12/2001 | 01/29/2001 | 02/01/2001 |
| 233685157 | NOBLF | SHINESE | LACY | | 03/12/2001 | 02/09/2001 | 02/27/2001 |
| 237047965 | CHENH | ICHIEH | | | 03/12/2001 | 01/29/2001 | 01/31/2001 |
| 237822698 | MCLAURIO | CHRISTINE | RUTH | | 02/22/2001 | 02/08/2001 | 02/13/2001 |
| 238764046 | WASHINGTOO | LATOYA | KEOSHA | | 03/12/2001 | 03/13/2001 | 03/12/2001 |
| 239765056 | DREX | TINA | LOUISE | | 03/12/2001 | 02/26/2001 | 01/19/2001 |
| 240067741 | NDOEKB | ADAMA | LYDIA | | 03/12/2001 | 02/12/2001 | 03/12/2001 |
| 242659214 | MARTINEA | YANIRES | BRAVO | | 03/12/2001 | 02/22/2001 | 02/02/2001 |

FIG.24A

Nominee Packet Progress Detail (grouped by complete/incomplete, Ethnic Group, ordered by SSN)

Date: 11/27/01

| SSN | LAST_NAME | FIRST_NAME | MID_NAME | ETH_GRP | SUBMIT DATES NOMINEE | NOMINATION | RECOMMEND |
|---|---|---|---|---|---|---|---|
| Complete | | | | | | | |
| 248748590 | HOLLANE | DAISHA | CHERON | | 03/12/2001 | 02/01/2001 | 02/27/2001 |
| 249864799 | YEC | F CHRISTIAN | | | 03/12/2001 | 01/31/2001 | 01/31/2001 |
| 252886568 | HAYSPELM | JALYLIA | ROSIELEE | | 03/12/2001 | 02/19/2001 | 02/27/2001 |
| 269642906 | NELSCO | LORI | BIANCA | | 03/12/2001 | 02/01/2001 | 03/01/2001 |
| 288643172 | ROKES | LATOYA | A | | 03/12/2001 | 02/19/2001 | 03/02/2001 |
| 297640414 | CHANEZ | MARISSA | DAWN | | 03/12/2001 | 02/13/2001 | 03/02/2001 |
| 315062797 | YOOO | SUE | MI | | 03/12/2001 | 02/09/2001 | 01/29/2001 |
| 316199229 | CHP | CHRISTINE | SHIN YOUNG | | 02/26/2001 | 02/12/2001 | 02/09/2001 |
| 323296130 | CAMPBELM | DEVELAND | CLENTON | | 03/12/2001 | 02/09/2001 | 02/07/2001 |
| 327131552 | ROACI | MYRA | ELIZABETH | | 03/12/2001 | 02/19/2001 | 03/12/2001 |
| 331316844 | YOUNH | DALY | | | 03/12/2001 | 01/27/2001 | 01/30/2001 |
| 337435794 | HAMILTOO | MICHELLE | ANDREA | | 03/12/2001 | 03/13/2001 | 03/01/2001 |
| 337671015 | CHOJ | HANNAH | KIM | | 03/12/2001 | 01/18/2001 | 02/19/2001 |
| 341439300 | KellZ | CANDACE | KaYE | | 03/12/2001 | 01/30/2001 | 01/30/2001 |

FIG.24B

Nominee Packet Progress Detail (grouped by complete/incomplete, Ethnic Group, ordered by Nominee Name)

Date: 11/27/01

| SSN | LAST_NAME | FIRST_NAME | MID_NAME | ETH_GRP | NOMINEE | SUBMIT DATES NOMINATION | RECOMMEND |
|---|---|---|---|---|---|---|---|
| Complete | | | | | | | |
| 663539492 | GONCALVET | AMA | BUHJAH | | 03/12/2001 | 02/26/2001 | 03/01/2001 |
| 217847972 | AIBANB | OMOHUNMI | ALEBAT | | 03/12/2001 | 02/22/2001 | 02/19/2001 |
| 648730060 | ALVARADP | NATALIA | ANDREA | | 03/12/2001 | 02/19/2001 | 03/12/2001 |
| 558894336 | ALVIAS | TONI | MARK | | 03/12/2001 | 03/13/2001 | 02/02/2001 |
| 360416815 | Arlinf | Joshua | Jermaine | | 03/12/2001 | 02/12/2001 | 02/27/2001 |
| 351554133 | ASHMORF | MICHELLE | ANTOINETTE | | 03/12/2001 | 03/13/2001 | 02/27/2001 |
| 664715551 | BARAJAT | ALEJANDRO | LOPEZ | | 03/12/2001 | 02/09/2001 | 02/15/2001 |
| 692529240 | BARAIAT | LOREnA | | | 03/12/2001 | 02/19/2002 | 03/12/2001 |
| 492909525 | BariLLaT | KaLo | MeLissa | | 03/12/2001 | 02/19/2001 | 03/12/2001 |
| 625479436 | BEGAZ | CASSANDRA | CLARKIE | | 03/12/2001 | 04/04/2001 | 04/04/2001 |
| 694205103 | BELLF | JANEIL | MARTA | | 03/12/2001 | 01/30/2001 | 01/30/2001 |
| 519310348 | BESS | APRIL | | | 03/12/2001 | 02/26/2001 | 03/01/2001 |
| 650750136 | Biancp | Aaron | Freddy | | 03/12/2001 | 02/01/2001 | 03/12/2001 |
| 685514351 | BILLZ | JASON | A | | 03/12/2001 | 02/12/2001 | 03/12/2001 |
| 700249919 | BOJOrQUEA | SAHARA | NETH | | 03/12/2001 | 01/30/2001 | 03/12/2001 |
| 654816551 | Boumet | Anoiath | Lorinda | | 03/12/2001 | 03/02/2001 | 02/27/2001 |
| 528471007 | BOYCF | JERRY | IF | | 03/12/2001 | 02/12/2001 | 02/19/2001 |
| 516178415 | BRAXTOO | CRYSTAL | Kenee | | 03/12/2001 | 02/12/2001 | 02/13/2001 |

FIG.25A

Nominee Packet Progress Detail (grouped by complete/incomplete, Ethnic Group, ordered by Nominee Name)    Date: 11/27/01

| SSN | LAST_NAME | FIRST_NAME | MID_NAME | ETH_GRP | NOMINEE | SUBMIT DATES NOMINATION | RECOMMEND |
|---|---|---|---|---|---|---|---|
| Complete | | | | | | | |
| 497926174 | BRAZZIEM | JUANITA | DEIONA | | 03/12/2001 | 02/26/2001 | 03/01/2001 |
| 608238112 | bristom | royonna | LAnAE | | 03/12/2001 | 02/13/2001 | 03/02/2001 |
| 488906782 | BROOK T | MICHELLE | LEE | | 03/12/2001 | 03/13/2001 | 02/12/2001 |
| 446724901 | Brownlef | KRYSTAL | SHANTRISE | | 03/12/2001 | 03/13/2001 | 02/19/2001 |
| 534793395 | CAMBRIDGF | SHANNON | MELISSA | | 03/12/2001 | 01/20/2001 | 01/20/2001 |
| 317131552 | CAMPBELM | DEVELAND | CLENTON | | 03/12/2001 | 02/09/2001 | 02/07/2001 |
| 566733542 | CAMPBELM | ERIN | TIANNA | | 03/12/2001 | 01/31/2001 | 02/23/2001 |
| 359671372 | CAMPBELM | Marcee | Lynn | | 03/12/2001 | 01/16/2001 | 02/12/2001 |
| 710446788 | CASA RODRS | Lucia | | | 03/12/2001 | 02/12/2001 | 02/27/2001 |
| 691591772 | Castillp | Grace | | | 03/12/2001 | 02/19/2001 | 03/02/2001 |
| 645759701 | CASTRP | BARBARA | MARRUTH | | 03/12/2001 | 02/07/2001 | 03/01/2001 |
| 297640414 | CHANEZ | MARISSA | DAWN | | 03/12/2001 | 02/13/2001 | 03/02/2001 |
| 723077629 | CHANH | EMILY | | | 03/12/2001 | 02/12/2001 | 02/13/2001 |
| 625714346 | CHAVEA | AMANDA | TERESA | | 03/12/2001 | 02/26/2001 | 03/01/2001 |

FIG.25B

Complete Packages (ordered by Nominee SSN)

| Nominee Data: | | | | Recommender Data: | | Nominator Data: |
|---|---|---|---|---|---|---|
| SSN | SUBMIT_DATE | LAST_NAME | FIRST_NAME | RLNAME | RFNAME | NLNAME |
| 102666661 | 02/07/2001 | BALTAZAS | CHRISTOPHER | POF | BARBARa | POF |
| 103820267 | 02/22/2001 | MARCI | KELSEY | LEBLAND | NORM | LEBLAND |
| 104942831 | 01/30/2001 | Sayee | Momena | Burdib | Johannah | Steio |
| 106929883 | 02/28/2001 | Piercf | Gdye | WESTOO | KAREN | POREN TURNF |
| 106943505 | 03/01/2001 | WANH | JING JING | Vaughao | David | Hambfo |
| 107655555 | 02/26/2001 | BERRINGT | AMBER | DUMOULIO | PETER | munfore |
| 109704131 | 02/01/2001 | Snoparskz | April | 'Deyes | Lorri | Rachem |
| 110666246 | 02/02/2001 | Hb | Sarah | KRAUST | FRANCES | BEGUO |
| 110724923 | 02/09/2001 | NGUYEO | KIMBERLY | AHEARO | MARCIA | Dehorenzp |
| 110803498 | 01/31/2001 | Matilane | Dominick | Mitchelm | Daavid | Foster - Ahmee |
| 110841763 | 02/23/2001 | AKUKWF | VICTOR | LINSP | KATHLEEN | LUDWIH |
| 111645020 | 02/22/2001 | VITELLP | KATHERINE | WOODCOCL | DONNA | TIERNEZ |
| 111662102 | 02/01/2001 | Givent | Puresha | Alstoo | Natsaha | Bernhards |
| 111683631 | 01/30/2001 | Tsanh | On | O'Rourkf | Sally | O'Rourkf |
| 112644854 | 03/02/2001 | MYRIF | STEPHANIE | STAFFORE | RICHARD | Sullivao |
| 112666184 | 02/26/2001 | TALBOU | CHIRSTINE | KONKEM | HEIDI | FONDOX |
| 112660885 | 02/01/2001 | Tonh | Andrew | KIN | SOPHIA | FALLOO |

FIG.26A

Complete Packages (ordered by Nominee SSN)

| Nominee Data: | | | | Recommender Data: | | Nominator Data: |
|---|---|---|---|---|---|---|
| SSN | SUBMIT_DATE | LAST_NAME | FIRST_NAME | RLNAME | RFNAME | NLNAME |
| 113644174 | 02/22/2001 | RYAO | JAMILAH | CONNOLZ | JAMES | Skinnes |
| 113709561 | 02/01/2001 | Soi | Karen | Gaskilm | Terry | RYAO |
| 114645967 | 01/30/2001 | MB | Pei Pei | O'Nelim | Luke | Wintes |
| 114802528 | 02/01/2001 | Landep | Sandra | melendea | carmen | Goldsteio |
| 115649010 | 02/03/2001 | Powelm | Samantha | GUADULESB | ONE NAME | ANDREWT |
| 115700542 | 02/12/2001 | Piercf | LAUREN | MURRAZ | WILLIAM | DiTolib |
| 115741077 | 02/23/2001 | XIAP | SHONG | MUHAMMAE | NAMAH | muhammae |
| 115745377 | 01/22/2001 | Abinades | Olga | Costb | Diane | Rost |
| 115800770 | 02/23/2001 | AVENDANP | JUAN | GUZMAO | NlLda | AMARAM |
| 116302031 | 02/03/2001 | Noai | Luyombya | Arthus | Kayonga | Arthus |
| 116303041 | 01/31/2001 | Henrz | Ddungu | Joho | Seboana | Wilbes |
| 116646008 | 01/31/2001 | Huntes | Brandi | Gonzalet | Cathy | Williamt |
| 116805102 | 01/30/2001 | Kin | Namcheol | Cool | Charles | Cool |
| 117642727 | 01/29/2001 | Correlb | Fdynee | Eldes | Barbara | Caroo |
| 117642922 | 01/31/2001 | Phan | Phuong | Gorhan | Richard | Richardsoo |
| 117647502 | 02/23/2001 | BB | VIRGINIA | PHOUNH | SAROEUM | COLEMAO |
| 117688652 | 03/12/2001 | VIESCB | ROBERT | NAGLOWSKZ | ALEX PAUL | Dempsez |
| 117703718 | 02/01/2001 | Moussoury | Crystal | Prosses | Michael | Prosses |
| 117704656 | 02/02/2001 | DelVam | Patrick | Merrilm | Diane | Merrilm |

FIG. 26B

Complete Packages (ordered by Nominee Name)

| Nominee Data: | | | | Recommender Data: | | Nominator Data: |
|---|---|---|---|---|---|---|
| SSN | SUBMIT_DATE | LAST_NAME | FIRST_NAME | RLNAME | RFNAME | NLNAME |
| 695734601 | 03/01/2001 | GARCIB | ADEIANA | COWAO | JUDY | COWAO |
| 635135834 | 02/23/2001 | HOPKINT | ALIKA | Mofio | Daniel | SCHMIDS |
| 663539492 | 03/12/2001 | GONCALVET | AMA | Barre | Jerry | MASAYKP |
| 629736099 | 02/22/2001 | HOYU | BRIAN | ANDEREGH | CATHY | TAIT |
| 351650858 | 02/27/2001 | LALANJ | SHAZIA | ATKINT | MARY | ATKINT |
| 582029744 | 02/09/2001 | LEF | KAREN | Schula | Suzan | LONDOO |
| 525613739 | 02/09/2001 | NORTHINGTP | KEISHA | | | Smiti |
| 212828027 | 02/07/2001 | AAROO | JENEL | ROBERTT | SANDRA | Thomas-Mendendel |
| 646957290 | 01/29/2001 | Astos | Barivule | Olurb | michael | Denlof |
| 338530147 | 03/02/2001 | ABBOTS | LAQUIENTTA | GIBBONT | MELINDA | KATTERMAO |
| 698106628 | 02/01/2001 | ABDALLAH-T | DANNY | COLOO | LORENZO | FOSECA-RIVJ |
| 658793016 | 02/09/2001 | ABDULLAI | QADRIYAH | Santot | Juan | Barelicb |
| 460940084 | 02/13/2001 | ABEGUNDF | VERONICA | Leveo | Sara | Frauseo |
| 685757347 | 03/12/2001 | ABEITB | JUDITH | BasenburH | | SCHUBAUFS |
| 523316859 | 02/22/2001 | abercrombif | steve | Costb | RodneY | MITCHELM |
| 115745377 | 01/22/2001 | Abinades | Olga | Lodij | Diane | Rost |
| 713489583 | 02/04/2001 | Aboutahc | Sarah | SUTTOO | Muhammad | TRIGAT |
| 461746049 | 02/19/2001 | ABRAHAN | JONATHAN | Redmone | Dr.JANICE | LOMBARDJ |

FIG.27A

Complete Packages (ordered by Nominee Name)

| Nominee Data: | | | | Recommender Data: | | Nominator Data: |
|---|---|---|---|---|---|---|
| SSN | SUBMIT_DATE | LAST_NAME | FIRST_NAME | RLNAME | RFNAME | NLNAME |
| 509433123 | 03/12/2001 | ABRAHAN | MARQUETA | DITTMAS | TaJuana | WALKES |
| 511954253 | 02/22/2001 | ABRAHAN | SHERLY | Pedrj | LELLA | STRINGES |
| 620118077 | 01/26/2001 | Abram | Andrew | Hathoro Lynda | Dave | Floret |
| 325617449 | 02/19/2001 | ABUAGLB | FATIMA | FOSTES | | HATHORO |
| 588963910 | 03/01/2001 | Ace VEDP | NICOLE | Christenseo | RODNEY | MILLZS |
| 193865418 | 01/25/2001 | Acheamponh | Mike | Kifowau | Foy | Christenseo |
| 546112404 | 02/07/2001 | ACKAI | STEPHEN | VEGB | Steven | Blacl |
| 558916407 | 02/02/2001 | Acostb | Chrsfian | Bustallot | HENRY | Vegb |
| 563838619 | 01/31/2001 | Acostb | Veronica | Olojp | Frank | Rogert |
| 481230187 | 02/01/2001 | Adabonyao | Olamide | Landgrafg | Agboola | Jonet |
| 164886932 | 02/07/2001 | Adao | Summoya | Newidrl | Laura | Landgrafg |
| 479067856 | 02/22/2001 | AdAmd | AKELIA | MARSI | ulysses | WILSOO |
| 517336887 | 02/22/2001 | ADAMT | ALEXIS | Hamoo | RANDALL | Westbroof |
| 359658125 | 01/31/2001 | Adamt | Kennedy | SHURGOU | Ajoni | Frudges |
| 557733330 | 02/28/2001 | ADDISOO | MICHAEL | Hammone | SYLVIE | JOHNSOO |
| 628817088 | 02/22/2001 | ADDZ | ANGELA | Bumangiah | Becky | Coy |
| 528573731 | 02/01/2001 | Adeblyj | Sem | aHORF | Jerome | Cliftoo |
| 576355661 | 01/29/2001 | Adedirao | Adebolo | | FAYETTE | Landrz |

FIG.27B

Complete Packages (ordered by Nominee Submit_Date)

| Nominee Data: | | | | Recommender Data: | | Nominator Data: |
|---|---|---|---|---|---|---|
| SSN | SUBMIT_DATE | LAST_NAME | FIRST_NAME | RLNAME | RFNAME | NLNAME |
| 551954311 | 12/23/2000 | Cotz | Adrienne | SLATF | WENDY | LANEZ |
| 637319108 | 12/29/2000 | Zhanh | Kang | Bolane | Megan | Alstos |
| 636964654 | 01/01/2001 | Sheft | Jamilia | Hudsoo | Dorothy | Davit |
| 390826435 | 01/04/2001 | Perrymao | Jocelyn | Belm | Crystal | Davit |
| 349538106 | 01/05/2001 | Dysco | Penekata | Gorf | Melzetta | Vaughu |
| 607311814 | 01/05/2001 | Williamt | Carim | DEEMES | ANNA | LINDSEZ |
| 731039006 | 01/05/2001 | Diggt | Asia | LACHANDB | NICOLE | Lachandb |
| 399889776 | 01/06/2001 | Davit | Lena | Supancid | Frank | Supancid |
| 703363321 | 01/06/2001 | YEUNH | ERNESTINE | Chubbud | Cynthia | SCHAEFES |
| 450720987 | 01/07/2001 | Kinnez | Paul | Collins-Moorf | Leslie | Caffez |
| 625617070 | 01/08/2001 | Chavea | Joseph | Sandovam | Frances | LOPEA |
| 535671999 | 01/08/2001 | holmet | tara | jonet | patricia | Holmet |
| 733073652 | 01/08/2001 | Taz | Sophia | RAIDU | M | RAIDU |
| 541066876 | 01/09/2001 | Ibarrb | Artemio | Blanci | Donna | BATTLET |
| 596864791 | 01/09/2001 | Diam | Bryan | SEALET | LLOYD | Balkf |
| 725644275 | 01/09/2001 | Hogpf | Ali | CROSBZ | EMERAL | CROSBZ |
| 470949413 | 01/09/2001 | Clarl | Randall | ELLIT | SOHPIA | ELLIT |
| 348270885 | 01/10/2001 | Hamiltoo | Elias | Simon-Edwardt | Vernell | Stawf |

FIG. 28A

Complete Packages (ordered by Nominee Submit_Date)

| Nominee Data: | | | | Recommender Data: | | Nominator Data: |
|---|---|---|---|---|---|---|
| SSN | SUBMIT_DATE | LAST_NAME | FIRST_NAME | RLNAME | RFNAME | NLNAME |
| 580805261 | 01/10/2001 | Willit | Jamese | Kokikp | Charles | Zoe |
| 552817525 | 01/11/2001 | Leam | Maria | Garzb | Efren | Chapmao |
| 252841799 | 01/11/2001 | Arboledb | Paula | Schnus | Myra | Wilsoo |
| 650770459 | 01/14/2001 | Leoo | Mara | OLIVARET | ROSE | Lanta |
| 709086346 | 01/15/2001 | Vegb | Tyrone | De Lucib | Merry | Lipsoo |
| 565635330 | 01/15/2001 | Garsef | Veronica | Ryao | Anita | Ryao |
| 627970142 | 01/15/2001 | Avilea | Luz | ATKINT | Mary | Vandagrifg |
| 169701759 | 01/15/2001 | Xv | Mark | Hydet | Iris | Smiti |
| 634232730 | 01/15/2001 | Li | Yiang | johninh | bARCLgY | Evart |
| 319277580 | 01/16/2001 | Lj | Danielle | Hansoo | Richard | Hansoo |
| 610869288 | 01/16/2001 | Cartes | Harmah | Walm | Jesse | Craih |
| 550994778 | 01/16/2001 | Prichetu | Malika | Mitchelm | Christopher | Gdinf |
| 529313662 | 01/17/2001 | Langlez | Rhonda | jenkint | marsha | JENKINT |
| 233787953 | 01/17/2001 | Trao | Phong | Howlez | Sister Judy | Stelznes |
| 537493178 | 01/17/2001 | Hortoo | Brandon | Stewaru | Gloria | Morgao |
| 689418491 | 01/17/2001 | Pesaniea | Marcelo | Dacb | Rosalie | CHURCH-SMIU |
| 560674047 | 01/17/2001 | Malonf | Brandi | Harrit | Christine | Hayware |
| 214688850 | 01/18/2001 | Honh | George | Pollare | Alvera | O'Garro-Bayul |

FIG. 28B

Possible Duplicate Nominee Profile Submittals Based on SSN (ordered by SSN)

| ssn | last_name | first_name | middle_name | phone | email | street | city |
|---|---|---|---|---|---|---|---|
| 000000000 | daf | john | | 000000000 | illazzb | 000000000 | xxxx |
| 000000000 | Batet | MICHELLE | m | 4805550738 | MLBATET@HOTMAIL.COM | 726 S. HARDY DR. | TEMPE |
| 000000000 | Butles | Olive | LYNN | 9545552171 | spapes100@yahoo.com | 4502 Charleston Blvd | Fort Lauderdale |
| 000000000 | Lanies | Yzette | E | 2025550035 | lilshoeboy@aol.com | 3336 4th St NW #81 | Washington |
| 000000000 | Otieno-Palb | Vanessa | Angelique-Inez | 9145558955 | Nyagwenp82@aol.com | 21 Lake Street | White Plains |
| 000000000 | h | g | Awinda | 000000000 | 000000000 | 000000000 | 000000000 |
| 000000000 | mahfoudi | yassir | abdulkarim | 2545552050 | yassirammas@hotmail.com | 31 box97109 | mombsa |
| 108726067 | Billaop | Sara | Chan Soon | 8025554225 | Squisi29@aol.com | 31 Maple Street | Essex Junction |
| 108726067 | BILLADE | SARA | CHAN SOON | 8025554225 | SQUISI29@AOLCOM | 31 MAPLE STREET | ESSEX JUNCTION |
| 112662947 | Onigbanjo | Toba | Mutiat | 6095553467 | mutiatP@aol.com | 62 Heil Avenue | Trenton |
| 112662947 | Onigbanjo | TOLU | MUTIAT | 6095553467 | MUTIATP@aOLCOM | 62 HEIL AVENUE | TRENTON |
| 113769363 | Nguyeo | Tan-Le | Phue | 5085556528 | nguyentanlf@hotmail.com | 24 North Byron Ave. | Brockton |
| 113769363 | NGUYEO | TANLE | PHUE | 5085556528 | NGUYENTANLF@HOTMAIL.COM | 24 NORTH BYRON AVE | BROCKTON |
| 114645967 | Mb | Pei Pei | | 6175557606 | peidron@yahoo.com | 53 Rindge Ave. | Cambridge |
| 114645967 | MB | Pei Pei | | 6175557606 | peidron@yahoo.com | 53 Rindge Avenue | Cambridge |
| 118645480 | PHAO | NAM | MINH | 6175558721 | NMM09@AOL.COM | 940 QUINCY SHORE DRIVE | QUINCY |
| 118645480 | phao | nam | minh | 6175558721 | nmq9@aol.com | 940 quincy shore drive | quincy |
| 122642411 | Jean-Jacquet | Alexandra | | 4075550215 | xelb72983@hotmail.com | 705 Holbrook Circle | Lake Mary |
| 122642411 | JEAN-JACQUET | ALEXANDRIA | | 4075550215 | xelb72983@hotmail.com | 705 HOLBROOK CIRCLE | LAKE MARY |

FIG.29A

Possible Duplicate Nominee Profile Submittals Based on SSN (ordered by SSN)

| ssn | last_name | first_name | middle_name | phone | email | street | city |
|---|---|---|---|---|---|---|---|
| 122645343 | Walkes | Bonita | D. | 6175242195 | applebonf@yahoo.com | 60 Lamartine St. | Boston |
| 122645343 | walkes | bonita | d | 6175552195 | applebonf@yahoo.com | 60 lamartine street | boston |
| 122645343 | WALKES | BONITA | D | 6175552195 | applebonf@yahoo.com | 60 LAMARTINE ST | BOSTON |
| 122645382 | eldridgf | jovon | tarasha | 4135553003 | centrj2001@aol.com | 394 fernbank rd | springfield |
| 122645382 | eLDRIDGf | JOVON | TPRASHA | 4135553003 | CentRJoo1@aol.COM | 394 remBANk RD | SPRINGFIELD |
| 122808409 | Agunwambb | Chioma | Adaene | 6175557029 | Nwaomb2000@hotmail.com | P O BOX 271 | Dorchester |
| 122808409 | Agunwambb | Chioma | Adaeze | 6175557029 | Nwaomb2000@hotmail.com | POBox 271 | Dorchester |
| 123668877 | Guzmao | Melissa | Alejandra | 3105559355 | DJMelyH1283@aol.com | 951 Main Street | El Segundo |
| 123668877 | Guzmao | Melissa | Alejandra | 3105559355 | DJMelyH1283@aol.com | 951 Main Street | El Segundo |
| 124727785 | Anandb | Aravinda | Joy | 4135550417 | aravinda_anandb@missporter's.org | 773 Chapel Road | Sonoy |
| 124727785 | ANANDB | ARAVINDA | JOY | 4135550417 | ARAVINDA_ANANDA@MISSPORTER'S.ORG | 773 CHAPEL RD | SAVOY |
| 124727785 | ANANDB | ARAVINDA | JOY | 4135550417 | ARAVINDA_ANANDA@MISSPORTER'S.ORG | 773 CHAPEL ROAD | SAVOY |
| 126783025 | Kin | Hanna | | 4135557660 | H44nb@cs.com | 253 Colonial Village Apts. | Amherst |
| 126783025 | KIN | HANNA | | 4135557660 | H44NB@CS.COM | 253 COLONIAL VILLAGE APTS | AMHERST |
| 128720569 | Kin | So-One | Hwang | 6175559426 | skin@groton.org | 71 Bateman Street | Roslindale |
| 128720569 | KIN | SO ONE | HWANG | 6175559426 | SKIN@GROTON.ORG | 71 BATEMAN STREET | ROSLINDALE |
| 129648802 | PAISIBLF | ANNE LISE | | 7815551271 | APAISIBLF@YAHOO.COM | 2425 SALEM STREET | MALDEN |
| 129648802 | PAISIBLF | ANNE LISE | | 7815551271 | apaisiblf@Yahoo.COM | 2425 SALEM STREET | MALDEN |
| 129703484 | Ibeabuchj | Chizoba | Chidiogo | 6175553678 | TweetyChidj@hotmail.com | 40 Bradlee Street | Hyde Park |
| 129703484 | IBHABVCHJ | CHIZOBA | CHIDIOGO | 6175553678 | TWEETYCHIDJ@HOTMAIL.COM | 40 BRADLEE STREET | HYDE PARK |
| 133705724 | FREEMAO | HOPE | DENEgE | 6175555593 | hFREEMAO15@excite.com | 33 CALDER STREET | DORCHESTER |

FIG.29B

Possible Duplicate Nominee Profile Submittals Based on SSN (ordered by Name)

| ssn | last_name | first_name | middle_name | phone | email | street | city |
|---|---|---|---|---|---|---|---|
| 125590995 | IP | FAVIOLA | CANDY | 7035559019 | favis@Yahoo.COM | 3456 N DICKERSON ST | Arlington |
| 195681353 | DABADZ | SHANTEL | | 6095551781 | CHANTF184@HOME.COM | 7 THORNHILL COURT | WILLINGBOR |
| 351650858 | LALANJ | SHAZIA | ROXENA | 8645554931 | GIGGEA598@AOL.COM | 3553 OLD FURNACE RD | BOILING SPRIN |
| 665751233 | SALAZAS | GINA | MAUREEN | 2095551058 | GINAMAUREF@YAHOO.COM | PO BOX 309 | TUOLUMNE |
| 137604542 | VILLEGAT | WILSON | AYLEY | 4015557701 | COLOMBIANITP2000@HOTMAIL.COM | 75 BOUTWELL | PAWTUCKET |
| 123456789 | a | a | a | 2345554565 | aaa | aa | aa |
| 123456789 | abc | a | a | 1111111111 | a | a | a |
| 461746049 | Abrahan | Jonathan | | 7185558329 | Arid762212@aol.com | 365-10 Francis Lewis Blvd. | Rosedale |
| 461746049 | ABRAHAN | JONATHAN | | 7185553329 | ARIC762212@AOL.COM | 365 10 FRANCIS LEWIS BLVD | ROSEDALE |
| 686804792 | Adb | Aileen Mae | Cabrera | 6705551988 | Lenh670@hotmail.com | P.O. BOX 612346 | Saipan, MP |
| 686804792 | Adb | Aileen Mae | Cabrera | 6705551988 | Lenh670@hotmail.com | P.O. BOX 612346 | Saipan, MP |
| 164886932 | ADAN | SUMMAYA | NAZ | 7185550379 | TMZSONT@HOTMAIL.COM | 46-70 160TH STREET | FLUSHING |
| 164886932 | Adan | Summaya | Naz | 7185550379 | tmzsont@hotmail.com | 46 70 160 Street | Flushing |
| 164886932 | Adan | Summaya | Naz | 7185550379 | tmzsont@hotmail.com | 46 70 160 Street | Flushing |
| 692827285 | Adamt | Mark | Joseph | 3055550909 | segafanad@hotmail.com | 21425 SW 115 CT | Miami |
| 692827285 | Adamt | Mark | Joseph | 3055550909 | segafanad@hotmail.com | 21425 SW 115 CT | Miami |
| 527497857 | Adamt | Rander | Giovanni Hakeen | 6015551974 | gioadamt@yahoo.com | 2558 Wooddell Drive | Jackson |
| 527497857 | Adamt | Rander | Giovanni Hakeen | 6015551974 | gioadamt@yahoo.com | 2558 Wooddell Drive | Jackson |
| 555855143 | ADEYEYF | Adenike | Olutobl | 8175550556 | NIKF-6@juno.com | 4137 Pioneer Street | Fort Worth |

FIG.30A

Possible Duplicate Nominee Profile Submittals Based on SSN (ordered by Name)

| ssn | last_name | first_name | middle_name | phone | email | street | city |
|---|---|---|---|---|---|---|---|
| 686767848 | Adorablf | REBECCA | ANgefine | 6305555051 | bexpey12@aol.com | 310 s wood dale RD | WOOD DALE |
| 686767848 | Adorablf | Rebecca | Angeline | 6305555051 | BEXPEY12@aol.com | 310 S Wood Dale RD | WOOD DALE |
| 122808409 | Agumwamc | Chioma | Adaeze | 6175557029 | Nwaomb2000@hotmail.com | P O Box 160 | Dorchester |
| 122808409 | Agumwamc | Chioma | Adaeze | 6175557029 | Nwaomb2000@hotmail.com | POBox 271 | Dorchester |
| 205801439 | Aguoji | Uchenna | Nkemjika | 5165557582 | gx5160@hotmail.com | 8 Newburgh St. | Elmont |
| 205801439 | AGVOJJ | UCHENNA | NKEMJIKA | 5165557582 | GX5160HOTMAIL.COM | 8 NEWBURGH ST | ELMONT |
| 342652519 | Albergottij | April | Antia | 8045554049 | krayzgirm59@aol.com | 6924 Victoria Park Terrace | Richmond |
| 342652519 | ALBERGOTTJ | APRIL | ANTIA | 8045554049 | KRAYZGIRM59@AOL.COM | 6924 VICTORIA PARK TERRACE | RICHMOND |
| 705368616 | Alexandes | Frederick | Eugene | 6265550406 | alexgrouq@earthlink.net | 2002 N. Los Robles Ave. | Pasadena |
| 705368616 | alexandes | frederick | eugene | 6265550406 | alexgrouq@earthlink.net | 2002 n los robles ave | pasadena |
| 486983858 | Alexandes | Ivory | La Juan | 3135552604 | Honez081@aol.com | 30561 Klinger | Detroit |
| 486983858 | Alexandes | Ivory | LaJuan | 3135552604 | Honez081@aol.com | 3056 Klinger | Detroit |
| 486983858 | ALEXANDES | IVORY | LASUAN | 3135552604 | HONEZ081@aol.com | 29974 Pasadero Drive | detroit |
| 211661535 | Alj | Anastasia | Nichole | 8185559465 | Goodgam251@aol.com | 27171 VENTURA BLVD 347 | Tarzana |
| 211661535 | ALJ | ANASTASIA | NICHOLE | 8185559465 | GOODGAM251@AOL.COM | 5320 Panola Lake Circle | ENCINO |
| 694189933 | Alj | Fareed | Dawid | 7705557424 | gaij@c.Latlanta.ga.us | 5320 PANOLA LAKE CIRCLE | Lithonia |
| 694189933 | Alj | FAEED | DAWUD | 7705557424 | gaij@c.latlanta.ga.us | 512 Preakness Ave | Lithonia |
| 242985466 | Alj | Monojir | | 9735557865 | alj3897@yahoo.com | 512 Preakness Avenue | Paterson |
| 242985466 | Alj | Monokir | | 9735557865 | ilj3897@yahoo.com | | Paterson |
| 517178729 | ALLEO | MARTINELLE | | 7035559110 | PHOENIX.N@MAILCITY.COM | 2517 S GEORGE MASON DR | ARLINGTON |

FIG. 30B

Nominee Detail Data (Ordered by SSN/All Records):

| SSN | EC | LAST_NAME | FIRST_NAME | MIDDLE | SUFFIX | STREET | APT_NBR | CITY |
|---|---|---|---|---|---|---|---|---|
| | 00 | ALLEN | CICELY | DIANE | | 566 FORELLE COURT | | CLIFTON |
| | 00 | ANTHONZ | DOREEN | BORLA | | 989 W 40TH PLACE | | LOS ANGELES |
| | AA | BORUNDB | JORGE | | | 21718 GiLBert Rd | | YAKIMA |
| | 00 | BROOKT | LATOYA | DENISE | | 212 EAST EDGE 1408 | | SOUTH HOUSTON |
| | AA | CHARBONNES | ANDRALETA | THERESA | | 827 SOUTH ORANGE GROVE AVE | | LOS ANGELES |
| | AA | daniem  lef | | M | | COLUMBUS      GA | | |
| | 00 | DELACRUA | STEPHANIE | LYNN | | 424 LYONS DR | | BOLINGBROOK |
| | 00 | GREEO | cHARLIE | KIM | | 7939 SilverwoOd COURT | | Norfolk |
| | AA | HORnl | ANDREA | NICOLE | | 2021 LONGDALE DR | | deCATUR |
| | AA | KINH | SHONNA | Renee | | 215 EAST 12d | | BROKEN BOW |
| | HA | Lizarragb | Noemi | | | 754 East Merion St | | OntArio |
| | AP | LZ | CHINH | DINH | | 648 SOUTH 5th 1 | | SAN JOSE |
| | 00 | MAHF | TEVITA | MAPILIVAI | | 3148 36TH AVENUE | | OAKLAND |
| | AA | Niwatv | Charles | ObianA | | 5523 Rollngbrooks Court | | Alexandria U |
| | AA | SIDIGV | ANNAH | OMUNE | | 032 BRIDGE ST | | DAYTON |
| | 00 | SIDIGV | ANNAH | OMUNE | | 032 BRIDGE STREET | | DAYTON |
| | AA | Sidigy | Annah | Omune | | 032 Bridge Street | | Dayton |

FIG.31

Nominee Detail Data (Ordered by Name/All Records):

| SSN | EC | LAST_NAME | FIRST_NAME | MIDDLE | SUFFIX | STREET | APT_NBR | CITY |
|---|---|---|---|---|---|---|---|---|
| 000000000 | 00 | | | | | | | |
| 165769191 | AA | HITF | TIFFANY | MICHELLE | | 838 SOUTH MAIN STREET | | HINESVILLE |
| | 00 | MAYARE | MICHELLE | ANGELA | | 666 NW 164 AVE | | PEMBROKE PINES |
| | 00 | | | | | | | |
| 668772495 | 00 | | amy | allison | | 9 san pedro pl | | san ramon |
| 720142464 | HA | | duran | gabriel | | 2802 bicayne way | | san jose |
| 621415054 | | SANCHEZ | SELENE | | ROA | 2447 W NEVADA PL | | DENVER |
| 701059689 | AA | SMITI | NAUNDRIA | J JARLEGO | | 7692 N POSITANO WAY | | TUCSON |
| 653816272 | HA | ROSAT | CARMEN | MARIE | | 7373 NOEL AVENUE | | NEWARK |
| 695734601 | AA | GARCIB | ADEANA | | | 2976 WAKEEN DRIVE | | COCOUNT GROVE |
| 678157871 | 00 | Edwardt | Mercedes | Shirley | | 5319 4th Street Nw | | WASHInGtoN |
| 655135834 | AP | HOPKINT | ALIKA | AZEEZ SALEH | | 902 MAKANI ROAD | | PUKALANI |

FIG.32A

Nominee Detail Data (Ordered by Name/All Records):

| SSN | EC | LAST_NAME | FIRST_NAME | MIDDLE | SUFFIX | STREET | APT_NBR | CITY |
|---|---|---|---|---|---|---|---|---|
| 752019245 | 00 | CHUONH | TOAN | QUOC | | 2117 Scarlet OAK Drive | | COLORADO SPRINGS |
| 456782646 | | DATTB | PRODEEP | | | 371 SHAG BARK LANE | | STREAMWOOD |
| 663539492 | | GONCALVET | AMA | BUHLAE | | 3332 E 27TH ST | | OAKLAND |
| 208769141 | HA | GUTIERREA | SOFIA | REYNA | | 71 MAIN STREET | | FARMINGTON |
| 418743333 | HA | gutierrea | Xavier | Isaac | | 4684 Fensmuir St | | Riverside |
| 629736099 | AP | HOYU | BRIAN | ALEXANDER | | 056 N COLORADO STREET | | SALT LAKE CITY |
| 339578293 | AJ | HUNU | MATTHEW | HENSDALE | | 649 GERALD RD | | FAIRMONT |

FIG.32B

Nominee Detail Data (Ordered by EthnicCode/Name/All Records):

| SSN | EC | LAST_NAME | FIRST_NAME | MIDDLE | SUFFIX | STREET | APT_NBR | CITY |
|---|---|---|---|---|---|---|---|---|
| 668772495 | 00 | | amy | allison | | 9 san pedro pl | | san ramon |
| 621415054 | 00 | | SANCHEZ | SELENE | ROA | 2447 W NEVADA PL | | DENVER |
| 678157871 | 00 | Edwardt | Mercedes | Shirley | | 5319 4th Street Nw | | WASHinGtoN |
| 752019245 | 00 | CHUONH | TOAN | QUOC | | 2117ScarLet OAK Drive | | COLORADO SPRINGS |
| 456782646 | 00 | DATTB | PRODEEP | | | 371 SHAG BARK LANE | | STREAMWOOD |
| 663539492 | 00 | GONCALVET | ANA | BUHLAE | | 3332 H 27TH ST | | OAKLAND |
| 726624968 | 00 | TRAO | HIEU | TRUNG | | 21451 PRADERA 16 | | MONTCLAIR |
| 517336882 | 00 | WILLIAMT | SHAWANDA | LATRICE | | 719 11th COURT WESt | | BIRMINGHAM |
| 000000000 | 00 | HITE | TIFFANY | MICHELLE | | 838 SOUTH MAIN STREET | | HINESXILLE |

FIG. 34A

Nominee Detail Data (Ordered by EthnicCode/Name/All Records):

| SSN | EC | LAST_NAME | FIRST_NAME | MIDDLE | SUFFIX | STREET | APT_NBR | CITY |
|---|---|---|---|---|---|---|---|---|
| 685257347 | 00 | ABIETB | JUDITH | MAUREEN | | POST OFFICE BOX 215 | | SANTO DOMINGO PUEBLO |
| 546112404 | 00 | ACKAI | STEPHEN | NDEDE | | 4524 KINGS ROA321 | | STEGER |
| 000000000 | 00 | ACOSTA-MIRANDB | ARIEL | ESAU | | 4 FREEMAN ST | | DORCHESTER |
| 89721998 | 00 | ACOSTA-MIRANDB | ARIEL | Esau | | 4 FREEMAN ST | | DORHESTER |
| 150701005 | 00 | ADABB | SABRINA | CHINYE | | 2842 MELVILLE #4 | | BRONX |
| 63789604 | 00 | ADEDAPQ | ADEDOLAPO | | | 08 26 HORACE H18E | | CORONA |
| 153869332 | 00 | Adedeji | Olucanir | Oluwafunmalayo | | 791 Park Avenue | | Uniondale |
| 572047995 | 00 | ADEGBONMIRF | ADEWOLE | BABATUNDE | | 426 MYRTLE AV 2ND FLOOR | | IRVINGTON |

FIG.34B

Nomination Floaters with Possible Nominee Linkages (ordered by Nominee Name, SSN)

| | Nominee_Profile Data | | | | | Nomination Data | | |
|---|---|---|---|---|---|---|---|---|
| Last_Name | First_Name | Mid_Name | NOMEssn | NOMEphone | NOMEssn | NOMELast_Nam | NOMRLast_Nam | NOMRFirst_Nam |
| | SANCHEZ | SELENE | 621415054 | 3035557138 | 530510592 | | HARRIT | BRENT |
| | SANCHEZ | SHLENE | 621415054 | 3035557138 | 651751613 | | BROOKT | Marilyn |
| | amy | allison | 668772495 | 9255554974 | 530510592 | | HARRIT | BRENT |
| | amy | allison | 668772495 | 9255554974 | 651751613 | | BROOKT | Marilyn |
| | duran | gabriel | 720142464 | 4085552662 | 530510592 | | HARRIT | BRENT |
| | duran | gabriel | 720142464 | 4085552662 | 651751613 | | BROOKT | Marilyn |
| | TOAN | QUOC | 652019245 | 7195550859 | 648835765 | Chuonh | THOMPSOO | PAUL |
| CHUONH | SOFIA | REYNA | 208769141 | 8605553985 | 620313551 | Gutierrea | VAN EPPT | LARRY |
| GUTIERREA | Xavier | Isaac | 418743333 | 9095550961 | 620313551 | Gutierrea | VAN EPPT | LARRY |
| gutierrea | KEVIN | MARSHALL | 459743813 | 3125554461 | 316044253 | Pinkez | GRAVET | MONIQUE |
| PINKNEZ | PRINCESS | NICOLE | 356692500 | 7065552731 | 5191705633 | THOMAT | DICKINSOO | DAVID |
| THOMAT | ERICA | MARIE | 182684497 | 7185558428 | 92683497 | UBIERB | WOODROFFF | STELLA |
| UBIERB | SHAWANDA | LATRICE | 517336882 | 2055557482 | 415905653 | WILLIAMT | BOYDEO | JANE |
| WILLIAMT | Rosa Anne | Patio | 711766500 | 9255557338 | 432806052 | Abae | Kaplevo | Kirsten |
| Abae | QADRIYAH | SABREEN | 658793016 | 6195557221 | 249904792 | Abdullai | Motf | Patricia |
| ABDULLAI | Steve | Nicolai | 6254150I0 | 5055551377 | 6857573347 | ABEITB | SCHUBAUFS | PATRICIA |
| Abeitb | JUDITH | MAUREEN | 685757347 | 5055550178 | 625415010 | Abeitb | Merces | Joseph |
| ABEITB | steve | | 523319859 | 2055555225 | 668951345 | Abercrombif | Arcep | Debbie |
| abercrombif | Bency | | 197722241 | 5165550028 | 461746049 | ABRAHAN | LOMBARDJ | MARCY |
| Abrahan | Bency | | 197722241 | 5165550028 | 551954253 | ABRAHAN | STRINGES | JO ANN |
| Abrahan | Bency | | 197722241 | 5165550028 | 509433123 | ABRAHAN | WALKES | WALKER |

FIG.35A

Nomination Floaters with Possible Nominee Linkages (ordered by Nominee Name, SSN)

| | Nominee_Profile Data | | | | | Nomination Data | | |
|---|---|---|---|---|---|---|---|---|
| Last_Name | First_Name | Mid_Name | NOMEssn | NOMEphone | NOMEssn | NOMELast_Nam | NOMRLast_Nam | NOMRFirst_Nam |
| Abrahan | Bency | | 197722241 | 5165550028 | 553896578 | Abrahan | Simmont | Bobby |
| Abrahan | Bency | | 197722241 | 5165550028 | 560655718 | Abrahan | Thompsoo | Diane |
| Abrahan | Bency | | 197722241 | 5165550028 | 552935635 | Abrahan | Morrisoo | Glenna |
| Abrahan | Bency | | 197722241 | 5165550028 | 608088985 | Abrahan | McKinnez | Diane |
| Abrahan | Bency | | 197722241 | 5165550028 | 730444095 | Abrahan | Hedstron | Erik |
| Abrahan | Bency | | 197722241 | 5165550028 | 238760486 | Abrahan | Pulavecchip | Rosemary |
| Abrahan | Sarah | | 238760486 | 2015551427 | 461746049 | ABRAHAN | LOMBARDJ | MARCY |
| Abrahan | Sarah | | 238760486 | 2015551427 | 551954253 | ABRAHAN | STRINGES | JO ANN |
| Abrahan | Sarah | | 238760486 | 2015551427 | 509433123 | ABRAHAN | WALKES | WALKER |
| Abrahan | Sarah | | 238760486 | 2015551427 | 553896578 | Abrahan | Simmont | Bobby |
| Abrahan | Sarah | | 238760486 | 2015551427 | 560655718 | Abrahan | Thompsoo | Diane |
| Abrahan | Sarah | | 238760486 | 2015551427 | 552935635 | Abrahan | Morrisoo | Glenna |
| Abrahan | Sarah | | 238760486 | 2015551427 | 608088985 | Abrahan | McKinnez | Diane |
| Abrahan | Sarah | | 238760486 | 2015551427 | 730444095 | Abrahan | Hedstron | Erik |
| Abrahan | Westie | Sharice | 318133702 | 4105550385 | 461746049 | ABRAHAN | LOMBARDJ | MARCY |
| Abrahan | Westie | Sharice | 318133702 | 4105550385 | 551954253 | ABRAHAN | STRINGES | JO ANN |

FIG. 35B

Nomination Floaters (ordered by Nominee SSN)

| NOMEssn | NOMELast | NOMRLast_Nam | NOMRFirst_Name | NOMRphone | STREET | APT_NBR | CITY |
|---|---|---|---|---|---|---|---|
| | Ignore | | | | | | |
| | Smiti | Loddenguare | David | 6315551231 | 27 Baywoods Drive | | Hampton Bays |
| | Odeno-Palf | O'Gero-Bayul | Jo-Ann | 9145557803 | 713 Woodland Hills Road | | White Plains |
| | Wolfgran | Wolfgran | Barbara | 8185555816 | 24093 Olive Grove Ln. | | Sylmar |
| | Brewtoo | Rincoo | Josephine | 5205552121 | 037 South Third Avenue | #B | Tucson |
| | Brewtoo | Rincoo | Josephine | 5205552121 | 037 South Third Avenue | #B | Tucson |
| | Kizb | Cool | Charles | 7815550213 | 294 Washington Street | | Arlington |
| | Calderoo | Satntiagp | Carmen | 7875555480 | Maribel 2616 | | Santurce |
| | kristen daz | schmahm | david | 5805559668 | 2626 sw67th street | | lawton |
| | FOOTMAO | MOHLES | LORI | 5615555000 | 4616 Shiloh Dr | | West Palm Beach |
| | ROSE ASHLEZ | HAZUGB | Larry | 8125556601 | 2911 FOX HOLLOW WAY | | JEFFERSONVILLE |
| | Kairf | Houlemane | Renee | 6265555716 | 2313 N. Chester Avenue | | Pasadena |
| | Riverb | Stolofg | Byron | 2155559440 | 262 W Luzerne St | | Phila. |
| | Hamiltoo | Towert | Chris | 9155559730 | 4910 Saco Ct | | El Paso |
| | Shelley Gumbt | Hansoo | Arlene | 9785554806 | 10 Willis Road | | Peabody |
| | Flisaimf | Cloudmao | David | 9545550992 | 4060 SW 84th Terrace | | Davie |
| | Coloo | Carcz | Lisa | 9315555675 | 5171 Toler Road | | Woodlawn |
| | Taylos | Nunlez | Denise | 4805555711 | 3141 E Credance Blvd | | Phoenix |
| | Taylos | Nunlez | Denise | 4805555711 | 3141 E Credance Blvd | | Phoenix |
| | Siglas | Everetu | Teresa | 3185555992 | 0498 Stonebrier Circle | | Shreveport |

FIG.36A

Nomination Floaters (ordered by Nominee SSN)

| NOMEssn | NOMELast | NOMRLast_Nam | NOMRFirst_Name | NOMRphone | STREET | APT_NBR | CITY |
|---|---|---|---|---|---|---|---|
| | Chunh | Treadwaz | Patricia | 5015556804 | 10 Terrance Dr. | | Little Rock |
| | Kin | Treadwaz | Patricia | 5015556533 | 10 Terrance Dr. | | Little Rock |
| | Kin | Treadwaz | Patricia | 5015556533 | 10 Terrance Dr. | | Little Rock |
| | m | CHAVEA | DANNY | | P O BOX 225 | | BUENA VISTA |
| | m | CHAVEA | DANNY | | P O BOX 225 | | BUENA VISTA |
| | Pete Perrattb | Aiellp | FRancine | 6025556300 | 5814 East Indian SChOOl Road | | Phoenix |
| | HANSOO | GAFKEO | ROGER | 9105554366 | 6866 SENOMA PLACE | | FAYETTEVILLE |
| | VERDEIP EDMB | GARCIB | IDALISSE | 7875558380 | RIO GRANDE ESTATES D44 FF3 | | RIO GRANDE |
| | de santiagp | dox | sara | 9155558400 | 337 podrrlo diaz | | el paso |
| | | CHISHOLN | ELAINE | 7085550139 | 20236 LOOMIS AVENUE | | HOMEWOOD |
| | | CAMQ | MICHELLE | 7575555031 | 3114 MANASSAS RUN | | VIRIGINA BEACH |
| | GREEO | ROBERTSOO | SHEILA | | 9111 CROOM ROAD | | UPPER MARLBORO |
| | FREDERICKT | GAMBARELLJ | ROBERT | 7035552325 | 711 KEARNEY CT SW | | VIENNA |
| | CUJ | ROBERTSOO | SHEILA | | 9111 CROOM ROAD | | UPPER MARLBORO |
| | FREDERICKT | Rosf | ashleigh | 5125555138 | 312 south bounds | | THroll |

FIG. 36B

Nomination Floaters (ordered by Nominee Last Name, SSN)

| NOMEssn | NOMELast_Name | NOMRLast_Name | NOMRFirst_Name | NOMRphone | STREET | APT_NBR | CITY |
|---|---|---|---|---|---|---|---|
| | | COBC | EMMETT | 5205556913 | PO BOX 466 | | MANY FARMS |
| | | CIB | WILLIAM | 3055555703 | 21764 SW 253 LANE | | MIAMI |
| | | COBC | JOSHUA | | 842 MADISON ST NE | | MINNEAPOLIS |
| | | SMITI | SUSAN | 7035558500 | 0333 ANDREW DR | 3 | MANASSAS PAR |
| | | SMITI | LOLITA | 9145553254 | 2031 MCGRAW AVE | | BRONX |
| | | ADAMS GREEO | TARRI | 6515555906 | 2326 SGERREB STREET WEST | 5D | ROSEVILLE |
| | | LEVINF | EMMETT | | PO BOX 466 | | MANY FARMS |
| | | BIB | WILLIAM | 5205556913 | 21764 SW 142 LANE | | MIAMI |
| | | COBC | JOSHUA | 3055555703 | 842 MADISON ST NE | | MINNEAPOLIS |
| | | SMITI | SUSAN | 7035558500 | 0333 ANDREW DR | 3 | MANASSAS PAR |
| | | SMITI | LOLITA | 9145553254 | 2031 MCGRAW AVE | | BRONX |
| | | ADAMS GREEO | TARRI | 6515555906 | 2326 SGERREB STREET WEST | 5D | ROSEVILLE |
| | | LEVINF | ELAINE | 7085550139 | 20236 LOOMIS AVENUE | | HOMEWOOD |
| | | CHISHOLN | CRAIG | 9095553802 | 40912 NOTTINgHILL Rd | | MUrlETA |
| | | EDMUNDT | ELAINE | 7085550139 | 20236 LOOMIS AVENUE | | HOMEWOOD |
| | | CHISHOLN | | | | | |
| | Rost | | asleigh | 5125555138 | 312 south bounds | | THrall |
| | WHITF | | WESLEY | 3235556060 | 4215 VIA BREVE | | MONTEBEllo CA |
| 530510592 | HAYET | | TOMMY | 3525553131 | 31 W WOODWARD AVENUE | | EUSTIS |
| | HARRIT | | BRENT | 8705553118 | 217 SCHOOL | | WEST HELENA |

FIG.37A

Nomination Floaters (ordered by Nominee Last Name, SSN)

| NOMEssn | NOMELast_Name | NOMRLast_Name | NOMRFirst_Name | NOMRphone | STREET | APT_NBR | CITY |
|---|---|---|---|---|---|---|---|
| 553952059 | GALLARE | RODRIGUEA | MARIA | 9565556815 | 7235 N SHARY RD | | MISSION |
| 700073992 | WELLT | conkito | Keny | 5025558269 | 629 MOSER ROAD | | Louisville |
| 720226667 | FLOS | THOMAT | JOHN | 7075556550 | 8524 WOODLAND AVE | | SEBASTOPOL |
| 91743349 | ANDREWT | LEEC | MARILYN | 7035556233 | 8411 CHURCH HILL RD | | MCLEAN |
| 446726654 | DAVIT | TURNES | PATRICIA | 7085552049 | 28912 OAKWOOD DRIVE | | HAZEL CREST |
| 559738177 | LAWSOO | BAROCAT | SUSAN | 716555904 | 26 ASBURY ST | | ROCHESTER |
| 174687327 | ABRAHAM, TP | KENKNIGHU | JANE | 7635554405 | 5410 GRIMES AVE NORTH | | ROBBINSDALE |
| 755093613 | ACHEAMPONIH | PALOmBm | SUSAN | 8035552444 | 931 GREGG STREET | | COLUMBA |
| 320028196 | Acref | SaPovitt | Thomas | 4105554053 | 34260 TuckAhoe Springs Drive | | Denton 1 J |
| 487967140 | BARBOUS | BEZAIRF | JOEL | 6155556834 | 2119 NEEDHAM DR | | SMYRNA |
| 359430381 | Bowmao | Whitf | Denise | | 416 Bowmant St | | Lavonia |
| | BrYe | Lamplez | Jessie | 6625555314 | 4560 HWY 373 | | COLUMBUS |
| | Burkf | Momt | ROnald | 9145558094 | 07 BrooksIDE PLACE | 525 | New Rochelle |
| | Burkf | Momt | ROnald | 9145558094 | 07 BrooksIDE PLACE | | New Rochelle |
| 553952059 | CaMQ | MORRISOo | RAndy | 6095552548 | 26 LARCHMONT CouRt | | PenningtoN |

FIG.37B

Nominator Detail Data (ordered by Nominee SSN/All Records):

| NOME_SSN | NOME_LNAME | NOMR_LNAME | NOMR_FNAME | MID_NAME | SUFX | STREET | APT_NBR | CITY |
|---|---|---|---|---|---|---|---|---|
| ignore | | | | | | | | |
| | Smiti | Loddengaare | David | Michael | | 27 Baywoods Drive | | Hampton Bays |
| | Otheno-Palb | O'Garro - Bayul | Jo-Ann | L | | 703 Woodland Hills Road | | White Plains |
| | Wolfgran | Wolfgran | Barbara | Ruth | | 24093 Olive Grove Ln. | | Sylmar |
| | Wolfgran | Riacoo | Josephine | Janice | | 036 South Third B#B | | Tucson |
| | Brewfoo | Riacoo | Josephine | Janice | | 036 South Third B#B | | Tucson |
| | Kin | Cool | Charles | Wilfred | | 294 Washington Street | | Arlington |
| | Calderoo | Santiagp | Carmen | D | | Maribel 2616 | 5-C | Santurce |
| | kristin daz | schmahm | david | edward | | 2626 sw67th street | | lowton |
| | FOOTMAO | MOHLES | LORI | L | | 4616 Shiloh Dr | | West Palm Beach |

FIG.38A

Nominator Detail Data (ordered by Nominee SSN/All Records):

| NOME_SSN | NOME_LNAME | NOMR_LNAME | NOMR_FNAME | MID_NAME | SUFX | STREET | APT_NBR | CITY |
|---|---|---|---|---|---|---|---|---|
| | ROSE ASHLEZ | HAZUGB | Larry | ROBERT | | 2911 FOX HOLLOW WAY | | JEFFERSONVILLE |
| | Kalrb | Houlemare | Renee | L | | 2313 N. Chester Avenue | | Pasadena |
| | Riverb | Stolofg | Byron | | Mr | 262 W Luzerne St | | Phila. |
| | Hamiltoo | Towert | Chris | Ellen | | 4910 Saco Ct | | El Paso |
| | Shelly Gumbt | Hansoo | Arlene | Amato | MRS | 10 Willis Road | | Peabody |
| | Filsaimf | Cloudmao | David | B | | 5171 SW 84th Terrace | | Davie |
| | Coloo | Carez | Lisa | M | Mrs | 3541 Toler Road | | Woodlawn |
| | Taylos | Nunlez | Denise | M | | 3141 E Creedance Blvd | | Phoenix |

FIG. 38B

Nominator Detail Data (ordered by Nominee Name/All Records):

| NOME_SSN | NOME_LNAME | NOMR_LNAME | NOMR_FNAME | MID_NAME | SUFX | STREET | APT_NBR | CITY |
|---|---|---|---|---|---|---|---|---|
| | | BIB | EMMETT | | JR | PO BOX 466 | | MANY FARMS |
| | | COBC | WILLIAM | PAUL | | 21764 SW 253 LANE | | MIAMI |
| | | SMITI | JOSHUA | WADE | | 842 MADISON S'3 | | MINNEAPOLIS |
| | | SMITI | SUSAN | L | MRS | 0333 ANDREW DR | | MANASSAS PAR |
| | | ADAMS GREEO | LOLITA | | | 2031 MCGRAW /5D | | BRONX |
| | | LEVINF | TARRI | | | 2326 SGERREB STREET WEST | | ROSEVILLE |
| | | BIB | EMMETT | | JR | PO BOX 466 | | MANY FARMS |
| | | COBC | WILLIAM | PAUL | | 21764 SW 253 LANE | | MIAMI |
| | | SMITI | JOSHUA | WADE | | 842 MADISON S'3 | | MINNEAPOLIS |
| | | SMITI | SUSAN | L | MRS | 0333 ANDREW DR | | MANASSAS PAR |

FIG.39A

Nominator Detail Data (ordered by Nominee Name/All Records):

| NOME_SSN | NOME_LNAME | NOMR_LNAME | NOMR_FNAME | MID_NAME | SUFX | STREET | APT_NBR | CITY |
|---|---|---|---|---|---|---|---|---|
| | | ADAMS GREEO | LOLITA | | | 2031 MCGRAW | /5D | BRONX |
| | | LEVINF | TARRI | | | 2326 SGERREB STREET WEST | | ROSEVILLE |
| | | CHISHOLN | ELAINE | J | | 20236 LOOMIS AVENUE | | HOMEWOOD |
| | | Rost | ashleigh | N | | 312 south bounds | | THrdl |
| | | WHITF | WESLEY | S | | 4219 VIA BREVE | | MONTEBEllo CA |
| | | HAYET | TOMMY | L | BZ | 31 W WOODWARD AVENUE | | EUSTIS |

FIG.39B

Nominator Detail Data (ordered by Nominator Name/All Records):

| NOME_SSN | NOME_LNAME | NOMR_LNAME | NOMR_FNAME | MID_NAME | SUFX | STREET | | CITY |
|---|---|---|---|---|---|---|---|---|
| | ignore | | | | | | | |
| 133627641 | HOANH | | | | | | | |
| 552651157 | CRAWFORE | | | | | | | |
| 281641822 | LIN | | ROSALIND | | | 21528 VALLEY FORCE CIRCLE | | KING OF PRUSSI |
| 516453141 | Hemandea | JONET | DONNA | | | PO BOx 298 | 5516 | COLLINSVILLE |
| 93682784 | HADAWAZ | OLEARZ | CATHRINE | A | | 33137TH STREET | | 22315 BROOKLYN NY |
| 175685599 | Hemansea | Lovf | Debbra | R | | 22731 Camp DRIVE | | DUNNELLON |
| 324555746 | soilt | nealf | mary | c | | 425 South FRedeRick Ave | | Gaithersburg |
| 314045910 | PARKES | ALLEO | SANDRA | A | | 2315 TORINGTON PLACE | | LARGO |

FIG. 40A

Nominator Detail Data (ordered by Nominator Name/All Records):

| NOME_SSN | NOME_LNAME | NOMR_LNAME | NOMR_FNAME | MID_NAME | SUFX | STREET | CITY |
|---|---|---|---|---|---|---|---|
| 710229867 | kidd Anjenise Lamyb | SANDeRT | MichAel | W | | 2326 VISTA GRANDE DR | VISTA |
| 448807807 | HF | BANIEWILA | JENNIFER | Ellen | | 20730 S SAWYER | CHICAGO |
| 337499766 | MOnROF | CHRISTMAT | Craig | B | | 5322 Dorset ROAD | Richmond |
| 389807997 | AILEO | GRISMES | DIAMENNE | | | 6109 BURKHARDT ROAD | DAYTON |
| 662753149 | GREENF | HALET | ROBERTA | J | MS | 92 861 AVE 57 | INDIO |
| 633965019 | BrOwo | HEROH | Tami | JO | | 8 MILLer LANE | MONTESANO |
| 236765295 | CaMQ | MORRISOo | RAndy | | | 26 LARCHMONT CouRt | PenningtoN |

FIG.40B

Recommendation Floaters with Possible Nominee Linkages (ordered by Nominee Name, SSN)

| Last_Name | First_Name | Nominee_Profile Data Mid_Name | NOMEssn | NOMEphone | NOMEssn | Recommendation Data NOMELast_Name | RECOMLast_Name |
|---|---|---|---|---|---|---|---|
| | SANCHEZ | SELENE | 621415054 | 3035557138 | 701038050 | | JACKSOO |
| | SANCHEZ | SELENE | 621415054 | 3035557138 | 426747954 | | Riojat |
| | SANCHEZ | SELENE | 621415054 | 3035557138 | 342391298 | | CALDWELM |
| | SANCHEZ | SELENE | 621415054 | 3035557138 | 1 | | Russelm |
| | SANCHEZ | SELENE | 621415054 | 3035557138 | 341598852 | | STREATES |
| | SANCHEZ | SELENE | 621415054 | 3035557138 | 499987391 | | PERINB |
| | amy | allison | 668772495 | 9255554974 | 701038050 | | JACKSOO |
| | amy | allison | 668772495 | 9255554974 | 426747954 | | Riojat |
| | amy | allison | 668772495 | 9255554974 | 342391298 | | CALDWELM |
| | amy | allison | 668772495 | 925 5554974 | 1 | | Russelm |
| | amy | allison | 668772495 | 9255554974 | 341598852 | | STREATES |
| | amy | allison | 668772495 | 9255554974 | 499987391 | | PERINB |
| | duran | gabriel | 720142464 | 4085552662 | 701038050 | | JACKSOO |
| | duran | gabriel | 720142464 | 4085552662 | 426747954 | | Riojat |
| | duran | gabriel | 720142464 | 4085552662 | 342391298 | | CALDWELM |
| | duran | gabriel | 720142464 | 4085552662 | 1 | | Russelm |
| | duran | gabriel | 720142464 | 4085552662 | 341598852 | | STREATES |
| | duran | gabriel | 720142464 | 4085552662 | 499987391 | | PERINB |
| CHUONH | TOAN | QUOC | 752019245 | 7195550859 | 648835765 | CHUONH | THOMPSOO |

FIG.41A

Recommendation Floaters with Possible Nominee Linkages (ordered by Nominee Name, SSN)

| Last_Name | First_Name | Nominee_Profile Data Mid_Name | NOMEssn | NOMEphone | NOMEssn | Recommendation NOMELast_Name | Data RECOMLast_Name |
|---|---|---|---|---|---|---|---|
| ABDULLAI | QADRIYYAH | SABREEN | 658793016 | 6195557221 | 249904792 | Abdulli | Stonf |
| Abellare | Najohe | | 255025930 | 6095550419 | 255625930 | ABELLARE | IMPAGLIAZZP |
| abercrombif | steve | | 523319859 | 2055555225 | 668951345 | abercrombif | Arcep |
| Abeytb | Jennifer | Marie | 705181040 | 3105554573 | 639924040 | ABEYTB | HARMAO |
| Abrahan | Bency | | 197722241 | 5165550028 | 742222611 | ABRAHAN | REESF |
| Abrahan | Bency | | 197722241 | 5165550028 | 551954253 | ABRAHAN | DITTMAS |
| Abrahan | Bency | | 197722241 | 5165550028 | 552935635 | Abrahan | Morrisoo |
| Abrahan | Bency | | 197722241 | 5165550028 | 238760486 | ABRAHAN | MCQUILLA - GOINET |
| Abrahan | Bency | | 238760486 | 2015551427 | 461746049 | ABRAHAN | SUTTOO |
| Abrahan | Sarah | | 238760486 | 2015551427 | 742222611 | ABRAHAN | REESF |
| Abrahan | Sarah | | 238760486 | 2015551427 | 551954253 | ABRAHAN | DITTMAS |
| Abrahan | Sarah | | 238760486 | 2015551427 | 552935635 | Abrahan | Morrisoo |
| Abrahan | Sarah | | 238760486 | 2015551427 | 461746049 | ABRAHAN | ABRAHAN |
| Abrahan | Weslie | Sharice | 318133702 | 4105550385 | 742222611 | ABRAHAN | REESF |
| Abrahan | Weslie | Sharice | 318133702 | 4105550385 | 551954253 | ABRAHAN | DITTMAS |
| Abrahan | Weslie | Sharice | 318133702 | 4105550385 | 552935635 | Abrahan | Morrisoo |
| Abrahan | Weslie | Sharice | 318133702 | 4105550385 | 238760486 | ABRAHAN | MCQUILLA - GOINET |
| Abrahan | Weslie | Sharice | 318133702 | 4105550385 | 461746049 | ABRAHAN | SUTTOO |

FIG. 41B

Recommendation Floaters (ordered by Nominee SSN)

| NOMEssn | NOMELast_Name | RECOMLast_Name | RECOMFirst_Name | RECOMphone | STREET | APT_NBR | CITY |
|---|---|---|---|---|---|---|---|
| | Suarea | Cornejp | Edward | 7185556100 | 3564 Morgan Avenue | | Bronx |
| | Katherine Robainf | Perreaulu | Donald | 8605555328 | Valley Regional High School | | Deep River |
| | Katherine Robainf | Perreaulu | Donald | 8605555328 | Valley Regional High School | | Deep River |
| | Katherine Robainf | Perreaulu | Donald | 8605555328 | Valley Regional High School | | Deep River |
| | Katherine Robainf | Perreaulu | Donald | 8605555328 | Valley Regional High School | | Deep River |
| | Katherine Robainf | Perreaulu | Donald | 8605555328 | Valley Regional High School | | Deep River |
| | Katherine Robainf | Perreaulu | Donald | 8605555328 | Valley Regional High School | | Deep River |
| | Hortoo | McKenzif | Robert | 2535559004 | 42372 44th Avenue SW | | Federal Way |
| | Va Phan | Woodt | George | 4805554543 | 745 W.Naranja Ave | | Mesa |
| | Hintoo | Pitcocl | Lillian | 2085552760 | 3936 Sioux Street | | Nampa |
| | Estebao | Spita | Susan | 4075553460 | 5167 Waterview Loop | | Winter Park |
| | Ellt | Beviilf | Shelley | 3215554737 | 4106 Black Gum Dr. | | Mims |
| | Doao | Koolb | Monica | 9795552201 | 724 Plantation | | Angleton |
| | Mehtb | DEMEL | CHARLES | 7035554788 | 7516 WHIPPANY WAY | | BURKE |
| | ARREDONBV | WILSOO | RICKy | 8035552445 | 9377 FLAYCREEK RD | | Kershaw |
| | Webc | HARU | DANIEL | 8185555302 | 3812 12 SANBORN | | LA CRESLOWTA |
| | Cummingt | Steinberges | John | 8105555317 | 23582 Lutz | | Warren |
| | Gibsoo, Tiffany | Texles | Kenneth | 8455577726 | 38 Leif Blvd. | | Congers |
| | Lesanf | Purcelm | Lori | 7705555952 | 355 Lovejoy Road | | Hampton |
| | Nickersoo | Feldes | Kimberly | 2125555275 | 3346 5th Avenue | 7E | New York |
| | Chunh | Steadz | Joanne | | 2010 Jackson Av | | Melbourne |
| | Chunh | Treadwaz | Patricia | 5015556804 | 10 Terrace Drive | | Little Rock, |
| | Chunh | Treadwaz | Patricia | 5015556804 | 10 Terrace Drive | | Little Rock, |

FIG.42A

Recommendation Floaters (ordered by Nominee SSN)

| NOMEssn | NOMELast_Name | RECOMLast_Name | RECOMFirst_Name | RECOMphone | STREET | APT_NBR | CITY |
|---|---|---|---|---|---|---|---|
| | Chunh | Treadwaz | Patricia | 5015556804 | 10 Terrace Drive | | Little Rock, |
| | Chunh | Treadwaz | Patricia | 5015556804 | 10 Terrace Drive | | Little Rock, |
| | KIN | NORA M MOCARSKJ | | 8605552294 | MAJOR BESSE DRIVE | | TORRINGTON |
| | | DAVIT | EILEEN | 2025557322 | 4211 CONNECTICUT AVENUE NW 439 | | WASHINGTON DC |
| HARRIS LAKRIT | | YAGLEZ | RICHARD | 3135559200 | 31951 CROWLEY | | SAINT CLAIR SH |
| LIANH | | STANTED | VICTOR | 2155555916 | 14TH AND MOUNT VERNON ST | | PHILADELPHIA |
| | | HARU | JAMIE | 2105559552 | 6434 VISTA CT DR | | SAN ANTONIO |
| GREEO | | JENKINT | NEAL | 7575554524 | 716 ROSAER LANE | | VIRGINIA BEACH |
| | TONH | VERDJ | CLAIRE | 9495556172 | 27 ROSEMARY STREET | | IRVINE |
| JOEvette Shaf S | | LeBland | MIChElIE | 7135557627 | 66211 CARINO | | HOUSTON |
| | | davit | ANNIE | 2195556045 | 654 NJumom AVENUE | | FoRT WAYNE |
| | NGUYEO | KAINA | LORRAINE | 8605554481 | 33 HILLSIDE DRIVE | | MOOSUP |
| | LOCKLEAS | MUIS | KENNETH | 7045556792 | 9723 QUARTERS LANE | | CHARLOTTE |

FIG. 42B

Recommendation Floaters (ordered by Nominee Last Name, SSN)

| NOMEssn | NOMELast_Nam | RECOMLast_Name | RECOMFirst_Name | RECOMphone | STREET | APT_NBR | CITY |
|---|---|---|---|---|---|---|---|
| | | WILSOO | RICKy | 8035552445 | 9377 FLAYCREEK RD | | Kershaw |
| | | DAVIT | EILEEN | 2025557322 | 4211 CONNECTICUT AVENUE NW 328 | | WASHINGTON DC |
| | | HARU | JAMIE | 2105559552 | 6434 VISTA CT DR | | SAN ANTONIO |
| | | davit | ANNIE | 2195556045 | 654 NUuman AVENUE | | FoRT WAYNE |
| | | NAKAMOTP | KENNETH | 6505555202 | 2207 DOME AVENUE | | SUNNyVALE |
| | | TESCHNES | RANDALL | 7195551390 | 96 SUNFLOWER RD 450 | | COLORADO SPR |
| | | JOHNSOO | MARy | 3615552232 | Po BOX 4119 | | PORT ARANSAS |
| | | BROWO | ROBERT | 6315551285 | 52 PENNDALE DRIVE | | AMITYVILLE |
| | | PAYNF | SteveN | 9545552334 | 2156 SoUTH FLAGLER | 828 | POmPANO BEAC |
| | | HOLMAO | FREDDIE | 2165552415 | CHADBOURNE ROAD | | SHAKER HEIGH |
| | | YOSU | GAIL | 4355552135 | 372 SOUTH 100 EAST | | LOGAN |
| | | JOHNSOO | DENNIS | | 7811 S OGLESBY | | CHICAGO |
| | | WHEATLEZ | LORETTA | 8305552194 | 435 LOST TRAIL CIRCLE | | LAVERNIA |
| | | DUFRENF | MICHAEL | 7035558500 | 0116 TUDOR LANE | | MANASSAS |
| | | INGLF | Lynne | 7095550499 | 5243 UppeRGARE Lane | | ChaRlotte |
| | | SCHULA | MARLO | 4055551141 | 2271 McCONNELL DRIVE | 413 | YUKON |
| | | freemao | DEIORES | 6105556716 | 876 EAST 35TH street | | CHESTER |
| | | POPF | MERRIE | 4075555509 | 2190 ERIELLE Ct | | OUIEDO |
| | | TRICARICP | JOHN | 3035550991 | 21123 S OAK LEAF WAY | | HIGHLANDS RA |

FIG.43A

Recommendation Floaters (ordered by Nominee Last Name, SSN)

| NOMEssn | NOMELast_Nam | RECOMLast_Name | RECOMFirst_Name | RECOMphone | STREET | APT_NBR | CITY |
|---|---|---|---|---|---|---|---|
| 1 | | colleo | donna | 6025551813 | 23547 NORTH 49TH DRIVE | | GLENDALE |
| | | | | 2815554001 | 24703 PARTAGE LANE | | HOUSTON |
| | | diana beattif | diana | 3015554791 | 3428 glendlen ave | 313 | silver springs |
| | | MILES | SYLVIA | | 4132 fbl 774 | | nDLOTHIAN |
| | | WHITF | WESLEY | 3235556060 | 4219 VIA BREVE | | MONTEBELLO |
| | | Russelm | TIMOTHy | 5035551204 | 4913 SW 15th DRIVE | | GRESHAM |
| 341598852 | | STREATES | SHIRLEY | 704 | 228 SHELTON CIRCLE | | WADESBORO |
| 499987391 | | PERINB | ANNE | 4145553986 | 2311 EFAIRMOUNT AVE | | WHITEFISH BAY |
| 701038050 | | JACKSOO | DENISE | 6025551547 | 6610 N CENTRAL | | PhOENIX |
| 561997730 | VILLB | BALLESTEROT | MARIA | 2105552535 | 36114 BLACK CREEK | | SAN ANTONIO |
| 561656862 | quin christp | froelici | joy | 9725556688 | 2713 East frankford | 3017 | Carrollton |
| | KIMBERLZ | JACKSOO | GLORIA | 5045554959 | 3447 DEERLICK LN | | HARVEY |
| 553638815 | WALKERNIB | ELLITYVONNE | | 3145551816 | PO BOX 732 | | FLORISSANT |
| 715175229 | AJIBOYF | goldsteio | rachel | 5105554475 | 781 54th ST | | Oakland |

FIG.43B

Recommender Detail Data (ordered by Nominee SSN/All Records):

| NOME_SSN | NOME_LNAME | RECO_LNAME | RECO_FNAME | MID_NAME | SUFX | STREET | APT_NBR | CITY |
|---|---|---|---|---|---|---|---|---|
| | Suarea | Corenip | Edward | | Mr. | 3564 Morgan Avenue | | Bronx |
| | Katherine Robainf | Perreauls | Donald | | | Valley Regional High School | | Deep River |
| | Katherine Robainf | Perreauls | Donald | | | Valley Regional High School | | Deep River |
| | Katherine Robainf | Perreauls | Donald | | | Valley Regional High School | | Deep River |
| | Katherine Robainf | Perreauls | Donald | | | Valley Regional High School | | Deep River |
| | Katherine Robainf | Perreauls | Donald | | | Valley Regional High School | | Deep River |
| | Katherine Robainf | Perreauls | Donald | | | Valley Regional High School | | Deep River |
| | Hortoo | McKenzif | Robert | | Jr | 43272 33rd Avenue SW | | Federal Way |
| | Va Phan | Woodt | George | | | 745 W.Naranja Ave | | Mesa |
| | Hintoo | Pitcocl | Liliena | | | 3936 Sioux Street | | Nampa |

FIG.44A

Recommender Detail Data (ordered by Nominee SSN/All Records):

| NOME_SSN | NOME_LNAME | RECO_LNAME | RECO_FNAME | MID_NAME | SUFX | STREET | APT_NBR | CITY |
|---|---|---|---|---|---|---|---|---|
| | Estebao | Spita | Susan | | | 5167 Waterview Loop | | Winter Pack |
| | Ellit | Bevilif | Shelley | | | 5217 Black Gum Dr. | | Mims |
| | Doao | Kotrib | Monica | | | 724 Plantation | | Angleton |
| | Mehtb | DEMEL | CHARLES | T | | 7516 WHIPPANY WAY | | BURKE |
| | | WILSOO | RICKy | LevoN | | 9377 FLAYCREEK RD | | Kershaw |
| | ARREDONBV | HARU | DANIEL | M | | 3812 23 SANBORN | | LA CRESLOWTA |
| | Webc | Steinberges | John | | | 23582 Lutz | | Warren |
| | Cummingt | Texles | Kenneth | | | 38 -Leif Blvd. | | Congers |
| | Gibsoo, Tiffany | Purcelm | Lori | | | 355 Lovejoy Road | | Hampton |

FIG.44B

Recommender Detail Data (ordered by Nominee Name/All Records):

| NOME_SSN | NOME_LNAME | RECO_LNAME | RECO_FNAME | MID_NAME | SUFX | STREET | APT_NBR | CITY |
|---|---|---|---|---|---|---|---|---|
| 499987391 | | WILSOO | RICKy | LevoN | | 9377 PLAYCREEK RD | | KERSHAW |
| | | PERINB | ANNE | W | MS | 2311 E FAIRMOUNT AVE | | WHITEFISH BAY |
| | | DAVIT | EILEEN | T | | 4211 CONNECTICUT AVE NW | 439 | WASHINGTON DC |
| 341598852 | | STREATES | SHIRLEY | A | | 228 SHELTON CIRCLE | | WADESBORO |
| | | HARU | JAMIE | D | | 6434 VISTA CT DR | | SAN ANTONIO |
| | | davit | ANNE | LEWIS | | 654 NUtrman AVENUE | | FoRT WAYNE |
| | | NAKAMOTP | KENNETH | H | | 2207 DOME AVENUE | | SUNNyVALE |
| | | TESCHNES | RANDALL | WAYNE | | 96 SUNFLOWER RD | 450 | COLORADO SPR |
| | | JOHNSOO | MARy | V | | Po BOX 4119 | | PORT ARANSAS |

FIG.45A

Recommender Detail Data (ordered by Nominee Name/All Records):

| NOME_SSN | NOME_LNAME | RECO_LNAME | RECO_FNAME | MID_NAME | SUFX | STREET | APT_NBR | CITY |
|---|---|---|---|---|---|---|---|---|
| | | BROWO | ROBERT | ALLEN | | 52 PENNDALE DRIVE | | AMITYVILLE |
| | | PAYNF | SteveN | WaldO | Jr | 2156 SoUTH FLAGLER | 828 | POmPANO BEAC |
| | | HOLMAO | FREDDIE | BOYD | | CHADBOURNE ROAD | | SHAKER HEIGH |
| 1 | | RusseIm | TIMOTHy | SCOTT | | 4913 SW 25th DRIVE | | GRESHAM |
| 342391298 | | CALDWELM | RICHARD | C | | 218 AURORA LANE | | HUNTERSVILLE |
| | | YOSU | GAIL | BONNIE | PHD | 372 SOUTH 100 EAST | | LOGAN |
| | | JOHNSOO | DENNIS | | | 7811 S OGLESBY | 413 | CHICAGO |

FIG.45B

Recommender Detail Data (ordered by Recommender Name/All Records):

| NOME_SSN | NOME_LNAME | RECO_LNAME | RECO_FNAME | MID_NAME | SUFX | STREET | APT_NBR | CITY |
|---|---|---|---|---|---|---|---|---|
| 715443294 | ROJAT | | | | | | | |
| 506356920 | PHILLIPT | | | | | 24713 PARTAGE LANE | | HOUSTON |
| 678067028 | FERNANDEA | | | E | | 5239 SIR WALTER ROAD | | OLNEY |
| 0 | GILLIPIO C CORETTA | | DANA | SHAWN | MR | 6613 OAKTRAIL LN | | HOUSTON |
| 567872850 | COTTP | | LYNN | T | | 3712 ROBINSON DRIVE TRLR 64 | | WACO |
| 725469746 | THAP | QUINO SUSAN | JANE | li | | 6844 NORTH FIFTH STREET | | FRESNO |
| 171742961 | Davit | KIBLES CAMILLE | | M | | Po BOX 362 | | PINE FORGE |

FIG. 46A

Recommender Detail Data (ordered by Recommender Name/All Records):

| NOME_SSN | NOME_LNAME | RECO_LNAME | RECO_FNAME | MID_NAME | SUFX | STREET | APT_NBR | CITY |
|---|---|---|---|---|---|---|---|---|
| 444720173 | MCCALESTES | WIINTERT | THOMAS | J | | 2435 HARBOUR TOWN PLACE | | BANDERA |
| 446720721 | ALLEO | GREFG | lmargaret | DOLAN | MRS | PO Box 755 | | SUGAR LAND |
| 561690827 | HERNANDEA | INEA | DAWN | LOTTI | | 2942 MICHELE DR | | WASHINGTON |
| 266640520 | PERTERSOO | RELKB | CONNIE | | | 312 ALLISON AVE | | MARIETTA |
| 700844632 | HARRIT | ASBURZ | CALVIN | L | MR | 5849 BIG OAK BEND 1 | | MORENO VALLI |
| 700227539 | PAPPP | CORIEA | NORMA | | | 35824 SUNNYMEAD BLVD | | |
| 692439065 | FeRnandea | DOWNEZ | MARY | V | ms | 3161 NO 74 ST | | PHILA |

FIG. 46B

SELECTION OF INDIVIDUALS FROM A POOL OF CANDIDATES IN A COMPETITION SYSTEM

This application is a Divisional of application Ser. No. 09/996,907, filed on Nov. 30, 2001, the entire contents of which are incorporated by reference.

FIELD OF THE INVENTION

The present invention relates to the evaluation of human resources, and more particularly to the automation-enhanced selection of individuals from a pool of competition candidates based on evaluations of cognitive and non-cognitive variables relative to a competition standard.

BACKGROUND OF THE INVENTION

The appropriate selection of individuals or candidates for employment, appointment to political positions, promotions, receiving awards or scholarships, and so on has traditionally been a difficult problem.

One trend facing competition systems is that of ever-increasing numbers of applications being received by competition systems. This results in problems of data handling of selecting the best candidates from an ever-increasing number of highly-qualified applicants, and also of eliminating an ever-increasing number of lower-quality, ineligible, or incompletely-responsive candidates.

The problem of candidate selection is compounded by candidate fraud which is becoming increasingly sophisticated. The forging of documents, the use of documents or credentials of others having similar names or demographic information, and so on complicates competition systems due to the detection and resolution requirements which must be imposed, as well as the resultant unfairness when such fraud goes undetected.

Another problem is the occurrence of duplicate forms. This often occurs as individuals apply multiple times in order to correct information or perhaps even in the belief that this can aid their chances of success.

The detection of both duplicates and fraud is further complicated, however, in that situations arise where two or more legitimate candidates sometimes appear identical from their submitted papers. Such situations often arise in connection with twins having similar or identical names, for example.

The selection of candidates for positions of future responsibility such as political appointees, military or civilian officers or leaders, corporate management, academic scholars, and so on has at its root the problem of selecting the best candidate based on predicted future performance. Studies have shown that non-traditional variables such as non-cognitive variables are sometimes a better predictor of future performance than traditionally-used variables.

The use of these variables, as well as the use of traditional but subjective variables, such as essay tests, has a problem because the nature of their evaluation is subjective aid thus difficult, even for a single evaluator, to do in a fair and consistent manner. This problem increases with the number of evaluators and encompasses the problems of evaluator selection, training, and monitoring. Studies have shown for example, that evaluators sometimes vary their decision methodologies in their evaluations, especially just before breaks or at the end of the day. Further more, studies have also shown that evaluators may evaluate non-cognitive variables more harshly for candidates of one ethnic or cultural background as compared with candidates of other ethnic or cultural backgrounds. The monitoring of evaluators is additionally complicated as system generally don't have the infrastructure necessary to allow real-time monitoring in a non-invasive way or the ability to implement corrective measures in real-time.

Additionally, traditional systems are lacking in methodologies to track both competition winners and competition losers for later use in producing statistical support for and improvement of system selection criteria.

From the above, it is evident that improvements are needed in the areas of data management (i.e. duplicate identification, false-duplicate identification, and fraud identification), candidate pool reduction, evaluator management, candidate selection, and winning-candidate progress tracking.

BRIEF DESCRIPTION OF THE DRAWINGS

FIGS. 12c-12e shows an example of the steps traversed in an application of the tie-breaking procedure of FIG. 12b.

FIGS. 16-17 show exemplary displays for use during determination of evaluator eligibility;

FIGS. 18-19 show exemplary displays for use during determination of candidate eligibility;

FIGS. 20-21 show exemplary displays for use during evaluation of candidate packages;

FIGS. 22-25 show exemplary displays of candidate progress detail reports;

FIGS. 26-28 show exemplary displays of completed applicant package reports;

FIGS. 29-30 show exemplary displays of possible duplicate document reports;

FIGS. 31-34 show exemplary display of candidate detail listing reports;

FIG. 35 shows an exemplary display of a nominator floater with possible key form report;

FIGS. 36-37 show exemplary display of nominator floater detail reports;

FIGS. 38-40 show exemplary display of nominator detail reports;

FIG. 41 shows an exemplary display of a recommender floater with possible key form report;

FIGS. 42-43 show exemplary display of recommender floater detail reports; and

FIGS. 44-46 show exemplary display of recommender detail reports.

DETAILED DESCRIPTION

Shown and described are embodiments, automated and partially-automated, of a system and method for selecting one or more candidates from a pool of candidates. It is noted that while this disclosure illustrates the present invention by examples drawn mainly from academic scholarship competitions, the present invention has application in many fields outside of academics such as, but not limited to: employee hiring; employee to job, position, or task matching; military officer selection; political appointee selection; personal date selection; personal friend selection; and so forth.

Figure 1:
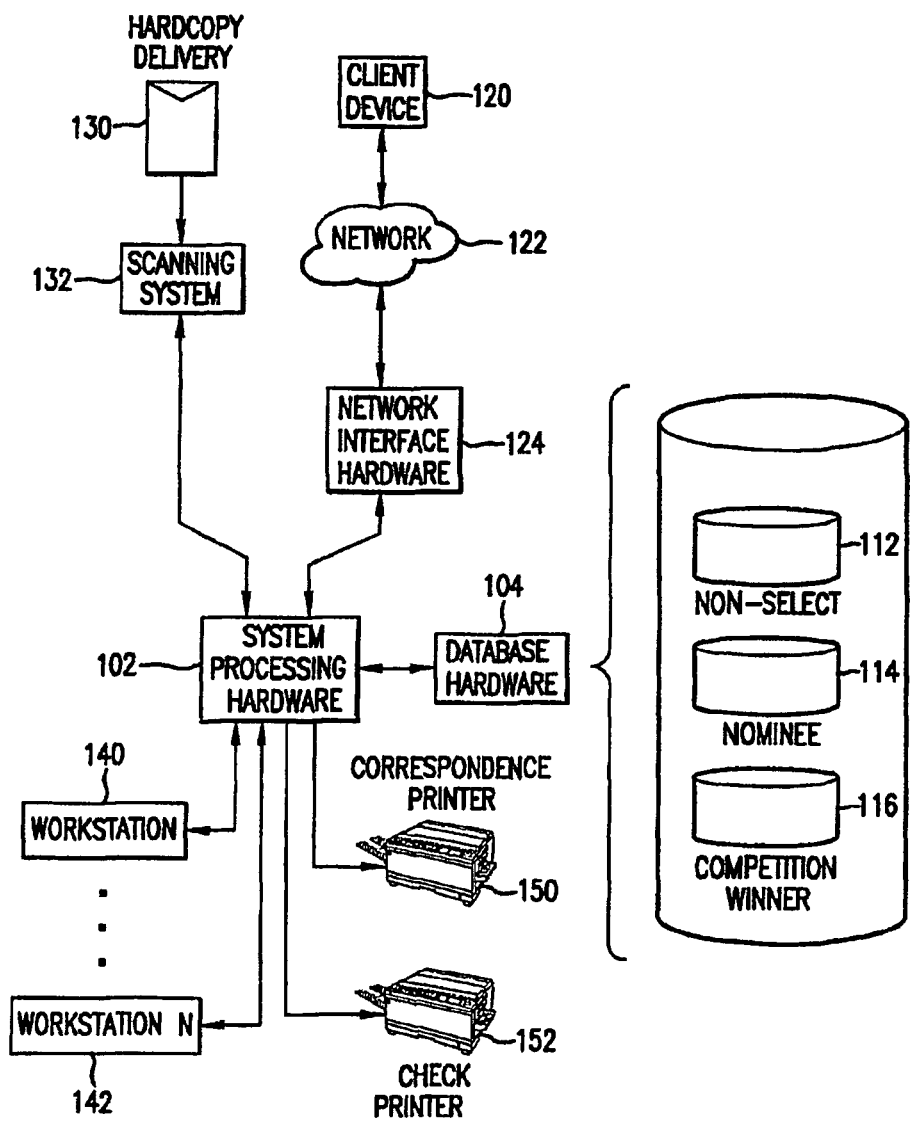
FIG. 1 shows a block diagram of an embodiment of a system for the selection of individuals from a pool of candidates.

Referring to FIG. 1, shown is a block diagram of an embodiment for a competitor system (100) for the selection of individuals from a pool of candidates.

Shown are system processing hardware (102), database hardware (104), a non-select segment (112), a candidate segment (114), a scholar segment (116), a client device (120), a network (122), network interface hardware (124), an envelope (130) representing postal delivery, a scanning and processing system (132), a workstation (140), a workstation (142) labeled "workstation n", a correspondence printer (150), and a check printer (152).

The system processing hardware (102) is coupled to the database hardware (104). The database hardware (104) as shown comprises the non-select segment (112), the candidate segment (114), and the scholar segment (116). The client device (120) is coupled to the network (122). The network (122) is coupled to the network interface hardware (124), which, in turn, is coupled to the system processing hardware (102). The envelope (130) representing postal delivery is coupled to the scanning system (132) which, in turn, is coupled to the system processing hardware (102). The workstation (140) and the workstation (142) labeled "workstation n" are both coupled to the system processing hardware (102). The correspondence printer (150) and the check printer (152) are also both coupled to the system processing hardware (102).

The system processing hardware (102) carries out processing required for the competition system (100). The system processing hardware (102) can be implemented by any hardware suitable for running general purpose software such as, but not limited to, any commercial computing hardware. By way of example, most computing systems having one or more Intel-, AMD-, or Motorola-based processors and targeted for general home or business use can be used for the system processing hardware (102).

The database hardware (104) stores information relating to candidates required in carrying out the processing of competitions. The exact nature of the storage architecture is not dependant on the present invention and can take any form necessary to) the particular implementation. In one embodiment, as shown, the database hardware (104) is segmented to manage individuals during various stages of consideration in the competition system (100). In this embodiment, data is marked to segment or group the data. The data is segmented or grouped into the categories which include applicants (the applicant category or segment (114)), applicants who are not selected (the non-select category or segment (112)), and candidates selected as competition winners (the competition-winner category or segment (116) also called the scholar category or segment in one embodiment). In one variation, the database can be any suitable commercial database product such as, but not limited to, products by Oracle, Sybase, or Microsoft.

In another embodiment, the database hardware (104) is physically differentiated into two or more separate databases as required. In one embodiment, the database hardware (104) includes a staging or applicant database, a non-select database, a candidate or nominee database (for applicants who have passed qualification and eligibility processes), and a competition-winner or scholar database. This embodiment is used, for example, where existing hardware capacities mandate such an approach or in systems which have an absolute requirement of data separation such as for security reasons. In systems requiring higher separation of data, a fifth database for the storage of finalists prior to confirmation, a finalist database, can be added.

In an embodiment, applications, to be complete, comprise two or more document. In a further variation, an applicant package (also called a candidate package or profile) includes an applicant form (submitted by the applicant), also called a nominee or candidate form, a nominator form (submitted by an individual with academic knowledge of the applicant such as a school teacher or administrator), and a recommender form (submitted by an individual with personal knowledge of the applicant such as a family friend. It is noted that school officials and teachers can also be nominators). In this embodiment, the applicant segment (114) comprises applicant-related submissions received from both the electronic and hardcopy submissior's. The non-select segment (112) comprises applicant packages for applicants who ultimately do not win a competition, i.e., for applicants who are ultimately lot selected or for applicants having incomplete or ineligible applicant packages. The competition-winner segment (116) (also called the scholar segment in academics scholarship embodiments) comprises candidate packages relating to those candidates who ultimately win a competition.

When application documents are received by the system, they are stored into the database (104), associated with any other records (the database versions of submitted documents) relating to the same applicant, and marked as being in the applicant segment (114). Later, the associated records (i.e. the applicant packages) are submitted to qualification and eligibility procedures. Applicant packages do not pass either the qualification and eligibility procedures are marked as being in the non-select segment (112). Later still, the applicant packages which have not been non-selected are evaluated, scored, and one or more competition winners selected. In one embodiment, once an applicant is selected as a competition finalist, he or she is referred to as a candidate and their applicant package is referred to as a candidate package. The candidate packages for those candidates who ultimately win a competition are marked as being in the competition-winner segment (116) upon certification (verification or confirmation of data supplied in the applicant, nominator, and recommender forms) and acceptance of competition winning status (i.e. acceptance of the competition award) by the candidate. Further to this embodiment, candidates who decline the competition award, or who are not certified, are designated as non-selects and their candidate packages are marked as being in the non-select segment (112).

In one embodiment, in order to keep track of the status of individuals during the competition process, various lists are maintained or the ability to create them at any time is preserved. These lists include an applicant list for listing all applicants f r which any document or form has been submitted, a non-select list for listing all individuals who ultimately are not winners of the competition, a candidate list for all a applicants passing an initial qualification and eligibility process, a finalist list for listing all candidates selected as finalists, and a competition-winner list for listing all finalists who pass a confirmation and acceptance process. Further to this embodiment, these lists are protected and each require (possibly different) special system privileges to have access. In a variation of this embodiment, each list can include various data regarding the individuals listed. The non-select list can include, for example, the date and stage within the competition at which the individual was non-selected or the competition-winner list can include dates at which the competitor winner is expected to submit requalification documents.

Information relating to applicants can be submitted by any conventional method such as by postal mail or electronic submission. Applicant information submitted by postal mail generally takes the form of a paper document (including predefined forms after user completion or nonstandard documents such as letters), but other manifestations, such as, but not limited to, computer readable media (containing word-processing files or even image scans of paper documents) are possible. As used herein, the term "document" refers to any submissions of applicant information and includes, for example, paper submissions, scanned images on computer-readable media, or any other media or vehicle containing information to be incorporated into the competition system.

Electronic submission begins when a submitted document is transmitted by the client device (120) via the network (122) to the competition system (100) where it is received via the network interface hardware (124). The client device (120) can be any user device able to initiate document submissions. By way of example, a client device (120) can be, but is not limited to, a computer, a handheld device such as a personal digital assistant (PDA), or a computer network such as a business, college, or university intranet. The network (122) can be any electronic or computer network or interconnection of networks such as one or more intranets or internets. In one embodiment, the network (122) is the Internet. The network interface hardware (124) is the physical connection of the competition system (100) to the network (122). The network interface hardware (124) can be any device such as, but not limited to, a modem, a TI interface, and so forth. Electronic submissions are discussed in greater detail later herein in reference to FIG. 5.

Documents submitted by postal mail are scanned in at the scanning system (132) and thereby incorporated into the system. In the case of submissions on computer-readable media, the candidate information is read in at a computer workstation such as the workstation (140) or (142). Hardcopy submissions are discussed in E eater detail later herein in reference to FIG. 6.

In one embodiment, the overall selection process has several stages including an application stage, a qualification stage, an evaluation stage, a ranking and selection stage, a finalist stage, a confirmation stage, and a tracking or monitoring stage. The application stage is where individual applications are received by the competition system (100) as discussed previously. The qualification stage implements basic qualification and eligibility requirements and is discussed in greater detail later herein in reference to FIGS. 8 and 9. The evaluation stage implements evaluation of qualified applicants and is discussed in greater detail later herein in reference to FIG. 10. The ranking and selection stage implements the ranking of evaluated candidates and the selection of finalists. Finalists are candidates who are selected after the evaluation process, but who must pass a certification process before becoming unqualified competition winners. The ranking and selection process is discussed in greater detail later herein in reference to FIGS. 12a-12b.

Once finalists have been identified, the confirmation stage implements confirmation of the qualifications of finalists and allows for ultimate acceptance by confirmed finalists. The confirmation of finalists is discussed in greater detail later herein in reference to FIG. 13. The tracking or monitoring stage implements the tracking of both competition winners (i.e., monitoring the progress of finalists who have accepted their competition awards) and non-selected candidates (for comparison purposes). Competition award payment and correspondence, such as notice letters and requests for progress reports, are generated by the payment and correspondence generation system during the tracking and monitoring stage. The tracking of competition winners is discussed in greater detail later herein in reference to FIG. 14.

The workstation (140) facilitates user use of the competition system (100). The competition system can be used though a single workstation but can also be implemented with any number of workstations necessary as indicated by the workstation 1142) labeled "workstation n". The workstation (140) can be any computing device able to allow display and entry of information such as, but not limited to, a personal computer, a handheld computing device, a laptop computer, a notebook computer, a SPARC™ station, etc. The workstation (140) has at least a display, such as a text or graphical monitor to display information and one or more input devices such as a keyboard and a mouse to allow entry and manipulation of information.

The correspondence printer (150) prints correspondence and the check printer (152) prints checks. While two printers are shown, any suitable number of printers can be used such as a report printer for use by the reporting module (280) discussed in greater detail later herein in reference to FIG. 2. Alternatively, printing can be partially or totally outsourced.

Figure 1A:
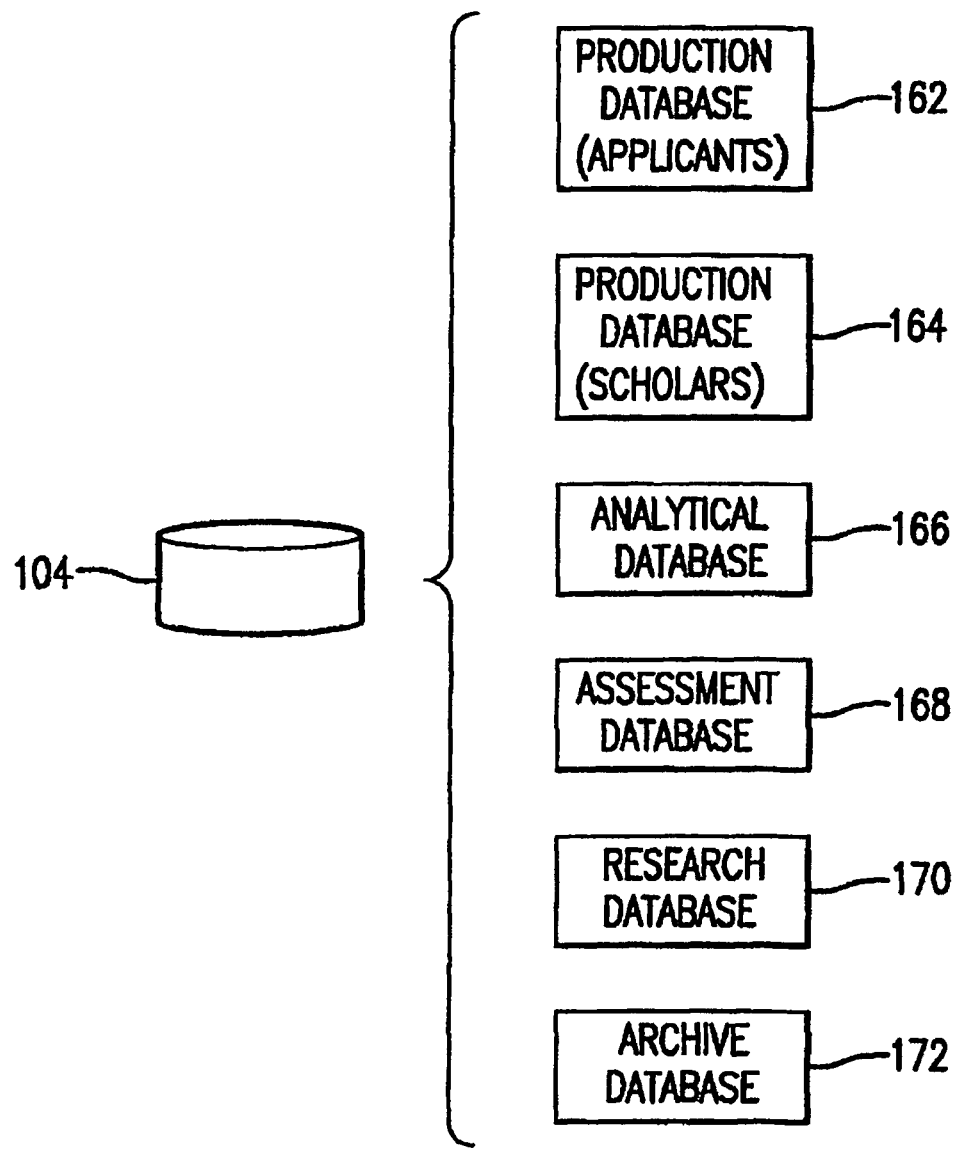
FIG. 1a shows a block diagram of an embodiment for database 104 of FIG. 1.

Referring to FIG. 1a, shown is a block diagram of an embodiment for database (101) of FIG. 1.

Shown are the database (104), an applicant database (162), a scholar database (164), an analytical database (166), an assessment database (168), a research database (170), and an archive database (172).

It this embodiment, the applicant database (162) and the scholar database (164) are equivalent, respectively, to the applicant segment (114) and the competition-winner segment (116) of FIG. 1. The analytical database (166) stores information relating to analytical studies of candidates in the system to determine trends. The assessment database (168) stores information relating to assessments and other input from vendor, donor, and other entities regarding the competition system (100). The research database (170) stores information relating to research regarding improvement of the rubric or application thereof used by the competition system (100). Generally, the results stored in the analytical database (166) is developed from the data stored in the research database (170). The archive database (172) stores any data which needs to be archived.

Figure 2:
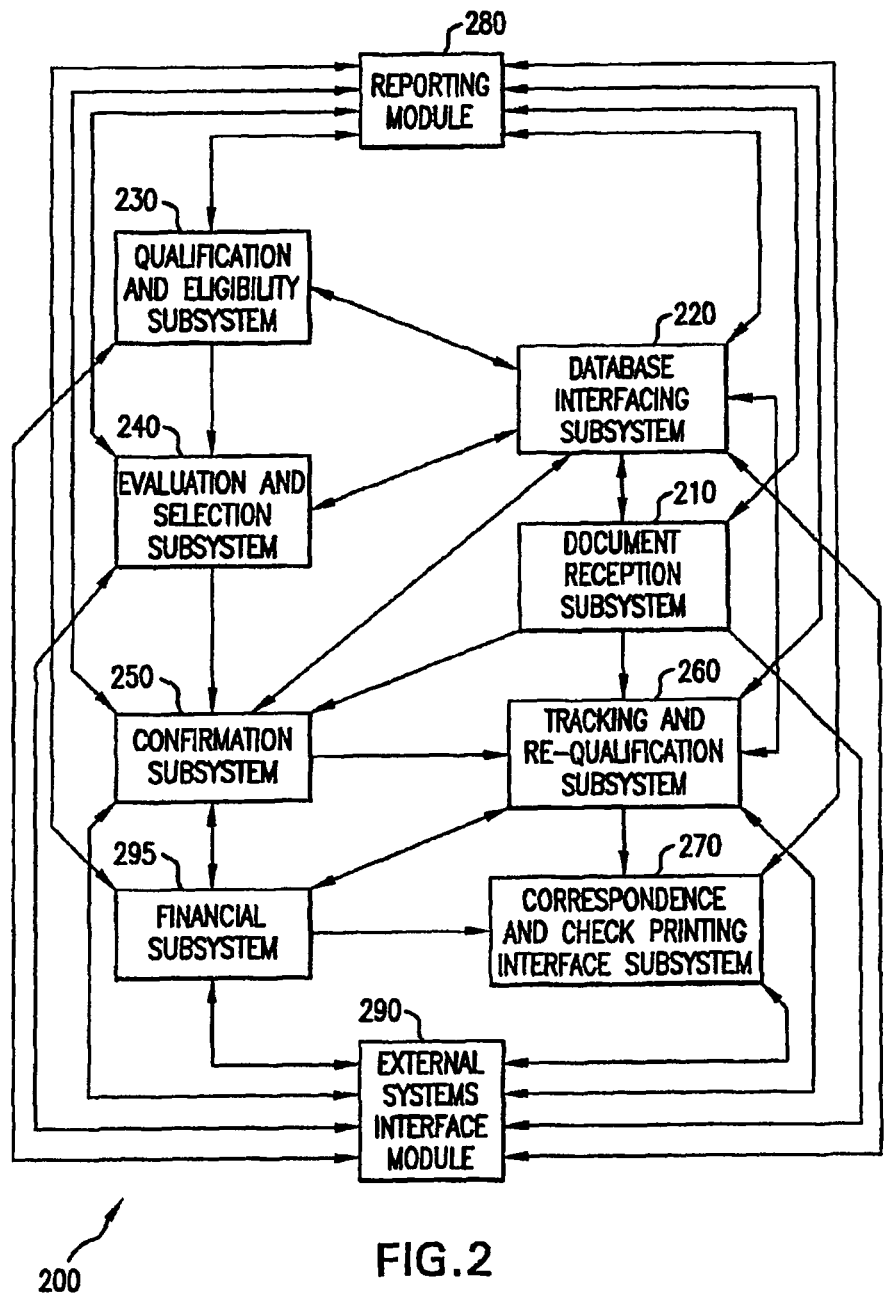
FIG. 2 shows a block diagram of an embodiment for a high-level software architecture for the system of FIG. 1.

Referring to FIG. 2, shown is a block diagram of an embodiment of a high-level software architecture for the system of FIG. 1.

Shown are a document reception subsystem (210), a database interfacing subsystem (220), a qualification and eligibility subsystem (230), an evaluation and selection subsystem (240), a confirmation subsystem (250), a tracking and re-qualification subsystem (260), a correspondence and check printing interface subsystem (270), a reporting module (280), an external interface module (290), and a financial subsystem (295).

The document reception subsystem (210) is coupled to the database interfacing subsystem (220), the confirmation subsystem (250), and the tracking and re-qualification subsystem (260). The qualification and eligibility subsystem (230) is coupled to both the evaluation and selection subsystem (240) and the database interfacing subsystem (220). The evaluation and selection subsystem (240) is also coupled to the confirmation subsystem (250) and the database interfacing subsystem (220). The confirmation subsystem (250) is additionally coupled to the database interfacing subsystem (220), the tracking and re-qualification subsystem (260), and the financial subsystem (295). The tracking and re-qualification subsystem (260) is also additionally coupled to the database interfacing subsystem (220). The financial subsystem (295) is coupled to the confirmation subsystem (250), the tracking and re-qualification subsystem (260), and the correspondence and check printing interface subsystem 270). The reporting module (280) and the external interface module (290) are coupled to each other and both are coupled to all the other subsystems.

The document reception subsystem (210) handles the incorporation of incoming documents into the competition system (100). While documents can be received in a variety of ways, such as electronically or by mail, the document reception subsystem (210) incorporates the documents into the system in a flat file format which is an electronic file containing the data of the original document. Flat files contain their data in a predefined format understandable by the various subsystems of the competition system (100). In one embodiment, the flat file format is a comma delimited format such as a comma separated value (CSV) format. This stored version of a document is referred to as a record, database record, or document record.

The qualification and eligibility subsystem (230) implements basic qualification, and eligibility requirements. The qualification and eligibility subsystem (230), in one embodiment, has one or more filters. A filter applies one or more criteria to an applicant package and determines whether the applicant package meets or does not meet the criteria. In one embodiment, applicant packages which do not meet any criteria are disqualified and marked so as to be in the non-select segment (112). In other embodiments, some criteria can be discretionary and applicants are given the chance to correct deficiencies. In one embodiment, the filters initially determine applicant package completeness (both data completeness and document record completeness). In this embodiment, once an applicant package is determined to have completeness, the applicant package is marked to be in the candidate segment (114) and is now called a candidate package. After this, further filters apply basic eligibility and discretionary eligibility requirements on the candidate packages.

The evaluation and selection subsystem (240) implements evaluation and scoring of candidate packages. The evaluation and selection subsystem (240) further compare scared candidate packages against each other and determines competition finalists. Competition finalists are those candidates which have been selected as competition winners, but are still required to pass a confirmation and acceptance procedure. In another embodiment, the confirmation and acceptance procedures are dispensed with, and the candidates selected by the evaluation and selection subsystem (240) directly become competition winners. This embodiment is used in competitions which do not place further responsibility or requirements on competition winners. By way of example, awards of recognition, such as a literary award, can be given without requiring confirmation or acceptance.

The confirmation subsystem (250) implements procedures for confirming finalists as competition winners and also implements the printing of correspondence alerting a finalist of his or her status and notifying them of the requirements and deadlines for submitting confirmation documents. In one embodiment, if a finalist passes the information and acceptance procedures, the finalist becomes a competition winner and the candidate package of the finalist is marked as being in the confirmation-winner segment.

The tracking and re-qualification subsystem (260) implements the procedures for tracking competition winners which includes the printing of correspondence notifying and alerting a competition winner to deadlines and requirements for staying qualified and the actual re-qualification determination for competition winners. Re-qualification is imposed on competition winners for whom a continuing performance criteria is required. By way of example, an academic scholarship may require a continuing minimum level of performance as measured by grade point average (GPA) or a minimum level of course difficulty.

The correspondence and check printing interface subsystem (270) interfaces between other subsystems and the printing hardware for printing correspondence, such as on the correspondence printer (150), and checks, such as on the check printer (152).

The database interfacing subsystem (220) allows the other subsystems access to the database hardware (104) of the competition system (100).

The reporting module (280) generates any reports documenting processes or results which take place. These reports include, but are not limited to, error reports such as scanning error or recognition error reports, status reports such as applicant status reports, audit reports (e.g. audit trails), possible duplicate reports, complete and incomplete candidate package reports, measurement reports, candidate detail reports, unmatched document (i.e. floater) reports, progress reports, documentation reports, and donor or other external reports. Documentation reports can include reports which document when and what procedures are used during competitions. Such documents can be valuable in a legal sense for sensitive competitions in which the losing candidates may attempt to make allegations of impropriety. Donor and other external reports can be produced ad hoc to provide specific and detailed information to the recipients. Donors, for example, may wish to know how their donations are used and reports addressing this may include amounts paid out, when, and how apportioned.

The external system interface module (290) enables the system to interface to other external application systems such as, but not limited to, financial systems, human resources (HR) systems, and registration systems.

The financial subsystem (295) implements the financial and accounting aspects of the system including keeping track of donations, award payments, and system costs. In an embodiment for the payment of academic scholarships, the financial subsystem (295) manages the award payments to scholars. In this embodiment, once an applicant is confirmed as a finalist, the financial subsystem (295) begins keeping track of the scholar. The financial subsystem (295) does this in yearly installments by reviewing the scholars package (i.e. the set of documents retained by the system on the scholar) and calculates a current term award by summing the monetary amounts of all scholarships (including $3^{rd}$ party scholarships), grants, and so forth and subtracts this amount from the total tuition amount. The resulting amount is divided by the number of semesters, trimesters, etc. applicable to arrive at a base award amount, also called the current term award. Note that in this embodiment, money from programs such as loans, work study, etc. are not included in the scholarship and grant calculation as the goal of this embodiment is to allow the student to maximize study time without incurring debt for later repayment. After arriving at the current term award, the financial subsystem (295) calculates an adjustment to the current term award which takes into account the effects of short-term scholarships, differences in tuition due to special circumstances such as study abroad or hanging institutions, etc. to arrive at a corrected current term award. This amount is then certified and results in payment generated and given to the scholar.

The financial subsystem (295) updates the previous calculations during the academic year at each term by reviewing the revised scholar award package and calculating a supplemental award based on the review of the revised scholar award package. The revised scholar award package is generated by adding term-specific information to the scholar award package. It is noted that the financial subsystem (295) accommodates scholarship payments for summer terms, study abroad.

Figure 3A:
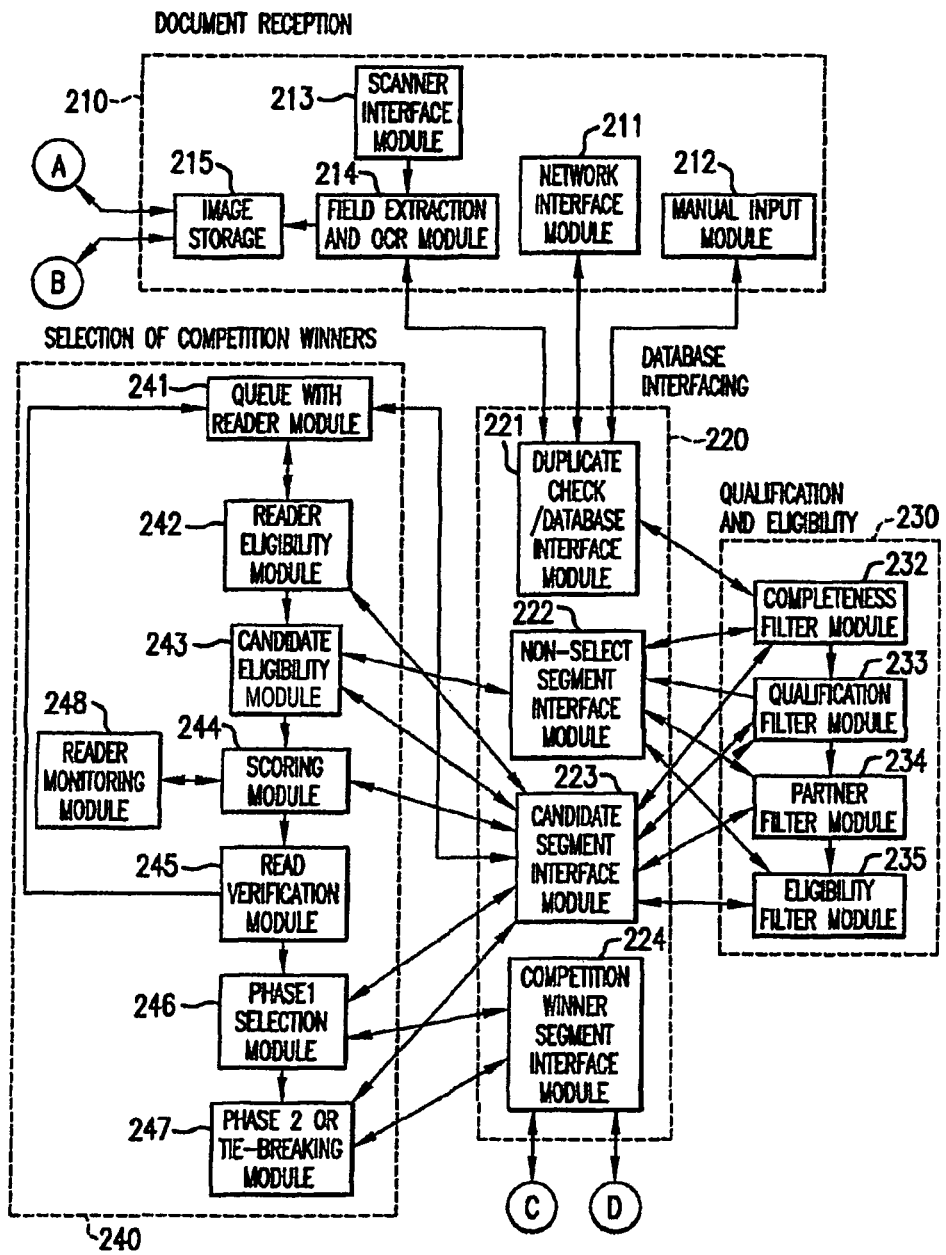
FIGS. 3a-3b show a block diagram in greater detail of the software architecture of FIG. 2.
Figure 3B:
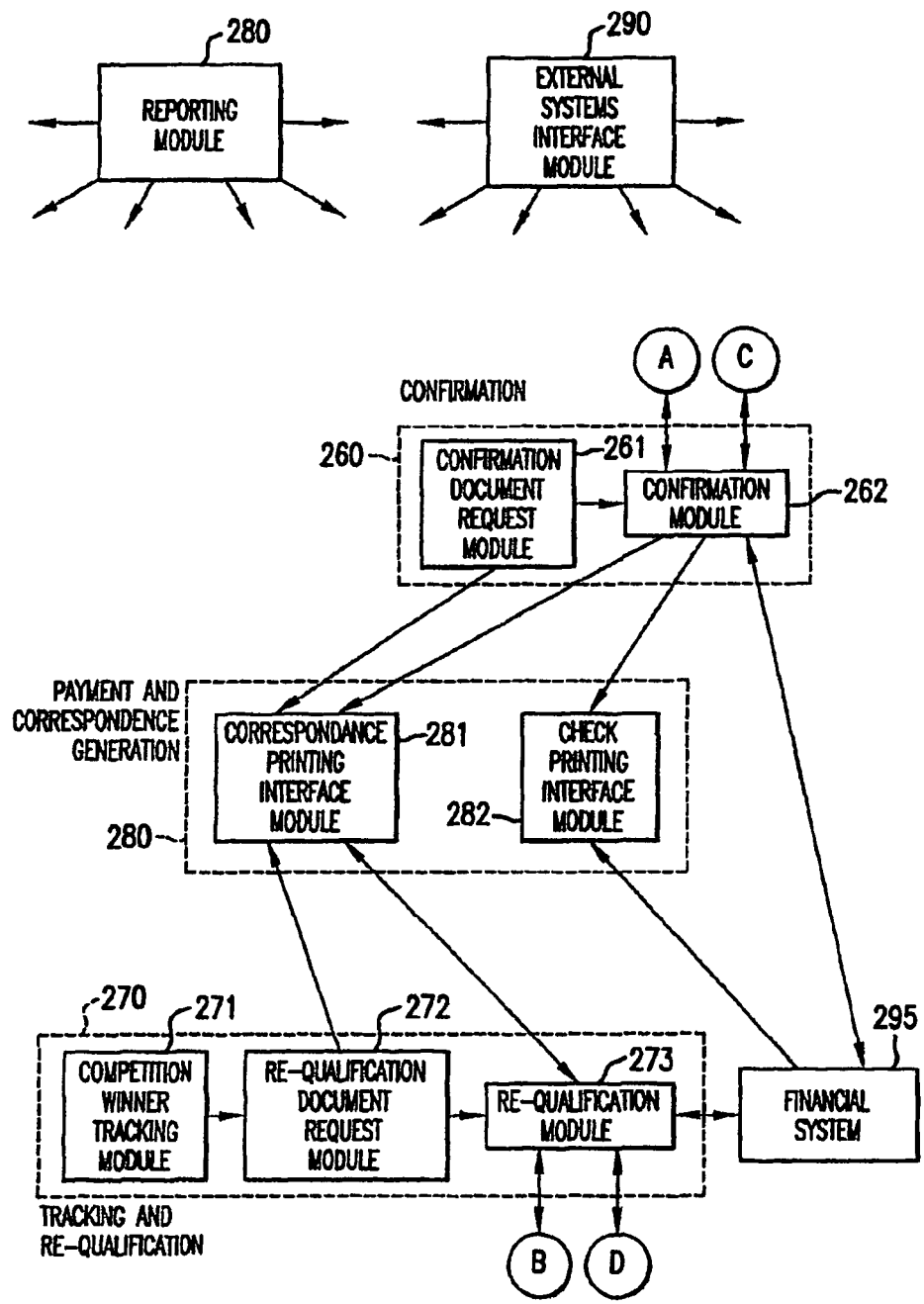

Referring to FIGS. 3a-3b, shown is a block diagram showing details of the subsystems of the software architecture of FIG. 2.

Shown in FIG. 3a are a document reception subsystem (210), a qualification subsystem (230), a selection of competition winners subsystem (240), and a database interfacing subsystem (220). Each of these subsystems comprise various modules that are discussed individually as follows.

The document reception subsystem (210) is shown having a network interface module (211), a manual input module (212) a scanner interface module (213), a field extraction and OCR module (214), and an image storage (215). OCR is an acronym for optical character recognition.

The scanner interface module (213) is coupled to the field extraction and OCR module (214). The field extraction and OCR module (214) is coupled to the image storage (215). The network interface module (211), manual input module (212), and the field extraction and OCR module (214) are all coupled to the duplicate check/database interface module (221). The image storage (215) is coupled to both the confirmation module (252) in FIG. 3b (via the connector "A"), and the re-qualification module (263) in FIG. 3b (via the connector "B").

The document reception subsystem (210) handles the incorporation of incoming documents into the competition system. In one embodiment, as shown, documents can be incorporated by any of three methods: electronic submission, hardcopy submission, and manual entry. Electronic submissions are received through the network interface module (211) and can originate from any electronic source such as an internet (e.g. the Internet) or an intranet. Electronic submissions can also be accepted from computers coupled directly to the competition system (and locally transferring documents in flat file format received on magnetic disc or compact disc, for example) such as the workstation (140) or the workstation (142). In one embodiment, the process of electronic submission directly produces the flat file format of the inputted form as the user (i.e. the applicant or, in one embodiment, the recommender or nominator) interacts with the competition system (100) in entering data. Electronic data entry by users is discussed in greater detail later herein in reference to FIG. 5.

From the network interface module (211), flat files are transferred to the duplicate check/database interface module (221). Incorporation of flat files is discussed in greater detail later herein in reference to FIG. 7.

Documents can also be submitted in paper or other hardcopy form including bit-image data on computer readable media such as on magnetic disc or optical disc, for example. Bit-image data refers to files not in flat format, such as bit-mapped images. Media containing bit-mapped image data generally results from external scanning of paper documents and storage onto computer-readable media, most likely, by the candidate himself or herself. In the embodiment as shown, the process of hardcopy submission is received through the scanner interface module (213). Paper, or other hardcopy documents requiring scanning, are first scanned in at one or module scanner modules and incorporated onto the system via a scanner interface module (213). Pre-scanned forms submitted on computer-readable media are simply read into the system. Incorporation of documents via scanning is discussed in greater detail later herein in reference to FIG. 6.

Documents submitted in a non-standard form format or which otherwise fail the attempt by the field extraction and OCR module (214) to extract field information can be incorporated into the system via rekeying at the manual input module (212). This directly produces the correct flat file format and this is then transferred to the duplicate check/database interface module (221) where the system storage is first checked to determine if the received flat file is already stored in the database hardware (104).

The scanned forms of the documents are then are transferred to the field extraction and OCR module (214) where the information of each field is extracted and the flat file form of the document is created. Field extraction involves the action of extracting information from predetermined fields and creating a "flat file" for the scanned document. The field extraction process requires that the documents be submitted using a predefined form (a form having defined "fields" which are located at predefined locations and are predetermined to hold specified information such as for a last name, first name, etc.) which is available upon request or from the Internet website. Use of the predefined form is encouraged for ease of data incorporation and to ensue that all required information is presented in sufficient detail. Once the flat file of a document is created by the field extraction and OCR module (214), it is transferred to the duplicate check/database interface module (221).

If the flat file already exists as a record in the database hardware (104), the system does not immediately store it but determines which version (stored record versus received flat file) is more completely filled out and will retain that copy. This process is described in greater detail later herein in reference to FIG. 7.

In one embodiment, a cutoff date is defined after which no further submissions are accepted. In the case of mailed submissions, the postmark date is the date used to determine timeliness of submission. Thus, further to this embodiment, an extension time period (such as 10 days) is employed to allow timely mailed hardcopies and other mailed media to arrive at the competition system. Once it is determined that all documents relating to candidate applications have been incorporated into the system, the qualification and eligibility subsystem (230) implements basic qualification and eligibility processes.

The qualification and eligibility subsystem (230) is shown comprising a completeness filter module (232), a qualification filter module (233), a partner filter module (234), and an eligibility filter module (235).

The completeness filter module (232) is coupled to the qualification filter module (233). The qualification filter module (233) is coupled to the partner group filter module (234). The partner group filter module (234) is coupled to the eligibility filter module (235). The completeness filter module (232), the qualification filter module (233), the partner filter module (234), and the eligibility filter module (235) are all coupled to both the non-select segment interface module (222) and the candidate segment interface module (223).

The completeness filter module (232) (also called the level 1 filter module) analyzes applicant packages for completeness. In one embodiment, the completeness filter module (232) checks applicant packages for both document completeness (i.e., that all required applicant documents are present) and information completeness (i.e., that all required data or information is present). Any applicant package which fails either document completeness or information completeness is transferred to the non-select database and the applicant package is deleted from the applicant list and entered in the non-select list. The application of level 1 filters is discussed in greater detail later herein in reference to FIG. 8.

The qualification filter module (233) (or level 2 filter module) analyzes candidate packages to determine if the candidates meet various minimum qualification standards. By way of example, these minimum standards can include a minimum GPA standard.

The partner group filter module (234) (also called the level 3 filter module) analyzes the candidate packages to determine if the candidates meet various partner group specific minimum standards. Partner groups are subpools of candidates (i.e., less than the full pool of candidates in the competition system) based on any one or more candidate-specific criteria. Partner groups are created so as to provide the ability to evaluate, rank, and select winners in ways sensitive to the specific partner group. By way of example, partner groups might be set up in an academic scholarship setting by looking to such variables as the candidates' geographical location, ethnic culture, poverty level, mother tongue, national origin, age, and so on. Thus, for a partner group for candidates having a non-English mother tongue, abilities in English might not be used during filtering as having little or no correlation to the academic abilities of candidates in that partner group. Conversely, English abilities might be stressed in the filtering of partner groups for which English as a mother tongue was a criteria.

The eligibility filter module (235) (or level 4 filter module) imposes one or more heightened minimum response standards. In one embodiment for a competition system having multiple optional essay questions, for example, a minimum number of essay responses are required by the eligibility filter.

It is noted that the use of more than one filter level or the use of partner groups is not necessary and having all filtering done by one software module is possible. The separation of filters into levels allows for easier use of criteria having different purposes. Separation of filters also allows for better separation of criteria which is useful when different individuals or committees are responsible for different filter criteria.

The operation of the level 2-4 filters is discussed in greater detail later herein in reference to FIG. 9.

The evaluation and selection subsystem (240) implements evaluation of applicant packages and selection of competition winners.

The evaluation and selection subsystem (240) is shown having a queue with reader module (241), a reader eligibility module (242), a candidate eligibility module (243), a scoring module (244), a read verification module (245), a phase 1 selection module (246), a phase 2 selection or tie-breaking module (247), and a reader monitoring module (248).

The queue with reader module (241) is coupled with the reader eligibility module (242). The reader eligibility module (242) is coupled to the candidate eligibility module (243) and the queue with reader module (241). The candidate eligibility module (243) is coupled to the scoring module (244) and the non-select segment interface module (222). The scoring module (244) is coupled to the read verification module (245) and the reader monitoring module (248). The read verification module (245) is coupled to the phase 1 selection module (246) and the queue with reader module (241). The phase 1 selection module (246) is coupled to the phase 2 selection or tie-breaking module (247). The reader eligibility module (242), the candidate eligibility module (243), the scoring module (244), the phase 1 selection module (246), and the phase 2 selection or tie-breaking module (247) are all coupled to the candidate segment interface module (223).

The queue with reader module (241) queues candidate packages with evaluators or readers for later evaluation (also called reading). In one embodiment, each applicant package is matched and queued with one evaluator. Matching is performed by comparing information from candidate packages with potential evaluators. In one embodiment, candidate packages are matched to evaluators by one or more of the following information: cultural background, ethnic background, age, or geographic residence. Each evaluator thereafter should have one or more candidate packages listed in the queue for that evaluator.

The reader eligibility module (242) requires the evaluator to pass an eligibility procedure for each candidate package prior to evaluation. This process requires the evaluator to answer one or more evaluator/reader eligibility questions with respect to a particular candidate package. The reader eligibility module (242) determines from the evaluator's responses whether the evaluator is able to evaluate the candidate package or not. In one embodiment, for example, evaluator questions can be concerned with whether the evaluator attended the same school as the candidate (or has other connections with the candidate which could raise questions of bias. If the evaluator is unable to evaluate the candidate, the evaluator is blocked from evaluating the candidate and the candidate package is requeued with another evaluator at the queue with reader module (241).

The candidate eligibility module (243) requires the evaluator to determine whether the candidate is eligible. This determination can be simply a verification check of the same requirements enforced by the filters in the qualification and eligibility subsystem (230) but additional or alternative requirements can be applied by this module.

The scoring module (244) implements the actual evaluation of applicant packages by evaluators. An embodiment for an algorithm implementing evaluation or reading of candidates is discussed in detail later herein in reference to FIG. 11. The read verification module (245) verifies that the candidate package was evaluated by the required number of evaluators. For example, in one embodiment, each candidate package must be evaluated by two evaluators, thus candidate packages having fewer than two evaluations are requeued with another evaluator at the queue with reader module (241).

The phase 1 selection module (246) handles initial selection of candidate finalists who, if confirmed at the confirmation subsystem (250) described hereinafter become competition winners. The phase 2 selection or tie-breaking module (247) handles the second phase or stage of candidate finalist selection. The phase 2 selection module (247) employs a finer selection paradigm than the phase 1 selection module (246) and is used to select between candidates who are very similar in overall evaluation scores. An algorithm for the phase 1 selection module (246) is discussed in detail later herein in reference to FIG. 12a and an algorithm for the phase 2 selection module (247) is discussed in detail later herein in reference to FIG. 12b.

The reader monitoring module (248) implements monitoring of the evaluators curing evaluations and can terminate an in-progress evaluation or nullify a completed evaluation if a problem is detected. Monitoring can take several forms. In one embodiment, evaluator responses are compared against corresponding reference standards. For example, if a competition involves evaluating candidates over several criteria such as writing skill and other criteria, monitoring will involve comparing the evaluator's responses for these criteria to standards. The evaluator's response to writing skill, for example, can be compared to the average score the evaluator has given to writing skill in all previous evaluations completed by that evaluator. Another method is to compare the evaluator's responses to a predetermined standard or to the average across all evaluators. If an evaluator is found to be erratic, corrective measures such as imposing a break, counseling, or so forth can be mandated. Additionally, completed evaluations found to be erratic can be nullified and the candidate package requeued with another evaluator.

The database interfacing subsystem (220) provides the necessary interfacing between the database hardware (104) and the rest of the system. The database interfacing subsystem (220) comprises a duplicate check/database interface module (221), a non-select segment interface module (222), a candidate segment interface module (223), and a competition-winner segment interface module (224).

The duplicate check/database interface module (221) is coupled to the database hardware (104), the network interface module (211), the manual input module (212), the field extraction and OCR module (214), and the completeness filtering module (232). The duplicate check/database interface module (221) supplies and retrieves flat files from the database hardware (104). Additionally, the duplicate check portion of the duplicate check/database interface module (221) determines, whether a flat file to be stored already exists in the database hardware (104) as a record, and if so, determines which of the two are to be stored as the most complete version and which is to be "set aside" (i.e. stored but indicated as a rejected duplicate). The duplicate check/database interface module (221) also, during the storing of flat files, determines if any other records in the database (104) relate to the same applicant as the file to be stored, and if so, they are associated together. For example, in systems requiring an applicant package to consist of an applicant form, a nominator form, and a recommender form, the duplicate check/database interface module (221), when storing a document, will check if the other two forms are present for the form being stored, and if one or both is, the forms will be associated together as an applicant package. An algorithm for implementing the duplicate check/database interface module (221) is discussed in greater detail in reference to FIG. 7.

The non-select segment interface module (222) is coupled to the completeness filter module (232), the qualification filter module (233), the partner group filter module (234), the eligibility filter module (235), and the candidate eligibility nodule (243). The non-select segment interface module (222) interfaces other software modules with the non-select segment (112) which holds candidate packages of candidates who ultimately do not become competition winners.

The candidate segment interface module (223) is coupled to the completeness filter module (232), the qualification filter module (233), the partner filter module (234), the eligibility filter module (235), the reader eligibility module (242), the nominee eligibility module (243), the scoring module (244), the read verificatior module (245), the phase 1 selection module (246), and the phase 2 selection or tie-breaking module (247). The candidate segment interface module (223) interlaces other software modules to the candidate segment (114) for access to candidate packages which have not been marked as non-selected.

The competition-winner segment interface module (224) is coupled to the phase 1 selection module (246), the phase 2 selection module (26), the confirmation module (252) (via the connector "C"), and the re-qualification module (263) (via the connector "D"). The competition-winner segment interface module (224) interfaces other software modules to the competition-winner segment (116) for storage of and access to candidate packages marked as competition winners.

Referring to FIG. 3b, shown is part 2/2 of a block diagram in greater detail of the software architecture of FIG. 2.

Shown are a confirmation subsystem (250), a tracking and re-qualification subsystem and a payment and correspondence generation subsystem (270). Each of these subsystems has various modules that are discussed in greater detail as follows.

The confirmation subsystem (250) is shown having a confirmation document request module (251) and a confirmation module (252). The confirmation document request module (251) is coupled to the confirmation module (252) and the correspondence printing interface module (271). The confirmation module (252) is coupled to the correspondence printing interface module (271), the check printing interface module (272) and the competition winner tracking module (261). The confirmation subsystem (250) implements confirmation of candidate finalists.

The confirmation document request module (251) determines what documents are needed to confirm a candidate finalist and handles the generation of correspondence to request these documents. The confirmation module (252) implements the actual confirmation of candidate finalists and handles the generation of award or rejection letters and, in the case of winners, initial check issuance if appropriate.

An exemplary algorithm for the operation of the confirmation subsystem (250) is discussed in greater detail later herein with respect to FIG. 13.

The tracking and re-qualification module (260) is shown having a competition winner tracking module (261), a re-qualification document request module (262), and a re-qualification module (263).

The tracking and re-qualification module (260) implements progress tracking of competition winners and submits the competition winners to re-qualification to ensure that they continually meet any requirements of the competition system (100). For example, in one embodiment for providing academic scholarships, competition winners (scholars) have defined academic requirements in order to continue receiving scholarship award payments. The competition winner tracking module (261) is coupled to the re-qualification document request module (262). The re-qualification document request module (262) is coupled to the re-qualification module (263) and the correspondence printing interface module (271). The re-qualification module (263) is coupled to the correspondence printing interface module (271), the check printing interface module (272), the competition-winner segment interface module (224), and the document receiving module (215).

The competition winner tracking module (261) determines when re-qualification or progress documents or information is needed. The re-qualification document request module (262) handles the scheduling and printing of correspondence to the necessary recipients which request the submission of required documents or other information so that competition winner tracking and re-qualification can be carried out. The re-qualification module (263) implements the actual re-qualification evaluation of competition winners.

An exemplary algorithm for the tracking of competition winners is discussed in greater detail later herein in reference to FIG. 14.

The payment and correspondence generation subsystem (270) is shown having a correspondence printing interface (271) and a check printing interface module (272).

The payment and correspondence generation subsystem (270) implement; generation of checks and correspondence. The correspondence printing interface (271) is coupled to the confirmation document request module (250), the confirmation module (252), the re-qualification document request module (262), and the re-qualification module (263). The check printing interface module (272) is coupled to the confirmation module (252) and the re-qualification module (263).

The correspondence printing interface (271) interfaces with word processors or other end devices such as the printer (150) to print correspondence necessary for implementation of any other processes in the system. The check printing interface module (272) enables the printing of competition award checks such as on the printer (152).

The reporting module (280) is shown with multiple interconnections radiating outward indicating that it is coupled with substantially every other module shown in FIGS. 3a and 3b. The reporting module, as previously discussed, collects information and generates reports. As an example of the detail which the reporting module (280) collects, the reporting module (280) is coupled to the queue with reader module (241) from which it determines each evaluator that an applicant package is queued to. From the reader eligibility module (242), the reporting module (280) documents the results of the reader evaluation, and so on. From these data, the reporting module (280) can generate reports documenting exactly what occurred with a particular applicant package as well as the performance of a particular reader, for example.

The external systems interface module (290) is likewise coupled to all modules necessary in FIGS. 3a and 3b. As discussed previously herein, the external systems interface module (290) interfaces the modules and subsystems shown in FIGS. 3a and 3b with external systems such as finance systems, human resources systems, and so forth.

Figure 3C:
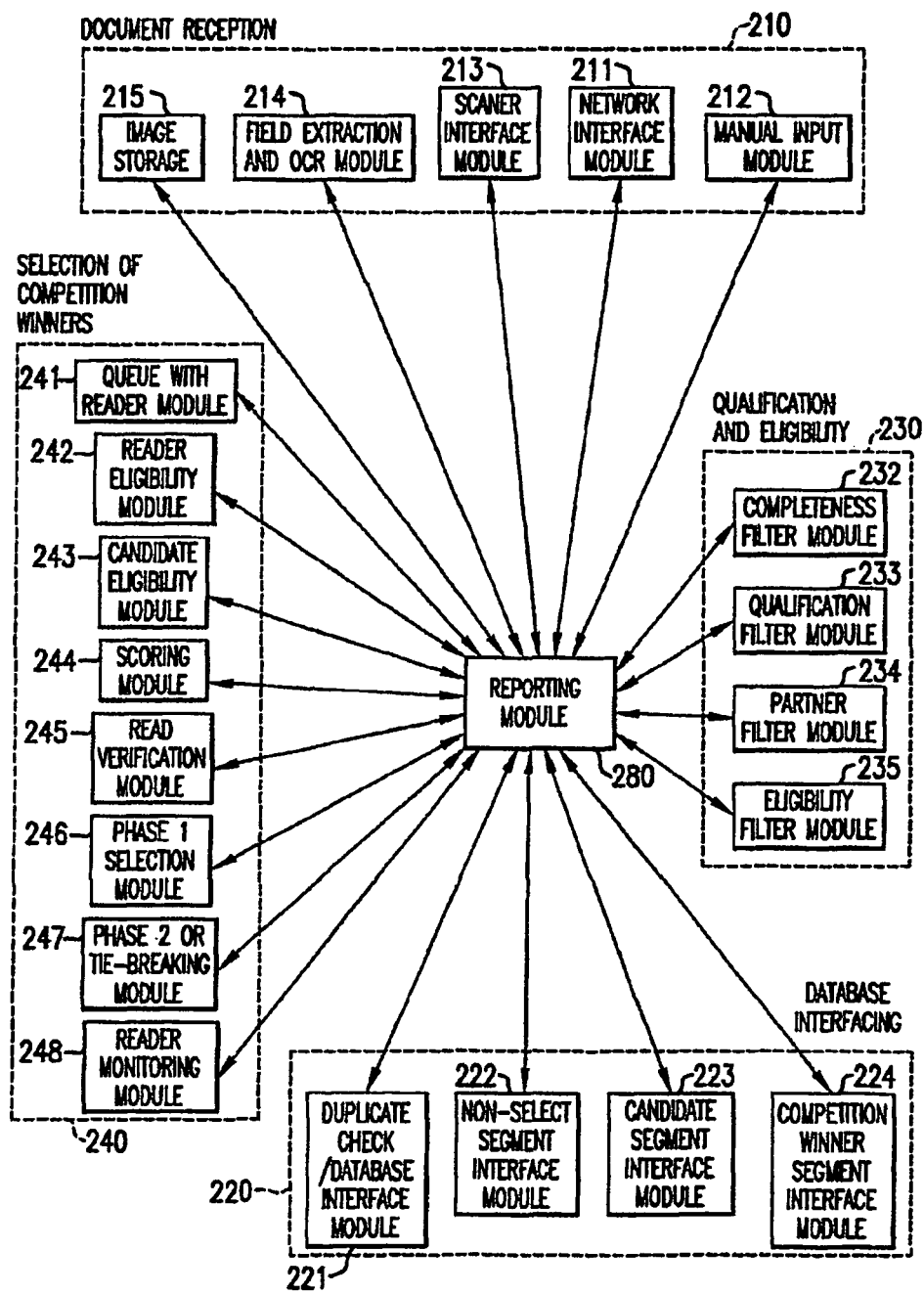
FIGS. 3c-3d show the block diagram of FIGS. 3a-3b emphasizing the interconnections of the reporting module (280).
Figure 3D:
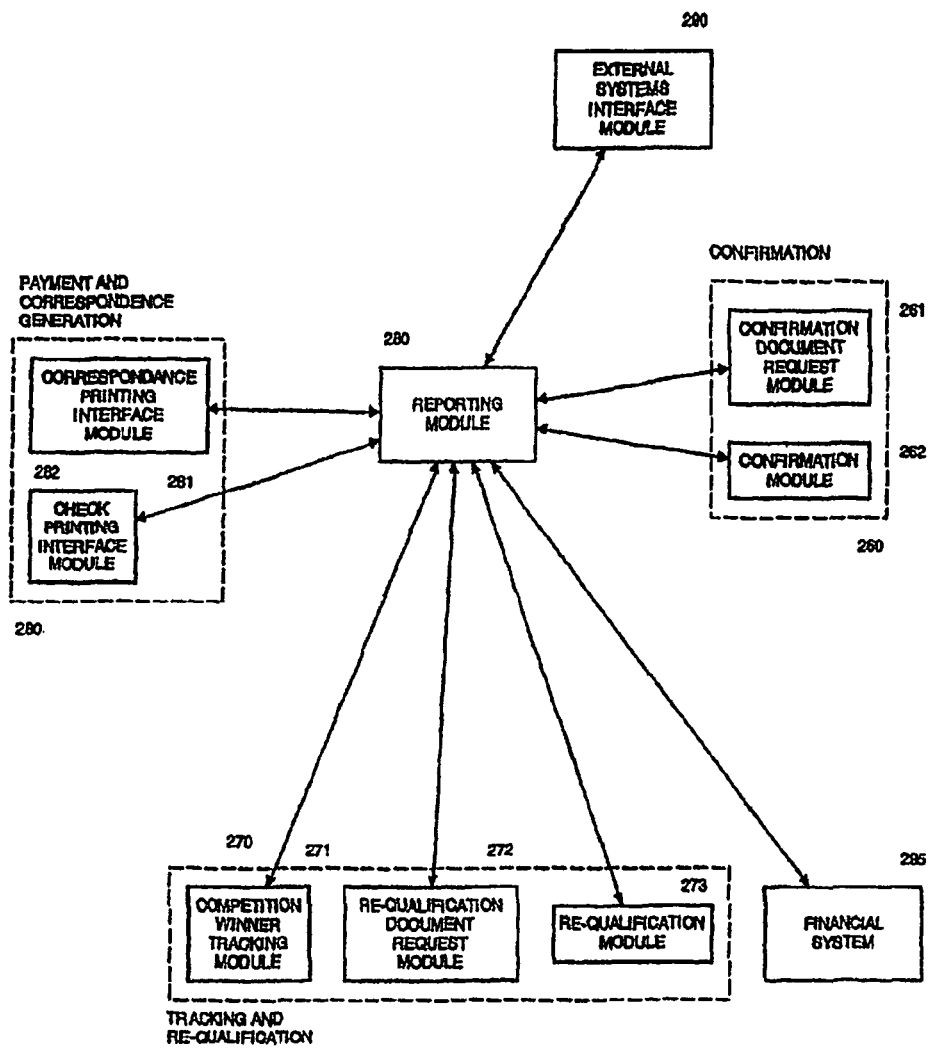

Referring to FIG. 3c, shown is the block diagram of FIG. 3a and the reporting module (280) showing interconnections of the reporting module (280). Similarly, referring to FIG. 3d, shown is the block diagram of FIG. 3b showing interconnections of the reporting module (280).

Shown in FIG. 3c are all of the modules shown in FIG. 3a and the reporting module (280). Shown in FIG. 3d are all of the modules of FIG. 3b. The reporting module (280) is shown in both figures connecting with all the shown modules. In operation, the reporting module (280) records the events of each module for documentation purposes. The reporting module (280) is able to synthesize a great variety of reports from the recorded information including, but not limited to document submission error reports, scanning error reports, possible duplicate reports, lists of all applicants for a specified competition, lists of all floater documents, status reports on a specified applicant package or a specified set of applicant packages (such as by an entered list or a specified partner group or a group defined by a specified piece or range of information), evaluation summary reports by applicant, partner group, evaluator, scholar financial reports, scholar progress reports, data analysis reports, trend analysis reports, and so forth. The reporting module also stores and can reference in reports the documenting of decisions by competition system personnel. Such documentation provides proof, if later required, of the decisions made by system administrators and personnel. Decisions which may be documented in this way include decisions regarding duplicate document and fraud situations, the order of evaluation variable application for tie-breaking, what constitutes a complete document, and so forth. It is noted that one of ordinary skill in the art, in implementing a competition system (100) for a defined purpose and a defined reporting capability, would know what modules to couple to the reporting module and what data the reporting module would accumulate and store. Additionally, one of ordinary skill in the art, given a defined purpose and a defined reporting capability, would know which modules the external systems interface module (295) would need to be coupled to and what transfer protocols would need to be implemented.

Figure 4:
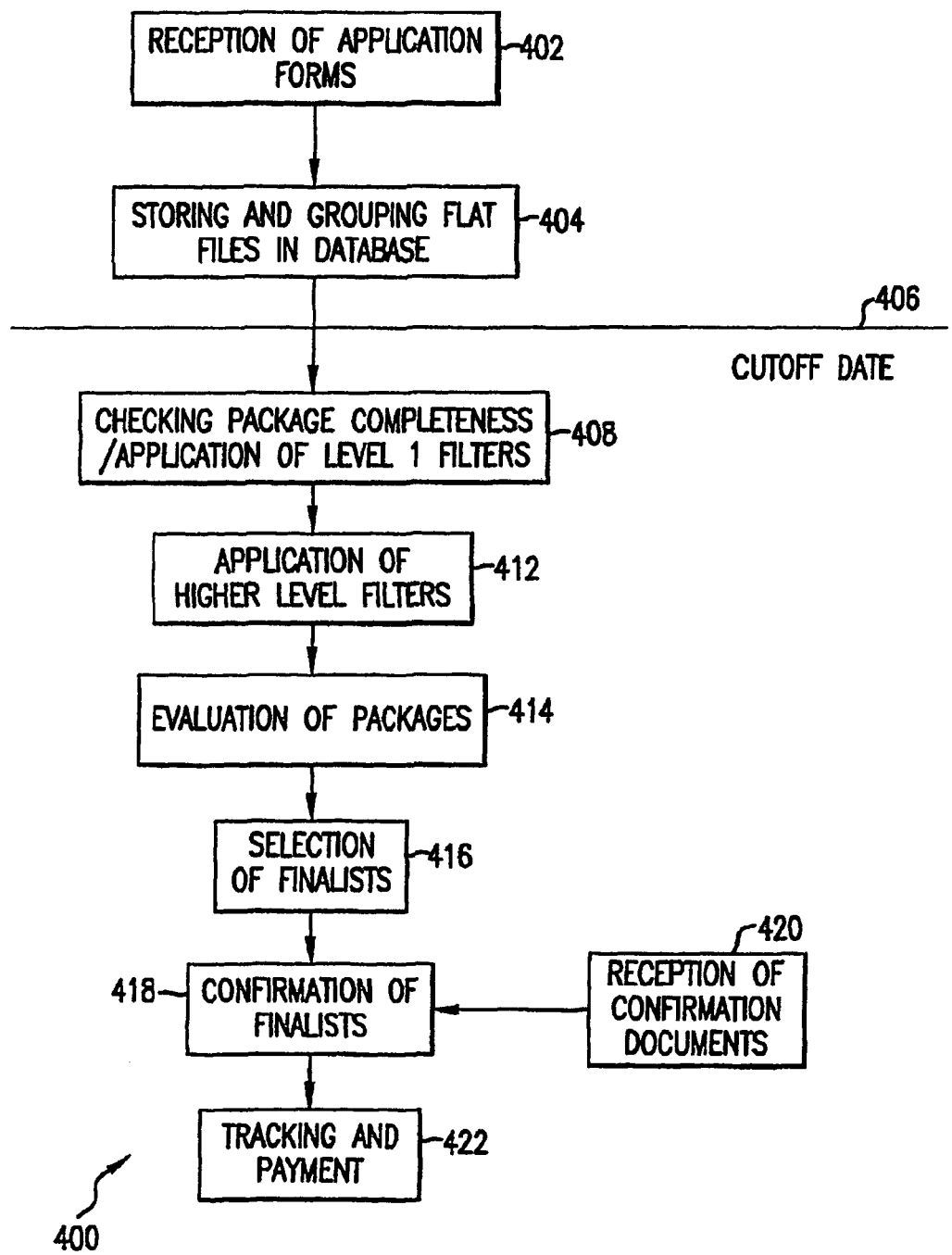
FIG. 4 shows a general flowchart of steps traversed by an exemplary method in operation of the systems of FIGS. 1-2.

Referring to FIG. 4, shown is a general flowchart of the steps traversed in operation of the systems of FIGS. 1 and 2.

The competition system (100) receives (402) application documents which can originate from applicants themselves and/or other individuals. In one embodiment, as discussed previously, are applications and documents in support thereof from nominators or recommenders. These submissions can be via electronic means such is, but not limited to, electronic submissions via the network (122) such as via the Internet, or via hardcopy submissions such as paper copies submitted by postal mail (130). In the case of hardcopy submissions using a preformatted form designed for the system of the present invention, the hardcopy is scanned using a scanning system (132). During the scanning process, form fields are identified and the information contained therein is extracted and read. In one embodiment, the scanning is done by optical means using a commercially available scanner although any other method, such as by mechanical means, can be implemented.

In one embodiment, regardless of method of submission, forms and documents must be converted to a flat file format discussed previously in reference to FIG. 2. In submissions via the network (122), the flat file is created directly from the inputted information. In submissions incorporated via the scanning system (132), the scanning system produces the flat file from the data retrieved during field extraction and optical character recognition (OCR). Similarly, flat files are generated from electronic submissions on computer-readable media or manual entry via a workstation such as workstation (140).

Once the flat file form of received documents are present, the system stores (404) the flat files in the database hardware (104) as records and they are marked as being in the staging segment (110). At the time of storing, the system groups (404) or associates the flat file with any other records from the same applicant. It is at this stage that the various records relating to the same applicant are associated to form applicant packages. While it is possible that duplicates of one or more of these forms can be submitted to the system, only one of each form type is included in an applicant package. Any duplicate forms are retained but identified as duplicates (the process of identifying the duplicate forms and excluding them from the candidate packages is termed "setting aside").

In one embodiment, the association of records is done by applicant social security number. In this embodiment, the applicant record (the application submitted by the applicant his- or herself) is the key file (or key record). Once the applicant form is stored as a record, the applicant identified in the record is added to an applicants list. If any other required forms identifying that applicant are later submitted, such as a nominator form or a recommender form, they are associated with the corresponding applicant record or key file. Required forms such as nominator forms or recommender forms, which are submitted without a corresponding key form (the applicant form) being present are termed "floaters" indicating they do not have a key file to be associated to.

After the cutoff date (406), further electronic submissions via the network interface module (211) are prevented. The cutoff date is chosen so as to provide enough time to carry out the rest of the competition processing prior to any necessary deadlines. In one embodiment, if hardcopy forms submitted by mail or other means are allowed in a competition, the postmark dates of mailed submissions are used to determine whether a submission was timely. When using postmarked dates to determine cutoff timeliness, extra time is allowed beyond the cutoff date (such as 10 days) to allow for the physical delivery of the mailed submissions to the competitor processing site and the necessary subsequent incorporation of the hardcopy data into the competition system. All applicants identified in any form which was received by the cutoff date and the postal mail extension time period allowed for are identified and recognized within the system and will therefore be considered luring the competition.

At this point, the competition system checks (408) the completeness of the applicant packages. This determination is also referred to as level 1 filtering. In one embodiment, the filtering is done in two or more stages or levels which are described in greater detail in reference to FIG. 8 and FIG. 9. In one embodiment, the completeness of applicant packages is checked in two ways. One determination is whether an applicant package has document completeness. As discussed previously in reference to one embodiment, a complete applicant package is comprised of an applicant or nominee form, a nominator form, and a recommender form. Any package determined not to contain all required initial forms is determined to be incomplete. A second determination is whether each document in a candidate package contains all required data or information. As each document required in a complete candidate package is different from all others, each document generally has different required data or information standards. Applicant packages which are lacking one or more required documents or which contain documents missing one or more required datum or pieces of information are determined to be incomplete. These applicant packages are redesignated as non-selects and are removed from the applicant list, added to the non-select list, and, along with any duplicate forms, are marked to the in the non-select segment (112). All complete applicant packages which meet the basic eligibility requirements are marked to be in the candidate database (114). Thereafter, these applicant packages are referred to as candidate packages. Candidate package are then filtered (412) with one or more higher level filters.

After candidate packages pass the filtering process, they are read (414). Reading involves evaluation of the candidates with respect to the rubric of the competition system. The term rubric refers to the variables and the scoring process which are used to score or select the winning candidate. The variables can be objective or quantitative (such as grade point average or GPA) or subjective or qualitative (such as the results of essay evaluation). The variables can also include both cognitive variables (GPA, essay writing, etc.) or non-cognitive variables (leadership experience, presence of a support person, etc.). In one embodiment, evaluation (or reading is done by humans who are trained to evaluate the candidate packages, a though automated reading implemented by software means or a combination of automated processes and human evaluation can be implemented. In one embodiment, human readers evaluate the candidate packages against a rubric composed in the greater part by non-cognitive variables such as, but not limited to: positive self-concept, realistic self-appraisal, understanding/navigation of social systems, preference for long-term goals over short-term needs, availability of a support personage, leadership experience, community service, and non-scholastic knowledge concentration (i.e. appreciable knowledge acquisition about a field not covered in past academic environments).

Evaluation or reading is generally done multiple times for each candidate package for reasons of reducing the effects of spurious read deviations. In one embodiment, the reading process is completed two independent times for each candidate package (i.e., the candidate packages are each evaluated by two different readers). In other embodiments, however, multiple partial reads are used which allows expert readers to specialize on a subset of evaluation variables. In still other embodiments, only one read or more than two reads can be used per candidate depending on the repeatable accuracy of readers, the limitations of the competition finances, or the fairness safety factor desired. The process of evaluation or reading is described in greater detail later herein in reference to FIG. 10.

In order to ensure the accuracy and repeatability of human (and automated) readers, reader normalization (or reader norming for short) is implemented in one embodiment. Reader normalization refers to those processes implemented to ensure readers operate within a predetermined variance standard during their evaluation. Reader normalization is used during training and continued during the actual reading of candidates. As a component of reader norming during actual evaluations, reader monitoring is implemented which allows for detection of errant evaluations or biases. Reader norming is discussed in greater detail later herein in reference to FIG. 11.

Once the candidate packages have been read, the candidate finalists are selected (416). Selection generally is implemented by selecting the candidates with the highest read scores. The selection process can be complicated and involved when the number of competition winners is predetermined and the number of read variables is relatively low because generally there will be a read score for which some candidates will be selected, but due to the limited number of total competition winners, others at the same score will not be able to be selected. The selection process is described in greater detail later herein in reference to FIGS. 12a and 12b.

Once the candidate finalists are determined (416), the candidate finalists are put through a confirmation process (418) which involves verifying statements made in the candidate's application (the nominee form in an embodiment) and any other required documentation (such as the nominator and recommender forms, in an embodiment) and also verifying that the candidate meets any eligibility requirements the data for which were not known at the time of application. The process of confirmation is aided by the reception (420) of required confirmation documents. By way of example, in an academic scholarship competition it may be that the candidate does not know which college or university he or she will attend at the time of application, but this information must be known and supplied prior to the academic scholarship grant. The process of confirmation is discussed in greater detail later herein with respect to FIG. 13.

After confirmation, competition winners are tracked (422) to monitor their progress and, optionally, to determine whether or not the competition winner is maintaining, any post-competition requirements. In an academic scholarship system, for examples, post-competition requirements may relate to academic performance, and if met, the system responds by continuing payment of the scholarship award. The post-competition tracking system is discussed in greater detail later herein in reference with FIG. 14.

Figure 5:
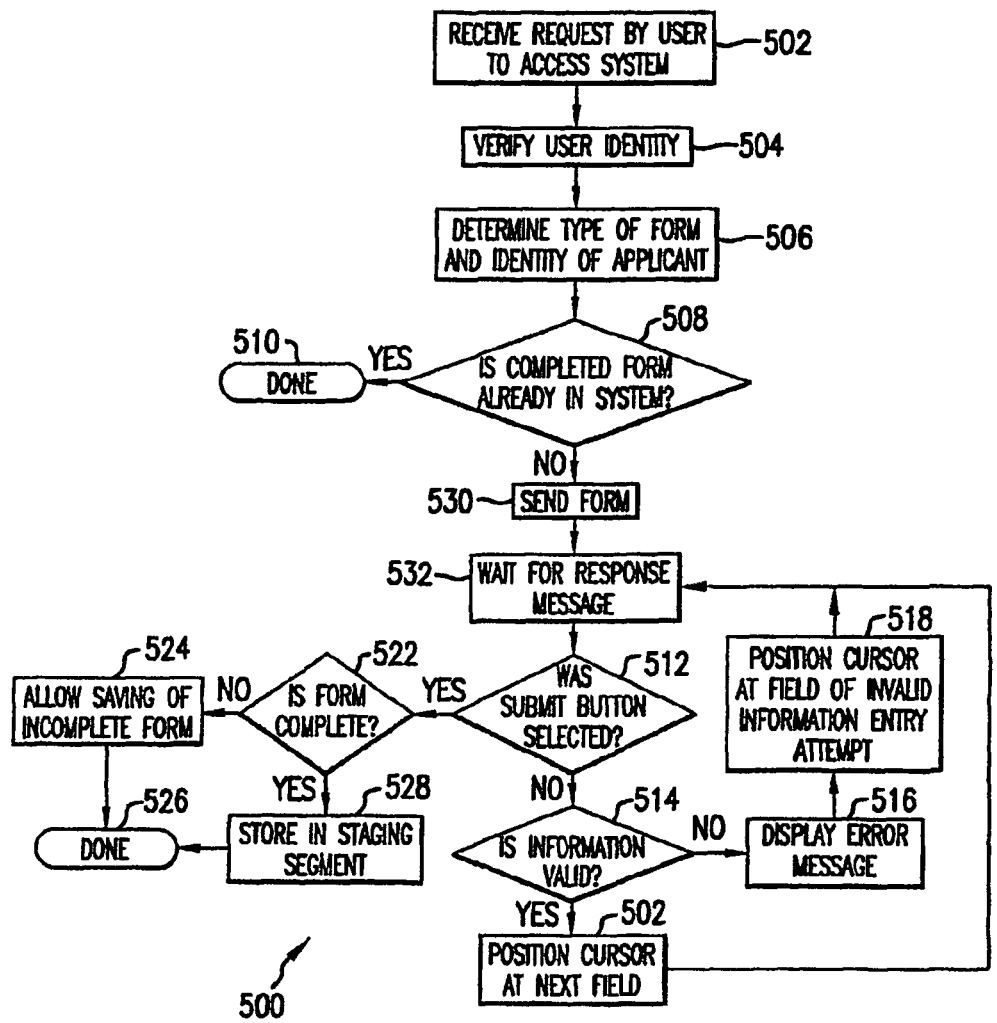
FIG. 5 shows a flowchart of steps traversed by an exemplary method in the operation of electronic reception of documents in the systems of FIGS. 1-2.

Referring to FIG. 5, shown is a flowchart of an exemplary algorithm (500) for the steps traversed in the operation of electronic document submission of FIG. 4.

As one method of receiving information from potential candidates, a website is maintained which allows access and online information submission by individuals. When an individual accesses (502) the website, for security reasons, the website requires (504) identification of the accessing individual by a logon protocol. Additionally, in one embodiment, security is implemented during the submission process. By way of example, digital signatures are used and retained by the system for verification. Alternatively, the system can require or allow the use of personal identification smart cards to verify identity.

Once the individual is successfully logged on, the system will provide the individual with options which include online form completion and submission. The individual then indicates his or her role (506) (e.g., in one embodiment as applicant, nominator, or recommender) and, in the case of individuals providing support documents, the identity of the applicant (504) for which they wish to submit a form. After selecting online form creation, the system which first determines (508) whether that form was already submitted (i.e. whether that individual already submitted a form for the candidate identified). Duplicate submissions are sometimes requested for various reasons such as the individual wishes to change some information the individual forgets the prior submission, and so on. In order to prevent creation of duplicate documents, the system prevents (510) the individual from continuing if the form requested has already been submitted to the system.

In one embodiment, duplicate forms are detected using the candidate's social security number only. In another embodiment, potential duplicate applications are detected by the use of the last name, the first letter of the first name, the date of birth, and the state of birth and/or residence. In this embodiment, potential duplicates identified by these criteria are included in a duplicate report and system administrators will be able to access a special interface set up to allow simultaneous display of data from two applications so that the two potentially duplicated firms can be viewed together. Duplicates can arise which have alternate candidate social security numbers. This can occur in the case of a duplicate form being input with an erroneous candidate social security numbers or intentionally changed social security number (i.e., fraud).

Detection of both innocent and intentional duplication of forms is necessary for proper competition administration. Cases of apparent duplicates with different social security numbers do often occur and a common situation is the case of twins. By way of example, it is noted that in some Asian cultures, twins may receive identical or nearly-identical names and thus may appear to be a highly likely case of duplication when in actuality it is not. In one embodiment, the system administrator reviews all possible duplicate situations prior to the involved documents continuing in the competition process. To facilitate this, the system generates a possible duplicate report such as shown in FIGS. 22-23.

If the form requested was not previously completed, the individual is presented (530) with the appropriate form for online completion. In the embodiment shown, the individual is interacting directly with the system, so the system must wait (530) for each field submission (usually by pressing of the enter key or the tab key). In another embodiment, forms can be completed by use of software such as a downloaded program or browser plugin and the results submitted at completion.

Next, the system determines (512) whether the submit button (indicating the individual has completed the form and wishes to submit the form for storage). If the individual's action was not submission but information entry in a field, the system determines (514) whether the entered data meets basic validity criteria for that field and presents (516) any error message to the individual. By way of example, if the field requires the birthdate of the candidate, the system may impose a general form requirement that the date be entered in the common mm/dd/yy form (i.e. two digit month numeral followed by two digit day numeral followed by a two digit year numeral). The system could also provide a presumed validity requirement by presuming invalid any birthday which is in the future, was in the past 10 years, or was prior to 100 years previously (under the hypothesis that no candidate would be younger than 10 years old or greater than 100 years old). If an error message is presented, the cursor resets (518) in the field where the invalid data was entered and the system again waits (532) for information entry and thereafter continues as discussed previously.

If a field submission is determined (514) valid, the system automatically positions (520) the cursor in the next field and thereafter waits (532) for further information entry and thereafter continues as described previously.

When the individual has completed the form and selects the submit button, the system determines (522) whether the form is completely filled out. If not, the system allows (524) the saving of incomplete forms for later continuance after which the online form entry session is finished for now as shown by done indicator (526). If the form is determined (522) to be complete, the form is stored in the database: hardware (104) as a record and marked (528) to be in the staging segment (110) and the form entry session is finished as shown by done indicator (526).

Figure 6:
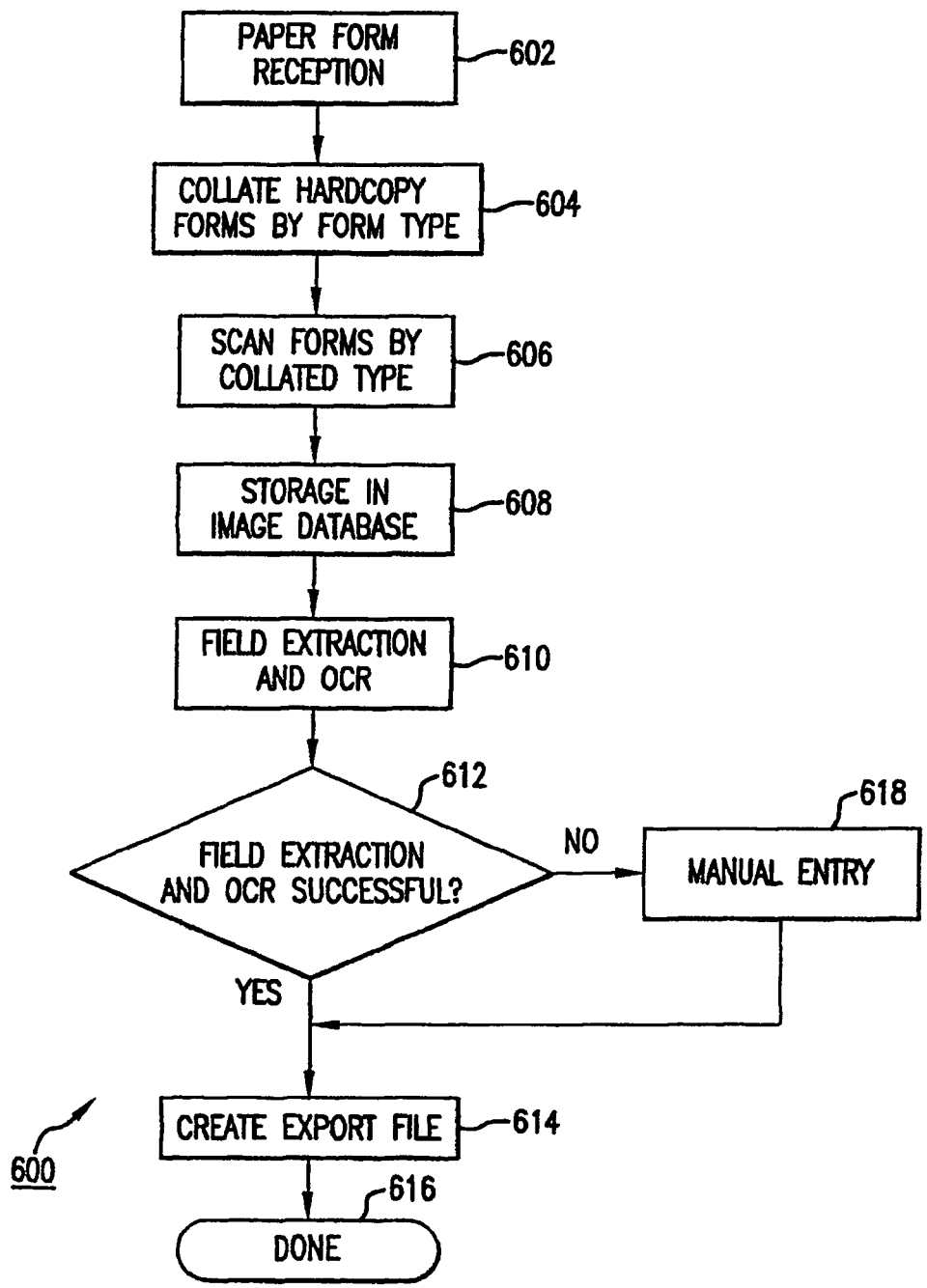
FIG. 6 shows a flowchart of steps traversed by an exemplary method in the operation of hardcopy reception in the systems of FIGS. 1-2.

Referring to FIG. 6 shown is a flowchart of an exemplary algorithm (600) of the steps traversed in the operation of hardcopy submissions in the systems of FIGS. 1-2.

Another way besides electronic submission for forms to be submitted by individuals is by paper or hardcopy submission such as by postal mail0. Other forms of submission could also be used which include, but are not limited to, facsimile submission, compact disc or other optical recording device submission, electronic file submission other than online form completion such as by a portable document format (PDF) file, submission on magnetic media such as tape or disc (e.g., floppy disc or harddisk), and mechanical submission such as by punched card, sheet, or tape.

As the competition system (100) receives (602) submissions, they are collated (604) by form type (e.g. by applicant, nominator, and recommender forms as discussed previously for one embodiment). At periodic intervals, or as convenient, the received forms are scanned (606) in batches. After scanning, the resultant images are submitted (610) to a field extraction and optical character recognition (OCR) process to extract the data in the images. The system then determines (612) whether the field extraction and OCR process was successful, and if it was, the algorithm (600) then creates (614) an export file and then is done for the data extraction of that image as indicated by the done indicator (616). After this, the algorithm (600) generally selects (602) another form for processing and continues as before until all scanned documents are likewise submitted to the field extraction and OCR process. If the field extraction and OCR process is determined (612) to have not been successful, forms can be manually entered (618). The algorithm (600) then creates (614) an export file and then is done for the data extraction of that image as indicated by the done indicator (616).

Generally, errors sometimes result in interpretation of field information. By way of example, an error could be as simple an occurrence as a comma having been entered when a "/" was required (such as in a date field). A scan report is generated which summarizes the results of the scan process of each batch and if errors result d, these are indicated by document in the scan report.

Figure 7:
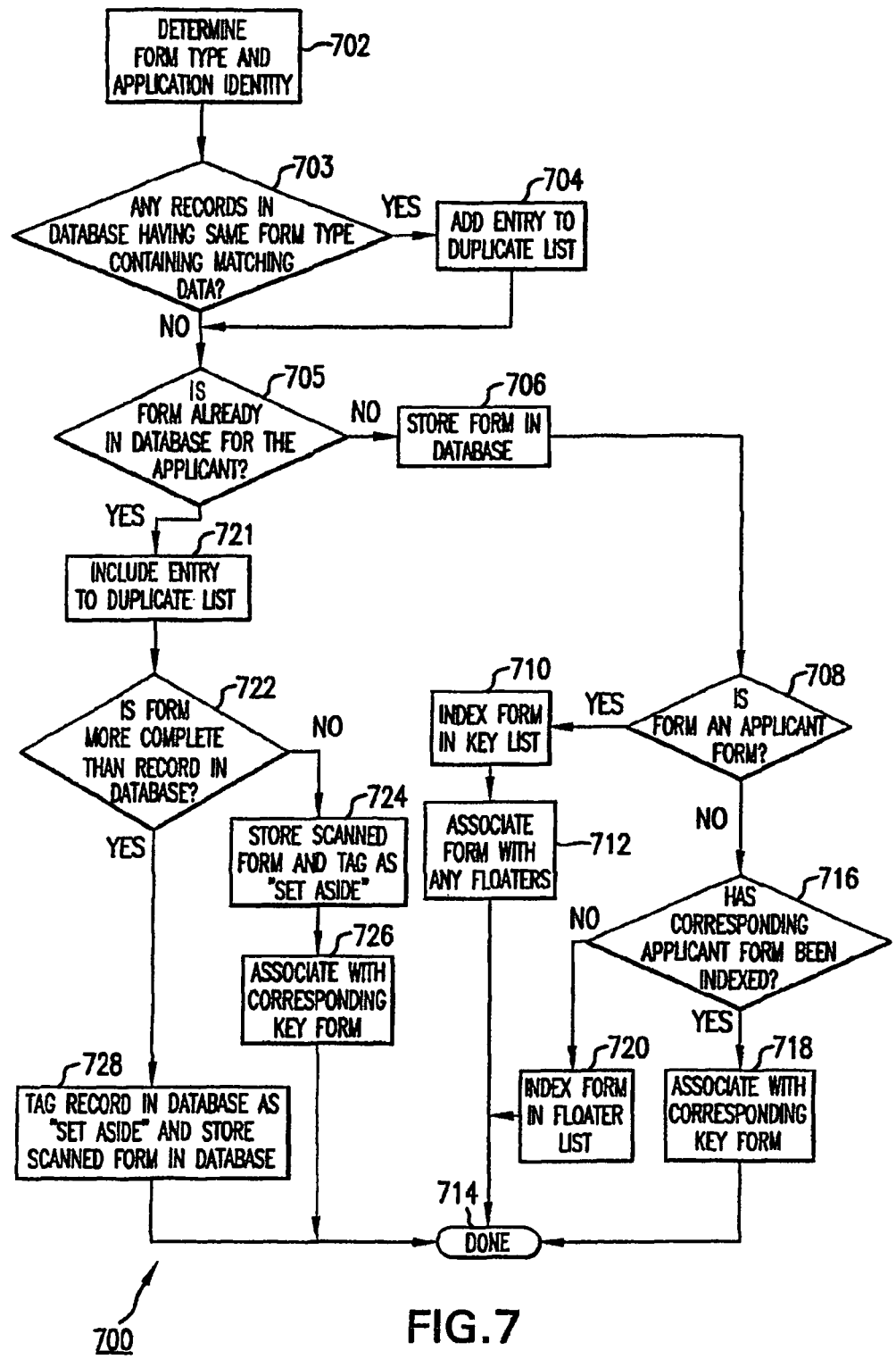
FIG. 7 shows a flowchart of the steps traversed in an exemplary algorithm for the storing and duplicate detection for the submission procedures shown in FIGS. 5-6.

Referring to FIG. 7, shown is a flowchart of an exemplary algorithm (700) of the steps traversed in the storing and grouping of records shown in block (404) of FIG. 4.

The algorithm (700) stores flat files into the database hardware (104) as records. These flat files are received through any of the methods discussed previously in reference to FIGS. 5-6 (such as electronically and via postal mail with subsequent scanning or manual entry). The algorithm (700) begins by determining (702) the form type (i.e. in one embodiment, whether the flat file represents an applicant form, nominator form, or recommender form) and applicant identity from the flat file. In one embodiment this is easily done as forms must be submitted using predefined forms having specified fields or identifying information or markings which identify the nature of the form. Next, the algorithm (700) determines (703) whether any records in the database (104) for applicants with a different social security number have the same form type and contain data which substantially matches the flat file to be stored. If any records are found substantially matching the file to be stored, this is a potential fraud situation and an entry is made (704) in the duplicate list.

Next, the algorithm (700) determines (705) if a record exists in the database (104) which is a match for the form type and the same applicant. If not, the flat file is stored (706) in the database hardware (104) as a record. If the form is an applicant form (708), it is indexed (710) in the applicant list or key list. The applicant form or key list is The algorithm (700) then checks a floater list for any floaters corresponding to the stored applicant record and if there are any, they are associated (712) with the just-stored applicant record. The floater list is a list of all forms (such as the nominator and recommender forms in the prior embodiment) for which a corresponding applicant record has not been stored in the database hardware (104). The algorithm (700) is then done for this flat file as indicated by the done indicator (714).

If the flat file is not an applicant form (708), a check (716) is made if the corresponding applicant (or key) form has already been indexed. This is done in one embodiment by use of the candidate's social security number (SSN), which is also required on the nominator and recommender forms in identifying the applicant for which the form is submitted. If a corresponding applicant form has not been received by the competition system (100), the file is indexed (720) and flagged as a floater in the floater list. After indexing of the file in the floater list, the algorithm (700) is done with this form as shown by the done indicator (714).

If a corresponding applicant form is found (716) to have been indexed by the system, the stored record is associated (718) with the corresponding applicant or key form. The algorithm (700) is then done with this form as shown by the done indicator (714).

If the flat file is determined (705) to already be in the database hardware (104), this means that the flat file is considered a possible duplicate and is indexed in a duplicate list. The duplicate list is a report which keeps track of all duplicates. The algorithm (700) next compares the stored record with the received flat file to determine (722) whether the received flat file is more complete than the record already stored in the database hardware (104). If it is, the record already stored in the database hardware (104) is flagged as "set aside" and the received file is stored and is the record which is used by the competition system (100) during further considerations.

It is noted that as discussed previously, by consideration of the duplicate list, system administrators or other officials can verify whether the correct action was taken.

If the received file is determined (722) to be less complete than the record stored already, the received form is stored (724) in the database hardware (104) and flagged as "set aside", but is still associated (726) with the other documents of the same applicant. The algorithm (700) is then done with this form as shown by the done indicator (714).

Figure 7A:
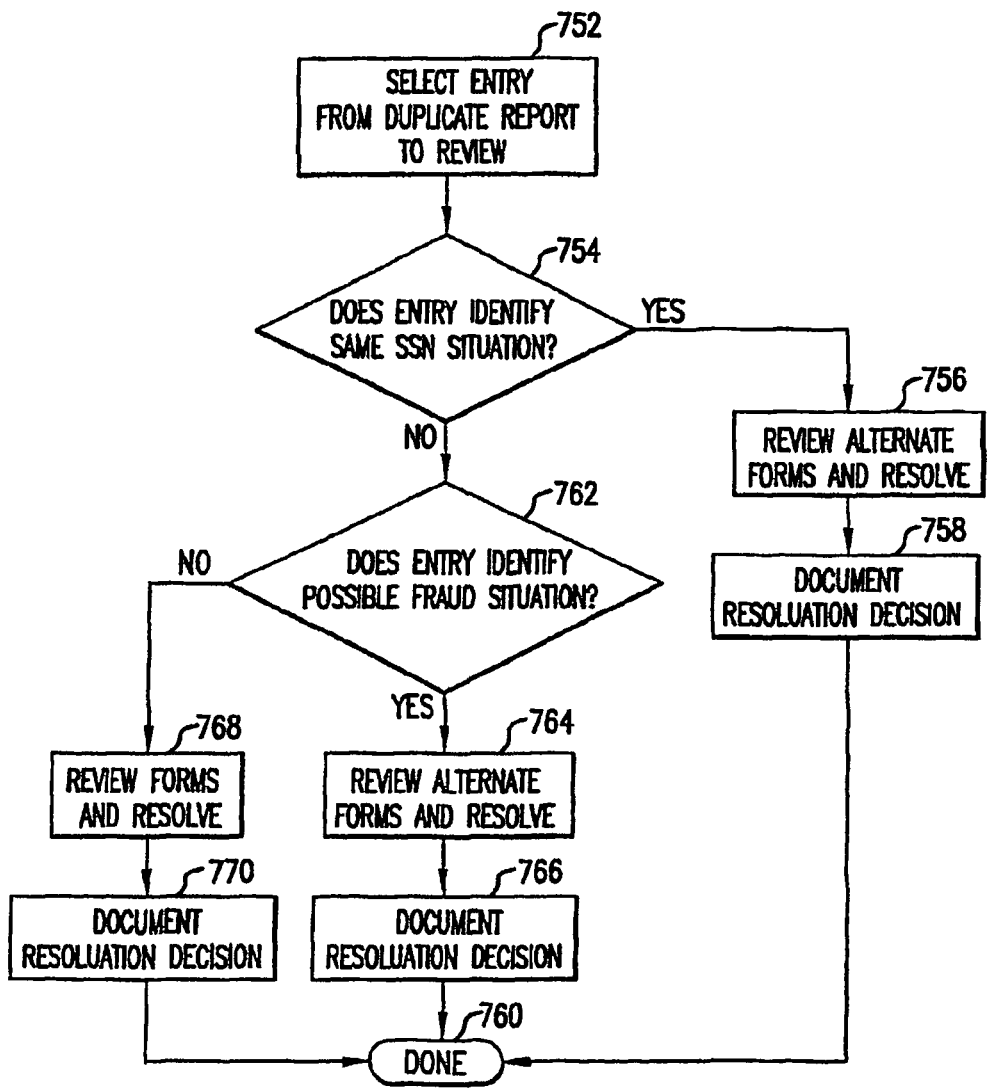
FIG. 7a shows a flowchart of an exemplary embodiment for possible duplicate document review.

Referring to FIG. 7a, shown is a flowchart of an exemplary algorithm for duplicate detection review in one embodiment.

In one embodiment, system administrators or other authorized personnel, must review all possible duplicate detections prior to the qualification and eligibility phases. A reviewer accesses the possible duplicate list to determine the possible duplicate situations to review. After selection (752) of a possible duplicate situation to review, the reviewer notes (754) the nature of the situation. If the situation is one of two or more documents identifying the same applicant social security number (SSN), the reviewer reviews the involved documents to determine which document is more completely filled out. In one embodiment, the duplicate detection/database interface module (291) makes an initial decision as to which document is more complete. In this embodiment, if the reviewer determines (756) that the duplicate detection/database interface module (291) made the right decision, documents (758) that decision and is done for that situation. Otherwise, if the reviewer determines (756) that the decision of duplicate detection/database interface module (291) was in error, the reviewer corrects the decision and documents (758) the decision and action and is done for that situation.

If the situation is determined (754) to be a situation which does not involve identical social security numbers, the reviewer notes (762) whether it is a situation of possible fraud. Possible fraud situations result from two or more documents bearing demographic and other information which appears to refer to an identical individual but which identifies different social security numbers. If the situation is one of possible fraud, the reviewer reviews (764) the involved documents and makes a determination. Possible determinations include (1) that the involved documents relate to different individuals (i.e. no fraud), (2) that the documents refer to the same individual (i.e. actual fraud), (3) that the documents refer to the same individual but that one or more social security numbers were improperly entered, and so forth. After the determination and resultant action, the reviewer documents (766) the determination and action and is thereafter done (760) for the situation.

If the reviewer determines (762) that the situation is something other than simple duplicate detection or possible fraud, the reviewer reviews (768) the situation, makes a determination, implements the determination, and documents (720) the determination and implementation. Thereafter, the reviewer is done (760) with the situation.

Figure 8:
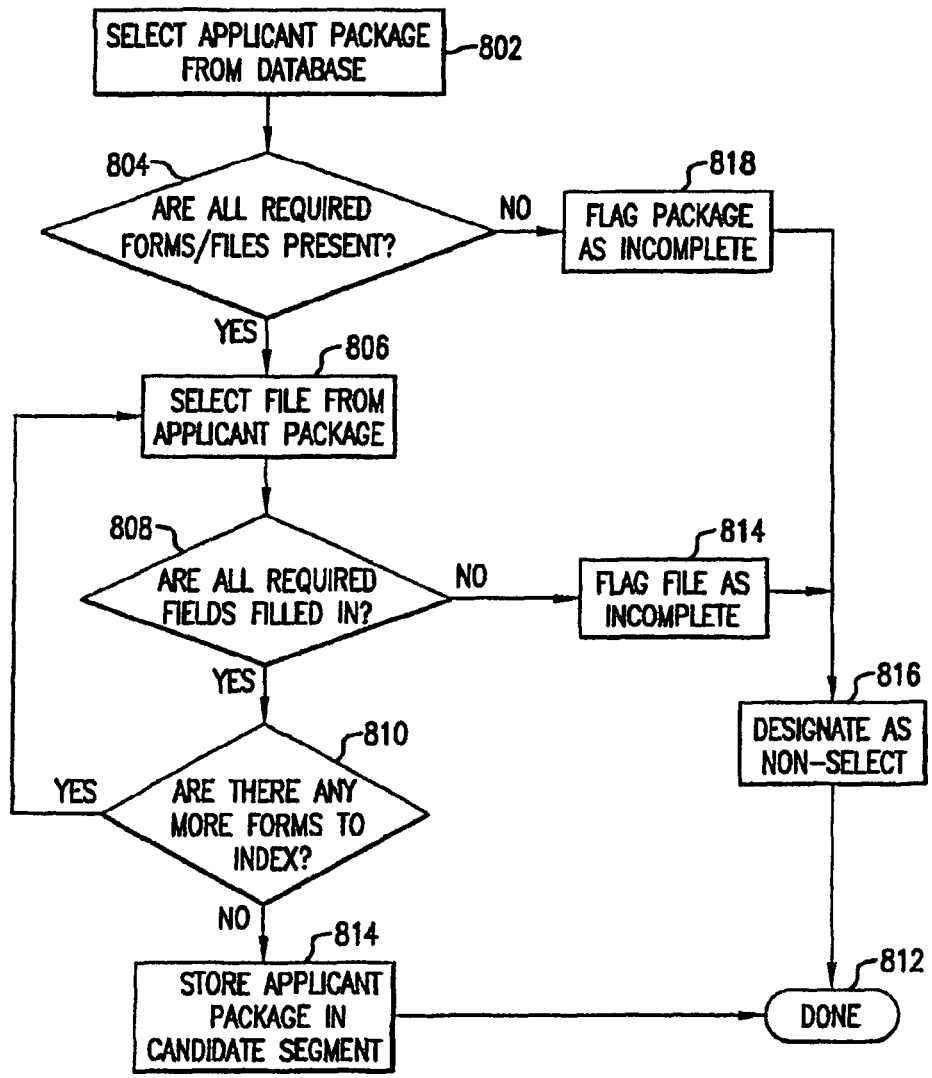
FIG. 8 shows a flowchart of steps traversed in an exemplary algorithm the grouping and level 1 filtering for candidate package completeness shown in FIG. 4.

Referring to FIG. 8, shown is a flowchart of an exemplary algorithm (800) of the steps traversed in the determination of candidate package completeness in FIG. 4.

Once the cutoff date (406) and any extended time for postal delivery has been reached, applicant packages are analyzed for completeness. In one embodiment, applicant packages are analyzed for both document completeness and each document is analyzed for data completeness. The algorithm (800) begins by selecting (8102) an applicant package for analysis. The algorithm (800) determines (804) first whether the application package has data completeness, and if so, the algorithm (800) selects a form from the package. Applicant packages, to have document completeness, must be made up of a minimum required set of document records. For example, in one embodiment, a candidate package requires an applicant form, a nominator form, and a recommender form to be complete. The algorithm (800) then determines (808) whether the form has data completeness. For an applicant package to have data completeness, each document or record in the applicant package must meet a minimum data completeness standard (such as all required fields having non-null entries or all required data present). Note that because each document in an applicant package is different, each may have different minimum data completeness requirements. If the record selected does have data completeness, the algorithm (800) determines (810) whether any more records in the applicant package need to be checked for data completeness, and if so, the algorithm (800) selects (806) another record and continues as described previously. If there are no further records to be analyzed (810), the algorithm (800) is done for this package as indicated by the done indicator (812).

If a record is determined (808) not to have data completeness, it is flagged (814) as incomplete and the applicant package is marked (816) to be in the non-select segment (110). Thereafter, the algorithm (800) is done for this package as indicated by the done indicator (812).

If the applicant package is determined (804) to be lacking in one or more records, the applicant package is flagged (818) as incomplete and designated (816) as a non-select by being marked as in the non-select segment (110) and being listed in the non-select list. Thereafter, the algorithm (800) is done for this package as indicated by the done indicator (812).

Figure 9:
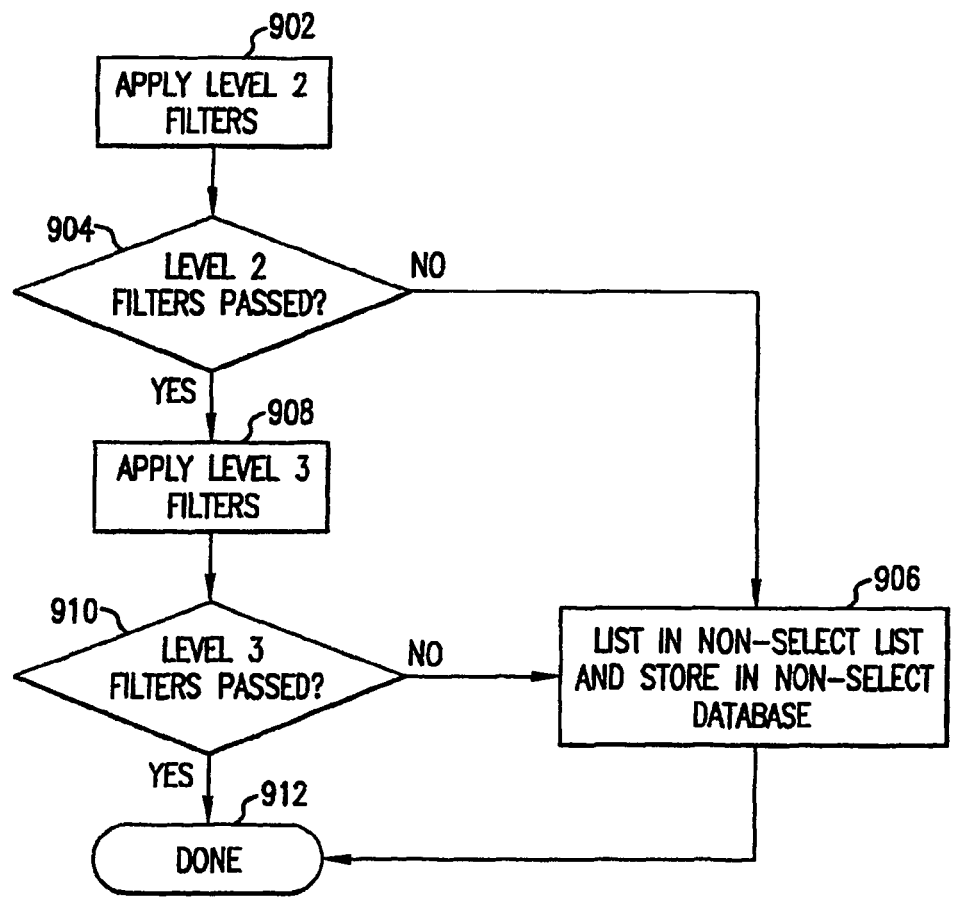
FIG. 9 shows a flowchart of steps traversed in an exemplary algorithm in the operation of the level 2-3 filtering of electronic documents shown in FIG. 4.

Referring to FIG. 9, shown is a flowchart of an exemplary algorithm (900) of the steps traversed in the level 2-3 filtering of candidate packages shown in FIG. 4.

After the candidate packages have passed the level 1 filters of data completeness and form completeness, they are filtered by one or more higher level filters. In one embodiment, a candidate package is filtered (902) by level 2 filters which ensure candidates meet certain qualifying characteristics. Further to this embodiment these qualifying characteristics include a minimum GPA score or completion of a general equivalency degree (GED) and minimum financial requirements (such as a maximum family income to be eligible for receiving an academic scholarship). The algorithm (900) then determines (904) whether the level 2 filter qualifications are met and if they are not, the candidate package is marked (906) to be on the non-select segment (112) and the candidate is listed in the non-select list.

Otherwise, if the algorithm (900) determines (904) that the level 2 filter qualifications are met, further filters can be applied to the candidate package. In one embodiment, a candidate package is filtered (908) by level 3 filters which ensure that the candidate meets certain heightened response requirements. Further to this embodiment, the level 3 filters are applied specific to the candidate's subgroup or partner group). In this embodiment, once candidates pass the level 1 and level 2 filters, they are grouped together into two or more subgroups or partner groups. In one embodiment, the grouping is done by the creation of partner lists. The grouping can be done based on any one or more pieces of data. By way of example, grouping could be done in an academic scholarship setting by looking to such variables as the candidates' geographical location, ethnic culture, poverty level, mother tongue, and so on. The level 3 filters are then be applied by subgroup/partner group and ensure minimum qualifications designed in light of the specific characteristics of the particular subgroup.

In one embodiment, group or partner administrators are able to apply the level 3 filter; more than one time in order to reduce the candidate pool for that candidate group or partner group to predetermined levels selected as optimum prior to going into the read or evaluation process. Criteria applied during level 3 filtering includes, in one embodiment, a minimum number of academic awards, a minimum number of public awards, a minimum number of honors, a minimum number of leadership roles, a minimum number of student excel bubbles completed, a minimum class rigor average, a minimum amount of community service, a maximum amount of personal circumstance exceptions, and a minimum number of paid hours of employment.

In another embodiment, the level 3 filters, in order to effectively reduce the pool of candidates to a desirable number, are predetermined. In this embodiment, prior to the start of the competition process, a predetermined set of discretionary criteria and an ordering of their application is determined. Additionally, a desired pool size or a target range within which the pool must number is selected. Thereafter, in the actual filtering process, the discretionary criteria is applied in increments and the number of applicants remaining in the pool is ascertained after each increment, with the filtering stopping when the target pool size is reached. By way of example, the first 10 discretionary criteria in one embodiment are, in a competition for employment at a law firm, a law degree from a $2^{nd}$ tier school or higher, a grade point average of 3.2 or higher in a law degree, completion of one or more engineering degrees, a grade point average of 3.2 or higher for one engineering degree, the attendance of a top 20 engineering school for one engineering degree, a law degree from a $1^{st}$ tier school, a grade point average of 3.5 or higher in a law degree, completion of two or more engineering degrees, a grade point average of 3.5 or higher in an engineering degree, and the attendance of a top 10 engineering school for one engineering degree. Thus, these criteria would be applied in order until the pool of applicants was reduced to the desired level.

In another embodiment, the level 3 filters, in order to effectively reduce the pool of candidates to a desirable number, are determined as a function of the number of applicants in the applicant pool. In this embodiment, the discretionary criteria is predetermined but instead of their application being dependent on a required outcome, their application is dependent on the initial size of the applicant pool. In this variation, the criteria itself can be dependent on the size of the pool of candidates. For example, again in a system for the selection of a law firm associate, one criteria for a pool of applicants below 50 is that the applicants must have a 3.2 grade point average or higher in a law degree and for a pool of 100 or more candidates, the criteria is a minimum of a 3.5 grade point average. Alternatively, the criteria could be that the applicants must have a law school grade point average which exceeds $4-(1/x)$ where x is the number of applicants in the pool. After either of the block (910) or the block (906), the algorithm (900) is finished as shown by done indicator (912).

If the candidate package passes (910) the level 3 filters, the candidate package has passed the filtering phase of the competition as shown by the done indicator (912). If the candidate package does not pass (910) the level 3 filtering, it is stored (906) in the non-select database (112) and the candidate is listed in the non-select list.

Additional or fewer levels of filtering can be applied within the scope of the present embodiment. In one variation, an additional level 4 set of filters is applied which ensure that the candidate has responded to a minimum number of essay questions in his or her applicant form. The system applies the level 4 filters in a manner similar to that as described for the level 2 and level 3 filters.

Figure 10:
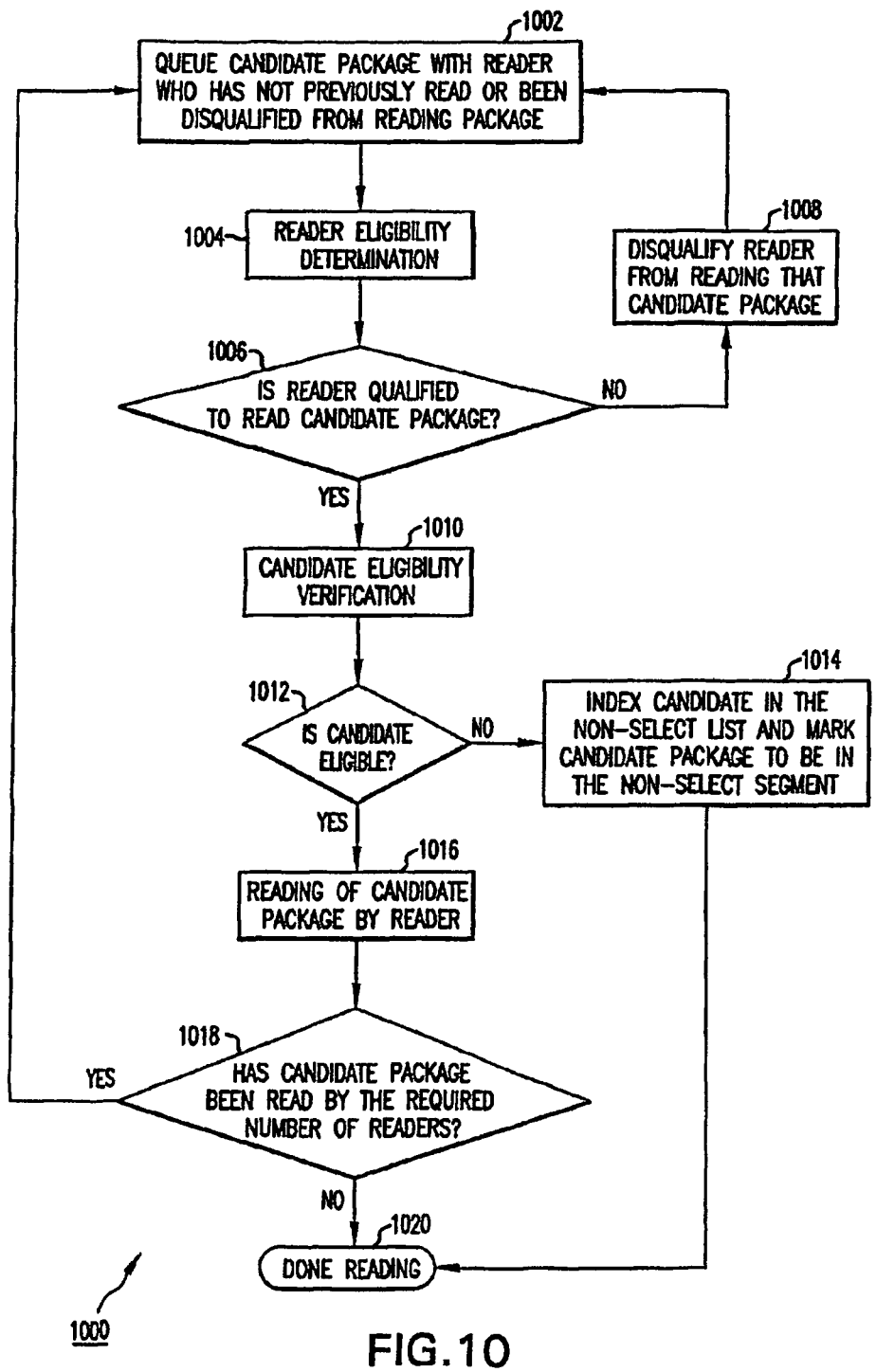
FIG. 10 slows a flowchart of steps traversed in an exemplary method in operation of the reading process of FIG. 4.

Referring to FIG. 10, shown is a flowchart of an exemplary algorithm (1000) of the steps traversed in operation of the reading process in FIG. 4.

The system begins by queuing (1002) a applicant package with an evaluator (also referred to as a reader) who has not previously evaluated that applicant package or been disqualified from evaluating or reading that applicant package. The evaluator then begins by responding (1004) to a set of reader qualification questions which document whether the evaluator has any connections or conflicts with the applicant which would raise questions of bias. By way of example, in one embodiment, reader qualification questions include whether the evaluator served as nominator or recommender for the applicant and whether the evaluator ha any connection with the applicant such as having attended the same high school or college as the applicant or that the evaluator has any personal reason not to read the applicant. In this example, a yes to any reader eligibility question disqualifies the reader from reading the applicant.

The system then checks (1006) whether the reader is qualified to read the applicant, an d if not, the reader is disqualified (1008) from reading the applicant and the system again queues (1002) the applicant package with another available reader.

After verification (1006) of reader eligibility to evaluate or read the applicant package, the evaluator verifies (1010) whether the applicant is eligible based on the requirements of the competition system. To facilitate this, the system presents the necessary information extracted from the applicant package on the reader's display along with a statement of applicant eligibility requirements. The system then determines (1012) from the reader's verification whether the applicant is eligible and if the applicant is not eligible, the system marks the applicant package to be in the non-select segment (112) and indexes the applicant in the non-select list.

If the applicant is determined (1012) to be ineligible for reading, the algorithm (1000) marks (11014) the applicant package to be in the non-select segment (112) and lists (1014) the applicant in the non-select list. In this case, the algorithm (1000) is thereafter finished as shown by the done indicator (1020).

Figure 21:
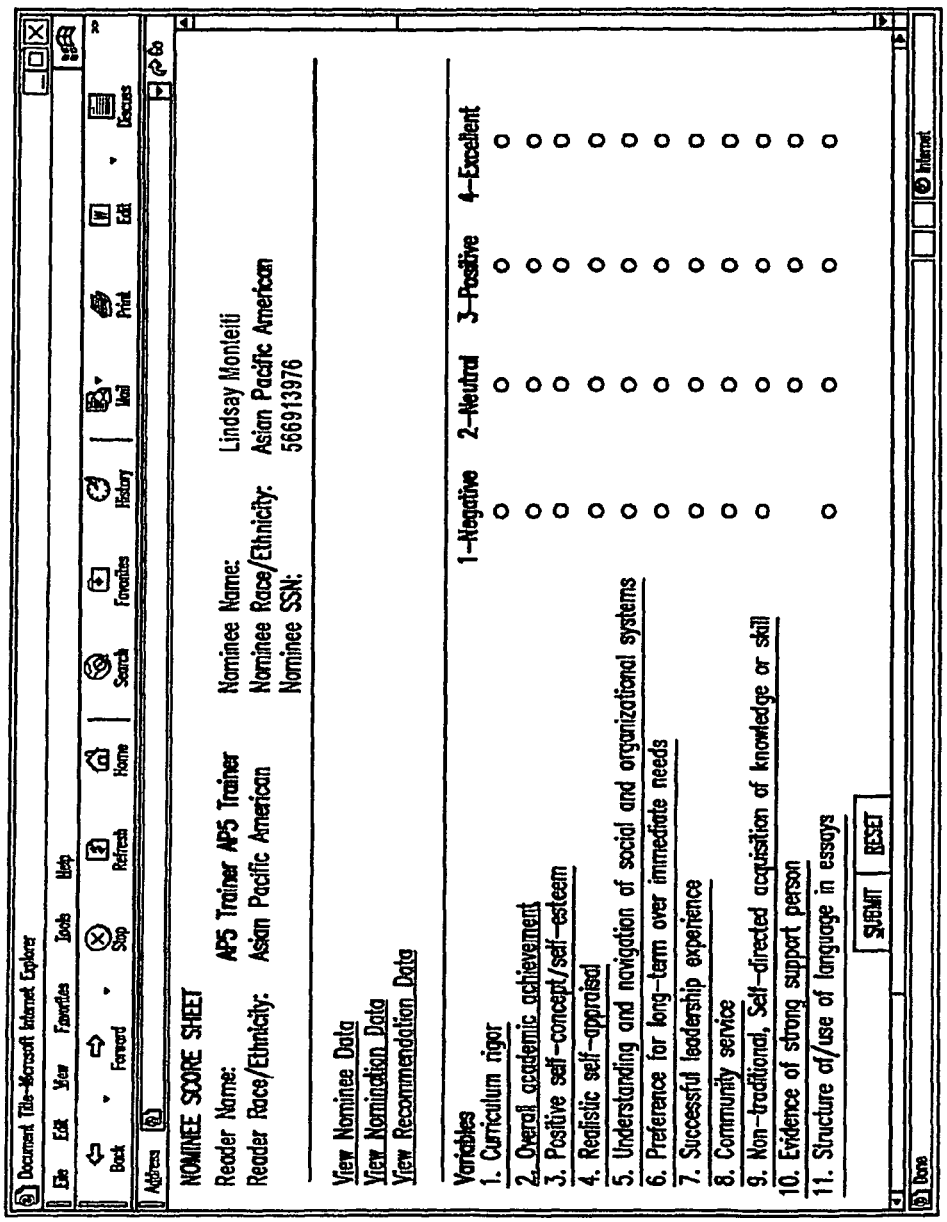

If the applicant is (1012) eligible, the reader then reads (1016) the applicant package. Reading is facilitated by the side-by-side display of the read variable scoring area and an information display. FIGS. 20-21 show views of an exemplary display for reading. In the information display, the system can display applicant data segments which are sections of data extracted from one or more forms in the applicant package or the system can display complete forms. The system also blocks information which is of a personal nature such as the applicant's social security number (SSN), email address, mailing address, alien registration number, date of alien registration number issuance, and family information such as gross annual income, family size, and number of family members currently in college. When the reader clicks or selects a variable, the system will pull up the relevant data segments or applicant package forms and displays them in the information area for use by the reader.

The read variables are determined by the administrators of the competition system and the scores achieved by applicants on the read variables are what determines whether they are ultimately successful in the competition. By way of example, the read variables for one embodiment in the academic scholarship arena include the non-cognitive variables 1) positive self-concept, 2) realistic self-appraisal, 3) understanding/ navigation of a social system, 4) preference of long-term goals over short-term goals, 5) availability of a strong support person, 6) leadership experience, community service, 7) interest/knowledge in a non-school field, 8) community service, as well as the cognitive-related variables 9) curriculum rigor, 10) academic achievement, 11) essay response.

In one embodiment, the scoring during evaluation is by a numerical scale as follows: 1 indicates a negative score, 2 indicates a neutral score, 3 indicates a positive score, and 4 indicates an excellent score. In some variable cases, less than the total number of scores will be available. By way of example, in the case of the non-cognitive variable presence of a strong support person, only the two scores of 2 or 3 are allowed.

After the reader has completed and submitted the reading of the applicant package, the system determines (1018) whether the applicant package has been read by the required number of different readers. Use of multiple readings has many benefits including, but not limited to, ensuring greater fairness and providing compensation for the event of one reader providing a randomly "unfair", inequitable, or inaccurate read which is not detected by the system. In one embodiment, two independent reads are required but more reads can be used within the scope of the invention. If the required number of readers has not read the applicant package, the system queues (1002) the applicant package with another available reader and continues as before. Otherwise, the reading phase for the applicant package is complete as shown by the done indicator (1020).

Figure 11:
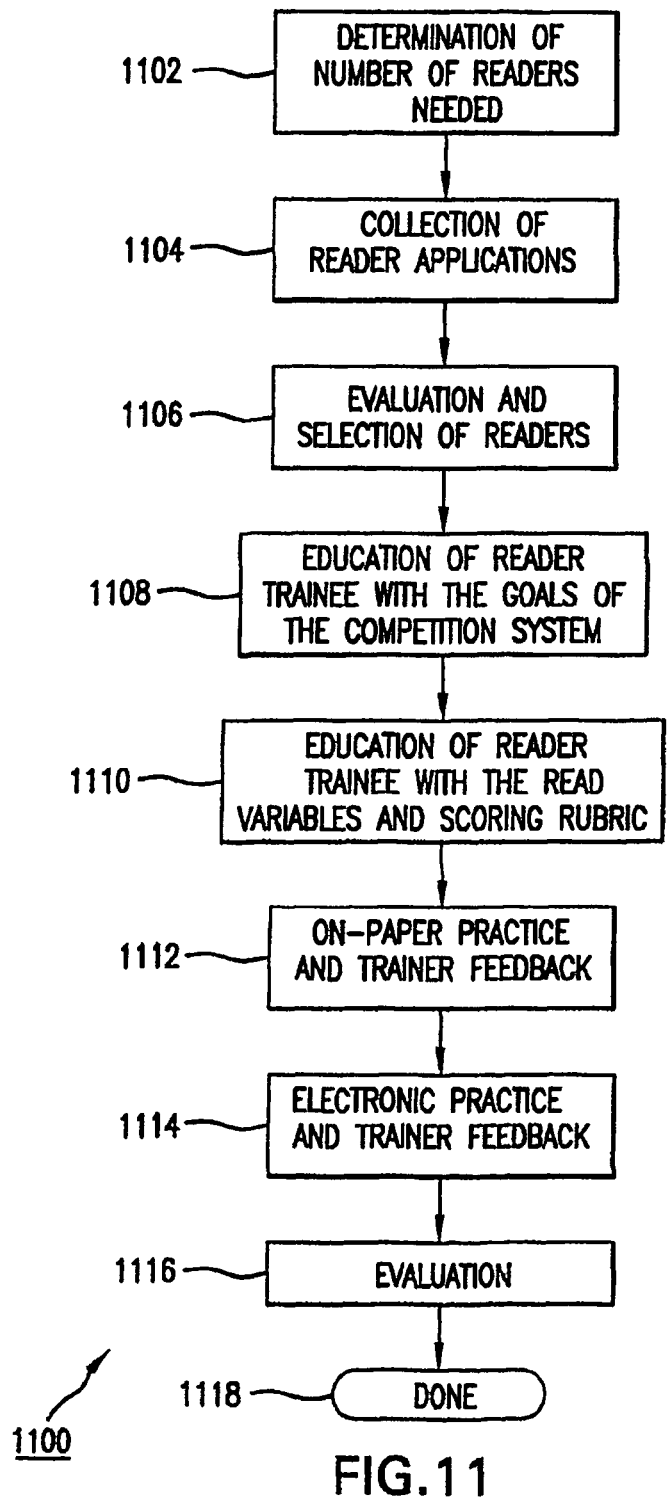
FIG. 11 slows a flowchart of steps traversed in an exemplary method in operation of the selection and training of readers to participate in the process of FIG. 8.

Referring to FIG. 11, shown is a flowchart of the steps traversed in the operation of reader selection and training for participation in the algorithm (1000) of FIG. 10.

First, the number of readers is determined (1102). In one embodiment, this is done manually by the system administrator based on the number of candidates anticipated and either (a) the number of reads per reader desired or (b) the length of the reading phase considered in conjunction with the average number of reads per reader per day. Once the number of desired readers is determined, reader applications, are collected (1104) and evaluated (1106). In one embodiment, readers are filtered to meet minimum criteria related to the nature of the competition to be conducted. By way of example, for a competition system for military officer selection, readers would likely be required to have minimum qualifications which include military experience or familiarity, officer selection experience, and so forth. The administrators of the system then select (1106) the readers.

The readers are then trained (1108) with the goals and procedure of the competition system. Following the initial orientation, the readers are trained (1110) about the read variables and the scoring rubric. In training the readers on the scoring process, the readers are first trained (1112) by paper and pencil scoring exercises which facilitates a personal review procedure whereby trainers may personally discuss the scoring rubric with the reader trainee. Once the readers have demonstrated a basic competence during the paper exercises, the readers are then trained (1114) by computer-based exercises which substantially mimic the actual reading displays and use actual prior candidate packages (without personal identifying information). As with the paper exercises, reader trainers are available to reinforce the scoring rubric by discussions of the methodology and balancing of factors which go into scoring the read variables. In closing the electronic reading exercises, an valuation is conducted (1116) to ensure that the readers are reading at the level mandated by the competition system requirements. After the readers pass the evaluation, the reader training phase is finished as shown by the done indicator (1118).

Figure 12A:
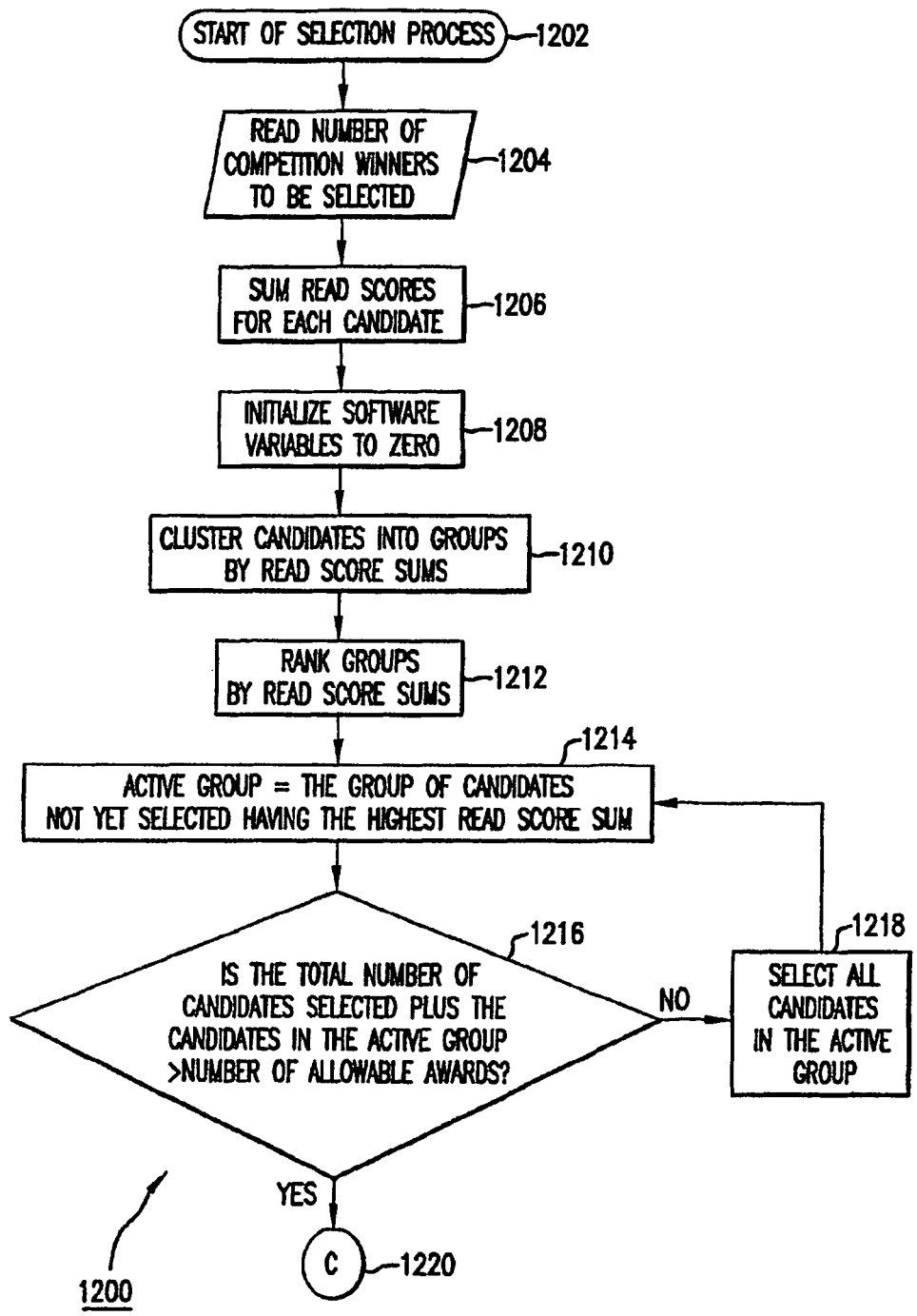
FIGS. 12a-12b show a flowchart of steps traversed in an exemplary algorithm in operation of finalist selection of FIG. 4.
Figure 12B:
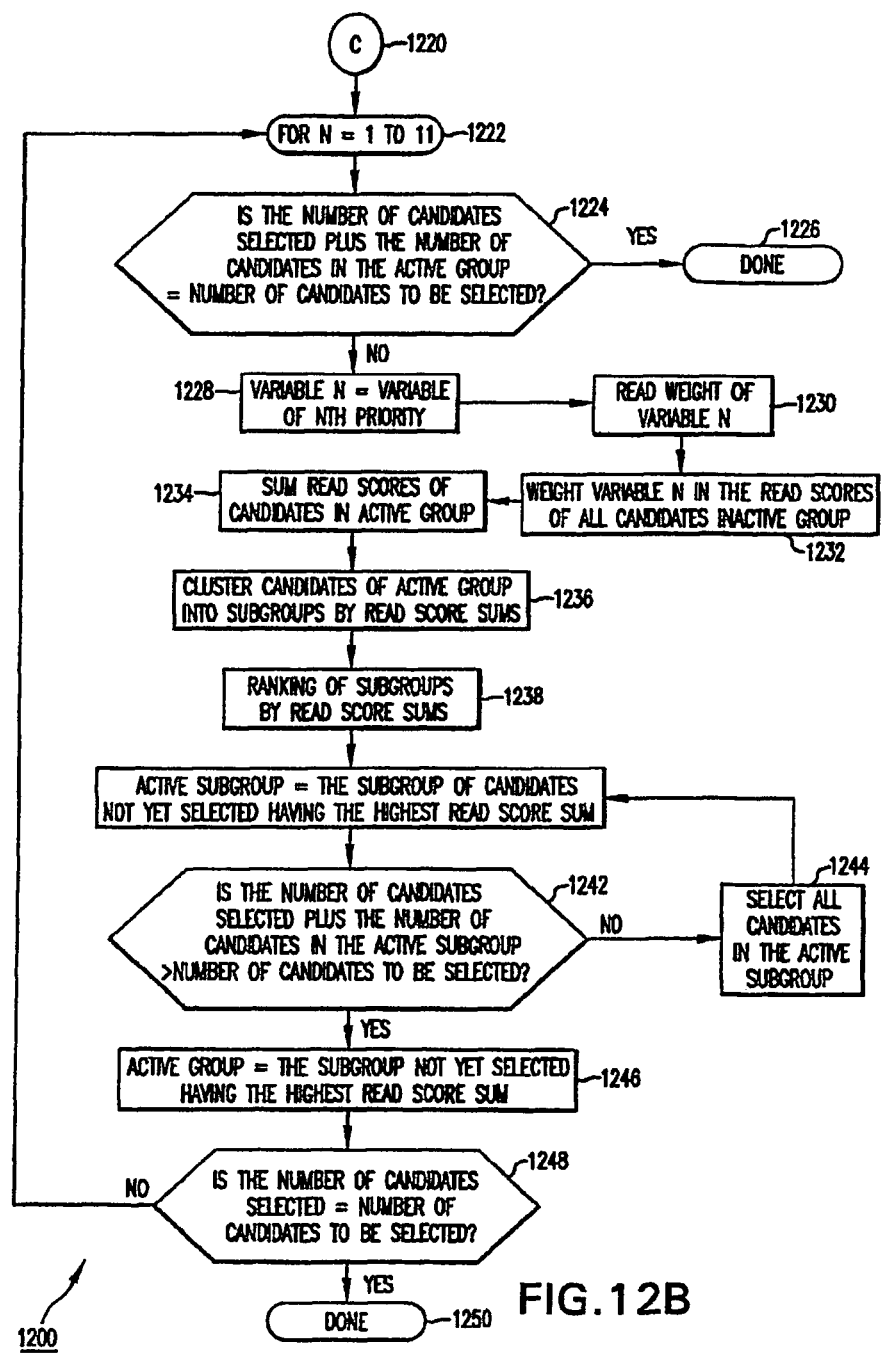

Referring to FIGS. 12a-12b, shown is a flowchart of an exemplary algorithm (100) of the steps traversed in operation of finalist selection in FIG. 4.

Referring to FIG. 12a, shown is part ½ of the algorithm (1200). Finalist selection occurs (1202) after the reading is finished. The number of competition winners to be chosen is read (1204) (or alternatively input by a system operator) and the read variable scores for each candidate are summed (1206) to produce read variable sums. By way of example, in one embodiment, 11 read variables are scored each scored by two evaluators. Thus, for each candidate, there are 22 total read variable scores which are then summed together to provide the read variable sum for that candidate. After summing the read scores, software variables to be used in later processing are initialized (1208). The candidates are then grouped (1210) by read variable sums. By way of example, if 25 candidates out of a pool of 400 candidates achieve a read variable sum of 80, then these 25 candidates form one group and the other 375 candidates form one or more other groups as dictated by their read variable sums.

Once the candidates are clustered into groups by read variable sums, the groups are ranked (1212) from highest read score sum to next lowest read score sum and so on until all groups are ranked. At this point, the actual selection process begins by first selecting (1214) the highest ranking group as the active group. Next, the algorithm (1200) determines (1216) whether the total number of candidates already selected (zero at this point) plus the number of candidates in the active group exceeds the total number of competition winners to be selected. If the total number of candidates already selected (again, zero at this point) plus the number of candidates in the active group is less than the total number of competition winners to be selected, all candidates in the active group are selected (1218). Selection entails the candidates being designated as finalists by a entry being made in the finalist list and their candidate packages being flagged as a finalist. The algorithm (1200) then returns to block (1214) and selects (1214) the next highest ranking group as the active group and continues as described before except that now, the variable describing the total number of candidates already selected is no longer zero. The loop consisting of the steps described, (1214) to (1218) inclusive, continues until the first occurrence where the total number of candidates already selected plus the number of candidates in the active group is determined to exceed (1216) the total number of competition winners to be selected. At this point, the algorithm (1200) leaves the loop, steps (1214) to (1218), and continues (via the connector "C" (1220)) to the second level or phase 2 of selection which begins at the step (1222) shown in FIG. 12b.

Referring to FIG. 12b, shown is part 2/2 of the algorithm (1200). This part of the algorithm (1200) is an exemplary embodiment for tie-breaking. Tie-breaking refers to the method of selecting a subset of an active group of candidates in order to end up with the same number of selected candidates (i.e. finalists) as the total number of competition winners to be selected.

The embodiment shown in FIG. 12b uses 11 read variables during the tie-breaking process. However, part 2/2 of the algorithm (1200) as shown in FIG. 12b can be used with any number of read variables. The block (1222) is a loop control which limits the number of iterations to a maximum equal to the number of read variables available (11 read variables in the shown embodiment). First, the algorithm (1200) determines (1224) whether the number of selected candidates (finalists) exactly equals the total number of competition winners to be selected, and if it does, the selection process is finished as indicated by done indicator (1226). Otherwise, the algorithm (1200) selects (1228) the highest priority read variable which was not already selected and reads (1230) the weight to be applied to that read variable.

Read variable priority is a ranking or scaling of the various read variables for use during tie-breaking. The read variable priorities are, in an embodiment and for reasons of fairness, determined prior to the reading process. In one embodiment, read variable priorities are determined by partner group and not globally over the entire pool of candidates. In this embodiment, the partner groups are free to determine the read variable priorities in ways which makes the most sense relative to the characteristics of the candidates of that partner group. The read variable having the highest priority will be used first in any tie-breaking which needs to be done. Then, if the total number of selected candidates is not yet reached, the next highest variable is used and so on until the total number of allotted awards are matched to selected candidates.

Once the highest priority read variable is determined, it is weighted (1232) by a pr determined amount. Further to the last embodiment, the predetermined amount, like the priority ordering of the read variables, is determined before the reading process. Weighting refers to multiplying the selected read variable by the predetermined weight for each candidate in the active group. By way of example, for a competition system applying two reads over 11 variables for each candidate, there are two read variables for each candidate which are weighted and the predetermined weight to be applied during first round tie-breaking is 2. After weighting the read variables, a new read variable sum is computed (1234). Next, the candidates (of only the active group) are first clustered (1236) into subgroups or cells such that (a) each subgroup has candidates all having the same new read variable sum (which incorporates the weighted variables) and (b) all candidates having the same new read variable sum are in the same subgroup. Next, the subgroups are ranked (1238) by from highest weighted read variable sum progressively down to the lowest weighted read variable sum.

Or the first pass through the tie-breaking loop (block (1222) to block (1248) inclusive), only one read variable weight is applied. On each successive iteration through the tie-breaking loop another read variable is weighted. Read score sums in a given iteration through the tie-breaking loop incorporate the weighted read scores of all previous iterations (e.g. once a read variable is weighted, the weighted variable is used for the rest of the tie-breaking rather than reverting to the original non-weighted score).

The tie-breaking selection process now continues similarly to the selection process as described in reference to FIG. 12*a*. The highest subgroup is designated (1240) as the active subgroup. Next, the algorithm (1200) determines (1242) whether the total number of selected candidates plus the candidates in the active subgroup exceeds the total number of competition winners to be selected. If not, the candidates in the active subgroup are selected (1244) and the algorithm (1200) continues back and selects (1240) the next highest ranked subgroup as the active subgroup and continues as before. The act of selecting of a candidate means that the candidate has been converted to finalist status. At this point, all that is done is that the candidate is indexed into a selected list. The loop consisting of block (1240) to block (1244) is iterated until the total number of selected candidates plus the candidates in the active subgroup is determined to exceed (1242) the total number of competition winners to be selected. When this occurs, the highest ranking subgroup having candidates who have not been selected is designated (1246) the active group. Next, the algorithm (1200) checks (1248) whether the total number of competition winners to be selected equals the number of selected candidates and if it has, algorithm (1200) has finished the selection process (as shown by block 950). Otherwise, the algorithm (1200) continues back and determines (1122) the next highest priority read variable and continues as before.

Generally, this embodiment of tie-breaking is very effective in narrowing out of a group of candidates the necessary subgroup to fill out the total number of candidates to be selected. The only complication is when two or more candidates receive exactly the same score on each read variable and also just happen to fall within the read score hierarchy such that only a subset of them can be chosen to fill out the allotment of awards. In this case, successive weighting and ranking will not be able to differentiate between them so as to fill out the award allotments. This situation can be handled by having backup variables which normally are not used for scoring and ranking which can be used. These backup variables could also be scored by the readers, or alternatively, they could be taken from candidate information such as GPA, normalized GPA, etc.

One all of the finalists have been selected, the system implements the actual conversion of the candidates to finalists by designating all candidates as a finalists in the their respective candidate packages, adding the candidates to the finalist list, and deleting the candidates from the nominee list.

It is noted that in one embodiment, candidate finalists are subject to confirmation and if confirmed, are required to accept prior to being confirmed as a competition winner. In this embodiment, some candidate finalists will not be confirmed and others who are confirmed may not accept. Thus, in order for the predetermined number of competition winners to be met, the system must select new competition finalists for each competition finalist who is ultimately not confirmed or who does not accept even when confirmed. In one embodiment, the system selects additional finalists by continuing from where the phase 1 and phase 2 selection systems left off. The selection of additional finalists can be done periodically, such as once a week, or can be done more frequently such as once a day or even each time notification of non-acceptance or non-confirmance is received.

Referring to FIGS. 12*c*-12*e*, shown is an example of an application of tie-breaking. Ref erring to FIG. 12*c*, shown is an example of the priority ordering of evaluation variables for two partner groups in one embodiment.

As an example of tie-breaking, one embodiment concerns the selection of individuals for employment. In this embodiment, the variables over which the candidate packages are evaluated are curriculum rigor, overall academic achievement, positive self-esteem, realistic self appraisal, understanding and navigation of social and organizational systems, preference for long-term goals over immediate gratification, leadership experience, community service, self-motivated acquisition of knowledge or skills, persuasiveness, language structure and expression ability. These variables are chosen to maximize the predictive ability of the competition system and it is noted that in competitions employed for other purposes or with different goals, these variables may be chosen to differently.

In this embodiment, applicants are divided into partner groups which include partner groups for engineering and business management. Within the partner group for engineering the evaluation variables are ordered for priority as: overall academic achievement, curriculum rigor, language structure and expression ability, preference for long-term goals over immediate gratification, self-motivated acquisition of knowledge or skills, understanding and navigation of social and organizational systems, leadership experience, persuasiveness, positive self-esteem, realistic self appraisal, and community service. In comparison, within the partner group for business management the evaluation variables are ordered for priority as: understanding and navigation of social and organizational systems, leadership experience, positive self-esteem, language structure and expression ability, persuasiveness, preference for long-term goals over immediate gratification, self-motivated acquisition of knowledge or skills, overall academic achievement, curriculum rigor, realistic self appraisal, and community service. It is noted these orderings per partner group reflect the goals of the particular competition and would likely be chosen differently for different competition objectives.

Referring to FIG. 12*d*, shown are an example of the evaluation results for two candidates in an embodiment.

As an example, two candidates are in competition for an engineering position. As part of the qualification and eligibility process, each was determined to have the necessary engineering degrees and so on. During the reading process, candidate # 1 received for reader #1: 4, 4, 2, 3, 3, 2, 4, 2, 3 and, for reader #2: 3, 4, 2, 2, 4, 2, 3, 4, 4, 3, 2. Candidate #2 received for reader #1: 4, 4, 3, 3, 3, 2, 4, 4, 3, 2, 2 and for reader #2: 2, 4, 4, 4, 3, 2, 4, 2, 2, 3, 2.

Referring to FIG. 12*e*, shown is an example of tie-breaking between the two candidates of FIG. 12*d* according to the evaluation variable priorities of FIG. 12*c*.

Thus, in phase 1 of the selection process, both candidates have an overall score of 66 aid so a decision of which to choose cannot be made. In a situation where only one of these candidates is to be selected, resort is made to the phase 2 or tie-breaking selection process which uses evaluation variable priorities. For the engineering partner group, the first priority variable is overall academic achievement (the second variable in the global listing of variables). In the example, both candidates have the values of 4, 4 in their two readings. If the weighting is 2, for example, these scores become 8 and 8 for both candidates and their overall scores become 74 for both. The second priority variable for the engineering groups is curriculum rig or (the first variable in the global evaluation variable listing). Candidate #1 received scores of 3, 3 for this variable whereas candidate #2 received 4, 2. Applying, a weighting of 2 again, these scores become 6, 6 and 8, 4, respectively aid both candidates receive an overall score of 82. The third priority variable for the engineering partner group is language structure and expression ability (the last variable in the global evaluation variable order) for which candidate #1 received 3, 2 and candidate #2 received 2, 2. Thus, applying a weighting of 2 for this variable results in scores of 6, 4 and 4, 4, respectively. Thus, candidate #1 now has a total score of 87 and candidate #2 now has a score of 86 and the tie has been broken in favor of candidate #1.

Figure 13:
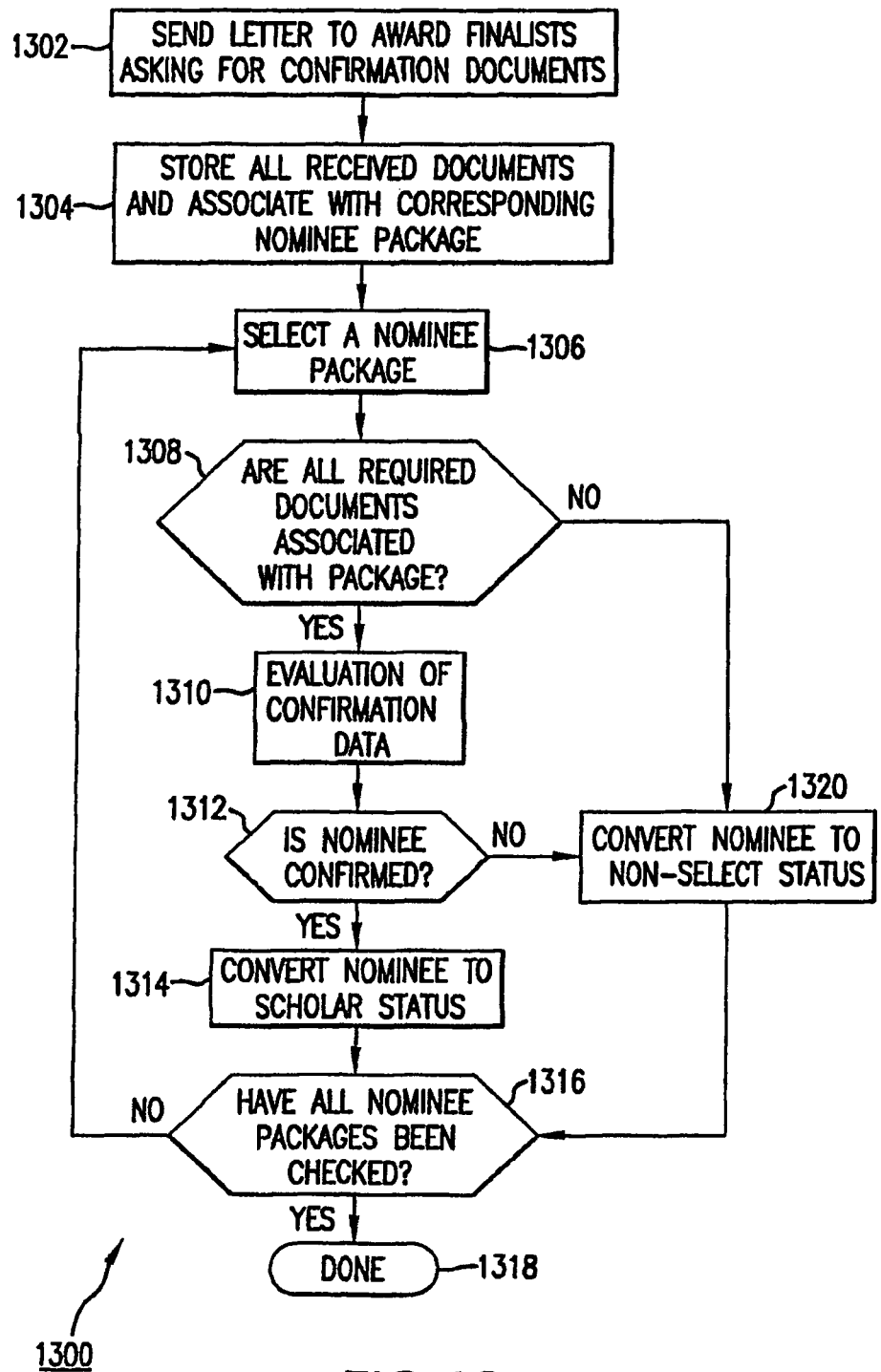
FIG. 13 shows a flowchart of steps traversed in an exemplary method in operation of competition winner confirmation of FIG. 4.

Referring to FIG. 13 shows a flowchart of an exemplary algorithm (1300) of the steps traversed in operation of competition finalist confirmation shown in FIG. 4.

competition finalist confirmation refers in part to the verification of various data presented on candidate package forms and in part to verify the eligibility of the candidate relating to any new information such as may now be available concerning the tuition needs of the candidate finalist. In one embodiment, once candidates have passed the reading and selection phases, they are transferred to a scholar tracking module. Entry into the scholar tracking module allows for individual access by administrators as various confirmation documents arrive and are incorporated into the system and also allows manual update of information and candidate status. The scholar tracking system allows for the administrator to search by social security number (SSN), partial SSN, specific surname, and generic surname. The term generic surname refers to the entry of an initial set of letters followed by a wildcard. The result of a generic surname search is a list of all names matching the query. By way of example, the query "Mus*" would result in a list containing Musam, Muse, and Musni provided those names were in the database queried.

The algorithm (1300) causes (1302) correspondence to be sent to the candidate finalists which announces their finalist status and which requests all necessary confirmation documents. In one embodiment, the required confirmation documents include a complete high school transcript (covering at least the last 3 years attended) or a general equivalency degree (GED) as appropriate, any tribal documents if the finalist is Native American (note that some Native American tribes have only one document to indicate tribal membership whereas others may have multiple documents which together indicate tribal membership), a United Negro College Fund (UNCF) Scholars information form (discussed in detail in the next paragraph), a copy of the finalist's college/university admissions letter indicating admittance, a letter/document for each scholarship (outside of this competition) which the finalist has been awarded indicating the amount of award, and any documents for each loan the finalist has indicating the amount and terms of the loan. In a variation of this embodiment, confirmation documents additionally include documents attesting to citizenship or primary residency, affidavits and documents regarding community service, documents regarding employment, documents regarding honors and awards, and affidavits and documents regarding leadership experience.

The UNCF Scholars information form is a form developed to standardize institution information disclosure relating to financial grants to students. It has been determined through actual experience that the levels of detail provided by colleges and universities in response to inquiries concerning financial grants to students can vary wildly from institution to institution. For example, some universities and colleges do not report $3^{rd}$ party scholarships in student financial reports. In response to this, a standardized form was developed which specifies what information needs to be disclosed. In one embodiment, the UNCF Scholars information form requires disclosure of all scholarships, grants, loans, and other financial assistance to the student, both from the academic institution as well as $3^{rd}$ parties. This level of detail is needed, in this embodiment, as the goal of the competition system in which it is used is to (1) complete the financial needs of competition winners by providing any required academic tuition not met by financial assistance already in place and additionally to repay in full all loans (so the student will not have that obligation later).

Once confirmation documents are received, they are incorporated into the system by the document receiving subsystem embodiments of which are similar to the procedure described in reference to FIGS. 4 and 5 except that documents are stored (1304) in the candidate database and linked immediately with the rest of the corresponding candidate package.

In the actual confirmation process, a candidate package is selected (1306). The algorithm (1300) then determines (1308) whether all required documents are present. If all the required confirmation documents are present, the candidate confirmation documents are evaluated (1310). In one embodiment, the evaluation of candidate confirmation data is done by a system administrator. The algorithm (1300) then determines (1312) whether the candidate has been confirmed, and if so, the candidate is converted (1314) to scholar status. Conversion to competition winner status includes the marking of the candidate package as being in the competition-winner segment (116) and the addition of the candidate to a competition winner list. The competition winner list is the master list of all competition winners for use by the system. From this point on, the candidate is referred to as a competition winner and his or her package is referred to as a competition winner package.

After conversion (1314) of a candidate to a competition winner, the algorithm (1300) determines (1316) whether any more candidate confirmations are outstanding, and if so, the algorithm (1300) selects (1308) another candidate package and continues as before. If the algorithm (1300) determines (1316) that no candidate packages are outstanding, the confirmation process is finished as shown by the done indicator (1316).

If the algorithm (1300) determines (1308) that one or more required confirmation documents are missing, the candidate is converted (1320) to a non-select by marking the candidate package as being non-select and listing the candidate in the non-select list. Thereafter, the algorithm (1300) determines (1316) whether any candidate packages still need to be confirmed, and continues as described previously.

If the algorithm (1300) determines (1312) that the candidate is not confirmed, the candidate is converted (1320) to a non-select as described previously and the algorithm (1300) thereafter determines (1316) whether any candidate packages still need to be confirmed, and continues as described previously.

Figure 14:
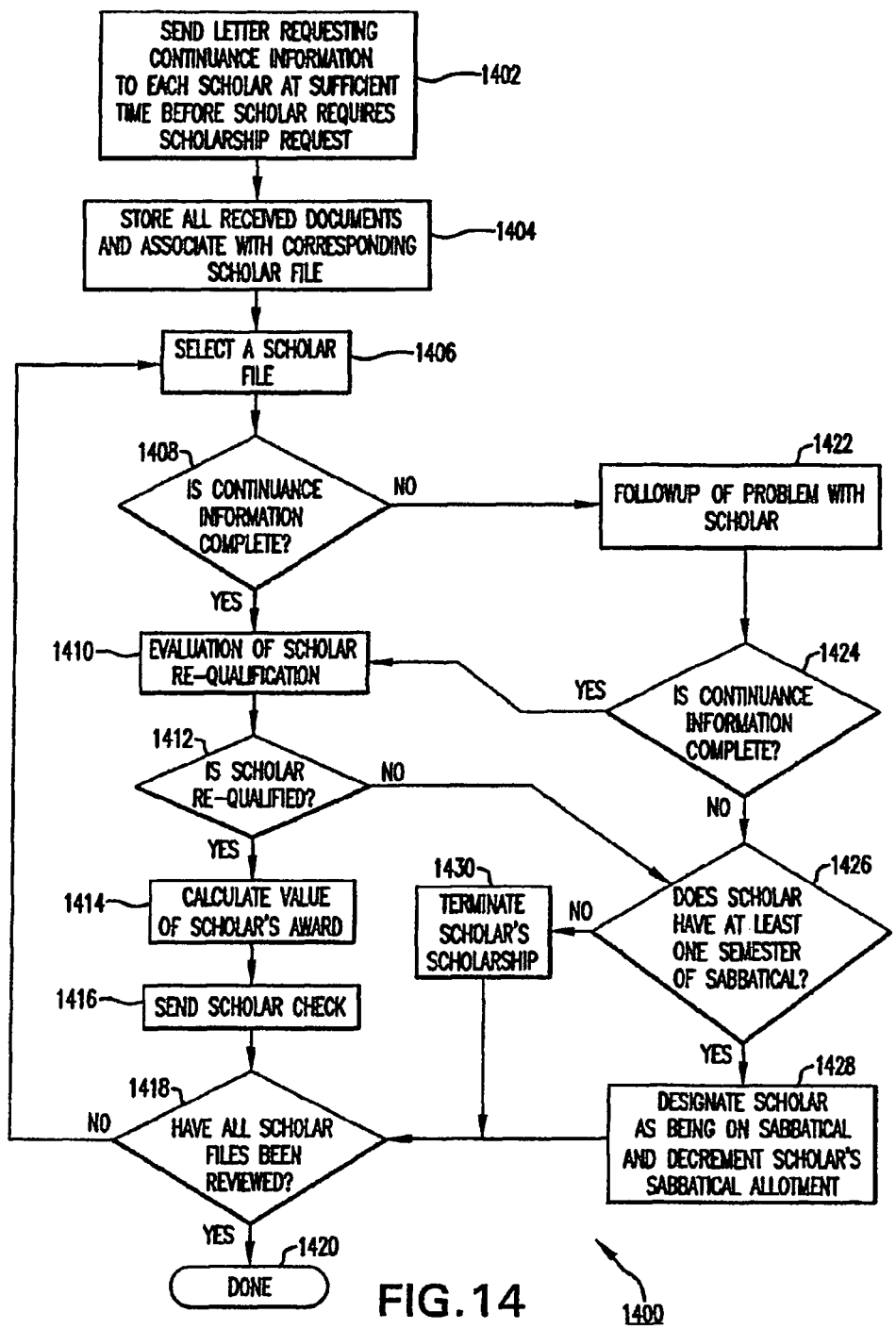
FIG. 14 shows a flowchart of steps traversed in an exemplary method in operation of con petition winner tracking of FIG. 4.

Referring to FIG. 14 shows a flowchart of an exemplary algorithm (1400) of the steps traversed in operation of competition winner tracking and payment and tracking in FIG. 3.

While the algorithm (1400) is optimized for the administration of academic scholarships, it is noted that with minor adaptations, this algorithm can monitor the continued performance of military or civil officers, employee performance, and so on.

Competition tracking refers to the monitoring of scholar progress, updating of competition winner files to add academic performance and other information, and re-qualification that the competition winner meets the requirements of the competition system. As such, the competition winner tracking system must periodically update the competition winner files. To do this, the algorithm (1400), after determining that it is time to re-qualify one or more competition winners (such as just before an academic year in an academic competition system), sends (1402) correspondence requesting any needed information. In one embodiment relating to academic scholarships, academic transcripts are requested once a year at the completion of the year of study. Further to this embodiment, prior to each further scholarship payment, the scholar is asked whether he or she wishes to continue in the scholarship.

In one embodiment, the system maintains a scholar tracking action list for scholars in order to keep track of when re-qualification is necessary. The system determines, by accessing the scholar tracking action list, when an action, such as requesting re-confirmation documents is required. In another embodiment, this information is kept separately for each scholar.

All re-qualification documents received in support of the scholar are stored (1404) into the competition-winner segment (116) and associated with the competition winner package. As with initial confirmation documents, documents requested in response to updating a competition winner's package can be received electronically or by hardcopy and are incorporated into the system by the same system and process as described in reference to FIGS. 4 and 5, with the difference that the documents are stored in the scholar database and associated with the scholar package.

Next, a first competition winner package is selected (1406). Next, the algorithm (1400) determines (1408) whether the re-qualification documents are all present and if so, the algorithm (1400) allows evaluation (1410) of the re-qualification materials to determine if the scholar re-qualifies. Both the checks if all required documents are present and the evaluation of the competition winner's re-qualification can be implemented by automation, by human reviewers, or a combination of both. In one embodiment relating to the field of academic scholarship competitions, both the checking if all required documents are present and the evaluation of the scholar's re-qualification are done by human reviewers. Further to this embodiment, the algorithm (1400) allows the human reviewers to quickly search in scholar packages for specific documents by keyword, document type, document receipt date, document originator, and so forth. Further, the algorithm (1400) allows for simultaneous display of portions of, or the complete contents of, any re-qualification materials (or indeed any form in the scholar package) with the re-qualification rubric and/or decision input form.

After evaluation (1410), the algorithm (1400) determines (1412) whether the competition winner has re-qualified and if so, the new amount of the scholarship award is calculated (1414). After the scholarship award amount has been determined (1114), a check is printed and sent (1416) to the competition winner's educational facility.

Next, the algorithm (1400) determines (1418) if all competition winners have been passed through the re-qualification process, and if so, the re-qualification process is finished (as shown by done indicator (1420). Otherwise, the algorithm (1400) selects (1406) another scholar package which has not been re-qualified and continues as described before.

If the algorithm (1400) determines (1408) that not all required re-qualification documents are present, the algorithm (1400) alerts and facilitates (1422) competition winner reviewers to follow up with the competition winner. If the re-qualification materials are competed (1424), the algorithm (1400) evaluates (1410) the scholar's re-qualification materials and continues as discussed previously. If the algorithm (1400) determines (1424) that the re-qualification materials is not complete, the algorithm (1400) determines (1426) whether the competition winner has at least one semester of sabbatical left under the terms of the scholarship. If the competition winner does have at least one semester of sabbatical left, the competition winner is designated (1428) as being on sabbatical and the competition winner's sabbatical allotment is decremented (1428) by one (1). Thereafter, the algorithm (1400) determines (1418) if all competition winner packages have been reviewed and continues as previously discussed. If the competition winner is determined (1426) to have no sabbaticals left, the competition winner's scholarship is terminated (1430) and the competition winner's package is updated (1430) to reflect this status. After terminating (1430) the scholar's scholarship, the algorithm (1400) determines (1418) whether any scholars have not been processed through the re-qualification process and continues as previously described.

If the competition winner is determined (1412) to not be re-qualified, the algorithm (1400) determines (1426) whether the competition winner has any sabbaticals left and continues as previously discussed.

Figure 14A:
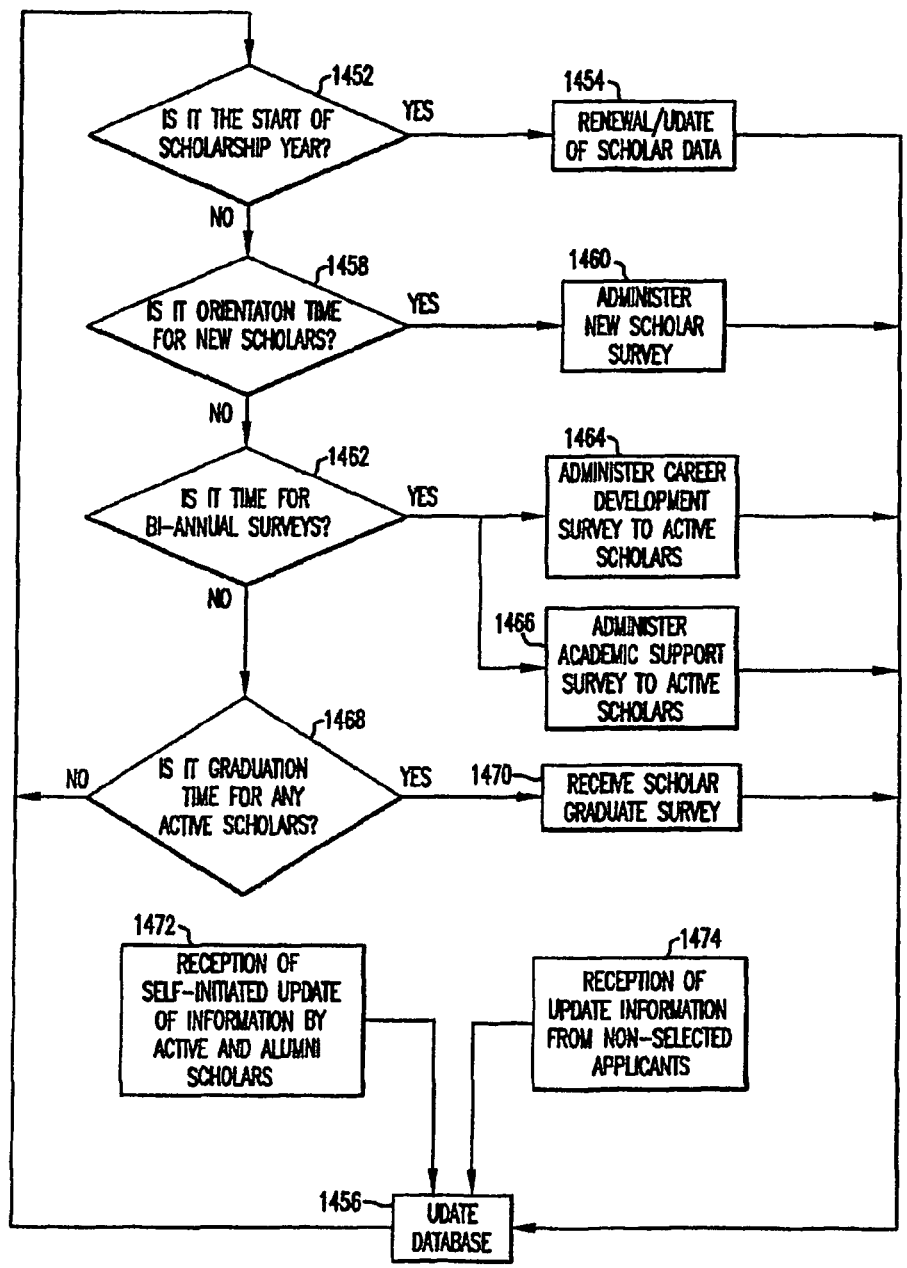
FIG. 14a shows a flowchart of the steps traversed in an exemplary method for the tracking of competition winners and non-selected applicants.

Referring to FIG. 14*a*, shown is a flowchart of the steps traversed in an exemplary method (1450) for the tracking of competition winners and non-selected applicants.

In one embodiment for the distribution of academic scholarships, the tracking and re-qualification subsystem (260) implements tracking and information accumulation on both scholars and non-selected applicants. The algorithm (1450) operates by the administration of surveys and other information retrieval activities based on the time of year. The algorithm (1450) first checks (1452) if it is the start of the academic year, and it is, the algorithm (1450) updates scholar data through request (1454) of the re-qualification materials as discussed in reference to FIG. 14. As discussed in reference to FIG. 14, once the re-qualification materials are received, they are incorporated (1456) into the system. If it is not (1452) the start of the academic year, the algorithm (1450) checks (1458) if it is the time for the orientation of new scholars and if it is, new scholar surveys are administered (1460) to the new scholars. Thereafter, this information is incorporated (1456) into the system. If it is not (1458) orientation time, the algorithm (1450) checks (1462) if it is time for the bi-annual surveys and if it is, career development surveys (1464) and academic support surveys (1466) are administered to the active scholars. If it is not (1462) time for the bi-annual active scholar surveys, the algorithm (1450) checks (1468) if it is graduation time for any active scholars and if it is, graduate surveys are administered (1470) to the graduating scholars. Thereafter, this information is incorporated (1456) into the system. If it is not (1470) a graduation time, the algorithm (1450) waits again until the first of the academic year (1452) and continues as previously described.

Additionally, information supplied by active scholars and scholar alumni may be received (1472) at any time. This can occur by mailed in material submissions, facsimile transmissions, website submissions, and so forth. As with the previously discussed survey information, this information is incorporated (1456) into the system.

Information is also received (1474) from third parties regarding non-selected applicants. This received information is very important for verifying and improving the selection rubric and criteria employed by the system. Non-selected applicant data is extracted from third parties which get this information during transactions with the non-selected applicants during situations such as, but not limited to, applications to other scholarships, credit cards, colleges or universities, etc. as well as from targeted promotions designed to elicit tracking information.

Improvement of the system rubric and evaluation criteria can be effectuated by tracking the performance of both competition winners and non-selected applicants and comparing the later performance of both types of individuals with their predicted performance as derived from the system rubric through the evaluation variables. To do this, each competition winner's tracked performance is evaluated and scored over one or more performance variables. In one embodiment, these variables include annual salary, gaps between employment periods, number of people managed, number of positive appearances on the news or on television, job satisfaction, community leadership, positive contributions to society, and so forth. Analysis is conducted of these performance variable scores in reference to the individual's original evaluation variable scores to determine the accuracy of each evaluation variable in predicting the eventual resultant performance of the individual. This analysis is conducted for all competition winners and non-selected applicants. The accuracy of predicting eventual resultant performance of each performance variable can thus be determined for each evaluation variable. Additionally, this analysis can be conducted separately for any subgroup of competition winners and for a corresponding subgroup of non-selected applicants to determine the significance of each evaluation variable in correctly differentiating individuals who went on to perform significantly from those who did not.

Figure 15:
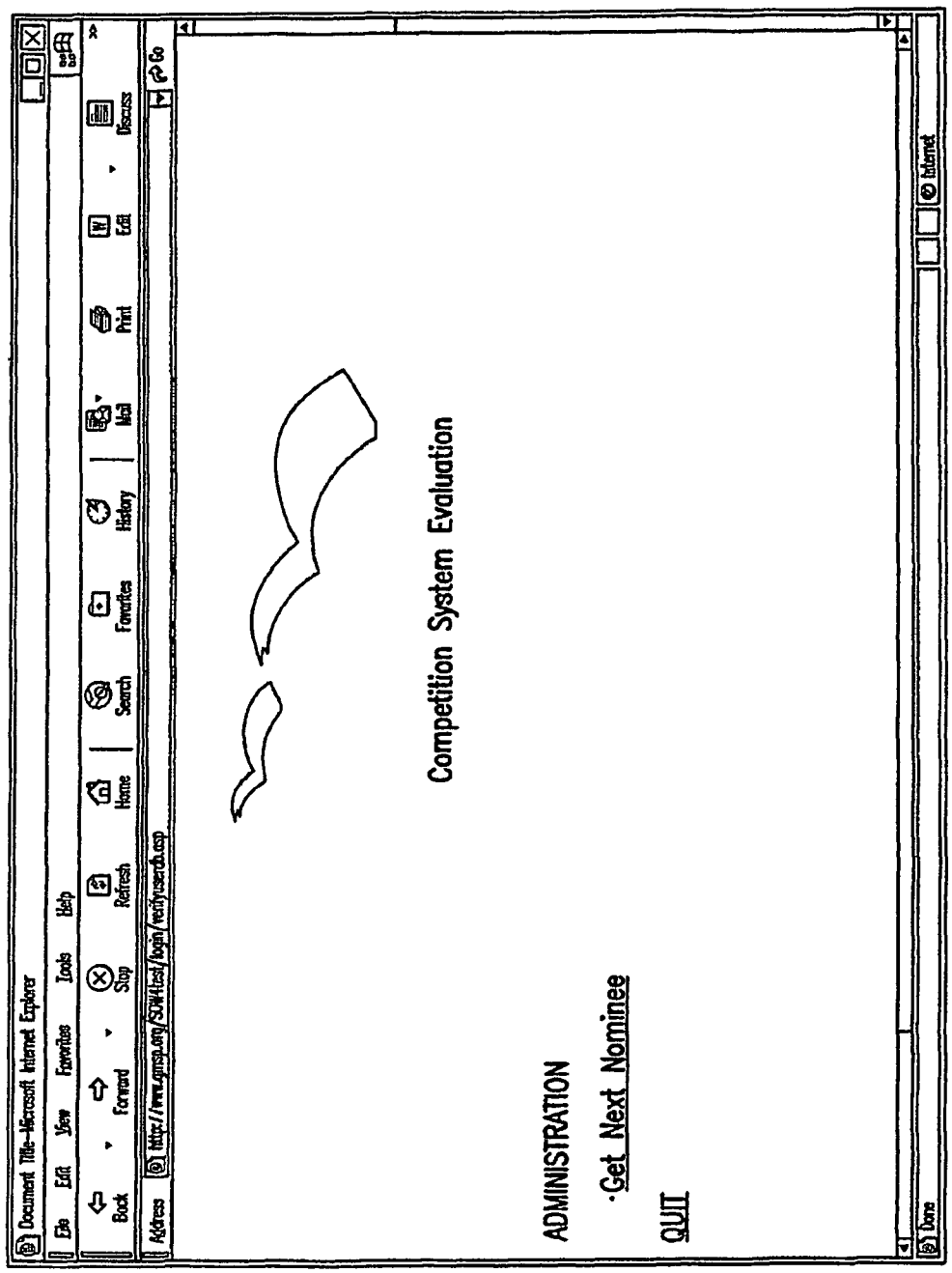
FIG. 15 shows an exemplary display presented to an evaluator.

Referring to FIG. 15, shown is an exemplary display presented to an evaluator. An evaluator is given the opportunity to either get an applicant for evaluation or to quit.

Referring to FIGS. 16-17, shown are two views of an exemplary display for use during determination of evaluator eligibility. Shown are selected information from an applicant package. In this example, shown are the candidate's gender, birthdate, dependency status, race/ethnicity, languages spoken, summary of high school attendance, general equivalency degree (GED) status, and future goals. Additionally shown is evaluator eligibility question guidelines and three evaluator eligibility questions for the evaluator to answer. Note that in other embodiments, different questions and different numbers of total questions are used. Determination of evaluator eligibility and subsequent redirection of applicant packages to another evaluator whet the evaluator is determined ineligible to evaluate the applicant package helps ensure an unbiased evaluation. Additionally, evaluator eligibility is documented in the system for later use, if needed, to counter any received allegations of impropriety.

Referring to FIGS. 18-19, shown are two views of an exemplary display for use during determination of candidate eligibility. Shown is information extracted from a candidate package and four questions regarding eligibility of the candidate package to be evaluated. In this example, the questions regarding the candidate package eligibility are whether the candidate is eligible based on high school graduation or GED completion, high school grade point average (GPA), not having attended college or university, and sufficient information for evaluation. Note that in other embodiments, different questions and different numbers of total questions are used.

Referring to FIGS. 20-21, shown are exemplary displays for use during evaluation of candidate packages. Shown in FIG. 20 is the typical split-screen display used in one embodiment. Shown are two windows or areas. One area (the data area) contains information from the nominator's form for the candidate. The other area (the control and response area) contains various controls or hyperlinks which control the information displayed in the first area. In the shown embodiment, the controls a low the evaluator to control the data area to show applicant form data, nominator form data, or recommender form data. By selecting, such as by use of a mouse, an evaluator directs the system to display information from the selected record in the data area. The control and response area also contains 11 evaluation variables requiring evaluator responses. In this embodiment, shown are the variables 1) curriculum rigor, 2) overall academic achievement, 3) positive self-concept, 4) realistic self-appraisal, 5) understanding/navigation of a social system, 6) preference of long-term goals over short-term goals, 7) leadership experience, community service, 9) self-directed acquisition of knowledge in a non-school field, 8) community service, 10) availability of a strong support person, 11) structure and use of language in essays. By selecting a particular one of the evaluation variables, the evaluator directs the data area to scroll to or extract information from the displayed record which is relevant to the selected variable. For example, as shown the data area of FIG. 20 shows information relevant to curriculum rigor. The data area shows this information whenever the evaluator indicates, by selecting the curriculum rigor variable, that the evaluator wishes to evaluate the curriculum rigor variable.

Figure 20A:
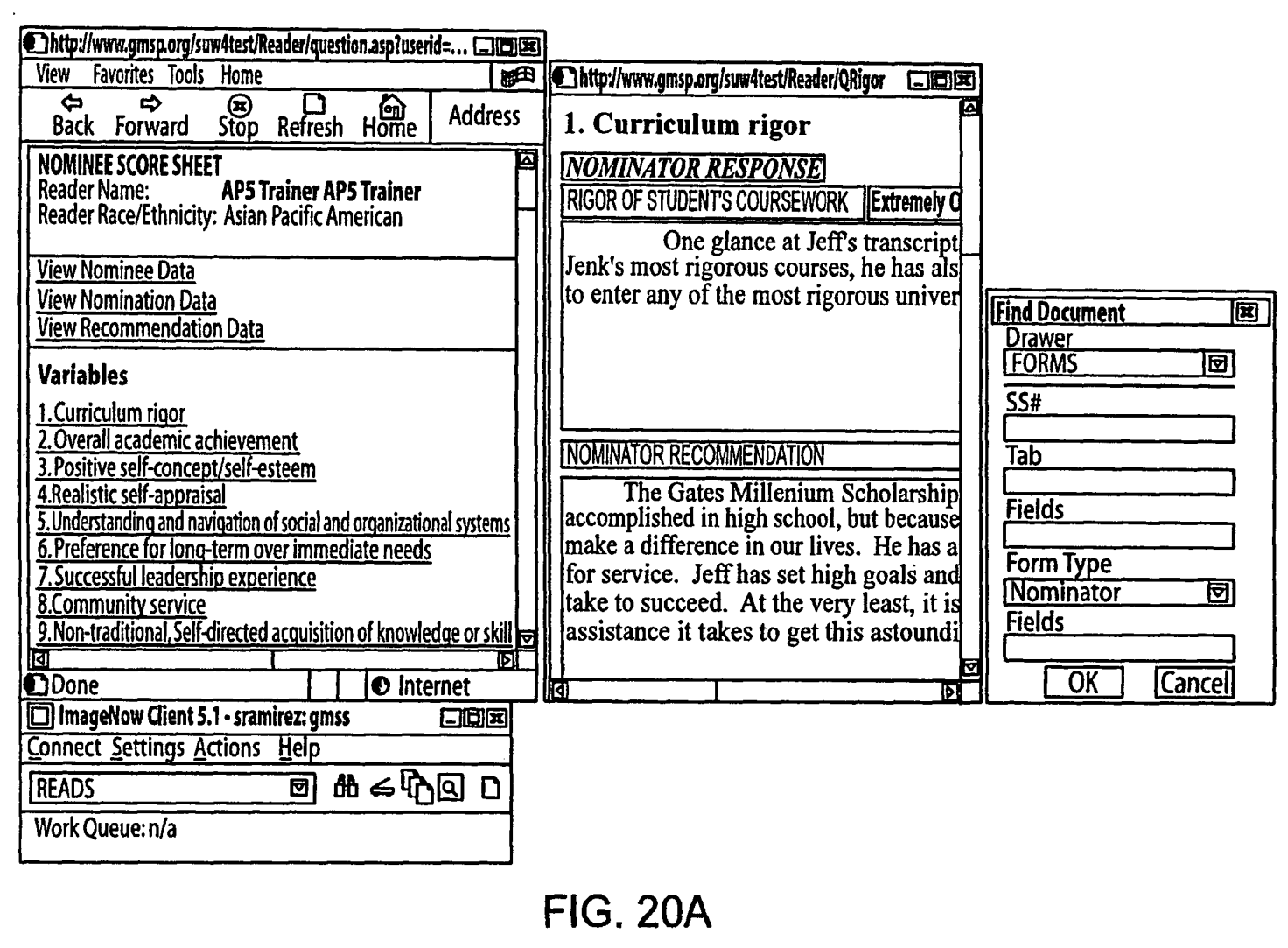

FIG. 20*a* shows the screen shot of FIG. 20 with additional control windows. The window below and to the left of the two evaluation windows as shown in FIG. 20 is a control window allowing the evaluator to access the stored image of a document from the applicant package under evaluation. This allows the evaluator to view the original document image which is displayed in the data area. This capability is also used by authorized personnel when deciding situations of possible fraud. The window shown to the right of the two evaluation windows as shown in FIG. 20 is a control window allowing the evaluator to find a document view. As shown, a document can be found by searching such as by social security number and form type or content.

Referring to FIGS. 22-25, shown are exemplary displays of candidate progress detail reports. Shown in FIG. 22 is an applicant package progress report detailing applicant packages grouped by complete/incomplete and sorted by social security number (SSN). Shown in FIG. 23 is an applicant package progress report grouped by complete/incomplete and sorted by applicant name. Shown in FIG. 24 is an applicant package progress report grouped by complete/incomplete, by ethnicity, and sorted by social security number (SSN). Shown in FIG. 25 is an applicant package progress report grouped by complete/incomplete, by ethnicity, and sorted by applicant name. In one embodiment, access to these reports is restricted such that only system administrators are able to bring up such reports.

Referring to FIGS. 26-28, shown are exemplary displays of completed applicant package reports. FIG. 26 shows a report listing all completed applicant packages sorted by applicant social security number. FIG. 27 shows a report listing all completed applicant packages sorted by applicant name. FIG. 28 shows a report listing all completed applicant packages sorted by submit date of the applicant (nominee) form.

Referring to FIGS. 29-30, shown are exemplary displays of possible duplicate document reports. FIG. 29 shows a listing of possible duplicate forms listed by applicant social security number. FIG. 30 shows a report of possible duplicate forms listed by applicant name.

Figure 33:
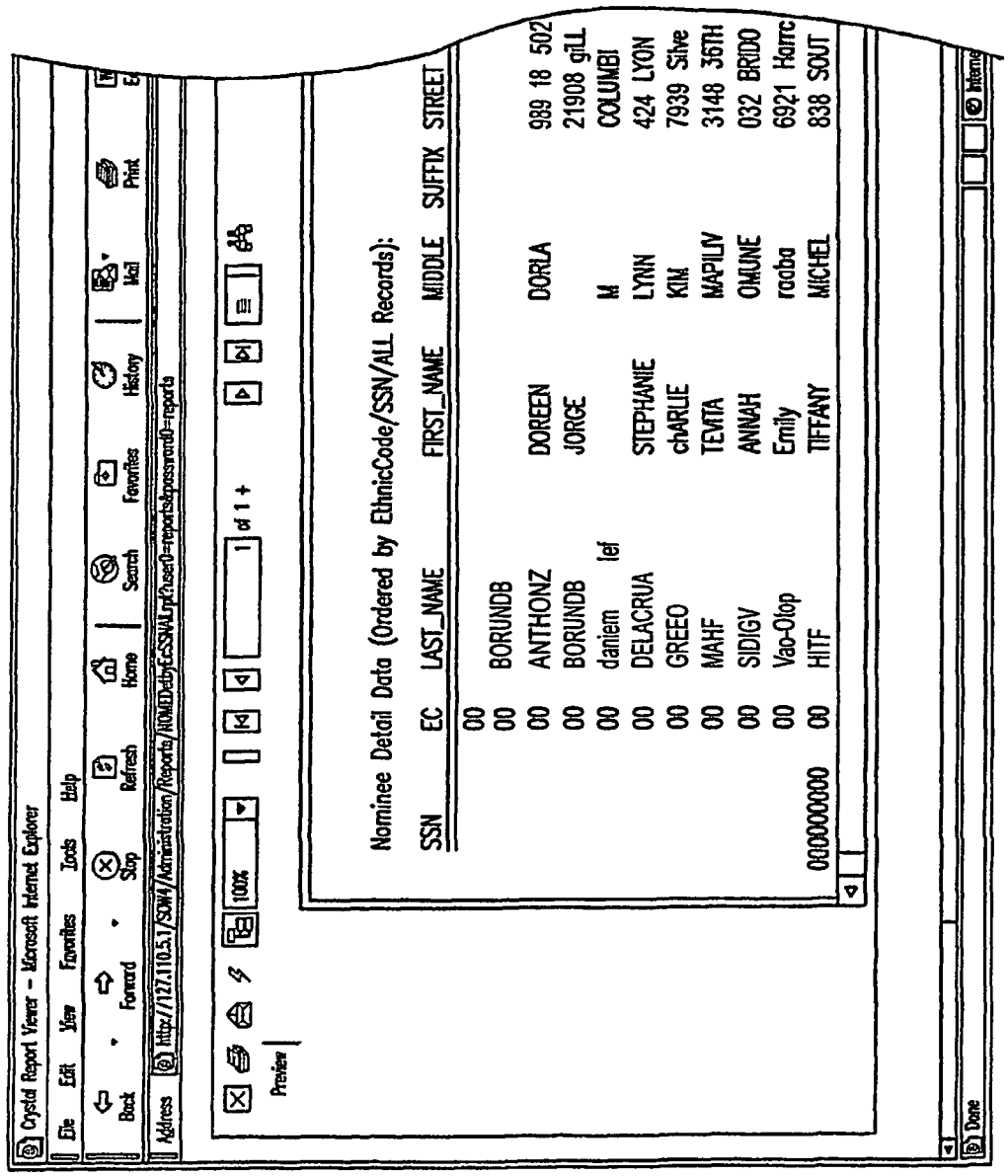
Figure 1:
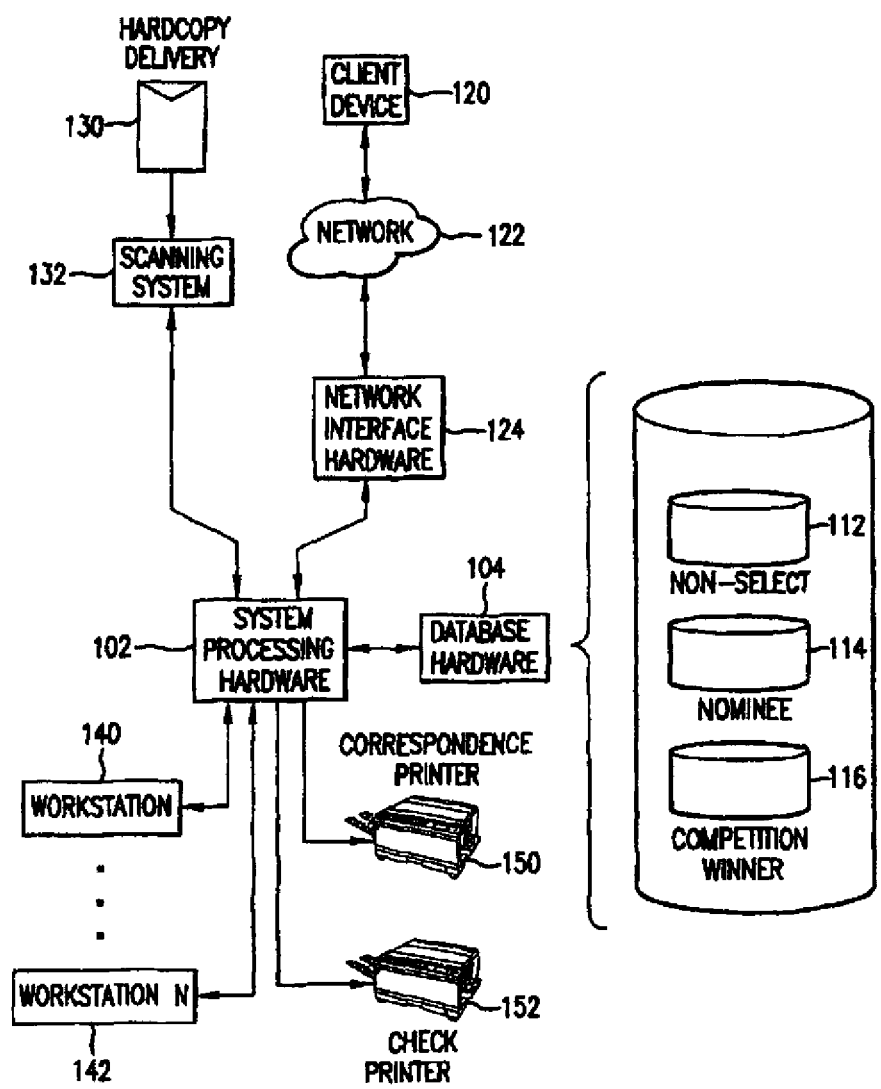
Figure 1A:
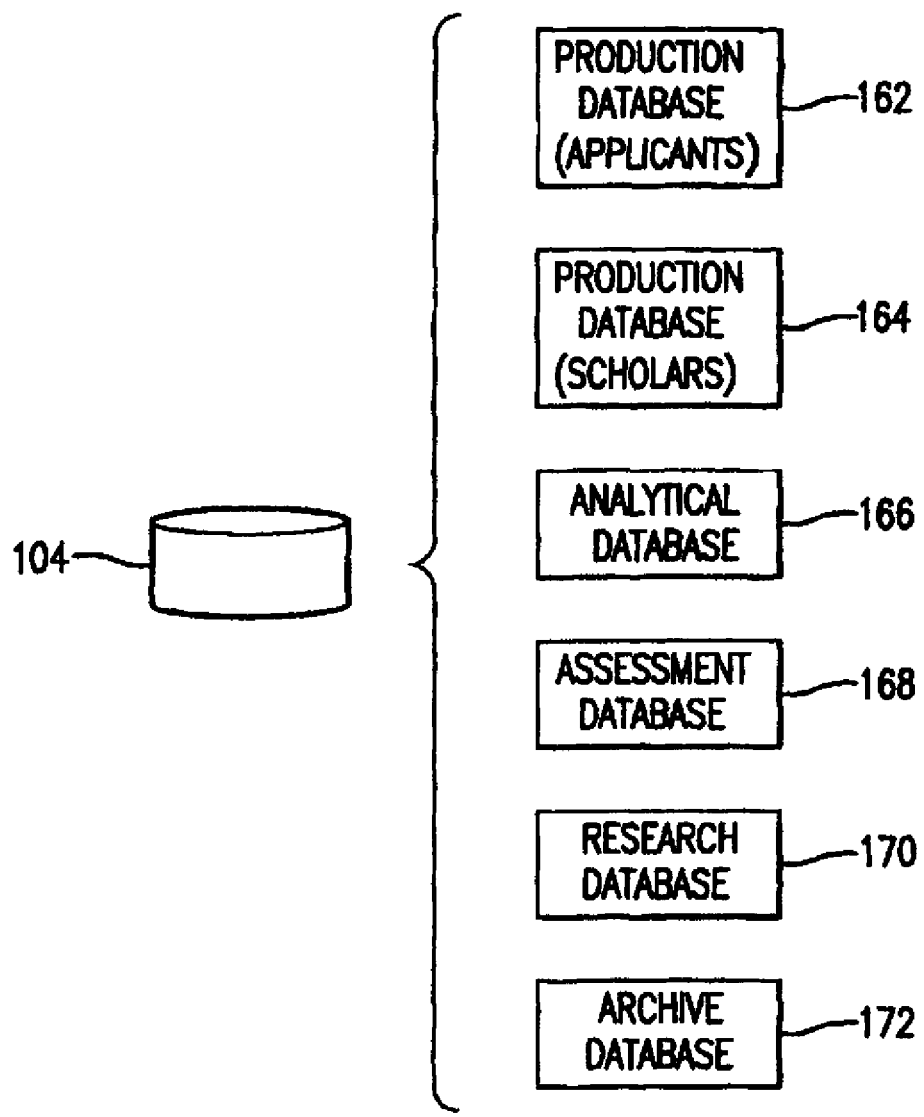
Figure 2:
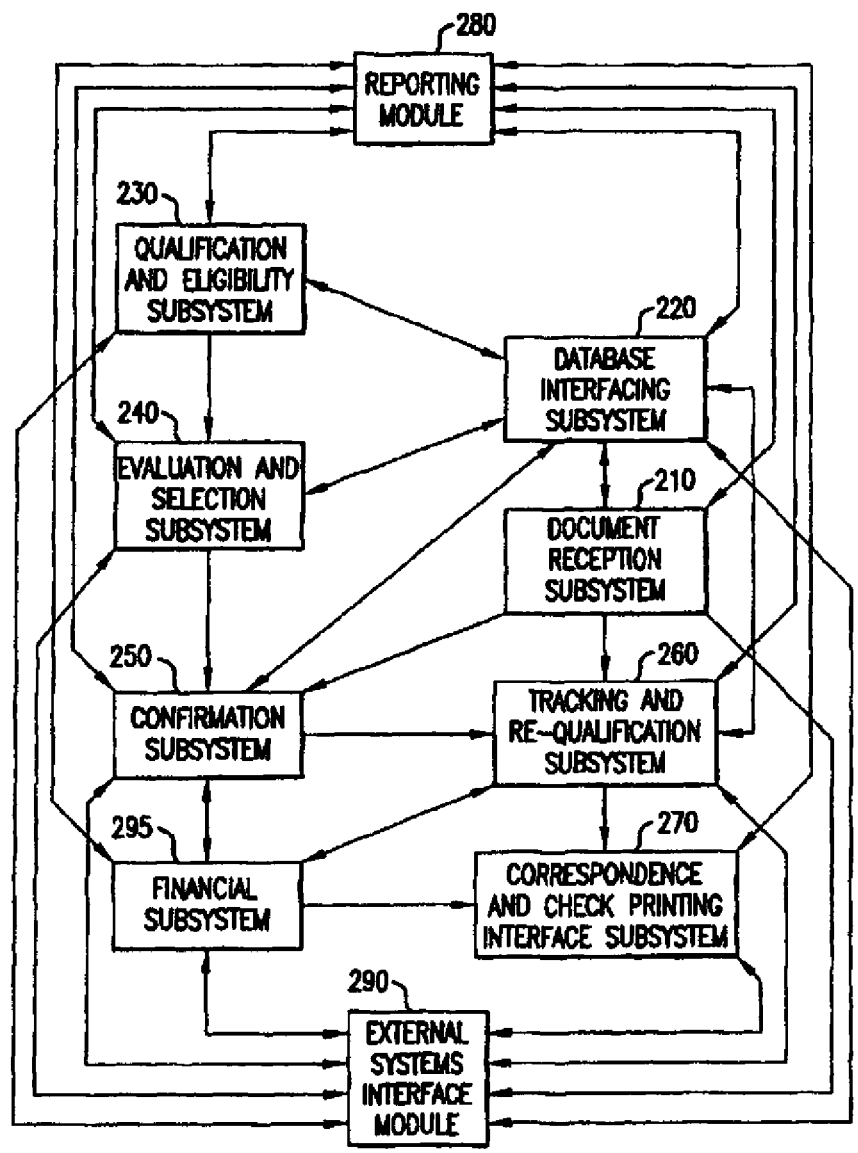
Figure 3A:
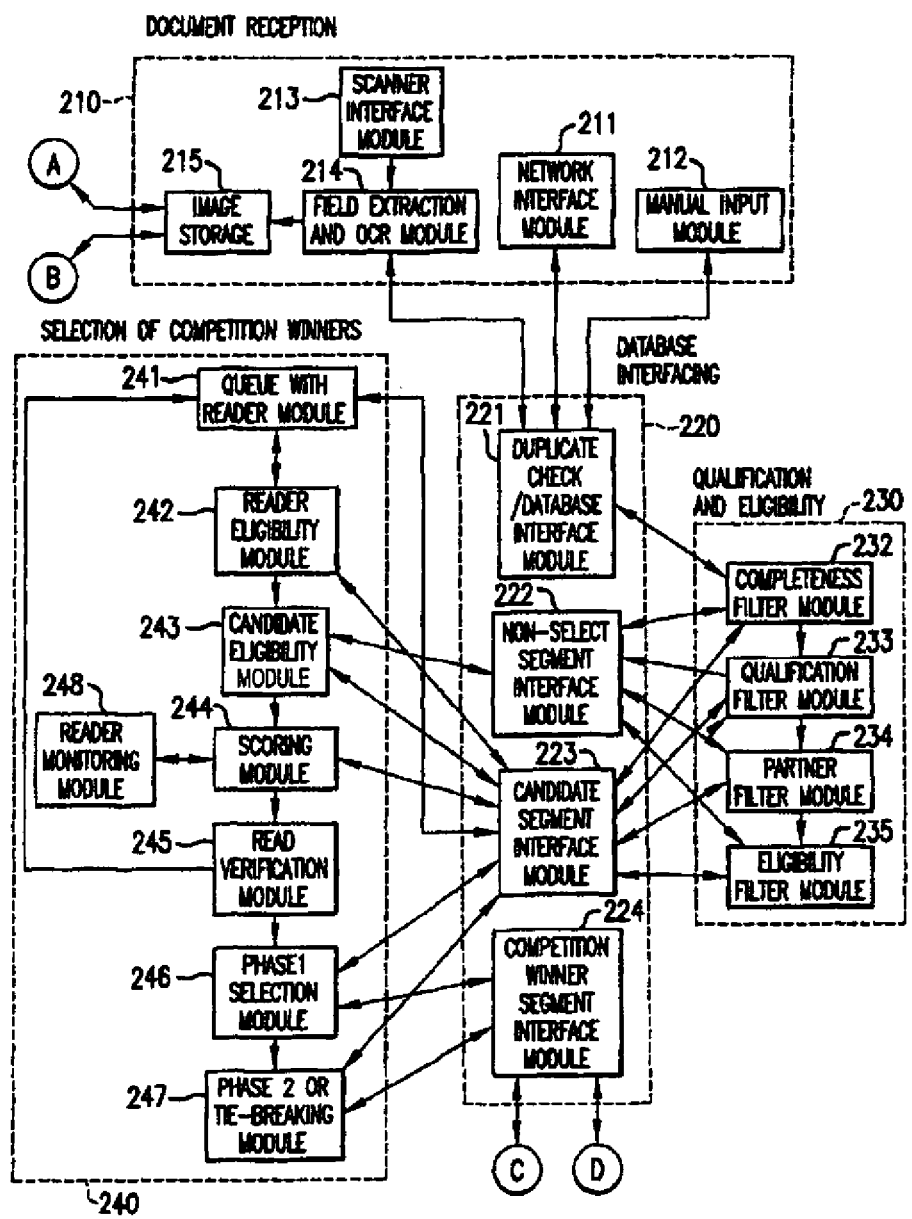
Figure 3B:
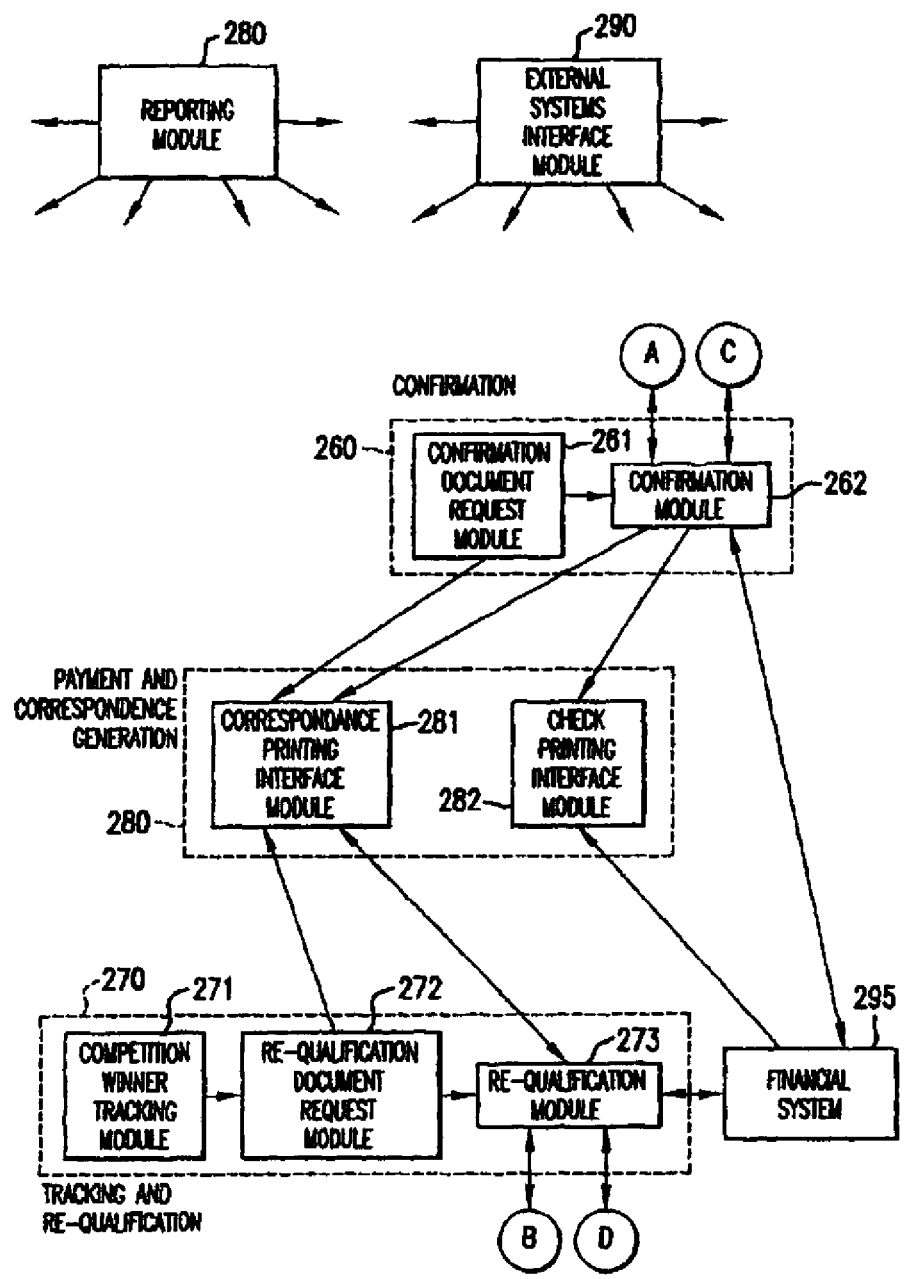
Figure 3C:
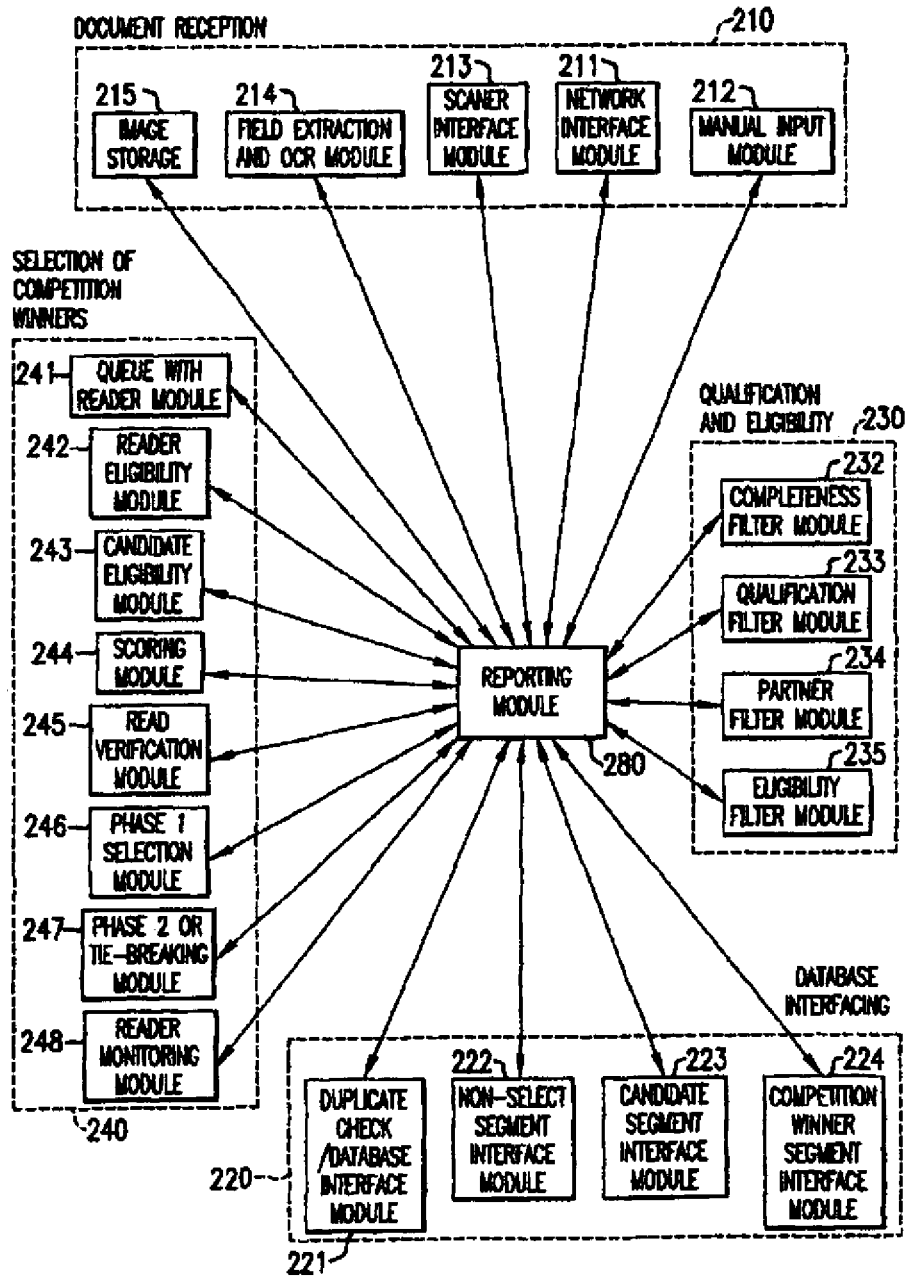
Figure 3D:
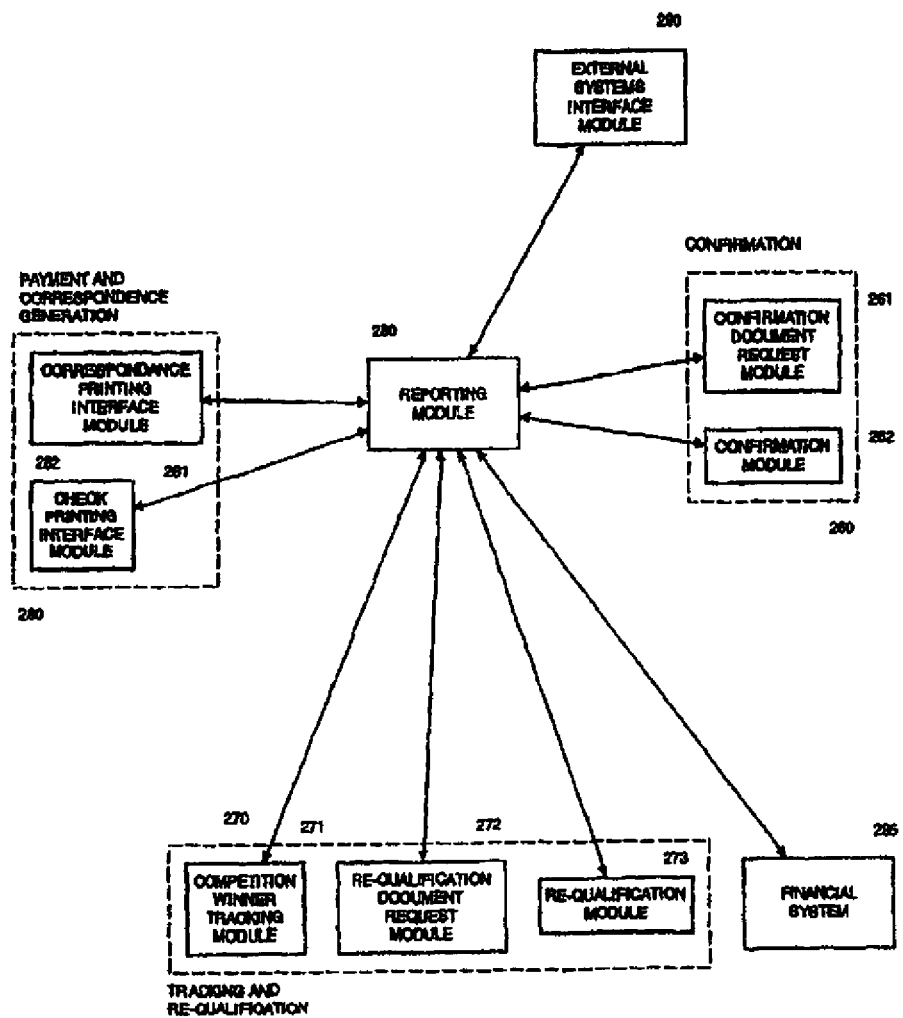
Figure 4:
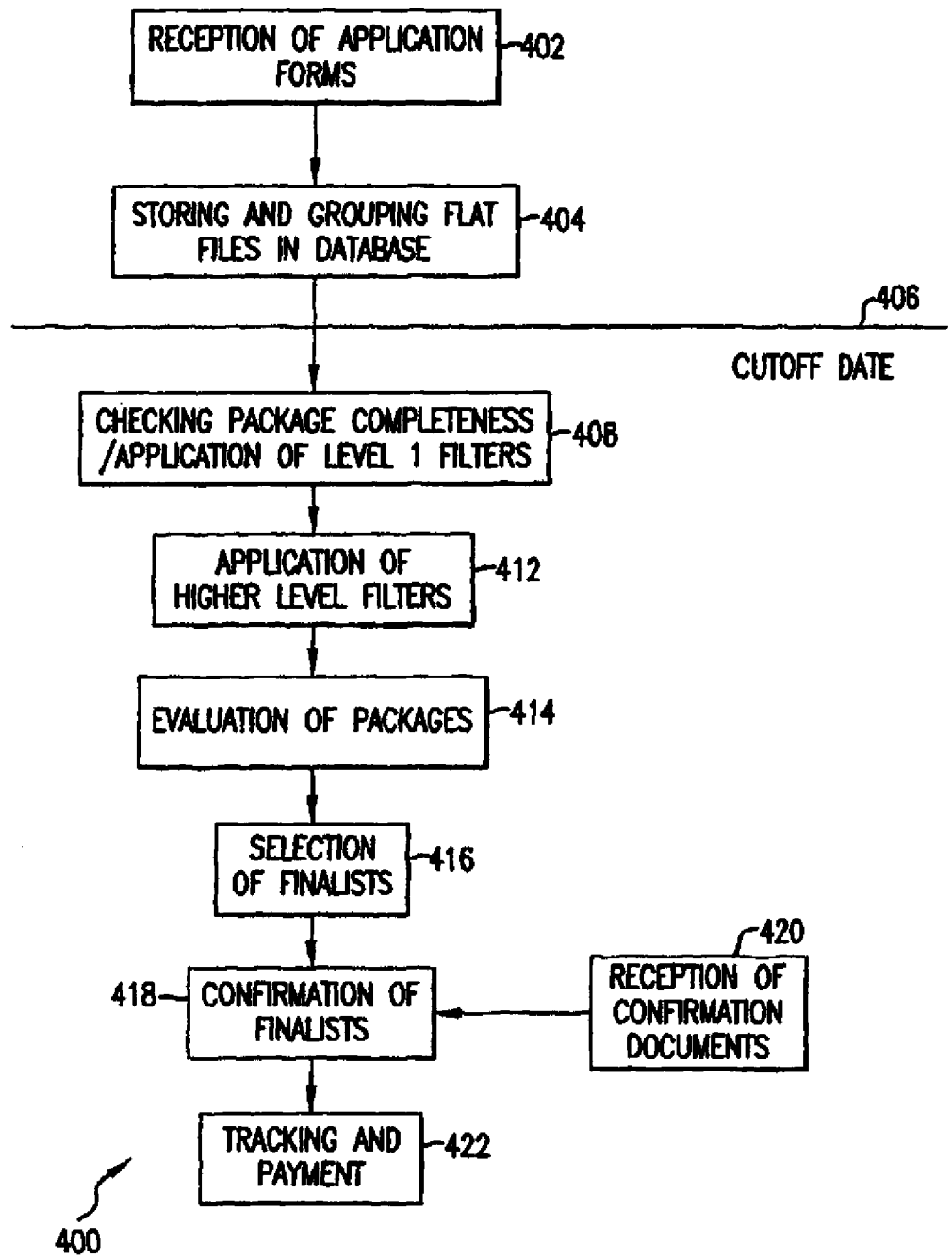
Figure 5:
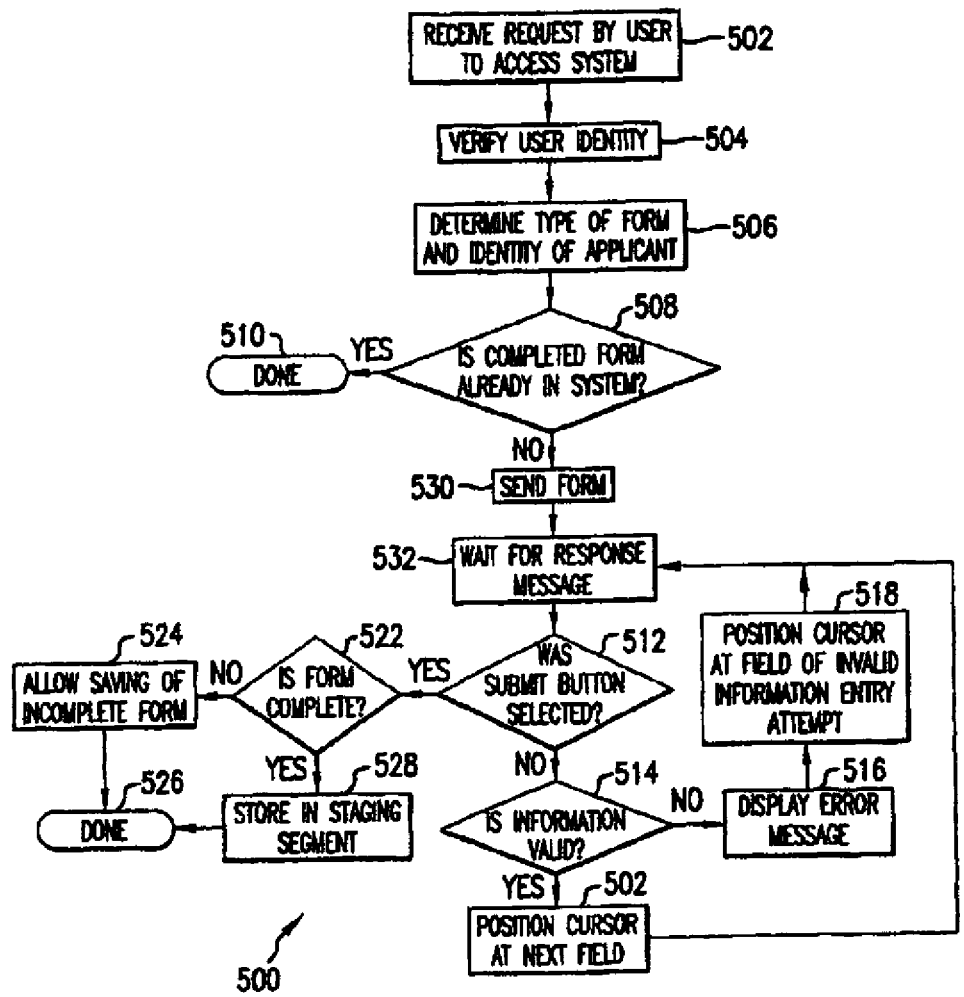
Figure 6:
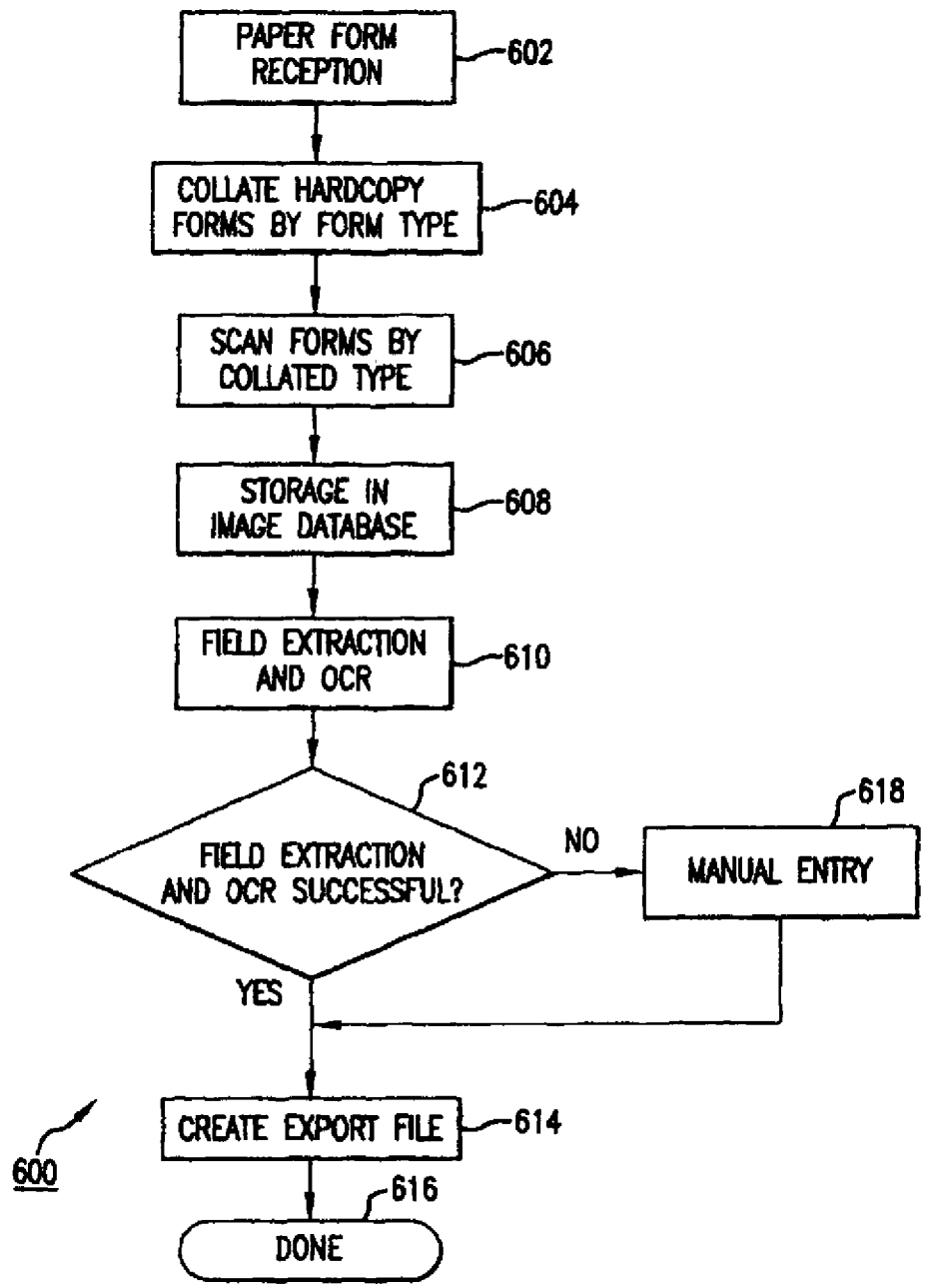
Figure 7:
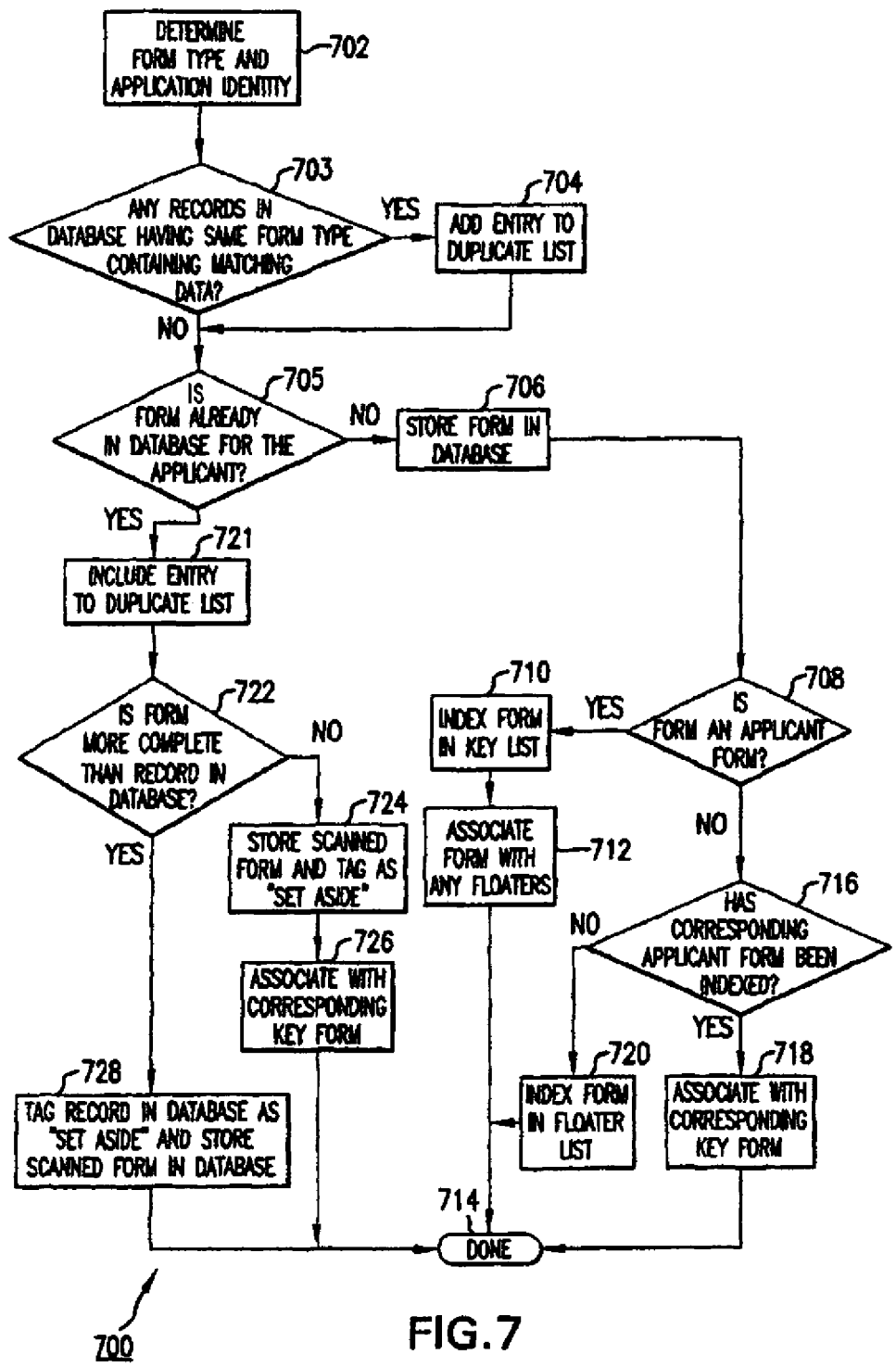
Figure 7A:
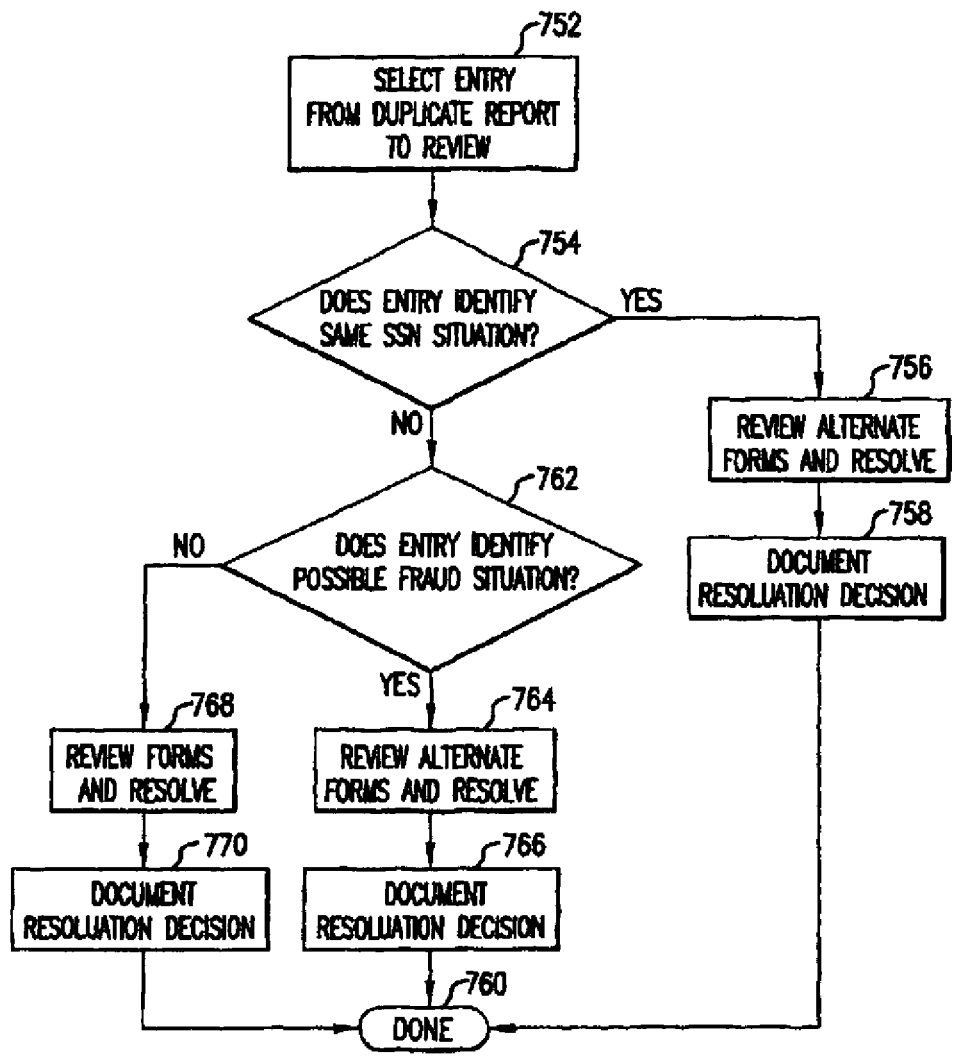
Figure 8:
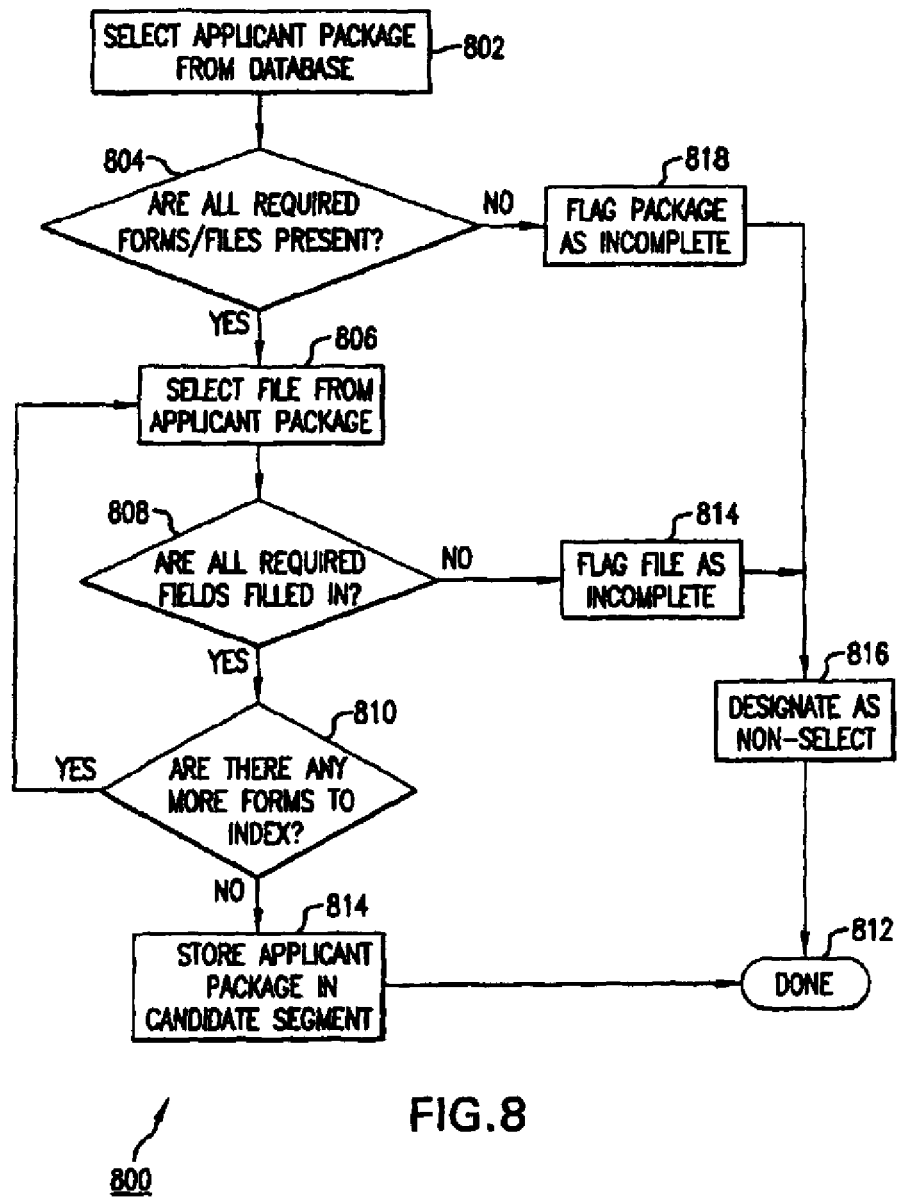
Figure 9:
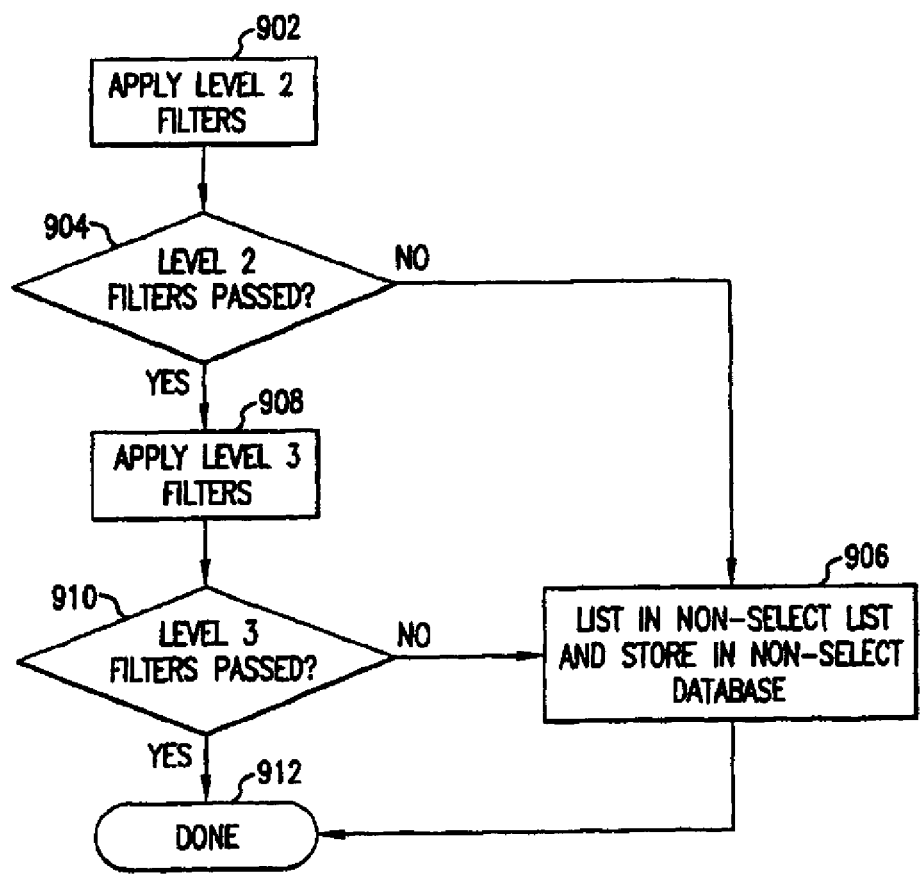
Figure 10:
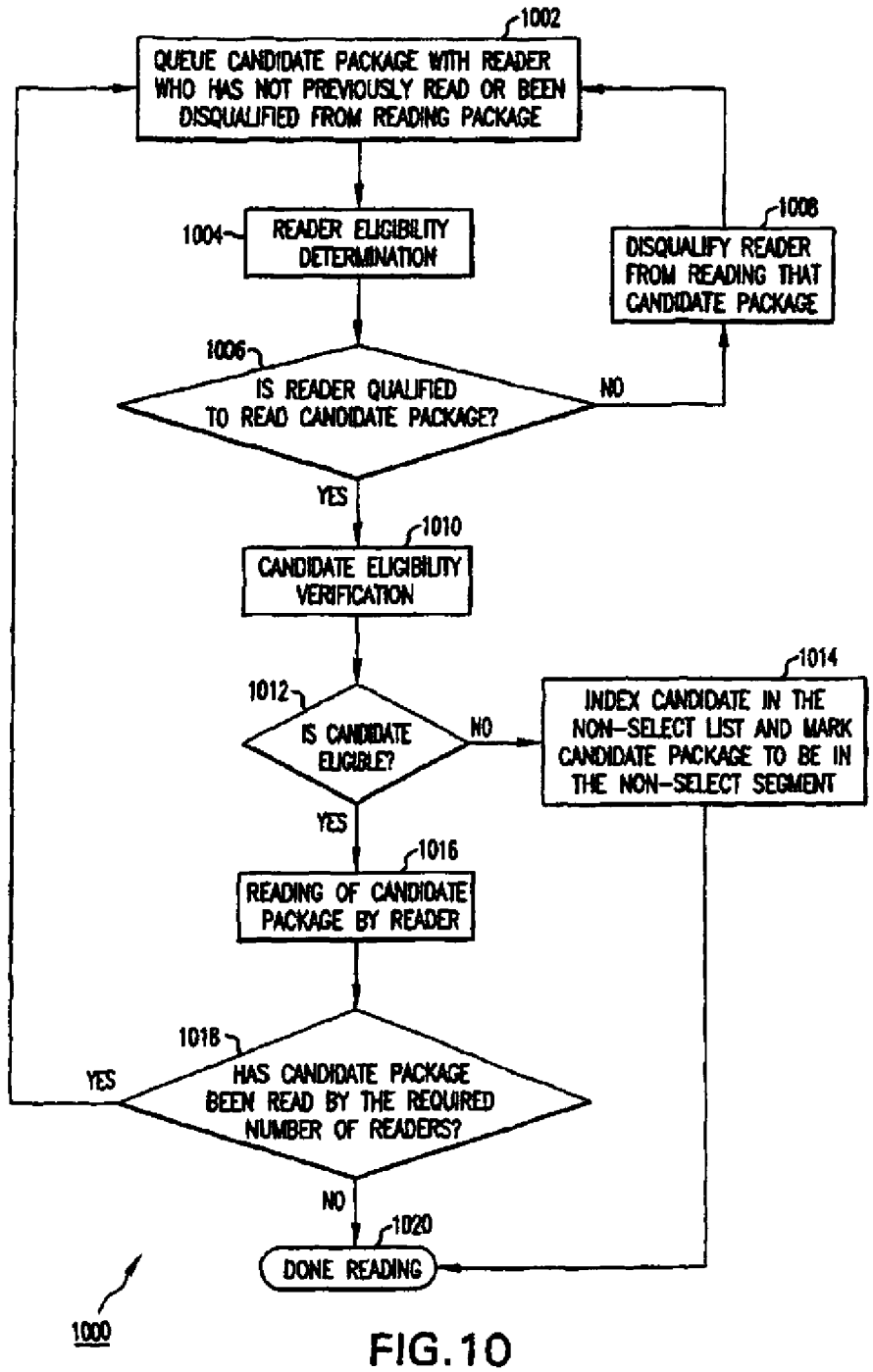
Figure 11:
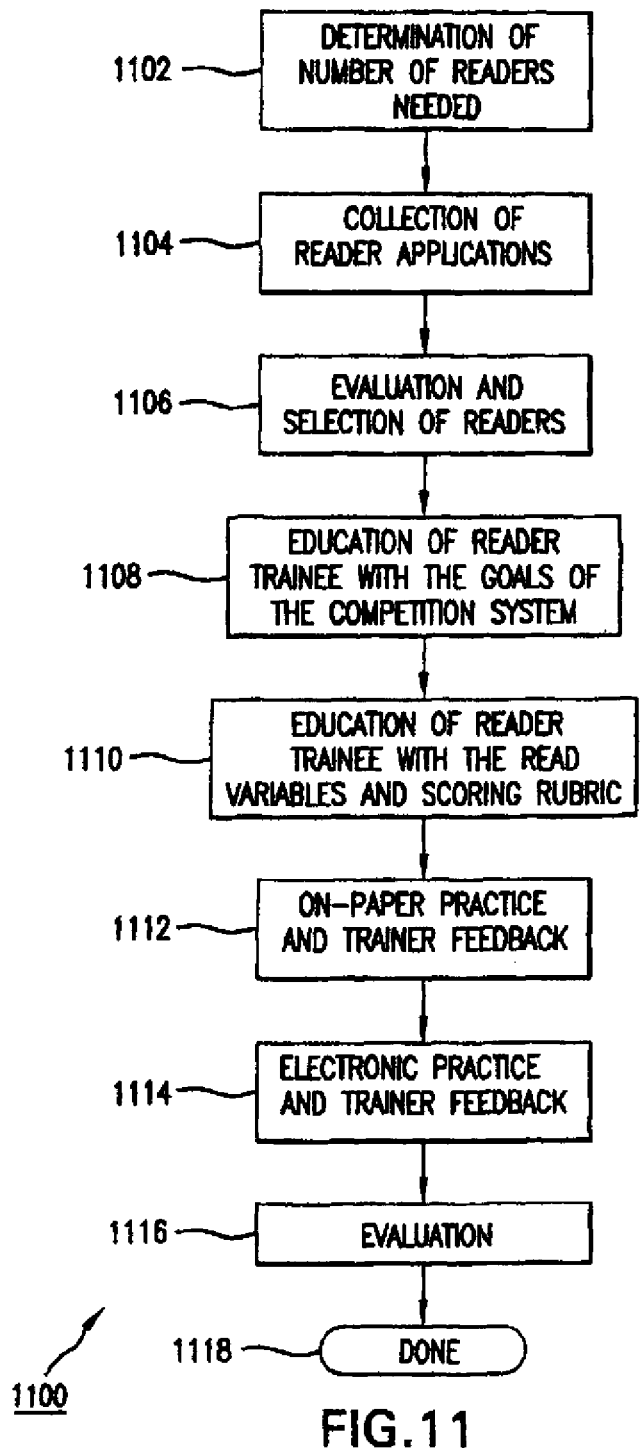
Figure 12A:
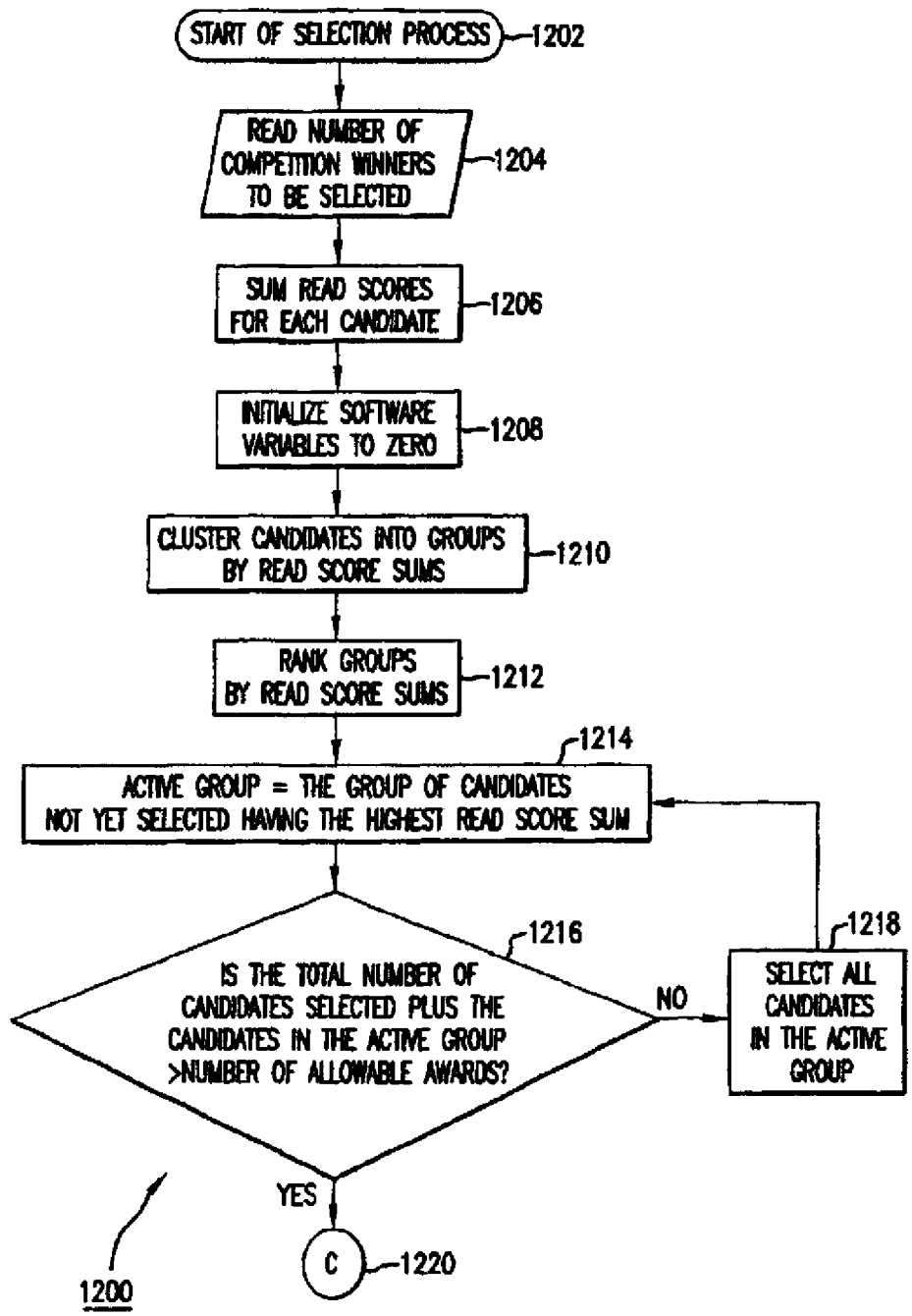
Figure 13:
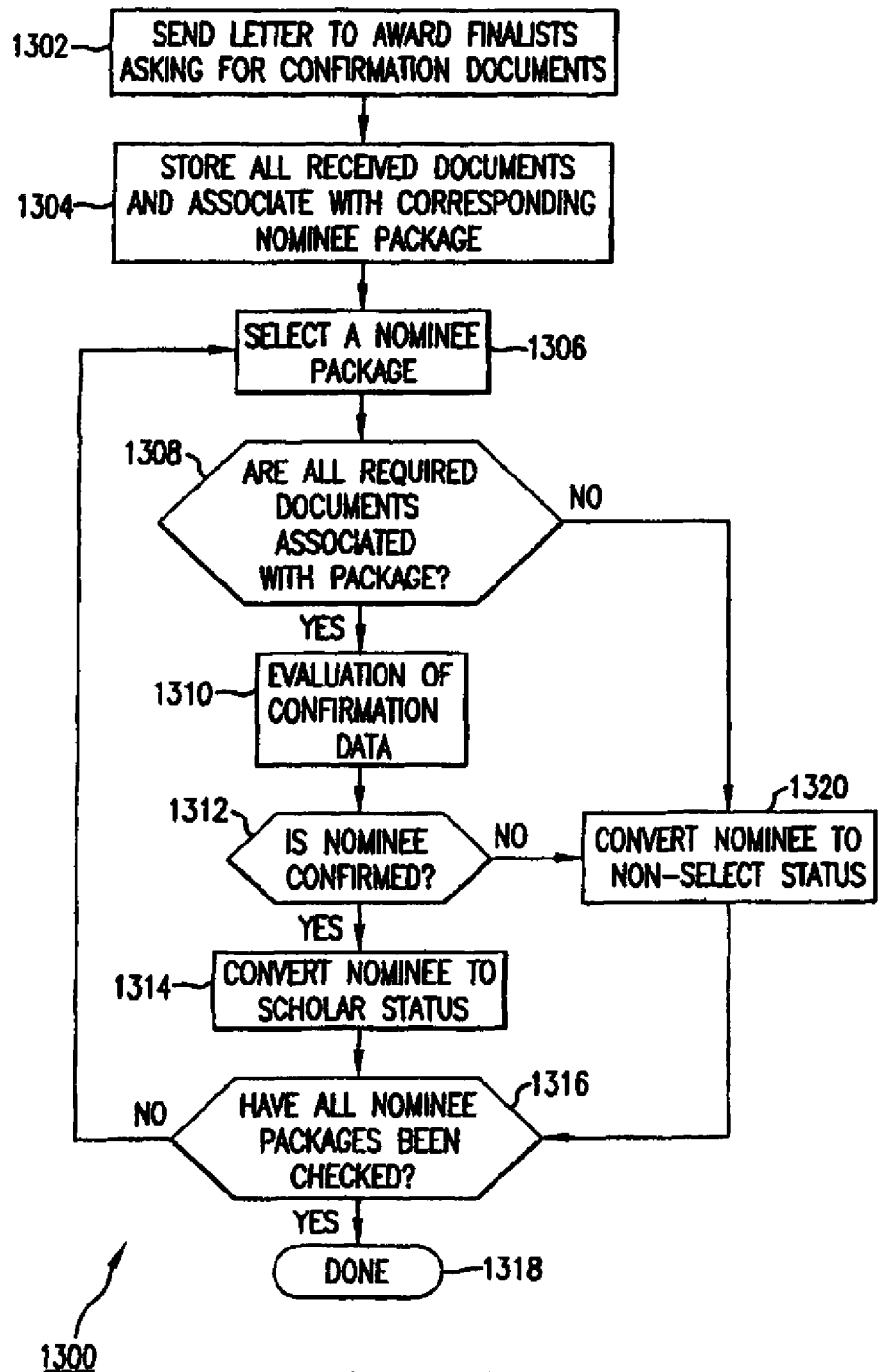
Figure 14:
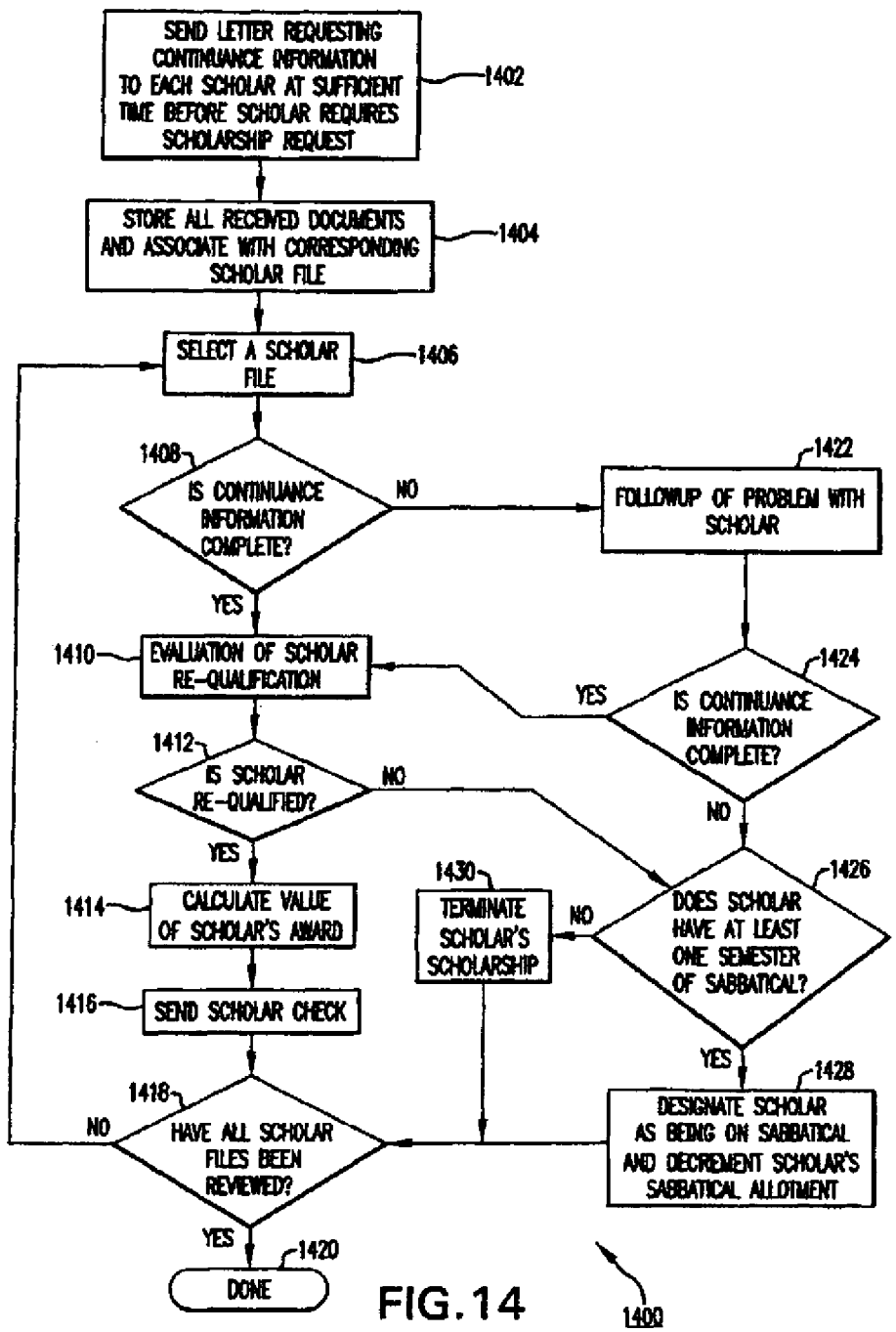
Figure 14A:
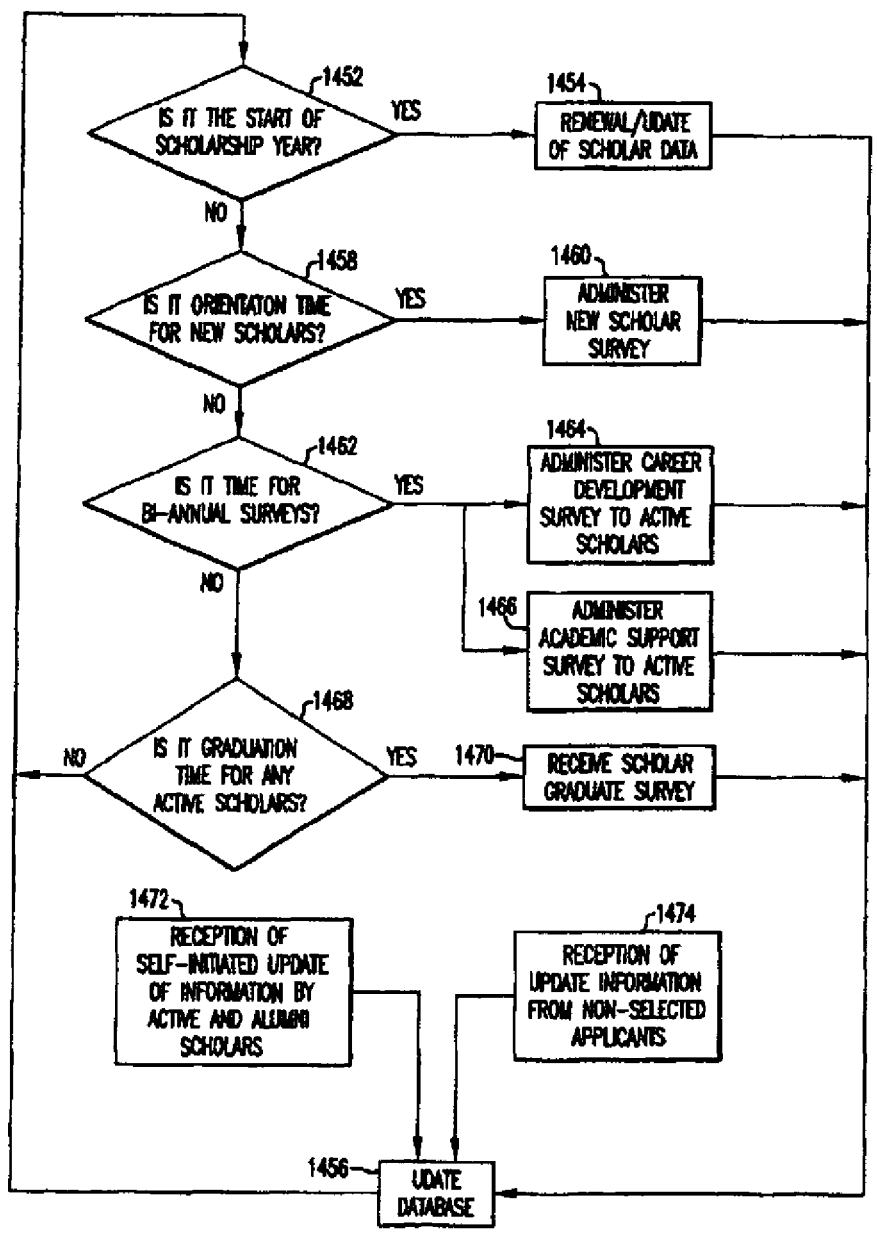
Figure 15:
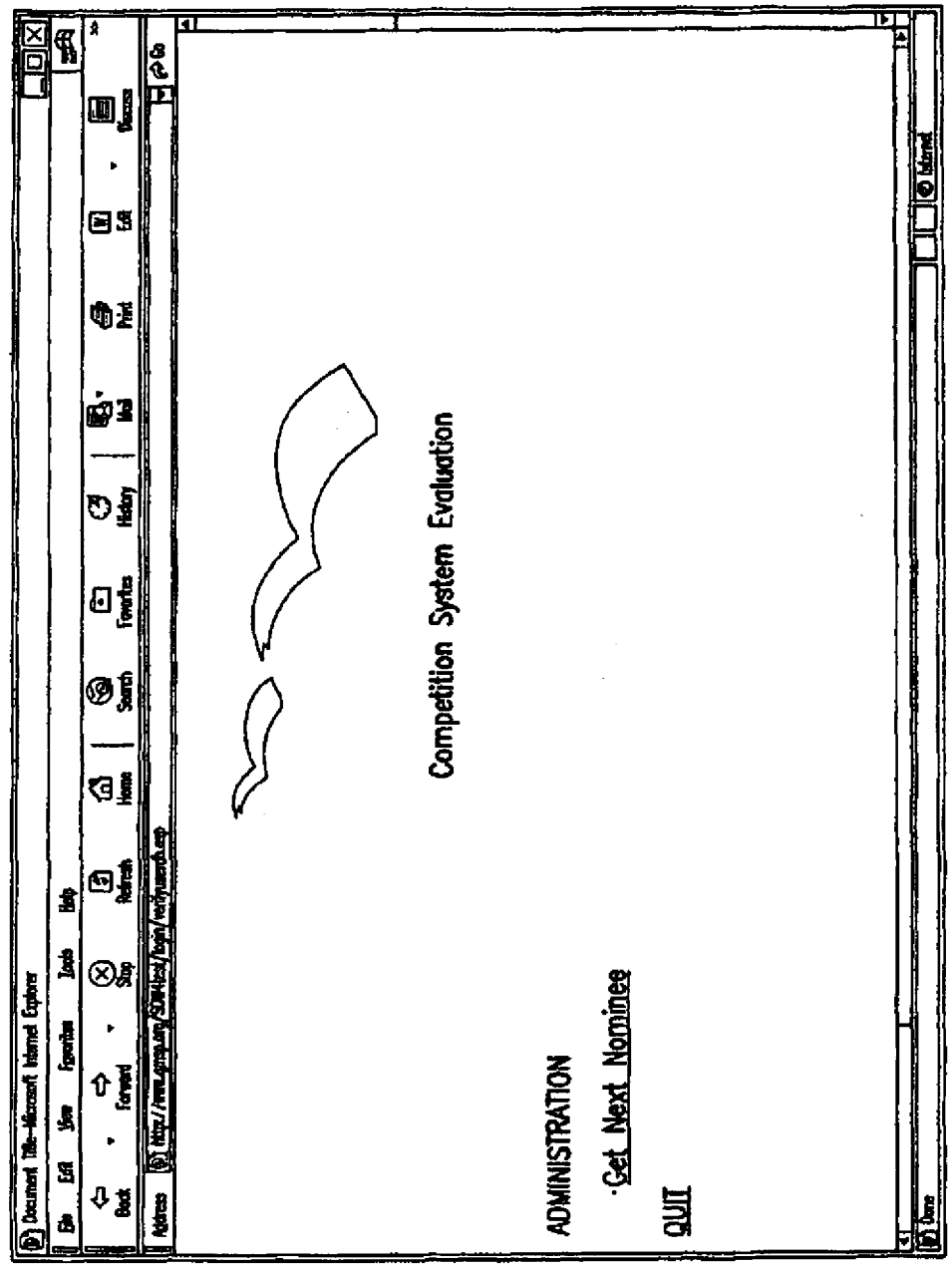

Referring to FIGS. 31-34, shown are exemplary display of candidate detail listing reports. Shown are candidate detail data. FIG. 31 shows applicant detail data sorted by social security number. FIG. 32 shows candidate detail data sorted by applicant name. FIG. 33 shows applicant detail data ordered by one partner group sorted by social security number. FIG. 34 shows candidate detail data ordered by partner group and secondly by applicant name.

Referring to FIG. 35, shown is an exemplary report of a nominator floater with possible applicant or key form (nominee form) ordered by applicant last name and secondly by social security number. This report lists all nominator floaters and likely corresponding key forms (nominee forms), if the system discovers any.

Referring to FIGS. 36-37, shown are exemplary display of nominator floater detail reports. FIG. 36 shows a report listing nominator form floaters ordered by applicant social security number. FIG. 37 shows a report listing nominator form floaters ordered by applicant last name and secondly by social security number.

Referring to FIGS. 38-40, shown are exemplary display of nominator detail reports. These reports list nominator detail data. FIG. 38 shows nominator detail data ordered by applicant social security number. FIG. 39 shows nominator detail data ordered by applicant name. FIG. 40 shows nominator detail data ordered by nominator name.

Referring to FIG. 41, shown is an exemplary report of recommender floaters with possible key form (nominee form) linkages ordered by applicant last name and secondly by social security number. This report lists all recommender floaters and likely corresponding key forms (applicant forms), if the system discovers any.

Referring to FIGS. 42-43, shown are exemplary display of recommender floater detail reports. FIG. 42 shows a report listing recommender form floaters ordered by applicant social security number. FIG. 43 shows a report listing recommender form floaters ordered by applicant last name and secondly by social security number.

Referring to FIGS. 44-46, shown are exemplary display of recommender detail reports. These reports list recommender detail data. FIG. 44 shows recommender detail data ordered by applicant social security number. FIG. 45 shows recommender detail data ordered by applicant name. FIG. 46 shows recommender detail data ordered by recommender name.

While the invention herein disclosed has been described by means of specific embodiments and applications thereof, numerous modifications and variations could be made thereto by those skilled in the art without departing from the scope of the invention set forth in the claims.

What is claimed is:

1. A method of monitoring the evaluation of individuals in a pool of candidates in a competition system comprising:
   receiving one or more evaluator responses for an evaluation from a first evaluator;
   analyzing said evaluation responses comparing an average time between said evaluator responses given in said evaluation to an average time between prior evaluator responses of said evaluator given in at least one prior completed evaluation; and
   determining whether said evaluation should be nullified based on said analysis, wherein at least one of the foregoing steps comprises an automated decision step.

2. A method as in claim 1, wherein said analysis comprises comparing at least one of said evaluator responses to one or more evaluator responses given by said evaluator in at least one previously completed evaluation.

3. A method as in claim 1, wherein said analysis comprises comparing a number of reference sources checked per evaluator response to a minimum number of sources to be checked per evaluator response.

4. A method as in claim 1, wherein said analysis comprises comparing at least one of said evaluator responses given in said evaluation to one or more evaluator responses given by a second evaluator.

5. A method of ensuring fair and consistent evaluation comprising:
   providing an evaluation workstation for use by an evaluator;
   making available candidate applications from one or more candidates needing evaluation;
   matching said evaluator to one or more of said candidate applications;
   receiving a request from said evaluator to evaluate one of said one or more candidate applications;
   providing one or more eligibility questions to said evaluator;
   receiving responses to said eligibility questions;
   determining from said responses to said eligibility questions whether said evaluator is eligible to evaluate said one candidate application;
   preventing said evaluator from evaluating said candidate application responsive to said first determination indicating said evaluator is not eligible to evaluate said candidate application;
   providing one or more candidate eligibility questions to said evaluator;
   receiving responses to said candidate eligibility questions;
   determining from said responses to said candidate eligibility questions whether said candidate is eligible to be evaluated;
   preventing said evaluator from evaluating said candidate application responsive to said second determination indicating said candidate is not eligible to be evaluated;
   presenting in a substantially simultaneous manner, said candidate application, an evaluation rubric, and a scoring display to said evaluator;
   monitoring the evaluation of said candidate package by said evaluator by at least one of detecting whether the average time between question responses is less than a minimum time period, determining whether the average time between question responses is less than the average time period between question responses for said evaluator during past evaluations, determining whether the average evaluation score is above a maximum score, determining whether the average evaluation score is below a minimum score, and determining whether any evaluation score is inconsistent with information in said candidate application; and
   interacting with said evaluation responsive to the determination that said evaluation is unfair or inconsistent,
   wherein at least one of the foregoing steps comprises an automated decision step.

6. A method as in claim 5, wherein said step of interacting comprises at least one of terminating said evaluation, initiating a conversation with said evaluator, and providing an automated message to said evaluator.

7. A method of monitoring the evaluation of individuals in a pool of candidates in a competition system comprising:
   receiving one or more evaluator responses for an evaluation from a first evaluator;

analyzing said evaluation responses by comparing an average time between said evaluator responses given in said evaluation to an average time between evaluator responses for one or more evaluator responses given by a second evaluator; and determining whether said evaluation should be nullified based on said analysis, wherein at least one of the foregoing steps comprises an automated decision step.

* * * * *

UNITED STATES PATENT AND TRADEMARK OFFICE
CERTIFICATE OF CORRECTION

| | | |
|---|---|---|
| PATENT NO. | : 7,792,685 B2 | |
| APPLICATION NO. | : 11/882007 | |
| DATED | : September 7, 2010 | |
| INVENTOR(S) | : Andino, Jr. et al. | |

It is certified that error appears in the above-identified patent and that said Letters Patent is hereby corrected as shown below:

Delete the title page and substitute therefore with the attached title page consisting of the corrected illustrative figure.

In the Drawings

Delete Drawing Sheets 1-78 and substitute therefore with the attached Drawing Sheets 1-79.

Signed and Sealed this
Fourth Day of August, 2015

Michelle K. Lee
*Director of the United States Patent and Trademark Office*

(12) United States Patent
Andino, Jr. et al.

(10) Patent No.: US 7,792,685 B2
(45) Date of Patent: Sep. 7, 2010

(54) SELECTION OF INDIVIDUALS FROM A POOL OF CANDIDATES IN A COMPETITION SYSTEM

(75) Inventors: Adalberto Andino, Jr., Sterling, VA (US); Matthew Errol Quamina, Fairfax, VA (US)

(73) Assignee: United Negro College Fund, Inc., Fairfax, VA (US)

( * ) Notice: Subject to any disclaimer, the term of this patent is extended or adjusted under 35 U.S.C. 154(b) by 0 days.

(21) Appl. No.: 11/882,007

(22) Filed: Jul. 30, 2007

(65) Prior Publication Data
US 2008/0052103 A1 Feb. 28, 2008

Related U.S. Application Data

(62) Division of application No. 09/996,907, filed on Nov. 30, 2001, now Pat. No. 7,321,858.

(51) Int. Cl.
G06Q 99/00 (2006.01)
(52) U.S. Cl. .............. 705/1.1; 705/320; 705/321
(58) Field of Classification Search ............. 705/1, 705/1.1, 320, 321
See application file for complete search history.

(56) References Cited

U.S. PATENT DOCUMENTS

| | | |
|---|---|---|
| 4,787,036 A | 11/1988 | Fleming |
| 5,117,353 A | 5/1992 | Stipanovich et al. |
| 5,164,897 A | 11/1992 | Clark et al. |
| 5,170,362 A | 12/1992 | Greenberg et al. |
| 5,197,004 A | 3/1993 | Sobotka et al. |
| 5,416,694 A | 5/1995 | Parrish et al. |
| 5,437,554 A | 8/1995 | Clark et al. |

(Continued)

FOREIGN PATENT DOCUMENTS

JP   11-120224   4/1999

(Continued)

OTHER PUBLICATIONS

Daniel P. Lopresti, "A Comparison of Text-Based Methods for Detecting Duplication in Document Image Databases," Proceedings of Document Recognition and Retrieval VII (IS&T/SPIE Electronic Imaging), vol. 3967, pp. 210-221, San Jose, CA, Jan. 2000.

(Continued)

*Primary Examiner* — Jonathan Ouellette
(74) *Attorney, Agent, or Firm* — Fitch Even Tabin & Flannery; Kendrew H. Colton

(57) ABSTRACT

An integrated highly automated competition system allows for selection of one or more competition winners. Documents can be submitted electronically or by hardcopy. Document submissions are checked against databases to determine duplicate existence by a variety of information extracted from the documents. Candidates are filtered by one or more filters requiring candidates meet completeness qualification, eligibility, and partner/discretionary standards. Candidates are evaluated by one or more readers and scored on a plurality of cognitive and non-cognitive variables. Readers are monitored and corrective action is taken when reader evaluations are determined to require corrective action. Candidates are selected by a two stage process first using raw read scores and then using a successive weighted read score iteration or tie-breaking stage. Winning candidates are subject to progress tracking and re-qualification prior to receiving award payments.

7 Claims, 79 Drawing Sheets

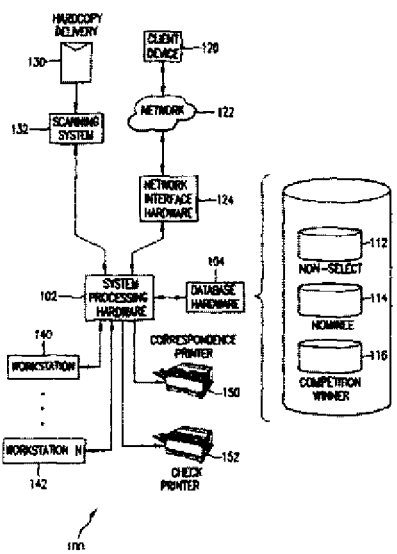

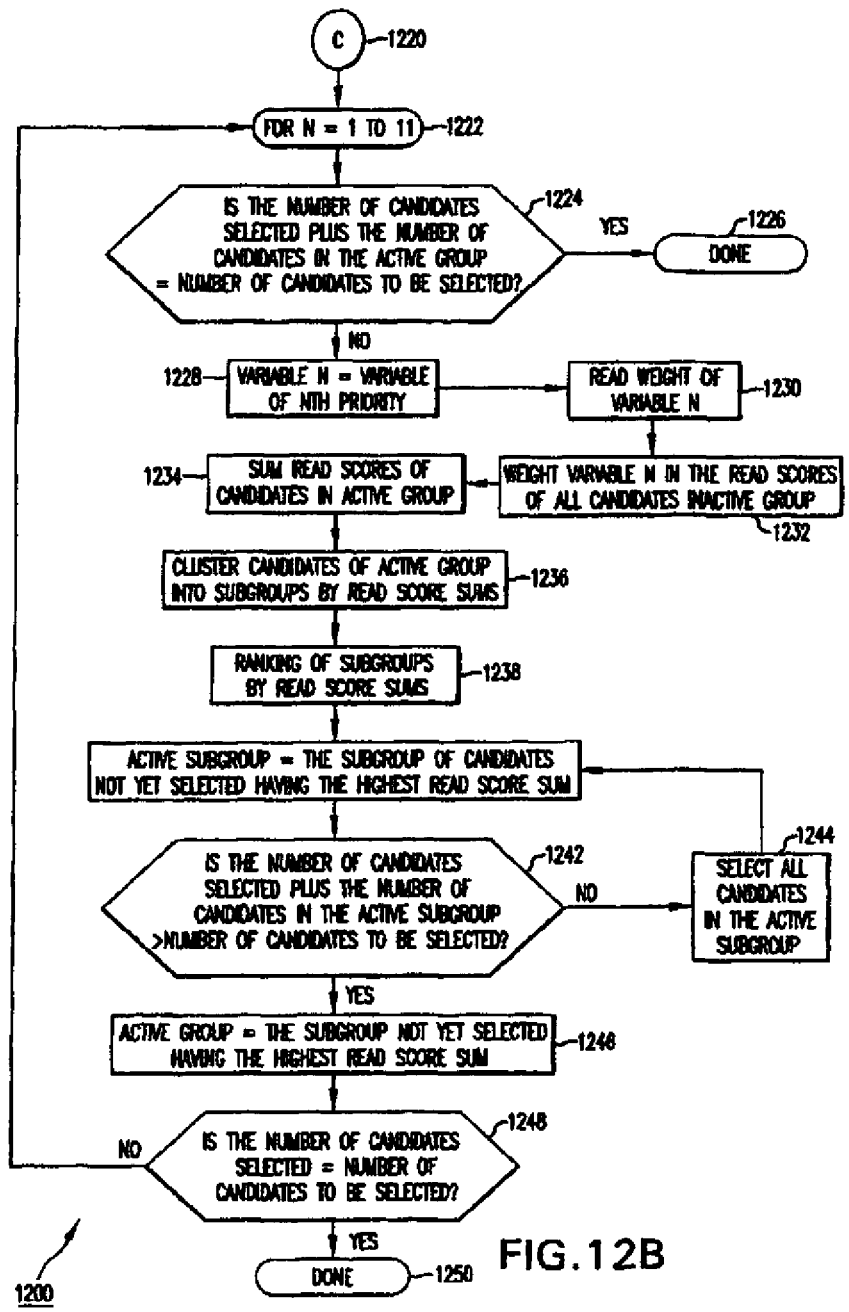

| EVALUATION VARIABLE | PARTNER GROUP | ENGINEERING PARTNER GROUP | BUSINESS MANAGEMENT PARTNER GROUP |
|---|---|---|---|
| CURRICULUM VIGOR | | 2 | 9 |
| ACADEMIC ACHIEVEMENT | | 1 | 8 |
| POSITIVE SELF-ESTEEM | | 9 | 3 |
| REALISTIC SELF-APPRAISAL | | 10 | 10 |
| UNDERSTANDING AND NAVIGATION OF SOCIAL AND ORGANIZATIONAL SYSTEMS | | 6 | 1 |
| PREFERENCE FOR LONG-TERM GOALS OVER IMMEDIATE GRATIFICATION | | 4 | 6 |
| LEADERSHIP EXPERIENCE | | 7 | 2 |
| COMMUNITY SERVICE | | 11 | 11 |
| SELF-MOTIVATED ACQUISITION OF KNOWLEDGE OR SKILLS | | 5 | 7 |
| PERSUASIVENESS | | 8 | 5 |
| LANGUAGE STRUCTURE AND EXPRESSION ABILITY | | 3 | 4 |

PRIORITY ORDERING OF EVALUATION
VARIABLES BY SELECTED PARTNER GROUPS

Figure 12c

|  | CANDIDATE #1, READ 1 | CANDIDATE #1, READ 2 | CANDIDATE #2, READ 1 | CANDIDATE #2, READ 2 |
|---|---|---|---|---|
| CURRICULUM VIGOR | 4 | 3 | 4 | 2 |
| ACADEMIC ACHIVEMENT | 4 | 4 | 4 | 4 |
| POSITIVE SELF-ESTEEM | 2 | 2 | 3 | 4 |
| REALISTIC SELF-APPRAISAL | 3 | 2 | 3 | 4 |
| UNDERSTANDING AND NAVIGATION OF SOCIAL AND ORGANIZATIONAL SYSTEMS | 3 | 4 | 3 | 3 |
| PREFERENCE FOR LONG-TERM GOALS OVER IMMEDIATE GRATIFICATION | 2 | 2 | 2 | 2 |
| LEADERSHIP EXPERIENCE | 4 | 3 | 4 | 4 |
| COMMUNITY SERVICE | 2 | 4 | 4 | 2 |
| SELF-MOTIVATED ACQUISITION OF KNOWLEDGE OR SKILLS | 3 | 4 | 3 | 2 |
| PERSUASIVENESS | 4 | 3 | 2 | 3 |
| LANGUAGE STRUCTURE AND EXPRESSION ABILITY | 3 | 2 | 2 | 2 |

View Recommendation Data

Please verify this Nominee is eligible on the basis of high school graduation by August 2001 OR completed GED by February 2001 OR, if neither, admission to a collegiate institution. Unless the Nominee completed the GED, please verify that at least GPA listed is a minimum of 3.3.

| COLLEGE BOARD | SCHOOL ATTENDED | | | BEGIN | END | GRAD | RANK/SZ | GPA |
|---|---|---|---|---|---|---|---|---|
| 371905 | Jenks High School | Jenks | Oklahoma | 8/1/97 | 5/1/01 | 5/1/01 | 0/0 | 3 |

ACCORDING TO THE NOMINATOR, DOES THE NOMINEE HAVE A CUMULATIVE GPA OF 3.3 OR MORE ON A 4.0 SCALE? Yes
GED COMPLETED: Not Provided
NEITHER GRADUATED HIGH SCHOOL NOR COMPLETED THE GED BY JUNE 2001 BUT HAS BEEN ADMITTED TO A COLLEGIATE INSTITUTION: Not Provided
PLEASE ENSURE ACCURACY OF RESPONSES BELOW. A "NO" response can eliminate a nominee from the scholarship competition.

1. Is the Nominee ELIGIBLE based on graduation by August 2001, GED, or admission to a collegiate institution?
   ⊙ Yes ○ No
2. Is the Nominee ELIGIBLE based on GPA? (if the Nominee has completed a GED, please mark "Yes" in all cases.)
   ⊙ Yes ○ No
3. Is the Nominee ELIGIBLE based on the most recent school being a high school (not a college)?
   ⊙ Yes ○ No
4. Is there enough information available on which to base a sound score for this Nominee?
   ⊙ Yes ○ No

[SUBMIT] [RESET]

Nominee Packet Progress Detail (grouped by complete/incomplete, ordered by SSN)    Date: 11/27/01

| SSN | LAST_NAME | FIRST_NAME | MID_NAME | ETH_GRP | NOMINEE | SUBMIT DATES NOMINATION | RECOMMEND |
|---|---|---|---|---|---|---|---|
| Complete | | | | | | | |
| 102666661 | BALTAZAS | CHRISTOPHER | JOHN | AP | 02/07/2001 | 01/31/2001 | 02/08/2001 |
| 103820267 | MARCI | KELSBY | RYESUN | AP | 02/22/2001 | 02/09/2001 | 02/15/2001 |
| 104942831 | Sayee | Momena | | AP | 01/30/2001 | 01/30/2001 | 01/27/2001 |
| 106929883 | Pierd | Odye | RattiGo | AP | 02/28/2001 | 02/07/2001 | 03/12/2001 |
| 106943505 | WANH | JNG JNG | | AP | 03/01/2001 | 01/26/2001 | 02/02/2001 |
| 1087655555 | BERRINGT | AMBER | LYN | AA | 02/26/2001 | 02/22/2001 | 02/26/2001 |
| 1097041311 | Snoparskz | April | Elisabeth | AP | 02/01/2001 | 01/27/2001 | 01/31/2001 |
| 110666246 | Hb | Sarah | Mia | AA | 02/02/2001 | 02/12/2001 | 02/08/2001 |
| 110724923 | NGUYEO | KIMBERLY | HANG | AP | 02/09/2001 | 02/09/2001 | 03/02/2001 |
| 110804098 | Maitlane | Dominick | Ariel | AA | 01/31/2001 | 01/31/2001 | 01/27/2001 |
| 110841763 | AKUKWF | VICTOR | UGONNA | AA | 02/23/2001 | 02/12/2001 | 02/27/2001 |
| 111645020 | VITELLP | KATHERINE | LEIGH | AP | 02/22/2001 | 02/08/2001 | 02/07/2001 |
| 111662102 | Givent | Puresha | Renee | AA | 02/01/2001 | 02/01/2001 | 02/01/2001 |
| 111683631 | Tsanh | On | Kia | AP | 01/30/2001 | 01/31/2001 | 01/31/2001 |
| 112644854 | MYRIF | STEPHANIE | ANETTE | AA | 03/02/2001 | 01/30/2001 | 02/08/2001 |
| 112660885 | TALBOU | CHRISTINE | ELIZABETH | AA | 02/26/2001 | 02/09/2001 | 02/07/2001 |
| 112666184 | Tonh | Andrew | Hoi-Ming | AP | 02/01/2001 | 01/22/2001 | 02/09/2001 |

FIG.22A

Nominee Packet Progress Detail (grouped by complete/incomplete, ordered by SSN)          Date: 11/27/01

| SSN | LAST_NAME | FIRST_NAME | MID_NAME | ETH_GRP | NOMINEE | SUBMIT DATES NOMINATION | RECOMMEND |
|---|---|---|---|---|---|---|---|
| Complete | | | | | | | |
| 113644174 | RYAO | JAMILAH | ROCHELLE | AA | 02/22/2001 | 02/01/2001 | 02/07/2001 |
| 113709561 | Soi | Karen | Kyeiing | AP | 02/01/2001 | 02/19/2001 | 01/28/2001 |
| 114645967 | MB | Pei Pei | | AP | 01/30/2001 | 01/31/2001 | 01/30/2001 |
| 114802528 | Landep | Sandra | Patricia | HA | 02/01/2001 | 02/01/2001 | 02/04/2001 |
| 115649010 | Powelin | Samantha | Danielle | AA | 02/03/2001 | 01/31/2001 | 02/07/2001 |
| 115700542 | Piercf | LAUREN | HULSTON | AA | 02/12/2001 | 02/01/2001 | 02/12/2001 |
| 115741077 | XIAP | SHONG | | AP | 02/23/2001 | 02/07/2001 | 02/07/2001 |
| 115745377 | Abinades | Olgo | Esther | HA | 01/22/2001 | 01/29/2001 | 02/01/2001 |
| 115800770 | AVENDANP | JUAN | ESTEBAN | HA | 02/23/2001 | 02/08/2001 | 03/01/2001 |
| 116302031 | Noai | Luyambyo | | AA | 02/03/2001 | 01/29/2001 | 01/29/2001 |
| 116303041 | Hentz | Ddungu | | AA | 01/31/2001 | 01/31/2001 | 01/31/2001 |
| 116646008 | Huntes | Brandi | Tichelle | AA | 01/31/2001 | 01/26/2001 | 01/25/2001 |
| 116805102 | Kin | Namcheol | Joshua | AP | 01/30/2001 | 01/30/2001 | 01/30/2001 |
| 117642727 | Correlb | Pelynne | Persephone | AA | 01/29/2001 | 01/30/2001 | 01/30/2001 |
| 117642922 | Phan | Phoong | Nguyen | AP | 01/31/2001 | 01/31/2001 | 02/01/2001 |
| 117647502 | BB | VIRGINIA | LAY | AP | 02/23/2001 | 02/09/2001 | 03/01/2001 |

FIG.22B

Nominee Package Progress Detail (grouped by complete/incomplete, ordered by Nominee Name)

Date: 09/05/01

| SSN | LAST_NAME | FIRST_NAME | MID_NAME | ETH_GRP | NOMINEE | SUBMIT DATES NOMINAT | RECOMME |
|---|---|---|---|---|---|---|---|
| Complete | | | | | | | |
| 445824111 | Abaz | Bezuwork | G. | AA | | | |
| 976531697 | Abdurn | Alganesh | D. | AA | | | |
| 301650319 | Ackenstosd | Aloho | B. | AP | | | |
| 938384949 | Awb | Amikka | | AA | | | |
| 310024156 | Bobarrb | Molly | Fanta | AA | | | |
| . . . | | | | | | | |
| Incomplete | | | | | | | |
| 112346789 | Ab | B'Lich | Methusalah | AA | | | |
| 114493466 | Akwokwp | Victor | Cindy | AA | | | |
| 234567890 | Ao | Xiao-Xiao | | AP | | | |
| 202544467 | Anh | Nom-Nom | | AP | | | |
| 393950606 | Av | Amelia | G. | AP | | | |
| . . . | | | | | | | |

FIG. 23

Nominee Packet Progress Detail (grouped by complete/incomplete, Ethnic Group, ordered by SSN)

Date: 11/27/01

| SSN | LAST_NAME | FIRST_NAME | MID_NAME | ETH_GRP | NOMINEE | SUBMIT DATES NOMINATION | RECOMMEND |
|---|---|---|---|---|---|---|---|
| Complete | | | | | | | |
| 207743970 | EBRAHIN | REHANNA | B | | 03/12/2001 | 02/12/2001 | 02/26/2001 |
| 206686762 | PENB | Maria | Elena | | 03/12/2001 | 01/30/2001 | 03/12/2001 |
| 208746368 | MANIGAU | JEANNE | CHRISTINE | | 03/12/2001 | 01/30/2001 | 03/01/2001 |
| 210600762 | SILLB | JENNIBA | | | 03/12/2001 | 03/13/2001 | 01/31/2001 |
| 210685497 | SAMSOO | TIFFANy | TALINA | | 03/12/2001 | 02/07/2001 | 02/19/2001 |
| 211680884 | NUNEA | OLIVA | | | 03/12/2001 | 02/22/2001 | 03/01/2001 |
| 211680884 | TOUSSAINU | TYRONE | ANCY | | 03/12/2001 | 02/01/2001 | 03/01/2001 |
| 217847972 | AIBANB | OMOWUNMI | ALEDMAT | | 03/12/2001 | 02/22/2001 | 02/19/2001 |
| 220509654 | MARTINEA | ANTONIO | BRAVO | | 03/12/2001 | 02/22/2001 | 02/01/2001 |
| 223722433 | Jamel | Anita | Modjo | | 03/12/2001 | 02/12/2001 | 02/27/2001 |
| 225722272 | THOMAT | CHARLES | ANTHONY | | 03/12/2001 | 01/29/2001 | 02/27/2001 |
| 233685157 | NOBLF | SHINESE | LACY | | 03/12/2001 | 02/09/2001 | 02/27/2001 |
| 237047965 | CHENH | ICHEH | | | 03/12/2001 | 01/29/2001 | 01/31/2001 |
| 237822698 | MCLAURIO | CHRISTINE | RUTH | | 02/22/2001 | 02/08/2001 | 02/13/2001 |
| 238764046 | WASHINGTOO | LATOYA | KEOSHA | | 03/12/2001 | 03/13/2001 | 03/12/2001 |
| 239765056 | DREX | TINA | LOUISE | | 03/12/2001 | 02/26/2001 | 01/19/2001 |
| 240067741 | NDOEKB | ADANA | LYDIA | | 03/12/2001 | 02/12/2001 | 03/12/2001 |
| 242659214 | MARTINEA | YANIRES | BRAVO | | 03/12/2001 | 02/22/2001 | 02/02/2001 |

FIG.24A

Nominee Packet Progress Detail (grouped by complete/incomplete, Ethnic Group, ordered by SSN)

Date: 11/27/01

| SSN | LAST_NAME | FIRST_NAME | MID_NAME | ETH_GRP | NOMINEE | SUBMIT DATES NOMINATION | RECOMMEND |
|---|---|---|---|---|---|---|---|
| Complete | | | | | | | |
| 248748590 | HOLLAND | DAISHA | CHERON | | 03/12/2001 | 02/01/2001 | 02/27/2001 |
| 249864799 | YEO | F CHRISTIAN | | | 03/12/2001 | 01/31/2001 | 01/31/2001 |
| 252986568 | HAYSPELM | JALYLIA | ROSIELEE | | 03/12/2001 | 02/19/2001 | 02/27/2001 |
| 269642906 | NELSOO | LORI | BIANCA | | 03/12/2001 | 02/01/2001 | 03/01/2001 |
| 288643172 | ROKES | LATOYA | A | | 03/12/2001 | 02/19/2001 | 03/02/2001 |
| 297640414 | CHANEZ | MARISSA | DAWN | | 03/12/2001 | 02/13/2001 | 03/02/2001 |
| 315062797 | YOOO | SUE | HI | | 03/12/2001 | 02/08/2001 | 01/29/2001 |
| 316199229 | CHP | CHRISTINE | SHIN YOUNG | | 02/26/2001 | 02/12/2001 | 02/09/2001 |
| 323296130 | CAMPBELM | DEVELAND | CLINTON | | 03/12/2001 | 02/08/2001 | 02/07/2001 |
| 327131552 | ROACI | MYRA | ELIZABETH | | 03/12/2001 | 02/19/2001 | 03/12/2001 |
| 331316844 | YOUNH | DALY | | | 03/12/2001 | 01/27/2001 | 01/30/2001 |
| 337735794 | HAMILTOO | MICHELLE | ANDREA | | 03/12/2001 | 03/13/2001 | 03/01/2001 |
| 337671015 | CHOJ | HANNAH | KIM | | 03/12/2001 | 01/18/2001 | 02/19/2001 |
| 341439300 | KellZ | CANDACE | KanE | | 03/12/2001 | 01/30/2001 | 01/30/2001 |

FIG.24B

Nominee Packet Progress Detail (grouped by complete/incomplete, Ethnic Group, ordered by Nominee Name)

Date: 11/27/01

| SSN | LAST_NAME | FIRST_NAME | MID_NAME | ETH_GRP | NOMINEE | SUBMIT DATES NOMINATION | RECOMMEND |
|---|---|---|---|---|---|---|---|
| Complete | | | | | | | |
| 663539492 | GONCALVET | AMA | BURLAH | | 03/12/2001 | 02/26/2001 | 03/01/2001 |
| 217847972 | AIBANB | OMOWUNMI | ALEEMAT | | 03/12/2001 | 02/22/2001 | 02/19/2001 |
| 648730060 | ALVARADP | NATALIA | ANDREA | | 03/12/2001 | 02/19/2001 | 03/12/2001 |
| 558894336 | ALVIAS | TONI | MARK | | 03/12/2001 | 03/13/2001 | 02/02/2001 |
| 360416815 | Afini | Joshua | Jermaine | | 03/12/2001 | 02/12/2001 | 02/27/2001 |
| 351554133 | ASHMORF | MICHELLE | ANTOINETTE | | 03/12/2001 | 03/13/2001 | 02/27/2001 |
| 664715551 | BARAJAT | ALEJANDRO | LOPEZ | | 03/12/2001 | 02/08/2001 | 02/15/2001 |
| 692529240 | BARAIAT | LORENA | | | 03/12/2001 | 02/19/2002 | 03/12/2001 |
| 492909525 | BariLLaT | KoLo | Melissa | | 03/12/2001 | 02/19/2001 | 03/12/2001 |
| 625479436 | BEGAZ | CASSANDRA | CLARICE | | 03/12/2001 | 04/04/2001 | 04/04/2001 |
| 694205103 | BELLF | JAMEL | MARTIA | | 03/12/2001 | 01/30/2001 | 01/30/2001 |
| 519310348 | BESS | APRIL | | | 03/12/2001 | 02/26/2001 | 03/01/2001 |
| 650750136 | Bianco | Aaron | Freddy | | 03/12/2001 | 02/01/2001 | 03/12/2001 |
| 685514351 | BILLZ | JASON | A | | 03/12/2001 | 02/12/2001 | 03/12/2001 |
| 700249919 | BOJOrOUEA | SAHARA | METH | | 03/12/2001 | 01/30/2001 | 03/12/2001 |
| 654816551 | Boumet | Anoioh | Lorindo | | 03/12/2001 | 03/02/2001 | 02/27/2001 |
| 528471007 | BOYCF | JERRY | IFT | | 03/12/2001 | 02/12/2001 | 02/19/2001 |
| 516178415 | BRAXTOO | CRYSTAL | Kenee | | 03/12/2001 | 02/12/2001 | 02/13/2001 |

FIG.25A

Nominee Packet Progress Detail (grouped by complete/incomplete, Ethnic Group, ordered by Nomineed Name)

Date: 11/27/01

| SSN | LAST_NAME | FIRST_NAME | MID_NAME | ETH_GRP | NOMINEE | SUBMIT DATES NOMINATION | RECOMMEND |
|---|---|---|---|---|---|---|---|
| Complete | | | | | | | |
| 497926174 | BRAZZEIM | JUANITA | DEIONA | | 03/12/2001 | 02/26/2001 | 03/01/2001 |
| 608238112 | bristom | royonna | LAnAE | | 03/12/2001 | 02/13/2001 | 03/02/2001 |
| 488906782 | BROOKT | MICHELLE | LEE | | 03/12/2001 | 03/13/2001 | 02/12/2001 |
| 446724901 | Brownlef | KRYSTAL | SHANTRISE | | 03/12/2001 | 03/13/2001 | 02/19/2001 |
| 534793395 | CAMBRIDGF | SHANNON | MELISSA | | 03/12/2001 | 01/20/2001 | 01/20/2001 |
| 317131552 | CAMPBELM | DEVELAND | CLENTON | | 03/12/2001 | 02/09/2001 | 02/07/2001 |
| 566733542 | CAMPBELM | ERIN | TIANNA | | 03/12/2001 | 01/31/2001 | 02/23/2001 |
| 359671372 | CAMPBELM | Marcee | Lynn | | 03/12/2001 | 01/16/2001 | 02/12/2001 |
| 710446788 | CASA RODRS | Lucia | | | 03/12/2001 | 02/12/2001 | 02/27/2001 |
| 691591772 | Castillp | Grace | | | 03/12/2001 | 02/19/2001 | 03/02/2001 |
| 645759701 | CASTRP | BARBARA | MARRUTH | | 03/12/2001 | 02/07/2001 | 03/01/2001 |
| 297640414 | CHANEZ | MARISSA | DAWN | | 03/12/2001 | 02/13/2001 | 03/02/2001 |
| 723077629 | CHANH | EMILY | | | 03/12/2001 | 02/12/2001 | 02/13/2001 |
| 625714346 | CHAVEA | AMANDA | TERESA | | 03/12/2001 | 02/26/2001 | 03/01/2001 |

FIG. 25B

Complete Packages (ordered by Nominee SSN)

| Nominee Data: | | | | Recommender Data: | | Nominator Data: |
|---|---|---|---|---|---|---|
| SSN | SUBMIT_DATE | LAST_NAME | FIRST_NAME | RLNAME | RFNAME | NLNAME |
| 102666661 | 02/07/2001 | BALTAZAS | CHRISTOPHER | POF | BARBARa | POF |
| 103820267 | 02/22/2001 | MARCI | KELSEY | LEBLAND | NORM | LEBLAND |
| 104942831 | 01/30/2001 | Sayee | Momeno | Burdib | Johannah | Steb |
| 106929883 | 02/28/2001 | Pientf | Gdte | WESTOO | KAREN | POREN TURNF |
| 106943505 | 03/01/2001 | WANH | JING JING | Vaughao | David | Hambfsto |
| 1087655555 | 02/26/2001 | BERRINGT | AMBER | DUMOULIO | PETER | munfore |
| 109704131 | 02/01/2001 | Snoparskz | April | Deyes | Lorri | Rachem |
| 110666246 | 02/02/2001 | Hb | Sarah | KRAUST | FRANCES | BEGUO |
| 110724923 | 02/09/2001 | NGUYEO | KIMBERLY | AHEARO | MARCIA | Dehorenzp |
| 110804098 | 01/31/2001 | Maitlane | Dominick | Mitchelm | Daavid | Foster - Ahmee |
| 110841763 | 02/23/2001 | AKUKWF | VICTOR | LINSP | KATHLEEN | LUDWIH |
| 111645020 | 02/22/2001 | VITELLP | KATHERINE | WOODCOCL | DONNA | TIBRNEZ |
| 111662102 | 02/01/2001 | Givent | Punesha | Alstoo | Nolsenho | Bemhards |
| 111683631 | 01/30/2001 | Tsanh | On | O'Rourkf | Sally | O'Rourkf |
| 112644854 | 03/02/2001 | MYRIF | STEPHANIE | STAFFORE | RICHARD | Sullivao |
| 112666184 | 02/26/2001 | TALBOU | CHIRSTINE | KONKEM | HEIDI | FONDOX |
| 112660885 | 02/01/2001 | Tonh | Andrew | KIN | SOPHIA | FALLOO |

FIG.26A

Complete Packages (ordered by Nominee SSN)

| Nominee Data: | | | | Recommender Data: | | Nominator Data: |
|---|---|---|---|---|---|---|
| SSN | SUBMIT_DATE | LAST_NAME | FIRST_NAME | RLNAME | RFNAME | NLNAME |
| 113644174 | 02/22/2001 | RYAO | JAMILAH | CONNOLZ | JAMES | Skinnes |
| 113709561 | 02/01/2001 | Soi | Karen | Gaskilin | Terry | RYAO |
| 114645967 | 01/30/2001 | MB | Pei Pei | O'Neslim | Luke | Wintes |
| 114802528 | 02/01/2001 | Landep | Sandra | melendea | carmen | Goldsteio |
| 115649010 | 02/03/2001 | Powelm | Somantha | GUADULES8 | ONE NAME | ANDREWT |
| 115700542 | 02/12/2001 | Piercf | LAUREN | MURRAZ | WILLIAM | DiTolib |
| 115741077 | 02/23/2001 | XIAP | SHONG | MUHAMMAE | NAIMAH | muhammae |
| 115745377 | 01/22/2001 | Abinades | Olga | Costb | Diane | Rost |
| 115800770 | 02/23/2001 | AVENDANP | JUAN | GUZMAO | NILda | AMARAM |
| 116302031 | 02/03/2001 | Nsai | Luyombyo | Arthus | Kayenga | Arthus |
| 116303041 | 01/31/2001 | Henz | Ddungu | Joho | Seboana | Wilbes |
| 116446008 | 01/31/2001 | Huntes | Brandi | Gonzalet | Cathy | William |
| 116805102 | 01/30/2001 | Kin | Namcheol | Cool | Charles | Cool |
| 117642727 | 01/29/2001 | Correlb | Falynee | Eldes | Barbara | Caroo |
| 117642922 | 01/31/2001 | Phan | Phuong | Gorhan | Richard | Richardson |
| 117647502 | 02/23/2001 | BB | VIRGINIA | PHOUNH | SARDELM | COLEMAO |
| 117688652 | 03/12/2001 | VIESCB | ROBERT | NAGLOWSKZ | ALEX PAUL | Dempsez |
| 117703718 | 02/01/2001 | Moussoury | Crystal | Prosses | Michael | Prosses |
| 117704656 | 02/02/2001 | DelVam | Patrick | Merrilm | Diene | Merrilm |

FIG. 26B

Complete Packages (ordered by Nominee Name)

| Nominee Data: | | | | Recommender Data: | | Nominator Data: |
|---|---|---|---|---|---|---|
| SSN | SUBMIT_DATE | LAST_NAME | FIRST_NAME | RLNAME | RFNAME | NLNAME |
| 695734601 | 03/01/2001 | GARCIB | ADEIANA | COWAO | JUDY | COWAO |
| 635135834 | 02/23/2001 | HOPKGNT | ALIKA | Moiio | Daniel | SCHMIDS |
| 663539492 | 03/12/2001 | GONCALVET | AMA | Barue | Jerry | MASAIYIP |
| 629736099 | 02/22/2001 | HOYU | BRIAN | ANDEREGH | CATHY | TATT |
| 351650858 | 02/27/2001 | LALANJ | SHAZIA | ATKINT | MARY | ATKINT |
| 582029744 | 02/09/2001 | LEF | KAREN | Schula | Suzen | LONDOO |
| 525613739 | 02/09/2001 | NORTHINGTP | KEISHA | | | Smiti |
| 212828027 | 02/07/2001 | AAROO | JENEL | ROBERTT | SANDRA | Thomas-Aberdendel |
| 646957290 | 01/29/2001 | Astos | Bonivule | Oturb | michael | Demibf |
| 338530147 | 03/02/2001 | ABBOTS | LAQUENTIA | GIBBONT | MELINDA | KATTERMAO |
| 698108628 | 02/01/2001 | ABDALLAH-T | DANNY | COLOO | LORENZO | FOSECA-RIVJ |
| 658793016 | 02/09/2001 | ABDULLAJ | QADRMYAH | Santot | Juan | Baraibb |
| 460940084 | 02/13/2001 | ABEGUNDF | VERONICA | Leveo | Sara | Frauseo |
| 685757347 | 03/12/2001 | ABETB | JUDITH | BasenturH | | SCHUBAUFS |
| 523316859 | 02/22/2001 | abercrombif | steve | Costo | RodneY | MITCHELW |
| 115745377 | 01/22/2001 | Abiscades | Olga | Lodhj | Diane | Rost |
| 713469583 | 02/04/2001 | Aboulatic | Sarah | SUTTOO | Muhammed | TRIGAT |
| 461746049 | 02/19/2001 | ABRAHAN | JONATHAN | Redmone | Dr.JANICE | LOMBARDJ |

FIG. 27A

Complete Packages (ordered by Nominee Name)

| Nominee Data: | | | | Recommender Data: | | Nominator Data: |
|---|---|---|---|---|---|---|
| SSN | SUBMIT_DATE | LAST_NAME | FIRST_NAME | RLNAME | RFNAME | NLNAME |
| 509433123 | 03/12/2001 | ABRAHAN | MARQUETA | DITTMAS | TaJuana | WALKES |
| 511954253 | 02/22/2001 | ABRAHAN | SHERLY | Pedrj | LELLA | STRINGES |
| 620118077 | 01/26/2001 | Abram | Andrew | Hathorn Lynda | Dove | Floret |
| 325617449 | 02/19/2001 | ABUAGLB | FATIMA | FOSTES | | HATHORO |
| 588963910 | 03/01/2001 | Ace VEDP | NICOLE | | RODNEY | MILLZS |
| 193865418 | 01/25/2001 | Acheamponh | Mike | Christenseo | Fay | Christenseo |
| 546112404 | 02/07/2001 | ACKAI | STEPHEN | Kitowau | Steven | Bacl |
| 558916407 | 02/02/2001 | Acosib | Christian | VEGB | HENRY | Vegb |
| 563838619 | 01/31/2001 | Acosib | Veronica | Bustallot | Frank | Rogert |
| 481230187 | 02/01/2001 | Adabonyao | Olamide | Oloip | Agboola | Jonel |
| 164886932 | 02/07/2001 | Adao | Summaya | Landgratg | Laura | Landgratg |
| 479067856 | 02/22/2001 | AdAnnl | AKELIA | Newidrl | ulysses | WILSOO |
| 517336887 | 02/12/2001 | ADAMT | ALEXIS | MARSI | RANDALL | Westbrod |
| 359658125 | 01/31/2001 | Adamt | Kennedy | Harnno | Ajani | Fndnges |
| 557733330 | 02/28/2001 | ADDISCO | MICHAEL | SHURGOU | SYLVIE | JOHNSOO |
| 628817088 | 02/22/2001 | ADDZ | ANGELA | Hammone | Becky | Coy |
| 528573731 | 02/01/2001 | AdeMyj | Sen | Bumanglah | Jerome | Clifabo |
| 576355661 | 01/29/2001 | Adediraio | Adebolo | aHORF | FAYETTE | Landrz |

FIG. 27B

Complete Packages (ordered by Nominee Submit_Date)

| Nominee Data: | | | | Recommender Data: | | Nominator Data: |
| --- | --- | --- | --- | --- | --- | --- |
| SSN | SUBMIT_DATE | LAST_NAME | FIRST_NAME | RNAME | RFNAME | NUNAME |
| 551954311 | 12/23/2000 | Cotz | Adrienne | SLATT | WENDY | LANEZ |
| 637319108 | 12/29/2000 | Zbanh | Kang | Bolane | Megan | Alistos |
| 636964654 | 01/01/2001 | Sheft | Jamilia | Hudsoo | Dorothy | Davit |
| 390826435 | 01/04/2001 | Penymao | Jocelyn | Belm | Crystal | Davit |
| 349538106 | 01/05/2001 | Dysoo | Pemekarta | Gorf | Mebzetta | Vaughu |
| 607311814 | 01/05/2001 | Williamt | Corinn | DEEMES | ANNA | LINDSEZ |
| 731039006 | 01/05/2001 | Diggt | Asia | LACHANDB | NICOLE | Lachandb |
| 399889776 | 01/06/2001 | Davit | Leno | Supanoid | Frank | Supanoid |
| 703363321 | 01/06/2001 | YEUNH | ERNESTINE | Chubbud | Cynthia | SCHAEFFES |
| 450720987 | 01/07/2001 | Kinnez | Paul | Collins-Moorf | Leslie | Caffez |
| 625617070 | 01/08/2001 | Chavea | Joseph | Sandovam | Frances | LOPEA |
| 535671999 | 01/08/2001 | lshmel | Iaro | janet | patricia | Holmet |
| 733073652 | 01/08/2001 | Taz | Sophia | RAIDU | M | RAIDU |
| 541066876 | 01/09/2001 | Bserrb | Artemio | Blanci | Donna | BATTLET |
| 596864791 | 01/09/2001 | Diam | Bryan | SEALET | LLOYD | Bahr |
| 725644275 | 01/09/2001 | Hoguf | Ali | CROSBZ | EMERAL | CROSBZ |
| 470949413 | 01/09/2001 | Clarl | Randall | ELLIT | SOHPIA | ELLIT |
| 348270885 | 01/10/2001 | Hamiltoo | Elias | Simon-Edwardt | Vernell | Stowf |

FIG. 28A

Complete Packages (ordered by Nominee Submit_Date)

| Nominee Data: | | | | Recommender Data: | | Nominator Data: |
|---|---|---|---|---|---|---|
| SSN | SUBMIT_DATE | LAST_NAME | FIRST_NAME | RLNAME | RFNAME | NLNAME |
| 580805261 | 01/10/2001 | Willit | Jermese | Kolotp | Charles | Zoe |
| 552817525 | 01/11/2001 | Leam | Maria | Garzb | Efren | Chapmao |
| 252841799 | 01/11/2001 | Arboledb | Paula | Schrus | Myra | Wilsoo |
| 650770459 | 01/14/2001 | Leo | Mara | OLIVARET | ROSE | Lanta |
| 709086346 | 01/15/2001 | Vegb | Tyrone | De Lucib | Merry | Lipsoo |
| 565635330 | 01/15/2001 | Garsef | Veronica | Ryao | Anita | Ryao |
| 627970142 | 01/15/2001 | Avilea | Luz | ATKINT | Mary | Vandagnitg |
| 169701759 | 01/15/2001 | Xv | Mark | Hydel | Iris | Smtj |
| 634232730 | 01/15/2001 | Lj | Yiang | johninh | bAROLgr | Evant |
| 319277580 | 01/16/2001 | Lj | Danielle | Hansoo | Richard | Hansoo |
| 610869288 | 01/16/2001 | Cartes | Hormeh | Walm | Jesse | Crah |
| 550994778 | 01/16/2001 | Prichetu | Moliko | Mitchelm | Christopher | Golinl |
| 529313662 | 01/16/2001 | Langlez | Rhonda | jenkint | marsha | JENKINT |
| 233787953 | 01/17/2001 | Trao | Phong | Howlez | Sister Judy | Steiznes |
| 537493178 | 01/17/2001 | Hortoo | Brandon | Stewaru | Gloria | Morgao |
| 689418491 | 01/17/2001 | Pesaniea | Marcelo | Dacb | Rosalie | CHURCH-SMIU |
| 560674047 | 01/17/2001 | Malonf | Brandi | Hamt | Christine | Hayware |
| 214688850 | 01/18/2001 | Honh | George | Poltare | Alvera | O'Garro-Bayul |

FIG. 28B

Possible Duplicate Nominee Profile Submittals Based on SSN (ordered by SSN)

| ssn | last_name | first_name | middle_name | phone | email | street | city |
|---|---|---|---|---|---|---|---|
| 000000000 | dot | john | m | 0000000000 | illazzb | 0000000 | xxxx |
| 000000000 | Batel | MICHELLE | LYNN | 4805550738 | MLBATET@HOTMAIL.COM | 726 S. HARDY DR. | TEMPE |
| 000000000 | Bulles | Olive | E | 9545552171 | spapes1009@yahoo.com | 4502 Charleston Blvd | Fort Lauderdale |
| 000000000 | Lanies | Yzette | Angelique-Inez | 2025550035 | litshoeboy@aol.com | 3336 4th St NW #B1 | Washington |
| 000000000 | Otieno-Palo | Vanessa | Awinda | 9145558955 | Nyagwenp82@aol.com | 21 Lake Street | White Plains |
| 000000000 | h | g | abdulkarim | 0000000000 | 00000000 | 0000000 | 00000000 |
| 000000000 | mahfoudi | yassir | abdulkarim | 2545552050 | yassirammas@hotmail.com | 31 box97109 | mambsa |
| 108726067 | Billaop | Sara | Chan Soon | 8025554225 | Squisi29@aol.com | 31 Maple Street | Essex Junction |
| 108726067 | BILLADE | SARA | CHAN SOON | 8025554225 | SQUISI29@AOL.COM | 31 MAPLE STREET | ESSEX JUNCTION |
| 112662947 | Ongbanip | Toba | Muriel | 6095553467 | mutiatP@aol.com | 62 Heil Avenue | Trenton |
| 112662947 | Ongbanip | TOLU | MUTIAT | 6095553467 | MUTIATP@AOL.COM | 62 HEIL AVENUE | TRENTON |
| 1137769363 | Nguyeo | Tam-Le | Phue | 5085556528 | nguyentanlf@hotmail.com | 24 North Byron Ave. | Brockton |
| 1137769363 | NGUYEO | TANLE | PHUE | 5085556528 | NGUYENTANLF@HOTMAIL.COM | 24 NORTH BYRON AVE | BROCKTON |
| 114645967 | Mb | Pei Pei | | 6175557606 | peidron@yahoo.com | 53 Rindge Ave. | Cambridge |
| 114645967 | MB | Pei Pei | | 6175557606 | peidron@yahoo.com | 53 Rindge Avenue | Cambridge |
| 118645480 | PHAO | NAM | MINH | 6175558721 | NM09@AOL.COM | 940 QUINCY SHORE DRIVE | QUINCY |
| 118645480 | phao | nam | minh | 6175558721 | nmq9@aol.com | 940 quincy shore drive | quincy |
| 122642411 | Jean-Jacquet | Alexandra | | 4075550215 | xelb72983@hotmail.com | 705 Holbrook Circle | Lake Mary |
| 122642411 | JEAN-JACQUET | ALEXANDRIA | | 4075550215 | xelb72983@hotmail.com | 705 HOLBROOK CIRCLE | LAKE MARY |

FIG. 29A

Possible Duplicate Nominee Profile Submittals Based on SSN (ordered by SSN)

| ssn | last_name | first_name | middle_name | phone | email | street | city |
|---|---|---|---|---|---|---|---|
| 122645343 | Walkes | Bonita | D. | 6175242195 | applebonf@yahoo.com | 60 Lamartine St. | Boston |
| 122645343 | walkes | bonito | d | 6175552195 | applebonf@yahoo.com | 60 lamartine street | boston |
| 122645343 | WALKES | BONITA | D | 6175552195 | applebonf@yahoo.com | 60 LAMARTINE ST | BOSTON |
| 122645382 | eldridgf | jovon | tarosha | 4135553003 | centrj2001@aol.com | 394 fernbank rd | springfield |
| 122645382 | eLDRIDGf | JOVON | TPRASHA | 4135553003 | CentRJoo1@aol.COM | 394 rernBANk RD | SPRINGFIELD |
| 122808409 | Agunwamb | Chioma | Adaeze | 6175557029 | Nwaomb2000@hotmail.com | P O BOX 271 | Dorchester |
| 122808409 | Agunwamb | Chioma | Adaeze | 6175557029 | Nwaomb2000@hotmail.com | POBox 271 | Dorchester |
| 123668877 | Guzman | Melissa | Alejandra | 3105559355 | DJMelyH1283@aol.com | 951 Main Street | El Segundo |
| 123668877 | Guzman | Melissa | Alejandra | 3105559355 | DJMelyH1283@aol.com | 951 Main Street | El Segundo |
| 124727785 | Anandb | Aravinda | Joy | 4135550417 | aravinda_anandb@missporter's.org | 773 Chapel Road | Savoy |
| 124727785 | ANANDB | ARAVINDA | JOY | 4135550417 | ARAVINDA_ANADA.B@MISSPORTER'S.ORG | 773 CHAPEL RD | SAVOY |
| 124727785 | ANANDB | ARAVINDA | JOY | 4135550417 | ARAVINDA_ANANDA.B@MISSPORTERS.ORG | 773 CHAPEL ROAD | SAVOY |
| 126783025 | Kin | Hanna | | 4135557660 | H44nb@cs.com | 253 Colonial Village Apts. | Amherst |
| 126783025 | KIN | HANNA | | 4135557660 | H44NB@CS.COM | 253 COLONIAL VILLAGE APTS | AMHERST |
| 128720569 | Kin | So-One | Hwang | 6175559426 | skin@groton.org | 71 Bateman Street | Roslindale |
| 128720569 | KIN | SO ONE | HWANG | 6175559426 | SKIN@GROTON.ORG | 71 BATEMAN STREET | ROSLINDALE |
| 129648802 | PAISIBLF | ANNE LISE | | 7815551271 | APAISIBLF.67@YAHOO.COM | 2425 SALEM STREET | MALDEN |
| 129648802 | PAISIBLF | ANNE LISE | | 7815551271 | apaisibf.@yahoo.COM | 2425 SALEM STREET | MALDEN |
| 129703484 | Ibeabuchj | Chizoba | Chidiogo | 6175553678 | TweetyChig@hotmail.com | 40 Bradlee Street | Hyde Park |
| 129703484 | IBHABVCHJ | CHIZOBA | CHIDIOGO | 6175553678 | TWEETYCHIOJ@HOTMAIL.COM | 40 BRADLEE STREET | HYDE PARK |
| 133705724 | FREEMAO | HOPE | DEMEgE | 6175555593 | hFREEMAO15@excite.com | 33 CALDER STREET | DORCHESTER |

FIG.29B

Possible Duplicate Nominee Profile Submittals Based on SSN (ordered by Name)

| ssn | last_name | first_name | middle_name | phone | email | street | city |
|---|---|---|---|---|---|---|---|
| 125590995 | IP | FAVIOLA | CANDY | 7035559019 | lewis@Yahoo.COM | 3456 N dICKERSON ST | Arlington |
| 195681353 | DABADZ | SHANTEL | | 6095551781 | CHANTF194@HOME.COM | 7 THORNHILL COURT | WILLINGBOR |
| 351650858 | LALANJ | SHAZIA | ROXENA | 8645554931 | GIGGEA598@AOL.COM | 3553 OLD FURNACE RD | BOILING SPRIN |
| 665751233 | SALAZAS | GINA | MAUREEN | 2095551058 | GINAMAUREF@YAHOO.COM | PO BOX 309 | TUOLUMNE |
| 137604542 | VILLEGAT | WILSON | AYLEY | 4015557701 | COLOMBIANITP2000@HOTMAIL.COM | 75 BOSTWELL | PAWTUCKET |
| 1234567889 | a | a | a | 2345554565 | aaa | aa | aa |
| 1234567889 | abc | a | a | 1111111111 | a | a | a |
| 461746049 | Abrahan | Jonathan | | 7185558329 | Arid762212@aol.com | 365-10 Francis Lewis Blvd. | Rosedale |
| 461746049 | ABRAHAN | JONATHAN | | 7185553329 | ARIC762212@AOL.COM | 365 10 FRANCIS LEWIS BLVD | ROSEDALE |
| 686804792 | Adb | Aileen Moe | Cabrera | 6705551988 | Leah6710@hotmail.com | P.O. BOX 612346 | Saipan, MP |
| 686804792 | Adb | Aileen Moe | Cabrera | 6705551988 | Leah6710@hotmail.com | P.O. BOX 612346 | Saipan, MP |
| 164886932 | ADAN | SUMMAYA | NAZ | 7185550379 | TMZSONT@HOTMAIL.COM | 46-70 160TH STREET | FLUSHING |
| 164886932 | Adan | Summaya | Naz | 7185550379 | tmzsont@hotmail.com | 46 70 160 Street | Flushing |
| 164886932 | Adan | Summaya | Naz | 7185550379 | tmzsont@hotmail.com | 46 70 160 Street | Flushing |
| 692827285 | Adam | Mark | Joseph | 3055550909 | segafanad9@hotmail.com | 21425 SW 115 CT | Miami |
| 692827285 | Adam | Mark | Joseph | 3055550909 | segafanad@hotmail.com | 21425 SW 115 CT | Miami |
| 527497857 | Adam | Rander | Giovonni Hakeem | 6315551974 | gioadamt@yahoo.com | 2558 Woodell Drive | Jackson |
| 527497857 | Adam | Rander | Giovanni Hakeem | 6315551974 | gioadamt@yahoo.com | 2558 Woodell Drive | Jackson |
| 555855143 | ADEYEYF | Adenike | Olutobi | 8175550556 | NIKF-6@juno.com | 4137 Pioneer Street | Fort Worth |

FIG. 30A

Possible Duplicate Nominee Profile Submittals Based on SSN (ordered by Name)

| ssn | last_name | first_name | middle_name | phone | email | street | city |
|---|---|---|---|---|---|---|---|
| 686767848 | Adorabif | REBECCA | ANgeline | 6306555051 | bexpey12@aol.com | 310 s wood dale RD | WOOD DALE |
| 686767848 | Adorabif | Rebecca | Angeline | 6306555051 | BEXPEY12@aol.com | 310 S Wood Dale RD | WOOD DALE |
| 1228808409 | Agumwamc | Chioma | Adeeze | 6175557029 | Nwaomb2000@hotmail.com | P O Box 160 | Dorchester |
| 1228808409 | Agumwamc | Chioma | Adeeze | 6175557029 | Nwaomb2000@hotmail.com | POBox 271 | Dorchester |
| 205801439 | Agwoji | Uchenna | Nkemjika | 5165557582 | gx5169@hotmail.com | 8 Newburgh St. | Elmont |
| 205801439 | AGWOJU | UCHENNA | NKEMJIKA | 5165557582 | GX5169HOTMAIL.COM | 8 NEWBURGH ST | ELMONT |
| 342652519 | Albergottij | April | Anita | 8045554049 | krayagim59@aol.com | 6924 Victoria Park Terrace | Richmond |
| 342652519 | ALBERGOTTJ | APRIL | ANITA | 8045554049 | KRAYZGRM599@AOL.COM | 6924 VICTORIA PARK TERRACE | RICHMOND |
| 7053668616 | Alexandes | Frederick | Eugene | 6265550406 | alexgroup@earthlink.net | 2002 N. Los Robles Ave. | Pasadena |
| 7053668616 | alexandes | frederick | eugene | 6265550406 | alexgroup@earthlink.net | 2002 n los robles ave | pasadena |
| 486983858 | Alexandes | Ivory | La Juan | 3135552604 | Honez081@aol.com | 30561 Klinger | Detroit |
| 486983858 | Alexandes | Ivory | Laduan | 3135552604 | Honez081@aol.com | 3056 Klinger | Detroit |
| 486983858 | ALEXANDES | IVORY | LASUAN | 3135552604 | HONEZ081@aol.com | 29974 Pasadero Drive | detroit |
| 211661535 | Alj | Anastasia | Nichole | 8185559465 | Goodjam251@aol.com | 27171 VENTURA BLVD 347 | Tarzana |
| 211661535 | ALJ | ANASTASIA | NICHOLE | 8185559465 | GOODGAM251@AOL.COM | 5320 Pamola Lake Circle | ENCINO |
| 694189933 | Alj | Fareed | Dawud | 7705557424 | galj@clatanta.ga.us | 5320 PANOLA LAKE CIRCLE | Lithonia |
| 694189933 | ALJ | FAEED | DAWUD | 7705557424 | galj@cladanta.ga.us | 512 Preckness Ave | Lithonia |
| 242985466 | Alj | Manojir | Donwid | 9735557865 | afj3897@yahoo.com | 512 Preckness Avenue | Paterson |
| 242985466 | Alj | Manokir | DAWUD | 9735557865 | lfj3897@yahoo.com | 2517 S GEORGE MASON DR | Paterson |
| 5171178729 | ALLEO | MARTINELLE | | 7035559110 | PHOENIX.NOMAILCITY.COM | | ARLINGTON |

FIG.30B

Nominee Detail Data (Ordered by SSN/All Records):

| SSN | EC | LAST_NAME | FIRST_NAME | MIDDLE | SUFFIX | STREET | APT_NBR | CITY |
|---|---|---|---|---|---|---|---|---|
| | 00 | ALLEN | CICELY | DIANE | | 566 FORELLE COURT | | CLIFTON |
| | 00 | ANTHONZ | DOREEN | DORLA | | 989 W 40TH PLACE | | LOS ANGELES |
| | AA | BORUNDB | JORGE | | | 21718 GiLBert Rd | | YAKIMA |
| | 00 | BROOKT | LATOYA | DENISE | | 212 EAST EDGE 140B | | SOUTH HOUSTON |
| | AA | CHARBONNES | ANDRALETA | THERESA | | 827 SOUTH ORANGE GROVE AVE | | LOS ANGELES |
| | AA | dariem lef | | M | | COLUMBUS GA | | |
| | 00 | DELACRUA | STEPHANIE | LYNN | | 424 LYONS DR | | BOLINGBROOK |
| | 00 | GREEO | chARLIE | KIM | | 7939 Silverwood COURT | | Norfolk |
| | AA | HORnf | ANDREA | NICOLE | | 2021 LONGDALE DR | | deCATUR |
| | AA | KINH | SHONNA | Renee | | 215 EAST 12d | | BROKEN BOW |
| | HA | Lizarragb | Noemi | | | 754 East Merion St | | OntArio |
| | AP | LZ | CHINH | DINH | | 648 SOUTH 5th 1 | | SAN JOSE |
| | 00 | MAHF | TEVITA | MAPILIVAI | | 3148 36TH AVENUE | | OAKLAND |
| | AA | Nwalv | Charles | ObkinA | | 5523 Rollingbrooks Court | | Alexandria U |
| | AA | SIDIGV | ANNAH | OMUNE | | 032 BRIDGE ST | | DAYTON |
| | 00 | SIDIGV | ANNAH | OMUNE | | 032 BRIDGE STREET | | DAYTON |
| | AA | Sidigv | Annah | Omune | | 032 Bridge Street | | Dayton |

FIG.31

Nominee Detail Data (Ordered by Name/All Records):

| SSN | EC | LAST_NAME | FIRST_NAME | MIDDLE | SUFFIX | STREET | APT_NBR | CITY |
|---|---|---|---|---|---|---|---|---|
| 000000000 | 00 | | | | | | | |
| 165769191 | AA | HITF | TIFFANY | MICHELLE | | 838 SOUTH MAIN STREET | | HINESVILLE |
| | 00 | MAYARE | MICHELLE | ANGELA | | 666 NW 164 AVE | | PEMBROKE PINES |
| | 00 | | | | | | | |
| 668772495 | 00 | | amy | allison | | 9 san pedro pl | | san ramon |
| 720142464 | HA | | duran | gabriel | | 2802 bicoyne way | | san jose |
| 621415054 | | | SANCHEZ | SELENE | ROA | 2447 W NEVADA PL | | DENVER |
| 701059689 | AA | SMITI | NAUNDRIA | J JARLEGO | | 7692 N POSITANO WAY | | TUCSON |
| 653816272 | HA | ROSAT | CARMEN | MARIE | | 7373 NOEL AVENUE | | NEWARK |
| 695734601 | AA | GARCIB | ADEIANA | | | 2976 WAKEEN DRIVE | | COCOUNT GROVE |
| 678157871 | 00 | Edwardt | Mercedes | Shirley | | 5319 4th Street Nw | | WASHinGtoN |
| 655135834 | AP | HOPKINT | ALIKA | AZEEZ SALEH | | 902 MAKANI ROAD | | PUKALANI |

FIG. 32A

Nominee Detail Data (Ordered by Name/All Records):

| SSN | EC | LAST_NAME | FIRST_NAME | MIDDLE | SUFFIX | STREET | APT_NBR | CITY |
|---|---|---|---|---|---|---|---|---|
| 752019245 | 00 | CHUONH | TOAN | QUOC | | 2117 ScarLet OAK Drive | | COLORADO SPRINGS |
| 456782646 | | DATTB | PRODEEP | | | 371 SHAG BARK LANE | | STREAMWOOD |
| 663539492 | | GONCALVET | AWA | BUHLAE | | 3332 E 27TH ST | | OAKLAND |
| 208769141 | | GUTIERREA | SOFIA | REYNA | | 71 MAIN STREET | | FARMINGTON |
| 418743333 | HA | gutierrea | Xavier | Isaac | | 4684 Fernsmuir St | | Riverside |
| 629736099 | AP | HOYU | BRIAN | ALEXANDER | | 056 N COLORADO STREET | | SALT LAKE CITY |
| 339578293 | AJ | HUNU | MATTHEW | HENSDALE | | 649 GERALD RD | | FAIRMONT |

FIG. 32B

FIG. 33

Nominee Detail Data (Ordered by EthnicCode/Name/All Records):

| SSN | EC | LAST_NAME | FIRST_NAME | MIDDLE | SUFFIX | STREET | APT_NBR | CITY |
|---|---|---|---|---|---|---|---|---|
| 668772495 | 00 | | amy | allison | | 9 san pedro pl | | san ramon |
| 621415054 | 00 | | SANCHEZ | SELENE | ROA | 2447 W NEVADA PL | | DENVER |
| 678157871 | 00 | Edwardl | Mercedes | Shirley | | 5319 4th Street Nw | | WASHinGtoN |
| 752019245 | 00 | CHUONH | TOAN | QUOC | | 2117ScarLet OAK Drive | | COLORADO SPRINGS |
| 456782646 | 00 | DATTB | PRODEEP | | | 371 SHAG BARK LANE | | STREAMWOOD |
| 663539492 | 00 | GONCALVET | ANA | BUHLAE | | 3332 H 27TH ST | | OAKLAND |
| 726624968 | 00 | TRAO | HIEU | TRUNG | | 21451 PRADERA 16 | | MONTCLAIR |
| 517336882 | 00 | WILLIAMT | SHAWANDA | LATRICE | | 719 11th COURT WESt | | BIRMINGHAM |
| 000000000 | 00 | HITE | TIFFANY | MICHELLE | | 838 SOUTH MAIN STREET | | HUNtSVILLE |

FIG.34A

Nominee Detail Data (Ordered by EthnicCode/Name/All Records):

| SSN | EC | LAST_NAME | FIRST_NAME | MIDDLE | SUFFIX | STREET | APT_NBR | CITY |
|---|---|---|---|---|---|---|---|---|
| 685257347 | 00 | ABIETB | JUDITH | MAUREEN | | POST OFFICE BOX 215 | | SANTO DOMINGO PUEBLO |
| 546112404 | 00 | ACKAJ | STEPHEN | NDEDE | | 4524 KINGS ROA321 | | STEGER |
| 000000000 | 00 | ACOSTA-MIRANDB | ARIEL | ESAU | | 4 FREEMAN ST | | DORCHESTER |
| 89721998 | 00 | ACOSTA-MIRANDB | ARIEL | Esau | | 4 FREEMAN ST | | DORCHESTER |
| 150701005 | 00 | ADABB | SABRINA | CHINYE | | 2842 MELVILLE #4 | | BRONX |
| 63789604 | 00 | ADEDAPQ | ADEDOLAPO | | | 08 26 HORACE H18E | | CORONA |
| 153869332 | 00 | Adedeji | Olucasif | Olunefunmolayo | | 791 Park Avenue | | Uniondale |
| 572047995 | 00 | ADEGBONMIRF | ADEWOLE | BABATUNDE | | 426 MYRTLE AV 2ND FLOOR | | IRVINGTON |

FIG. 34B

Nomination Floaters with Possible Nominee Linkages (ordered by Nominee Name, SSN)

| | Nominee_Profile Data | | | | | Nomination Data | | |
|---|---|---|---|---|---|---|---|---|
| Last_Name | First_Name | Mid_Name | NOMEssn | NOMEphone | NOMEssn | NOMELast_Nam | NOMRLast_Nam | NOMRFirst_Nam |
| | SANCHEZ | SELENE | 621415054 | 3035557138 | 530510592 | | HARRIT | BRENT |
| | SANCHEZ | SHLENE | 621415054 | 3035557138 | 651751613 | | BROOKT | Marilyn |
| | amy | allison | 668772495 | 9255554974 | 530510592 | | HARRIT | BRENT |
| | amy | allison | 668772495 | 9255554974 | 651751613 | | BROOKT | Marilyn |
| | duran | gabriel | 720142464 | 4085552662 | 530510592 | | HARRIT | BRENT |
| | duran | gabriel | 720142464 | 4085552662 | 651751613 | | BROOKT | Marilyn |
| | TOAN | QUOC | 652019245 | 7195550859 | 648835765 | | THOMPSOO | PAUL |
| CHUONH | SOFIA | REYNA | 208769141 | 8605553985 | 620313551 | Chuonh | VAN EPPT | LARRY |
| GUTIERREA | Xavier | Isaac | 418743333 | 9095550961 | 620313551 | Gutiemea | VAN EPPT | LARRY |
| gutiemea | KEVIN | MARSHALL | 459743813 | 3125554461 | 316044253 | Gutiemea | GRAVET | MONIQUE |
| PINKNEZ | PRINCESS | NICOLE | 356692500 | 7065552731 | 519170563 | Pinknez | DICKINSOO | DAVID |
| THOMAT | ERICA | MARIE | 182684497 | 7185559428 | 92683497 | THOMAT | WOODROFFF | STELLA |
| UBIERB | SHAWANDA | LATRICE | 517336882 | 2055557462 | 415905653 | UBIERB | BOYDEO | JAMIE |
| WILLIAMT | Rosa Anne | Potio | 711766500 | 9255557338 | 432806052 | WILLIAMT | Kapleuo | Kirsten |
| Abae | QADRIYYAH | SABREEN | 658793016 | 6195557221 | 249904792 | Abae | Mott | Patricia |
| ABDULLAI | Steve | Nicokci | 625415010 | 5055551377 | 685757347 | Abdullai | SCHUBAUFS | PATRICIA |
| Abeitb | JUDITH | MAUREEN | 685757347 | 5055550178 | 625415010 | ABEITB | Meroes | Joseph |
| ABEITB | steve | | 523319859 | 2055555225 | 668951345 | Abeitb | Arceo | Debbie |
| abercrombit | Bency | | 197722241 | 5165550028 | 461746049 | Abercrombit | LOMBARDJ | MARCY |
| Abrahan | Bency | | 197722241 | 5165550028 | 551954253 | ABRAHAN | STRINGES | JO ANN |
| Abrahan | Bency | | 197722241 | 5165550028 | 509433123 | ABRAHAN | WALKES | WALKER |

FIG.35A

Nomination Floaters with Possible Nominee Linkages (ordered by Nominee Name, SSN)

| Last_Name | Nominee_Profile Data First_Name | Mid_Name | NOMEssn | NOMEphone | NOMEssn | Nomination Data NOMELast_Nom | NOMRLast_Nom | NOMRFirst_Nam |
|---|---|---|---|---|---|---|---|---|
| Abrahan | Bency | | 197722241 | 5165550028 | 553896578 | Abrahan | Simmont | Bobby |
| Abrahan | Bency | | 197722241 | 5165550028 | 560655718 | Abrahan | Thompson | Dione |
| Abrahan | Bency | | 197722241 | 5165550028 | 5529335635 | Abrahan | Morisoo | Glenno |
| Abrahan | Bency | | 197722241 | 5165550028 | 608088985 | Abrahan | McKinnez | Diane |
| Abrahan | Bency | | 197722241 | 5165550028 | 7304444095 | Abrahan | Hedstrom | Erik |
| Abrahan | Bency | | 197722241 | 5165550028 | 238760486 | Abrahan | Pulavecchip | Rosemary |
| Abrahan | Sarah | | 238760486 | 2015551427 | 4617464049 | ABRAHAN | LOMBARDJ | MARCY |
| Abrahan | Sarah | | 238760486 | 2015551427 | 5519354253 | ABRAHAN | STRINGES | JO ANN |
| Abrahan | Sarah | | 238760486 | 2015551427 | 5094331123 | ABRAHAN | WALKES | WALKER |
| Abrahan | Sarah | | 238760486 | 2015551427 | 553896578 | Abrahan | Simmont | Bobby |
| Abrahan | Sarah | | 238760486 | 2015551427 | 560655718 | Abrahan | Thompson | Diane |
| Abrahan | Sarah | | 238760486 | 2015551427 | 5529335635 | Abrahan | Morisoo | Glenno |
| Abrahan | Sarah | | 238760486 | 2015551427 | 608088985 | Abrahan | McKinnez | Diane |
| Abrahan | Sarah | | 238760486 | 2015551427 | 7304444095 | Abrahan | Hedstrom | Erik |
| Abrahan | Westie | Shorice | 318133702 | 4105550385 | 4617464049 | ABRAHAN | LOMBARDJ | MARCY |
| Abrahan | Westie | Shorice | 318133702 | 4105550385 | 5519354253 | ABRAHAN | STRINGES | JO ANN |

FIG. 35B

Nomination Floaters (ordered by Nominee SSN)

| NOMEssn | NOMELast | NOMRLast_Nam | NOMRFirst_Name | NOMRphone | STREET | APT_NBR | CITY |
|---|---|---|---|---|---|---|---|
| | Ignore | | | | | | |
| | Smiti | Loddenquare | David | 6315551231 | 27 Boywoods Drive | | Hampton Bays |
| | Odeno-Palf | O'Gero-Bayul | Jo-Ann | 9145557803 | 713 Woodland Hills Road | | White Plains |
| | Wolfgran | Wolfgran | Barbara | 8185555815 | 24093 Olive Grove Ln. | | Sylmar |
| | Brewtoo | Rincoo | Josephine | 5205552121 | 037 South Third Avenue | #B | Tucson |
| | Brewtoo | Rincoo | Josephine | 5205552121 | 037 South Third Avenue | #B | Tucson |
| | Kizb | Cool | Charles | 7815550213 | 294 Washington Street | | Arlington |
| | Calderoo | Satntiagp | Carmen | 7875554480 | Manibel 2616 | 5-C | Santurce |
| | kristen daz | schmahm | david | 5805559668 | 2626 sw67th street | | lawton |
| | FOOTMAO | MOHLES | LORI | 5615555030 | 4616 Shiloh Dr | | West Palm Beach |
| | ROSE ASHLEZ | HAZUGB | Larry | 8125556601 | 2911 FOX HOLLOW WAY | | JEFFERSONVILLE |
| | Kairf | Houlemane | Renee | 6265555716 | 2313 N. Chester Avenue | | Pasadena |
| | Riverb | Stololg | Byron | 2155559440 | 262 W Luzerne St | | Phila. |
| | Hamiltoo | Towerl | Chris | 9155559730 | 4910 Saco Ct | | El Paso |
| | Shelley Gumbt | Hansoo | Arlene | 9785554806 | 10 Willis Road | | Peabody |
| | Filsaimf | Cloudmao | David | 9545550992 | 4060 SW 84th Terrace | | Davie |
| | Coloo | Carcz | Lisa | 9315555675 | 5171 Toler Road | | Woodlawn |
| | Taylos | Nunlez | Denise | 4805555711 | 3141 E Credance Blvd | | Phoenix |
| | Taylos | Nunlez | Denise | 4805555711 | 3141 E Credance Blvd | | Phoenix |
| | Siglas | Everetu | Teresa | 3185555992 | 0498 Stonebrier Circle | | Shreveport |

FIG. 36A

Nomination Floaters (ordered by Nominee SSN)

| NOMEssn | NOMELast | NOMRLast_Num | NOMRFirst_Name | NOMRphone | STREET | APT_NBR | CITY |
|---|---|---|---|---|---|---|---|
| | Chunh | Treadwaz | Patricia | 5015556804 | 10 Terrance Dr. | | Little Rock |
| | Kin | Treadwaz | Patricia | 5015556533 | 10 Terrance Dr. | | Little Rock |
| | Kin | Treadwaz | Patricia | 5015556533 | 10 Terrance Dr. | | Little Rock |
| | m | CHAVEA | DANNY | | P O BOX 225 | | BUENA VISTA |
| | m | CHAVEA | DANNY | | P O BOX 225 | | BUENA VISTA |
| | Pete Perrattb | Aielip | FRancine | 6025556300 | 5814 East Indian School Road | | Phoenix |
| | HANSOO | GAFKEO | ROGER | 9105554366 | 6866 SENOMA PLACE | | FAYETTEVILLE |
| | VERDEIP EDMB | GARCIB | IDALISSE | 7875558390 | RIO GRANDE ESTATES D44 FF3 | | RIO GRANDE |
| | de santiagp | dox | sara | 9155558400 | 337 podirilo diaz | | el paso |
| | GREEO | CHISHOLN | ELAINE | 7085550139 | 20236 LOOMIS AVENUE | | HOMEWOOD |
| | FREDERICKT | CAMQ | MICHELLE | 7575555031 | 3114 MANASSAS RUN | | VIRGINIA BEACH |
| | CUJ | ROBERTSOO | SHEILA | | 9111 CROOM ROAD | | UPPER MARLBORO |
| | FREDERICKT | GAMBARELLJ | ROBERT | 7035552325 | 711 KEARNEY CT SW | | VIENNA |
| | | ROBERTSOO | SHEILA | | 9111 CROOM ROAD | | UPPER MARLBORO |
| | | Rosf | ashleigh | 5125555138 | 312 south bounds | | THrol |

FIG.36B

Nomination Floaters (ordered by Nominee Last Name, SSN)

| NOMEssn | NOMELast_Name | NOMRLast_Name | NOMRFirst_Name | NOMRphone | STREET | APT_NBR | CITY |
|---|---|---|---|---|---|---|---|
| | | COBC | EMMETT | 5205556913 | PO BOX 466 | | MANY FARMS |
| | | CIB | WILLIAM | 3055555703 | 21764 SW 253 LANE | | MIAMI |
| | | COBC | JOSHUA | | 842 MADISON ST NE | | MINNEAPOLIS |
| | | SMITI | SUSAN | 7035558500 | 0333 ANDREW DR | 3 | MANASSAS PAR |
| | | SMITI | LOUTA | 9145553254 | 2031 MCGRAW AVE | | BRONX |
| | | ADAMS GREEO | TARRI | 6515555906 | 2326 SGERREB STREET WEST | 5D | ROSEVILLE |
| | | LEVINF | EMMETT | 5205556913 | PO BOX 466 | | MANY FARMS |
| | | BIB | WILLIAM | 3055555703 | 21764 SW 142 LANE | | MIAMI |
| | | COBC | JOSHUA | | 842 MADISON ST NE | | MINNEAPOLIS |
| | | SMITI | SUSAN | 7035558500 | 0333 ANDREW DR | 3 | MANASSAS PAR |
| | | SMITI | LOUTA | 9145553254 | 2031 MCGRAW AVE | | BRONX |
| | | ADAMS GREEO | TARRI | 6515555906 | 2326 SGERREB STREET WEST | 5D | ROSEVILLE |
| | | LEVINF | ELANE | 7085550139 | 20236 LOOMIS AVENUE | | HOMEWOOD |
| | | CHISHOLN | CRAIG | 9095553802 | 40912 NOTTINgHILL Rd | | MUNIETA |
| | | EDMUNDT | ELANE | 7085550139 | 20236 LOOMIS AVENUE | | HOMEWOOD |
| | | CHISHOLN | | | | | |
| | Rost | | osleigh | 5125555138 | 312 south bounds | | Tlroll |
| | WHITF | | WESLEY | 3235556060 | 4215 VIA BREVE | | MONTEBEllo CA |
| 530510592 | HAYET | | TOMMY | 3525553131 | 31 W WOODWARD AVENUE | | EUSTIS |
| | HARRIT | | BRENT | 8705553118 | 217 SCHOOL | | WEST HELENA |

FIG.37A

Nomination Floaters (ordered by Nominee Last Name, SSN)

| NOMEssn | NOMELast_Name | NOMRLast_Name | NOMRFirst_Name | NOMRphone | STREET | APT_NBR | CITY |
|---|---|---|---|---|---|---|---|
| 553952059 | GALLARE | RODRIGUEA | MARIA | 9565556815 | 7235 N SHARY RD | | MISSION |
| 700073992 | WELLT | conklio | Kerry | 5025558269 | 629 MOSER ROAD | | Louisville |
| 720226667 | FLOS | THOMAT | JOHN | 7075556550 | 8524 WOODLAND AVE | | SEBASTOPOL |
| 91743349 | ANDREWT | LEEC | MARILYN | 7035556233 | 8411 CHURCH HILL RD | | MCLEAN |
| 446726654 | DAVIT | TURNES | PATRICIA | 7085552049 | 28912 OAKWOOD DRIVE | | HAZEL CREST |
| 559738177 | LAWSOO | BAROCAT | SUSAN | 716555904 | 26 ASBURY ST | | ROCHESTER |
| 174687327 | ABRAHAM, TP | KENKNIGHU | JANE | 7635554405 | 5410 GRIMES AVE NORTH | | ROBBINSDALE |
| 750093613 | ACHEAMPONH | PALOmBm | SUSAN | 8035552444 | 931 GREGG STREET | | COLUMBIA |
| 320028196 | Acref | SaPovitt | Thomas | 4105554053 | 34260 TuckAhoe Springs DrNe | | Denton 1 J |
| 487967140 | BARBOUS | BEZARF | JOEL | 6155556834 | 2119 NEEDHAM DR | | SMYRNA |
| 359430381 | Bowmao | Whitf | Denise | | 416 Bowmont St | | Lavonia |
| | BrYe | Lamplez | Jessie | 6625555314 | 4560 HWY 373 | | COLUMBUS |
| | Burtf | Morrf | ROnald | 9145558094 | 07 BrooksIDE PLACE | 525 | New Rochelle |
| | Burtf | Morrf | ROnald | 9145558094 | 07 BrooksIDE PLACE | | New Rochelle |
| 553952059 | CaMQ | MORRISOo | RAndy | 6095552548 | 26 LARCHMONT CouRt | | PenningtoN |

FIG.37B

Nominator Detail Data (ordered by Nominee SSN/All Records):

| NOME_SSN | NOME_LNAME | NOMR_LNAME | NOMR_FNAME | MID_NAME | SUFX | STREET | APT_NBR | CITY |
|---|---|---|---|---|---|---|---|---|
| ignore | | | | | | | | |
| | Smith | Loddengaare | David | Michael | | 27 Bayroods Drive | | Hampton Bays |
| | Otheno-Patb | O'Garro - Bayul | Jo-Ann | L | | 703 Woodland Hills Road | | White Plains |
| | Wolfgran | Wolfgran | Barbara | Ruth | | 24093 Olive Grove Ln. | | Sylmar |
| | Wolfgran | Riacoo | Josephine | Janice | | 036 South Third B#B | | Tucson |
| | Brewtoo | Riacoo | Josephine | Janice | | 036 South Third B#B | | Tucson |
| | Kin | Cool | Charles | Wilfred | | 294 Washington Street | | Arlington |
| | Cattleroo | Santiago | Carmen | D | | Maribel 2616 | 5-C | Santurce |
| | kristin daz | schmahm | devid | edward | | 2626 sw67th street | | lawton |
| | FOOTMAO | MOHLES | LORI | L | | 4616 Shiloh Dr | | West Palm Beach |

FIG.38A

Nominator Detail Data (ordered by Nominee SSN/All Records):

| NOME_SSN | NOME_LNAME | NOMR_LNAME | NOMR_FNAME | MID_NAME | SUFX | STREET | APT_NBR | CITY |
|---|---|---|---|---|---|---|---|---|
| | ROSE ASHLEZ | HAZUGB | Larry | ROBERT | | 2911 FOX HOLLOW WAY | | JEFFERSONVILLE |
| | Kalrb | Houlemare | Renee | L | | 2313 N. Chester Avenue | | Pasadena |
| | Riverb | Stolotg | Byron | | Mr | 262 W Luzerne St | | Phila. |
| | Hamiltoo | Towert | Chris | Ellen | | 4910 Saco Ct | | El Paso |
| | Shelly Gumbt | Hansoo | Arlene | Amoto | MRS | 10 Willis Road | | Peabody |
| | Fitsaimf | Cloudmao | David | B | | 5171 SW 84th Terrace | | Davie |
| | Coloo | Carez | Lisa | M | Mrs | 3541 Toler Road | | Woodlawn |
| | Taylos | Nunlez | Denise | M | | 3141 E Creedance Blvd | | Phoenix |

FIG.38B

Nominator Detail Data (ordered by Nominee Name/All Records):

| NOME_SSN | NOME_LNAME | NOMR_LNAME | NOMR_FNAME | MID_NAME | SUFX | STREET | APT_NBR | CITY |
|---|---|---|---|---|---|---|---|---|
| | | BIB | EMMETT | | JR | PO BOX 466 | | MANY FARMS |
| | | COBC | WILLIAM | PAUL | | 21764 SW 253 LANE | | MIAMI |
| | | SMITI | JOSHUA | WADE | | 842 MADISON S'3 | | MINNEAPOLIS |
| | | SMITI | SUSAN | L | MRS | 0333 ANDREW DR | | MANASSAS PAR |
| | | ADAMS GREEO | LOLITA | | | 2031 MCGRAW /5D | | BRONX |
| | | LEVINF | TARRI | | | 2326 SGERREB STREET WEST | | ROSEVILLE |
| | | BIB | EMMETT | | JR | PO BOX 466 | | MANY FARMS |
| | | COBC | WILLIAM | PAUL | | 21764 SW 253 LANE | | MIAMI |
| | | SMITI | JOSHUA | WADE | | 842 MADISON S'3 | | MINNEAPOLIS |
| | | SMITI | SUSAN | L | MRS | 0333 ANDREW DR | | MANASSAS PAR |

FIG.39A

Nominator Detail Data (ordered by Nominee Name/All Records):

| NOME_SSN | NOME_LNAME | NOMR_LNAME | NOMR_FNAME | MID_NAME | SUFX | STREET | APT_NBR | CITY |
|---|---|---|---|---|---|---|---|---|
| | | ADAMS GREEO | LOLITA | | | 2031 MCGRAW | 5D | BRONX |
| | | LEVINF | TARRI | | | 2326 SGERREB STREET WEST | | ROSEVILLE |
| | | CHISHOLN | ELAINE | J | | 20236 LOOMIS AVENUE | | HOMEWOOD |
| | | Rost | asbleigh | N | | 312 south bounds | | Thrall |
| | | WHITF | WESLEY | S | | 4219 VIA BREVE | | MONTEBEllo CA |
| | | HAYET | TOMMY | L | BZ | 31 W WOODWARD AVENUE | | EUSTIS |

FIG.39B

Nominator Detail Data (ordered by Nominator Name/All Records):

| NOME_SSN | NOME_LNAME | NOMR_LNAME | NOMR_FNAME | MID_NAME | SUFX | STREET | | CITY |
|---|---|---|---|---|---|---|---|---|
| | ignore | | | | | | | |
| 133627641 | HOANH | | | | | | | |
| 552651157 | CRAWFORE | | | | | | | |
| 281641822 | LIN | | ROSALIND | | | 21528 VALLEY FORCE CIRCLE | | KING OF PRUSSI |
| 516453141 | Hernandea | JONET | DONNA | | | PO BOx 298 | 5516 | COLLINSVILLE |
| 93862784 | HADAWAZ | OLEARZ | CATHRINE | A | | 3313 71TH STREET | 22315 | BROOKLYN NY |
| 175685599 | Hernansea | Lorf | Debbra | R | | 22731 Camp DRIVE | | DUNNELLON |
| 324555746 | solt | nealf | mary | c | | 425 South FRederick Ave | | Gaithersburg |
| 314045910 | PARKES | ALLEO | SANDRA | A | | 2315 TORRINGTON PLACE | | LARGO |

FIG. 40A

Nominator Detail Data (ordered by Nominator Name/All Records):

| NOME_SSN | NOME_LNAME | NOMR_LNAME | NOMR_FNAME | MID_NAME | SUFX | STREET | CITY |
|---|---|---|---|---|---|---|---|
| 710229867 | kidd Anjenise Lamyb | SANDeRT | MichAel | W | | 2326 VISTA GRANDE DR | VISTA |
| 448807807 | HF | BANIEWILA | JENNIFER | Ellen | | 20730 S SAWYER | CHICAGO |
| 337499766 | MOnROF | CHRISTMAT | Craig | B | | 5322 Dorset ROAd | Richmond |
| 389807997 | AILEO | GRISMES | DIAMENNE | | | 6109 BURKHARDT ROAD | DAYTON |
| 662753149 | GREENF | HALET | ROBERTA | J | MS | 92 861 AVE 57 | INDIO |
| 633965019 | BrOwo | HEROH | Tami | JO | | 8 MiLLer LANE | MONTESANO |
| 236765295 | CaMQ | MORRISOo | RAndy | | | 26 LARCHMONT CouRt | PenningtoN |

FIG. 40B

Recommendation Floaters with Possible Nominee Linkages (ordered by Nominee Name, SSN)

| Last_Name | First_Name | Nominee_Profile Data Mid_Name | NOMEssn | NOMEphone | NOMEssn | Recommendation Data NOMELast_Name | RECOMLast_Name |
|---|---|---|---|---|---|---|---|
| SANCHEZ | SANCHEZ | SELENE | 621415054 | 3035557138 | 701038050 | | JACKSOO |
| SANCHEZ | SANCHEZ | SELENE | 621415054 | 3035557138 | 426747954 | | Riojat |
| SANCHEZ | SANCHEZ | SELENE | 621415054 | 3035557138 | 342391298 | | CALDWELM |
| SANCHEZ | SANCHEZ | SELENE | 621415054 | 3035557138 | 1 | | Russelm |
| SANCHEZ | SANCHEZ | SELENE | 621415054 | 3035557138 | 341598852 | | STREATES |
| SANCHEZ | SANCHEZ | SELENE | 621415054 | 3035557138 | 499987391 | | PERINB |
| | amy | allison | 668772495 | 9255554974 | 701038050 | | JACKSOO |
| | amy | allison | 668772495 | 9255554974 | 426747954 | | Riojat |
| | amy | allison | 668772495 | 9255554974 | 342391298 | | CALDWELM |
| | amy | allison | 668772495 | 9255554974 | 1 | | Russelm |
| | amy | allison | 668772495 | 9255554974 | 341598852 | | STREATES |
| | amy | allison | 668772495 | 9255554974 | 499987391 | | PERINB |
| | duran | gabriel | 720142464 | 4085552662 | 701038050 | | JACKSOO |
| | duran | gabriel | 720142464 | 4085552662 | 426747954 | | Riojat |
| | duran | gabriel | 720142464 | 4085552662 | 342391298 | | CALDWELM |
| | duran | gabriel | 720142464 | 4085552662 | 1 | | Russelm |
| | duran | gabriel | 720142464 | 4085552662 | 341598852 | | STREATES |
| | duran | gabriel | 720142464 | 4085552662 | 499987391 | | PERINB |
| CHUONH | TOAN | QUOC | 752019245 | 7195550659 | 648835765 | CHUONH | THOMPSOO |

FIG.41A

Recommendation Floaters with Possible Nominee Linkages (ordered by Nominee Name, SSN)

| Last_Name | First_Name | Nominee_Profile Data Mid_Name | NOMEssn | NOMEphone | NOMEssn | Recommendation Data NOMELast_Name | RECOMLast_Name |
|---|---|---|---|---|---|---|---|
| ABDULLAI | QADRIYYAH | SABREEN | 658793016 | 6195557221 | 249904792 | Abdulfi | Sbnf |
| Abellare | Najohe | | 255025930 | 6095550419 | 255625930 | ABELLARE | IMPAGLIAZZP |
| abercrombif | steve | | 523319859 | 2055555225 | 668951345 | abercrombif | Arcep |
| Abeytb | Jennifer | Marie | 705181040 | 3105554573 | 639924040 | ABEYTB | HARMAO |
| Abrahan | Bency | | 197722241 | 5165550028 | 742222611 | ABRAHAN | REESF |
| Abrahan | Bency | | 197722241 | 5165550028 | 551954253 | ABRAHAN | DITTMAS |
| Abrahan | Bency | | 197722241 | 5165550028 | 552935635 | Abrahan | Morrisoo |
| Abrahan | Bency | | 197722241 | 5165550028 | 238760486 | ABRAHAN | MCQUILLA - GOINET |
| Abrahan | Bency | | 197722241 | 5165550028 | 461746049 | ABRAHAN | SUTTOO |
| Abrahan | Sarah | | 238760486 | 2015551427 | 742222611 | ABRAHAN | REESF |
| Abrahan | Sarah | | 238760486 | 2015551427 | 551954253 | ABRAHAN | DITTMAS |
| Abrahan | Sarah | | 238760486 | 2015551427 | 552935635 | Abrahan | Morrisoo |
| Abrahan | Sarah | | 238760486 | 2015551427 | 461746049 | ABRAHAN | ABRAHAN |
| Abrahan | Weslie | Sharice | 318133702 | 4105550385 | 742222611 | ABRAHAN | REESF |
| Abrahan | Weslie | Sharice | 318133702 | 4105550385 | 551954253 | ABRAHAN | DITTMAS |
| Abrahan | Weslie | Sharice | 318133702 | 4105550385 | 552935635 | Abrahan | Morrisoo |
| Abrahan | Weslie | Sharice | 318133702 | 4105550385 | 238760486 | ABRAHAN | MCQUILLA - GOINET |
| Abrahan | Weslie | Sharice | 318133702 | 4105550385 | 461746049 | ABRAHAN | SUTTOO |

FIG. 41B

Recommendation Floaters (ordered by Nominee SSN)

| NOMEssn | NOMELast_Name | RECOMLast_Name | RECOMFirst_Name | RECOMphone | STREET | APT_NBR | CITY |
|---|---|---|---|---|---|---|---|
| | Suarea | Cornejp | Edward | 7185556100 | 3564 Morgan Avenue | | Bronx |
| | Katherine Robainf | Perreaulu | Donald | 8605553328 | Valley Regional High School | | Deep River |
| | Katherine Robainf | Perreaulu | Donald | 8605553328 | Valley Regional High School | | Deep River |
| | Katherine Robainf | Perreaulu | Donald | 8605553328 | Valley Regional High School | | Deep River |
| | Katherine Robainf | Perreaulu | Donald | 8605553328 | Valley Regional High School | | Deep River |
| | Katherine Robainf | Perreaulu | Donald | 8605553328 | Valley Regional High School | | Deep River |
| | Katherine Robainf | Perreaulu | Donald | 8605553328 | Valley Regional High School | | Deep River |
| | Katherine Robainf | Perreaulu | Donald | 8605553328 | Valley Regional High School | | Deep River |
| | Hortoo | McKenzif | Robert | 2535559004 | 42372 44th Avenue SW | | Federal Way |
| | Va Phan | Woodt | George | 4805554543 | 745 W.Naranja Ave | | Mesa |
| | Hintoo | Pitcocl | Lillian | 2085552760 | 3936 Sioux Street | | Nampa |
| | Estebao | Spita | Susan | 4075553460 | 5167 Waterview Loop | | Winter Park |
| | Elit | Bevillf | Shelley | 3215554737 | 4106 Black Gum Dr. | | Mims |
| | Doao | Koolb | Monica | 9795552201 | 724 Plantation | | Angleton |
| | Mehtb | DEMEL | CHARLES | 7035554788 | 7516 WHIPPANY WAY | | BURKE |
| | | WILSOO | RICKy | 8035552445 | 9377 FLAYCREEK RD | | Kershaw |
| | ARREDONBV | HARU | DANIEL | 8185553302 | 3812 12 SANBORN | | LA CRESCENTA |
| | Webc | Steinberges | John | 8105553317 | 23582 Lutz | | Warren |
| | Cummingt | Textes | Kenneth | 8455557726 | 38 Leif Blvd. | | Congers |
| | Gibsoo, Tiffany | Purcelm | Lori | 7705555952 | 355 Lovejoy Road | | Hampton |
| | Lesanf | Feldes | Kimberly | 2125555275 | 3346 5th Avenue | 7E | New York |
| | Nickersoo | Steadz | Joanne | | 2010 Jackson Av | | Melbourne |
| | Chunh | Treadwaz | Patricia | 5015556804 | 10 Terrace Drive | | Little Rock |
| | Chunh | Treadwaz | Patricia | 5015556804 | 10 Terrace Drive | | Little Rock |

FIG. 42A

Recommendation Floaters (ordered by Nominee SSN)

| NOMEssn | NOMELast_Name | RECOMLast_Name | RECOMFirst_Name | RECOMphone | STREET | APT_NBR | CITY |
|---|---|---|---|---|---|---|---|
| | Chunh | Treadwaz | Patricia | 5015556804 | 10 Terrace Drive | | Little Rock, |
| | Chunh | Treadwaz | Patricia | 5015556804 | 10 Terrace Drive | | Little Rock, |
| | KIN | NORA M MOCARSKJ | | 8605552294 | MAJOR BESSE DRIVE | | TORRINGTON |
| | | DAVIT | ELEEN | 2025557322 | 4211 CONNECTICUT AVENUE NW 439 | | WASHINGTON DC |
| HARRIS LAKRIT | | YAGLEZ | RICHARD | 3135559200 | 31951 CROWLEY | | SAINT CLAIR SH |
| LJANH | | STANTIED | VICTOR | 2155555916 | 14TH AND MOUNT VERNON ST | | PHILADELPHIA |
| | | HARU | JAMIE | 2105559552 | 6434 VISTA CT DR | | SAN ANTONIO |
| GREEO | | JENKINT | NEAL | 7575554524 | 716 ROSAER LANE | | VIRGINIA BEACH |
| TONH | | VERDJ | CLAIRE | 9495556172 | 27 ROSEMARY STREET | | IRVINE |
| JOEvelte Shaf S | | LeBland | MICHELIE | 7135557627 | 66211 CARINO | | HOUSTON |
| | | davit | ANNE | 2195556045 | 654 NUturnon AVENUE | | FoRT WAYNE |
| NGUYEO | | KAINA | LORRAINE | 8605554481 | 33 HILLSIDE DRIVE | | MOOSUP |
| LOCKLEAS | | MUIS | KENNETH | 7045556792 | 9723 QUARTERS LANE | | CHARLOTTE |

FIG.42B

Recommendation Floaters (ordered by Nominee Last Name, SSN)

| NOMEssn | NOMELast_Nam | RECOMLast_Name | RECOMFirst_Name | RECOMphone | STREET | APT_NBR | CITY |
|---|---|---|---|---|---|---|---|
| | | WILSOO | RICKy | 8035552445 | 9377 FLAYCREEK RD | | Kershaw |
| | | DAVIT | EILEEN | 2025557322 | 4211 CONNECTICUT AVENUE NW 328 | | WASHINGTON DC |
| | | HARU | JAMIE | 2105559552 | 6434 VISTA CT DR | | SAN ANTONIO |
| | | davit | ANNIE | 2195556045 | 654 NUuman AVENUE | | FoRT WAYNE |
| | | NAKAMOTP | KENNETH | 6505555202 | 2207 DOME AVENUE | | SUNNYVALE |
| | | TESCHNES | RANDALL | 7195551390 | 96 SUNFLOWER RD 450 | | COLORADO SPR |
| | | JOHNSOO | MARy | 3615552232 | Po BOX 4119 | | PORT ARANSAS |
| | | BROWO | ROBERT | 6315551285 | 52 PENNDALE DRIVE | | AMITYVILLE |
| | | PAYNF | StaveH | 9545552334 | 2156 SoUTH FLAGLER | 828 | POmPANO BEAC |
| | | HOLMAO | FREDDIE | 2165552415 | CHADBOURNE ROAD | | SHAKER HEIGH |
| | | YOSU | GAIL | 4355552135 | 372 SOUTH 100 EAST | | LOGAN |
| | | JOHNSOO | DENNIS | | 7811 S OGLESBY | | CHICAGO |
| | | WHEATLEZ | LORETTA | 8305552194 | 435 LOST TRAIL CIRCLE | | LAVERNA |
| | | DUFRENF | MICHAEL | 7035558500 | 0116 TUDOR LANE | | MANASSAS |
| | | INGLF | Lynne | 7095550499 | 5243 UppeRGARE Lane | 413 | ChaRlotte |
| | | SCHULA | MARLO | 4055551141 | 2271 McCONNELL DRIVE | | YUKON |
| | | freemao | DELORES | 6105556716 | 876 EAST 35TH street | | CHESTER |
| | | POPF | MERRIE | 4075555509 | 2190 ERIELLE Ct | | OUIEDO |
| | | TRICARICP | JOHN | 3035550991 | 21123 S OAK LEAF WAY | | HIGHLANDS RA |

FIG.43A

Recommendation Floaters (ordered by Nominee Last Name, SSN)

| NOMEssn | NOMELast_Nom | RECOMLast_Name | RECOMFirst_Name | RECOMphone | STREET | APT_NBR | CITY |
|---|---|---|---|---|---|---|---|
| | | colisa | donna | 6025551813 | 23547 NORTH 49TH DRIVE | | GLENDALE |
| | | | | 2815554001 | 24703 PARTAGE LANE | | HOUSTON |
| | | diana beatif | diana | 3015554791 | 3428 glendien ave | 313 | silver springs |
| | | MILES | SYLVIA | | 4132 fbl 774 | | nILOTHIAN |
| | | WHITF | WESLEY | 3235556060 | 4219 VIA BREVE | | MONTEBELLO |
| | | Russelim | TIMOTHY | 5035551204 | 4913 SW 15th DRIVE | | GRESHAM |
| 341598852 | | STREATES | SHIRLEY | 704 | 228 SHELTON CIRCLE | | WADESBORO |
| 499987391 | | PERINB | ANNE | 4145553996 | 2311 E.FAIRMOUNT AVE | | WHITEFISH BAY |
| 701038050 | | JACKSOO | DENISE | 6025551547 | 6610 N CENTRAL | | PhOENIX |
| 561997730 | VILLB | BALLESTEROT | MARIA | 2105552535 | 36114 BLACK CREEK | | SAN ANTONIO |
| 561656862 | quin christp | froelici | joy | 9725556688 | 2713 East frankford | 3017 | Carrollton |
| | KIMBERLZ | JACKSOO | GLORIA | 5045554959 | 3447 DEERLICK LN | | HARVEY |
| 553638815 | WALKERNIB | ELLITYVONNE | | 3145551816 | PO BOX 732 | | FLORISSANT |
| 715175229 | AJIBOYF | goldstein | rachel | 5105554475 | 781 54th ST | | Oakland |

FIG.43B

Recommender Detail Data (ordered by Nominee SSN/All Records):

| NOME_SSN | NOME_LNAME | RECO_LNAME | RECO_FNAME | MID_NAME | SUFX | STREET | APT_NBR | CITY |
|---|---|---|---|---|---|---|---|---|
| | Suarea | Corenjp | Edward | | Mr. | 3564 Morgan Avenue | | Bronx |
| | Katherine Robainf | Perreauls | Donald | | | Valley Regional High School | | Deep River |
| | Katherine Robainf | Perreauls | Donald | | | Valley Regional High School | | Deep River |
| | Katherine Robainf | Perreauls | Donald | | | Valley Regional High School | | Deep River |
| | Katherine Robainf | Perreauls | Donald | | | Valley Regional High School | | Deep River |
| | Katherine Robainf | Perreauls | Donald | | | Valley Regional High School | | Deep River |
| | Hortoo | McKenzif | Robert | | Jr | 43272 33rd Avenue SW | | Federal Way |
| | Va Phan | Woodt | George | | | 745 W.Naranja Ave | | Mesa |
| | Hintoo | Pitcod | Lilleno | | | 3936 Sioux Street | | Nampo |

FIG.44A

Recommender Detail Data (ordered by Nominee SSN/All Records):

| NOME_SSN | NOME_LNAME | RECO_LNAME | RECO_FNAME | MID_NAME | SUFX | STREET | APT_NBR | CITY |
|---|---|---|---|---|---|---|---|---|
| | Esteban | Spita | Susan | | | 5167 Waterview Loop | | Winter Park |
| | Ellit | Bevilli | Shelley | | | 5217 Black Gum Dr. | | Mons |
| | Doao | Kotrib | Monica | | | 724 Plantation | | Angleton |
| | Mehtb | DEMEL | CHARLES | T | | 7516 WHIPPANY WAY | | BURKE |
| | | WILSOO | RICKy | LevoN | | 9377 FLAYCREEK RD | | Kershaw |
| | ARREDONBV | HARU | DANIEL | M | | 3812 23 SANBORN | | LA CRESLOWTA |
| | Webc | Steinberges | John | | | 23582 Lutz | | Warren |
| | Cummingt | Textes | Kenneth | | | 38 Leif Blvd. | | Congers |
| | Gibsoo, Tiffany | Purcelm | Lori | | | 355 Lovejoy Road | | Hampton |

FIG. 44B

Recommender Detail Data (ordered by Nominee Name/All Records):

| NOME_SSN | NOME_FNAME | RECO_LNAME | RECO_FNAME | MID_NAME | SUFX | STREET | APT_NBR | CITY |
|---|---|---|---|---|---|---|---|---|
| 499987391 | | WILSOO | RICKy | LevoN | | 9377 PLAYCREEK RD | | KERSHAW |
| | | PERINB | ANNE | W | MS | 2311 E FAIRMOUNT AVE | | WHITEFISH BAY |
| | | DAVIT | EILEEN | T | | 4211 CONNECTICUT AVE NW 439 | | WASHINGTON DC |
| | | STREATES | SHIRLEY | A | | 228 SHELTON CIRCLE | | WADESBORO |
| 341598852 | | HARU | JAMIE | D | | 6434 VISTA CT DR | | SAN ANTONIO |
| | | davit | ANNE | LEWIS | | 654 NUtmon AVENUE | | FoRT WAYNE |
| | | NAKAMOTP | KENNETH | H | | 2207 DOME AVENUE | | SUNNYVALE |
| | | TESCHNES | RANDALL | WAYNE | | 96 SUNFLOWER RD 450 | | COLORADO SPR |
| | | JOHNSOO | MARY | V | | Po BOX 4119 | | PORT ARANSAS |

FIG.45A

Recommender Detail Data (ordered by Nominee Name/All Records):

| NOME_SSN | NOME_LNAME | RECO_LNAME | RECO_FNAME | MID_NAME | SUFX | STREET | APT_NBR | CITY |
|---|---|---|---|---|---|---|---|---|
| 1 | | BROWO | ROBERT | ALLEN | | 52 PENNDALE DRIVE | | AMITYVILLE |
| | | PAYNF | Steven | WaldO | Jr | 2156 SoUTH FLAGLER | 828 | POmPANO BEAC |
| | | HOLMAO | FREDDIE | BOYD | | CHADBOURNE ROAD | | SHAKER HEIGH |
| | Russelm | | TIMOTHy | SCOTT | | 4913 SW 25th DRIVE | | GRESHAM |
| 342391298 | CALDWELM | RICHARD | C | | | 218 AURORA LANE | | HUNTERSVILLE |
| | | YOSU | GAIL | BONNIE | PHD | 372 SOUTH 100 EAST | | LOGAN |
| | | JOHNSOO | DENNIS | | | 7811 S OGLESBY | 413 | CHICAGO |

FIG.45B

Recommender Detail Data (ordered by Recommender Name/All Records):

| NAME_SSN | NAME_LNAME | RECO_LNAME | RECO_FNAME | MID_NAME | SUFX | STREET | APT_NBR | CITY |
|---|---|---|---|---|---|---|---|---|
| 715443294 | ROJAT | | | | | | | |
| 506356920 | PHILLIPT | | | | | | | |
| 678067028 | FERNANDEA | | DANA | E | | 24713 PARTAGE LANE | | HOUSTON |
| 0 | GILLIPIO C CORETTA | | | | | 5239 SIR WALTER ROAD | | OLNEY |
| 567872850 | COTTP | | LYNN | SHAWN | NR | 6613 OAKTRAIL LN | | HOUSTON |
| 725469746 | THAP | QUINO SUSAN | JANE | T | II | 3712 ROBINSON DRIVE TRLR 64 | | WACO |
| 171742961 | David | KIBLES | CAMILLE | M | | 6844 NORTH FIFTH STREET | | FRESNO |
| | | | | | | Po BOX 362 | | PINE FORGE |

FIG. 46A

Recommender Detail Data (ordered by Recommender Name/All Records):

| NOME_SSN | NOME_LNAME | RECO_LNAME | RECO_FNAME | MID_NAME | SUFX | STREET | APT_NBR | CITY |
|---|---|---|---|---|---|---|---|---|
| 444720173 | MCCALESTES | WINTERT | THOMAS | J | | 2435 HARBOUR TOWN PLACE | | BANDERA |
| 446720721 | ALLEO | GREFG | lmargaret | DOLAN | MRS | PO Box 755 | | SUGAR LAND |
| 561690827 | HERNANDEA | INEA | DAWN | LOTTI | | 2942 MICHELE DR | | WASHINGTON |
| 266640520 | PERTERSOO | RELKB | CONNIE | | | 312 ALLISON AVE | | |
| 700844632 | HARRIT | ASBURZ | CALVIN | L | MR | 5849 BIG OAK BEND 1 | | MARIETTA |
| 700227539 | PAPPP | CORIEA | NORMA | | | 35824 SUNNYMEAD BLVD | | MORENO VALLI |
| 692439065 | FeRnandea | DOWNEZ | MARY | V | ms | 3161 NO 74 ST | | PHILA |

FIG.46B